US012599936B2

(12) United States Patent
Chalkley et al.

(10) Patent No.: US 12,599,936 B2
(45) **Date of Patent: *Apr. 14, 2026**

(54) CLEANER ASSEMBLIES, APPARATUSES INCLUDING A CLEANER ASSEMBLY, METHODS OF MAKING THE SAME, AND/OR METHODS OF OPERATING THE SAME

(71) Applicant: Altria Client Services LLC, Richmond, VA (US)

(72) Inventors: Jarrod W. Chalkley, Mechanicsville, VA (US); Robert Powell, Midlothian, VA (US); Christopher R. Newcomb, Powhatan, VA (US); Jeremy Straight, Midlothian, VA (US); Isaac J. McGill, Richmond, VA (US); James David Evans, Chesterfield, VA (US); Patrick McElhinney, Chesterfield, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/971,749

(22) Filed: Dec. 6, 2024

(65) Prior Publication Data

US 2025/0100734 A1 Mar. 27, 2025

Related U.S. Application Data

(60) Continuation of application No. 18/532,455, filed on Dec. 7, 2023, now Pat. No. 12,195,221, which is a (Continued)

(51) Int. Cl.

*B65B 55/24* (2006.01)
*B08B 1/30* (2024.01)

(Continued)

(52) U.S. Cl.

CPC .................. *B08B 1/30* (2024.01); *B08B 1/34* (2024.01); *B65B 9/04* (2013.01); *B65B 47/10* (2013.01); *B65B 55/24* (2013.01); *B65B 61/06* (2013.01)

(58) Field of Classification Search

None

See application file for complete search history.

(56) References Cited

U.S. PATENT DOCUMENTS 3,460,464 A * 8/1969 Mccarthy .................. B65B 1/24 100/232
6,467,120 B1 * 10/2002 Ziemins .................... B08B 1/34 15/97.1

(Continued)

FOREIGN PATENT DOCUMENTS

KR 20170114377 A * 10/2017 ............. B65B 35/32

*Primary Examiner* — Tanzim Imam

(74) *Attorney, Agent, or Firm* — HARNESS, DICKEY & PIERCE, P.L.C.

(57) ABSTRACT

A cleaner assembly for an apparatus for making pouch products includes a cleaner roller and a poker roller. The cleaner roller may counter rotate with a rotatable drum of the apparatus, in contact with an upper surface of a first elastic layer on the rotatable drum, and at a greater tangential speed than at least one surface of an outer circumferential surface of the rotatable drum or an upper surface of the first elastic layer. The poker roller includes projections that are each configured to extend into one or more divots of the rotatable drum. The poker roller may counter rotate with the rotatable drum and at a same tangential speed as the at least one surface such that the projections extend into and out of separate, respective divots of the rotatable drum based on the counter rotation of the poker roller and the rotatable drum.

20 Claims, 95 Drawing Sheets
(47 of 95 Drawing Sheet(s) Filed in Color)

Related U.S. Application Data division of application No. 17/674,216, filed on Feb. 17, 2022, now Pat. No. 11,891,204.

(51) Int. Cl.

| | |
|---|---|
| ***B08B 1/32*** | (2024.01) |
| ***B08B 1/34*** | (2024.01) |
| ***B65B 9/04*** | (2006.01) |
| ***B65B 47/10*** | (2006.01) |
| ***B65B 61/06*** | (2006.01) |

(56) References Cited

U.S. PATENT DOCUMENTS

| | | | | |
|---|---|---|---|---|
| 6,502,273 | B1 * | 1/2003 | Mihara | H01L 21/67046 492/31 |
| 8,683,920 | B1 * | 4/2014 | Oropeza | B65B 1/06 141/73 |
| 11,891,204 | B2 * | 2/2024 | Chalkley | B65B 61/10 |
| 2011/0088191 | A1 * | 4/2011 | Oohiro | B08B 1/34 15/230 |
| 2011/0265279 | A1 * | 11/2011 | Kawaguchi | A46B 9/005 15/244.4 |
| 2012/0048422 | A1 * | 3/2012 | Dagsland | B65B 1/363 141/98 |
| 2020/0324924 | A1 * | 10/2020 | Nelson | B65B 47/10 |
| 2020/0354097 | A1 * | 11/2020 | Chalkley | B29C 65/7441 |
| 2022/0258217 | A1 * | 8/2022 | Nishijima | G01L 5/0076 |

* cited by examiner

CLEANER ASSEMBLIES, APPARATUSES INCLUDING A CLEANER ASSEMBLY, METHODS OF MAKING THE SAME, AND/OR METHODS OF OPERATING THE SAME

CROSS-REFERENCE TO RELATED APPLICATIONS

The present application is a continuation of and claims priority under 35 U.S.C. §§ 120/121 to U.S. patent application Ser. No. 18/532,455, filed on Dec. 7, 2023, which is a divisional of and claims priority under 35 U.S.C. §§ 120/121 to U.S. patent application Ser. No. 17/674,216, filed on Feb. 17, 2022, the entire contents of each of which are hereby incorporated by reference.

BACKGROUND

Field

The present inventive concepts relate to cleaner assemblies, apparatuses including a cleaner assembly, methods of making the cleaner assemblies and/or apparatuses, and/or methods of operating the cleaner assemblies and/or apparatuses.

Description of Related Art

In manufacturing plant material products (e.g., oral products), machines may be used to prepare pouches containing plant material products. In some cases, the pouches may be filled with plant material.

SUMMARY

Example embodiments relate to a cleaner assembly, an apparatus including the cleaner assembly, methods of making the cleaner assemblies and/or apparatuses, and/or methods of operating the cleaner assemblies and/or apparatuses.

According to some example embodiments, an apparatus for making pouch products may include a first material dispensing station, a doser assembly at a dosing location, a second material dispensing station, a conveyor system, and a cleaner assembly. The first material dispensing station may be configured to transfer a first material to a first receiving location, the first material including a first elastic layer and a first support layer. The first material dispensing station may include a dispenser roller configured to hold a roll of the first material, a plurality of rollers configured to convey the first material from the dispenser roller to the first receiving location, and a stripper plate configured to remove at least a portion of the first support layer from a portion of the first elastic layer. The doser assembly may be configured to deliver a filler material to a portion of the first material. The second material dispensing station may be configured to transfer a second material to a second receiving location. The second material may include a second elastic layer and a second support layer. The first material may be aligned with the second material at the second receiving location, such that the filler material is between the portion of the first material and a portion of the second material. The second material dispensing station may include a second dispenser roller configured to hold a roll of the second material, a second plurality of rollers configured to convey the second material from the second dispenser roller to the second receiving location, and a second stripper plate configured to remove at least a portion of the second support layer from the second elastic layer, the second stripper plate adjacent the second receiving location. The conveyor system may include a rotatable drum that includes a plurality of divots along an outer circumferential surface of the rotatable drum, the plurality of divots configured to travel along a path of the rotatable drum, the plurality of divots configured to allow a vacuum to be communicated to the plurality of divots at the dosing location, such that separate, respective portions of the first elastic layer are drawn into separate, respective divots of the plurality of divots at the dosing location. The cleaner assembly may be between the doser assembly and the second material dispensing station. The cleaner assembly may be configured to move the filler material on an upper surface of the first elastic layer into one or more divots of the plurality of divots and to compress the filler material in the one or more divots. The cleaner assembly may include a cleaner roller and a poker roller. The cleaner roller may be configured to counter rotate with the rotatable drum and at a greater tangential speed than at least one of the outer circumferential surface of the rotatable drum or the upper surface of the first elastic layer, such that an outer surface of the cleaner roller is in contact with the upper surface of the first elastic layer on the outer circumferential surface of the rotatable drum. The poker roller may include a plurality of projections that are each configured to extend into the one or more divots of the plurality of divots of the rotatable drum. The poker roller may be configured to counter rotate with the rotatable drum and at a same tangential speed as the at least one of the outer circumferential surface of the rotatable drum or the upper surface of the first elastic layer, such that the projections extend into and out of separate, respective divots of the plurality of divots based on the counter rotation of the poker roller and the rotatable drum. The cleaner roller may be between the dosing location and the poker roller, such that the cleaner roller is configured to move the filler material on the upper surface of the first elastic layer into the one or more divots of the plurality of divots of the rotatable drum prior to the poker roller compressing the filler material in the one or more divots of the plurality of divots. The plurality of divots of the rotatable drum may include a plurality of separate lanes of divots extending in parallel around the outer circumferential surface of the rotatable drum. The plurality of projections of the poker roller may include a plurality of lanes of projections extending in parallel around an outer circumferential surface of the poker roller. The plurality of lanes of projections may be aligned with separate, respective lanes of divots of the rotatable drum such that respective projections of each separate lane of projections is configured to extend into and out of one or more divots of a separate, respective lane of divots of the rotatable drum based on the counter rotation of the poker roller and the rotatable drum.

The cleaner roller may include at least a compressible roller material that defines the outer surface of the cleaner roller. The cleaner roller may be configured to compress the compressible roller material against the upper surface of the first elastic layer on the outer circumferential surface of the rotatable drum.

The compressible roller material may include silicone.

The cleaner roller may be a circular cylindrical roller or a polygonal cylindrical roller.

A smallest spacing distance between the rotatable drum and the cleaner roller may be equal to or less than a thickness of the first material.

Each divot of the plurality of divots may have a first length in a first direction, a first width in a second direction that crosses the first direction, and a first depth in a third direction that crosses the first and second directions. Each projection of the plurality of projections may have a second length in a fourth direction that is parallel with a tangent of a curvature of the poker roller, a second width in a fifth direction that crosses the fourth direction, and a second depth in a sixth direction that crosses the fourth and fifth directions. The second length may be smaller than the first length. The second width may be smaller than the first width.

Each projection of the plurality of projections may have an outer surface that is distal from a central axis of the poker roller and has a convex curvature.

The cleaner roller may be configured to rotate such that the outer surface of the cleaner roller moves at a tangential speed that is at least three times greater than the tangential speed of the at least one of the outer circumferential surface of the rotatable drum or the upper surface of the first elastic layer.

According to some example embodiments, a method of making a pouch product may include transferring a first material to a first receiving location, the first material including a first elastic layer and a first support layer, removing a portion of the first support layer from the first elastic layer to form a first web, conveying the first web to a dosing location, applying a vacuum to the first web at the dosing location to form first web portions, filling each of the first web portions with a filler material to form filled first web portions, and conveying the filled first web portions to a cleaner assembly to move the filler material on an upper surface of the first material into one or more divots of a plurality of divots, and compress the filler material in the one or more divots of the plurality of divots.

The method may further include conveying the filled first web portions to a second receiving location, transferring a second material to the second receiving location, the second material including a second elastic layer and a second support layer, and removing a portion of the second support layer to form a second web.

The method may further include aligning the second web with the first web; and sealing the second web to the first web to form the pouch product.

The method may further include cutting the pouch product from the first web and the second web.

According to some example embodiments, a cleaner assembly for an apparatus for making pouch products may include a cleaner roller and a poker roller. The cleaner roller may be configured to counter rotate with a rotatable drum of the apparatus and at a greater tangential speed than at least one of an outer circumferential surface of the rotatable drum or an upper surface of a first elastic layer on the outer circumferential surface of the rotatable drum, such that an outer surface of the cleaner roller is in contact with the upper surface of the first elastic layer on the outer circumferential surface of the rotatable drum. The poker roller may include a plurality of projections that are each configured to extend into one or more divots of a plurality of divots of the rotatable drum, the poker roller configured to counter rotate with the rotatable drum and at a same tangential speed as the at least one of the outer circumferential surface of the rotatable drum or the upper surface of the first elastic layer, such that the projections extend into and out of separate, respective divots of the plurality of divots based on the counter rotation of the poker roller and the rotatable drum. The cleaner roller may be configured to move filler material on the upper surface of the first elastic layer into the one or more divots of the plurality of divots of the rotatable drum prior to the poker roller compressing the filler material in the one or more divots of the plurality of divots.

The plurality of projections of the poker roller may include a plurality of lanes of projections extending in parallel around an outer circumferential surface of the poker roller. The plurality of lanes of projections may be configured to be aligned with separate, respective lanes of divots of the rotatable drum such that respective projections of each separate lane of projections is configured to extend into and out of one or more divots of a separate, respective lane of divots of the rotatable drum based on the counter rotation of the poker roller and the rotatable drum.

The cleaner roller may include at least a compressible roller material that defines the outer surface of the cleaner roller. The cleaner roller may be configured to compress the compressible roller material against the upper surface of the first elastic layer on the outer circumferential surface of the rotatable drum.

The compressible roller material may include silicone.

The cleaner roller may have a circular cylindrical roller or a polygonal cylindrical roller.

Each projection of the plurality of projections may have an outer surface that is distal from a central axis of the poker roller and has a convex curvature.

The cleaner roller may be configured to rotate such that the outer surface of the cleaner roller moves at a tangential speed that is at least three times greater than the tangential speed of the at least one of the outer circumferential surface of the rotatable drum or the upper surface of the first elastic layer.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated. The patent or application file contains at least one drawing executed in color. Copies of this patent or patent application publication with color drawing(s) will be provided by the Office upon request and payment of the necessary fee.

FIGS. 4A-4E along line 13C-13C' shown in FIG. 7D according to some example embodiments.

DETAILED DESCRIPTION

Figure 1A:
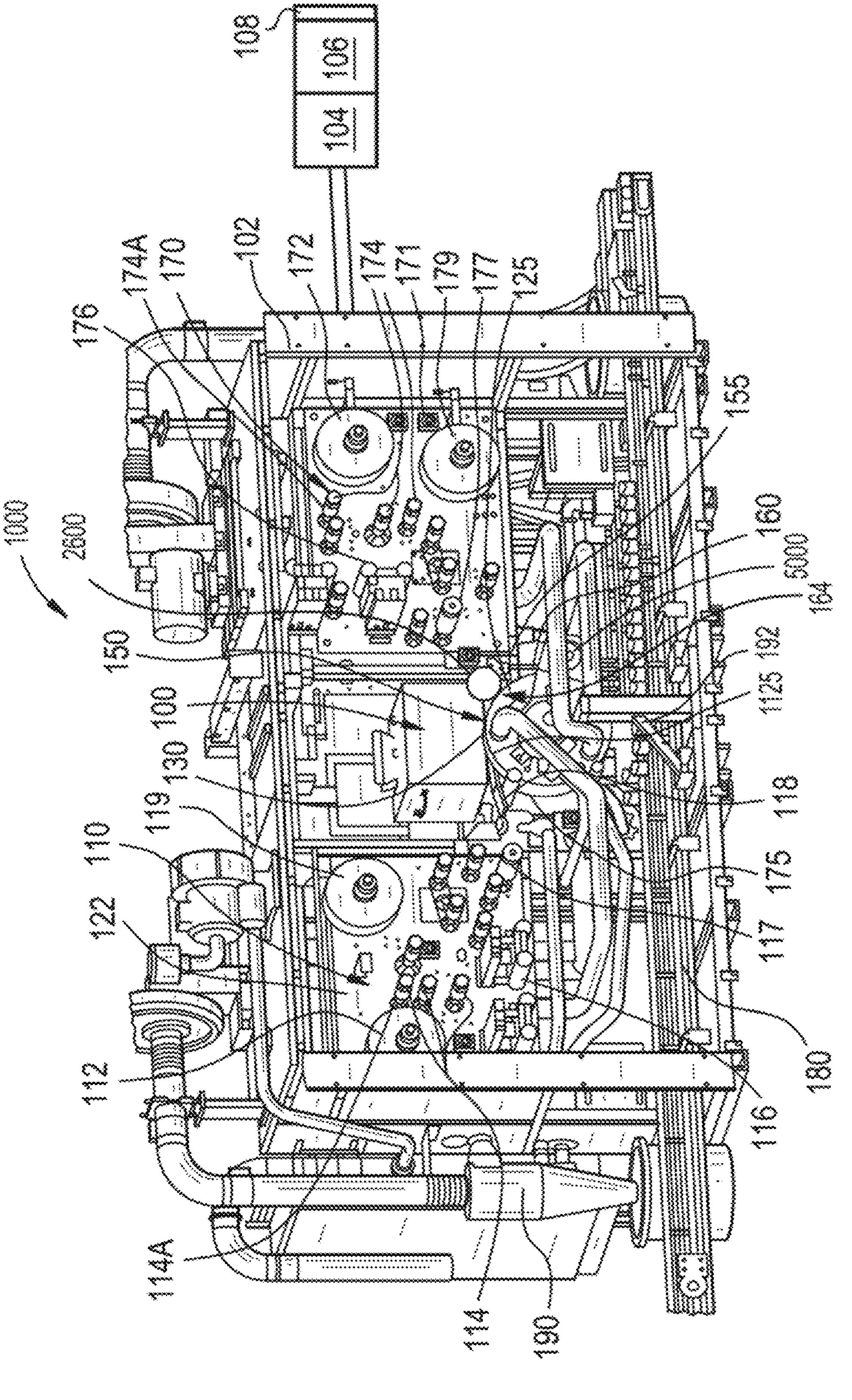
FIG. 1A is a front perspective view of an apparatus for forming a pouch product according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations and variations in shapes.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1B:
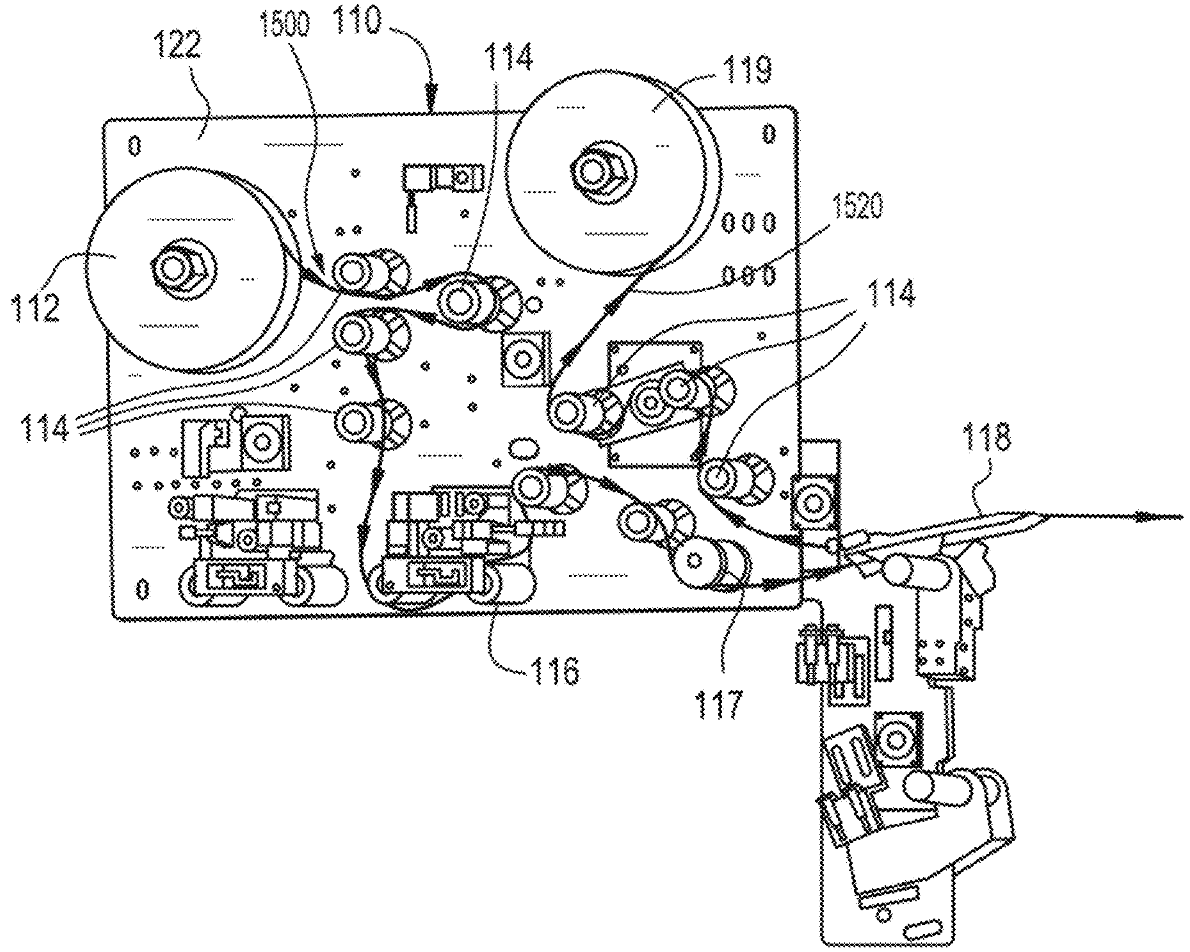
FIG. 1B is an illustration of a first material dispensing station of the apparatus of FIG. 1A according to some example embodiments.

In the drawings, a X-Y-Z coordinate axis may be used to describe some features. The X direction may be referred to as a first direction. The Y direction may be referred to as a second direction. The Z direction may be referred to as a third direction. As shown in FIGS. 1A and 1B, for example, the X, Y, and Z directions may cross each other and may be orthogonal to each other.

Referring to at least FIGS. 1A-3I, in some example embodiments, an apparatus 1000 may be configured to form pouch products that contain a filler material within a pouch comprising webs of elastic layer material that are sealed together.

As described herein, the apparatus 1000 may include a doser assembly 100 on top of and/or over a conveyor system. A description of the doser assembly 100 according to some example embodiments follows with regard to at least FIGS. 4A-18C. As described herein, the apparatus 1000 may include a cleaner assembly 2600. A description of the cleaner assembly 2600 according to some example embodiments follows with regard to at least FIGS. 18A-27. In some example embodiments, the doser assembly 100 and/or the cleaner assembly 2600 may be present independently of the remainder of some or all of the apparatus 1000. In some example embodiments, one or more of the doser assembly 100 or the cleaner assembly 2600 may be absent from the apparatus 1000.

Hereinafter, a non-limiting example of an apparatus 1000 where a doser assembly 100 and a cleaner assembly 2600 according to some example embodiments are placed on top of and/or over a conveyor system including a rotatable drum 1125 is described, but inventive concepts are not limited thereto.

Figure 1C:
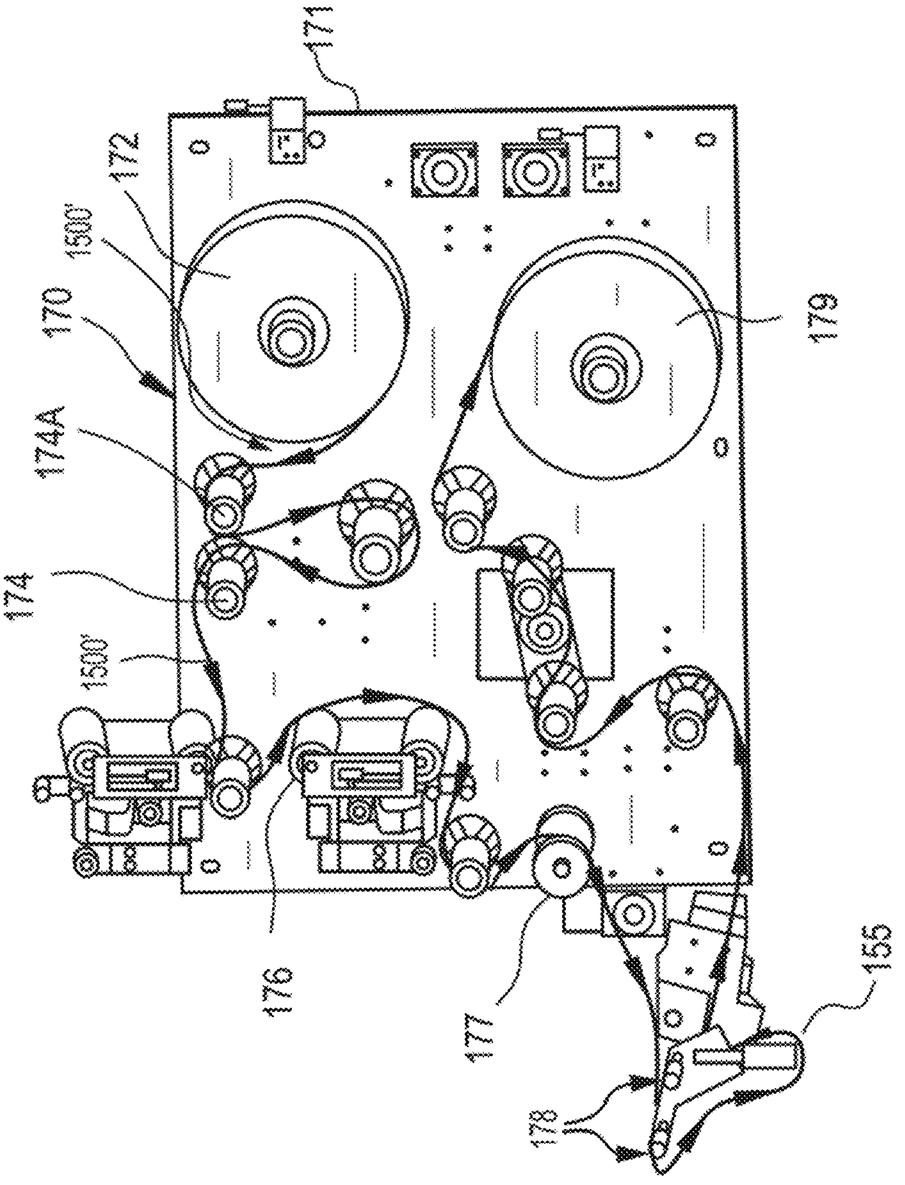
FIG. 1C is an illustration of a second material dispensing station of the apparatus of FIG. 1A according to some example embodiments.
Figure 1D:
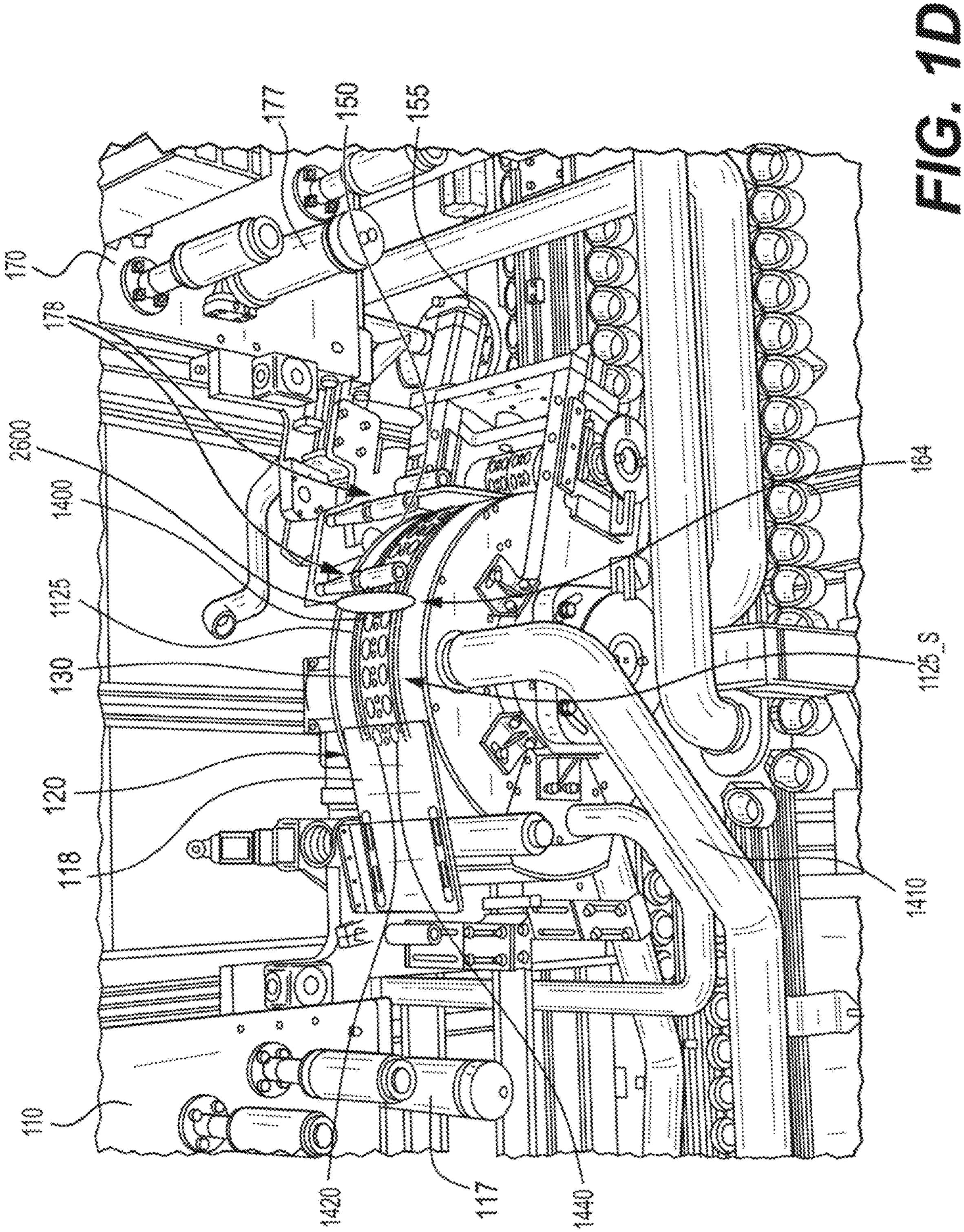
FIG. 1D is a partial view of a first receiving location, a dosing location, a cleaning location, and a second receiving location of the apparatus of FIG. 1A according to some example embodiments.
Figure 1E:
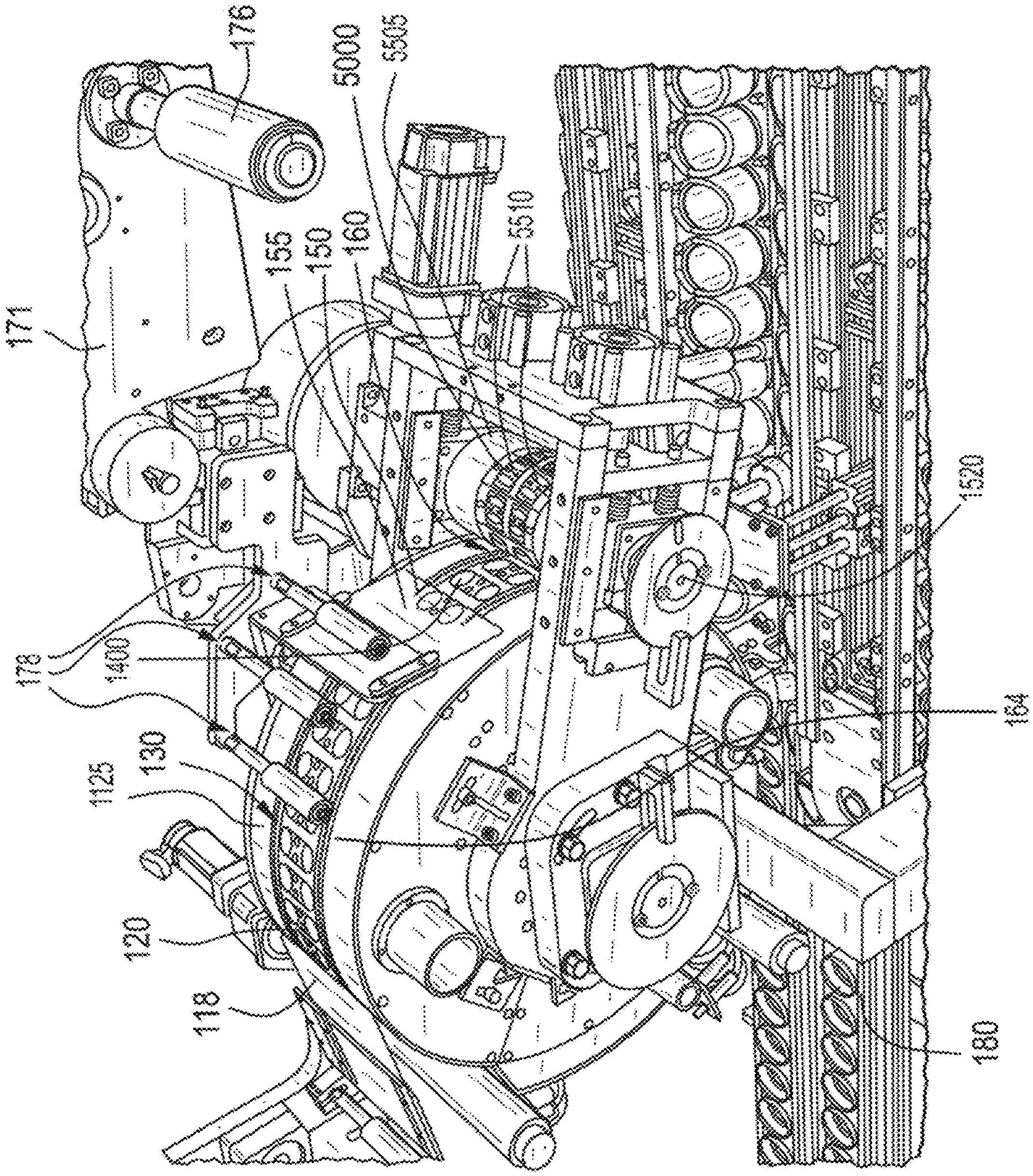
FIG. 1E is a top perspective view of a conveyor system of the apparatus of FIG. 1A according to some example embodiments.
Figure 1F:
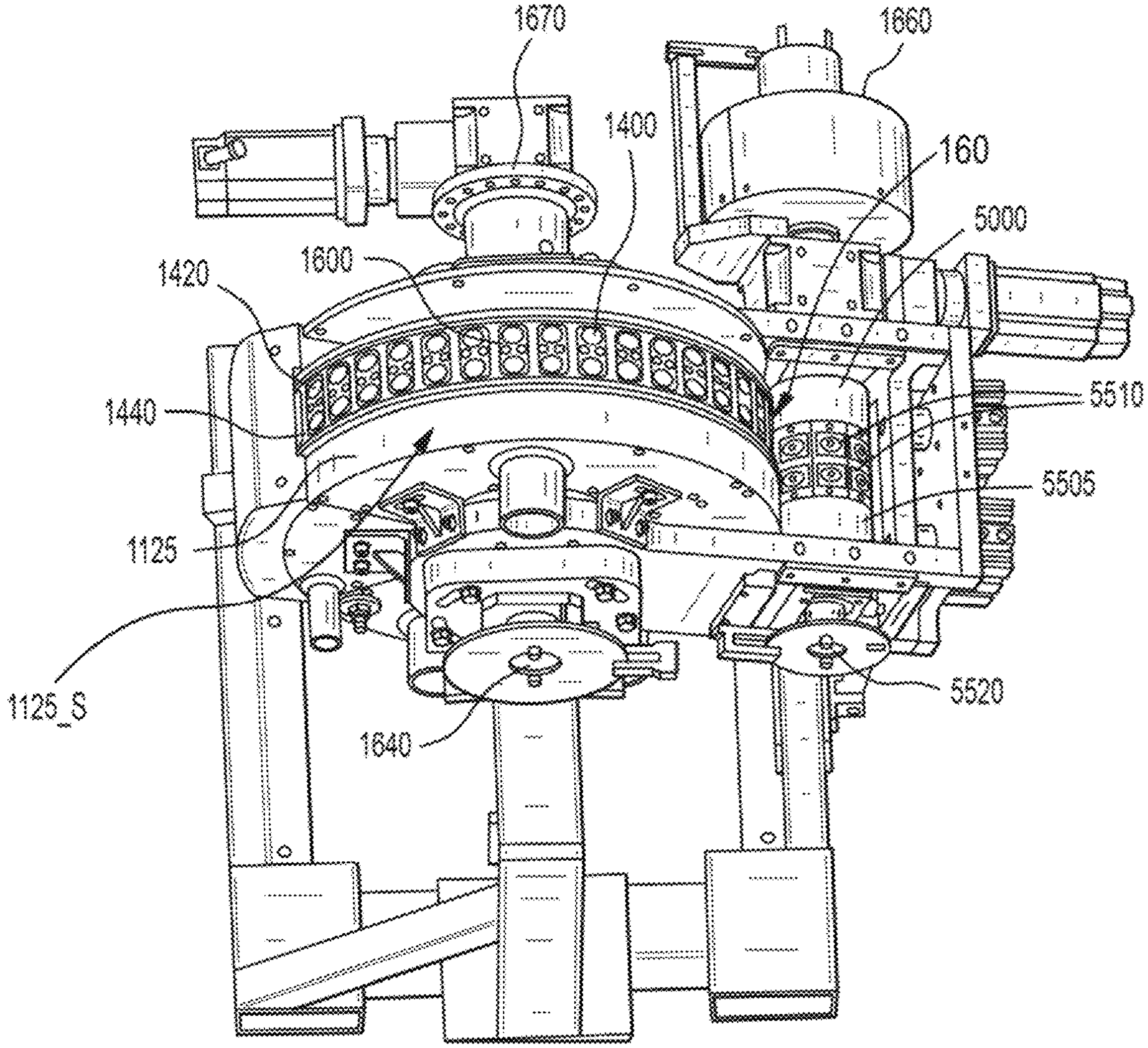
FIG. 1F is a top perspective view of a conveyor system of the apparatus of FIG. 1A according to some example embodiments.
Figure 1G:
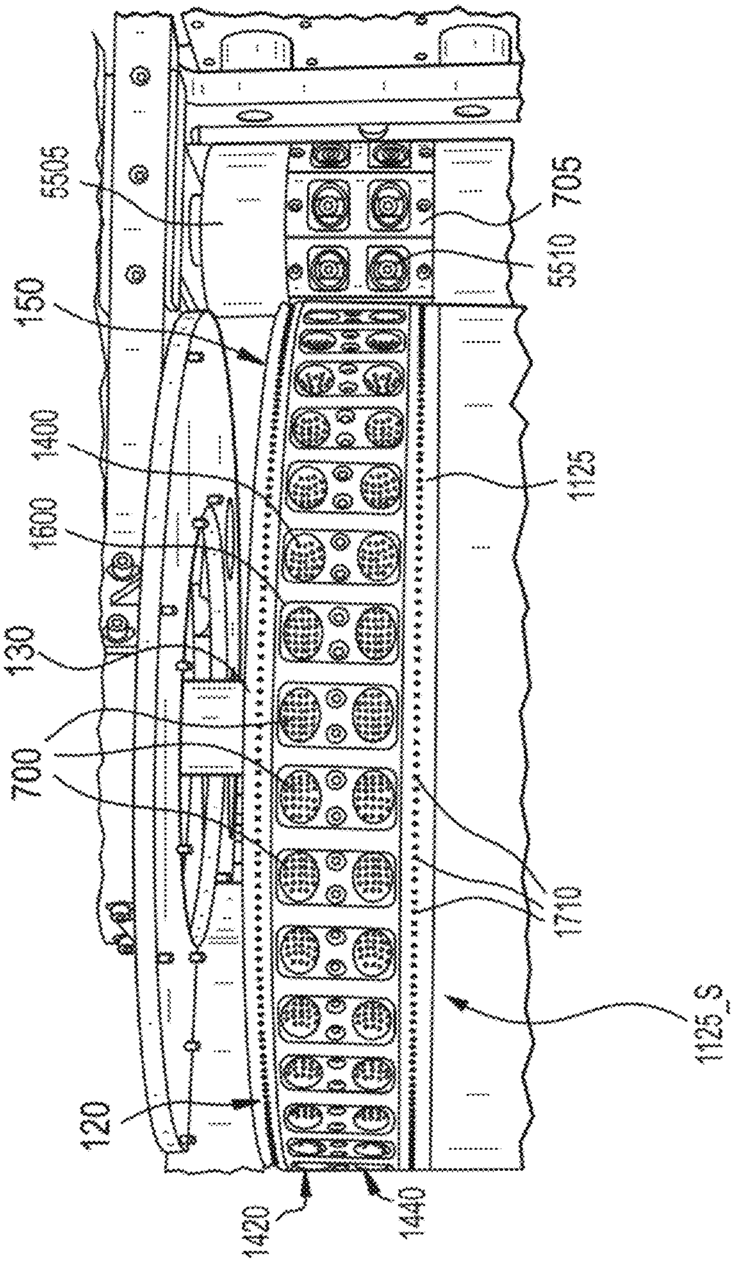
FIG. 1G is a top view of the apparatus of FIG. 1A according to some example embodiments.
Figure 1H:
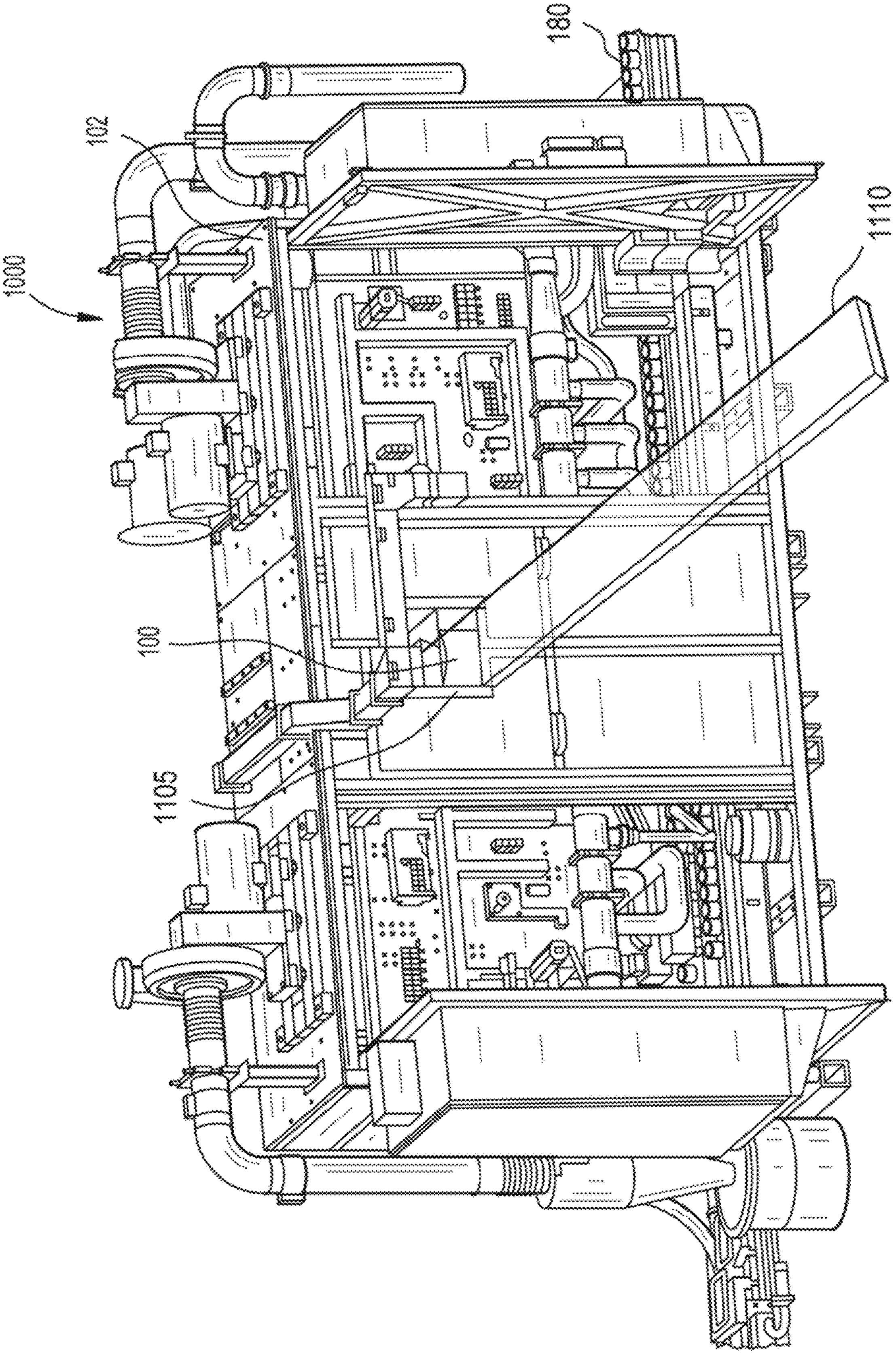
FIG. 1H is a rear perspective view of an apparatus for forming a pouch product according to some example embodiments.
Figure 1I:
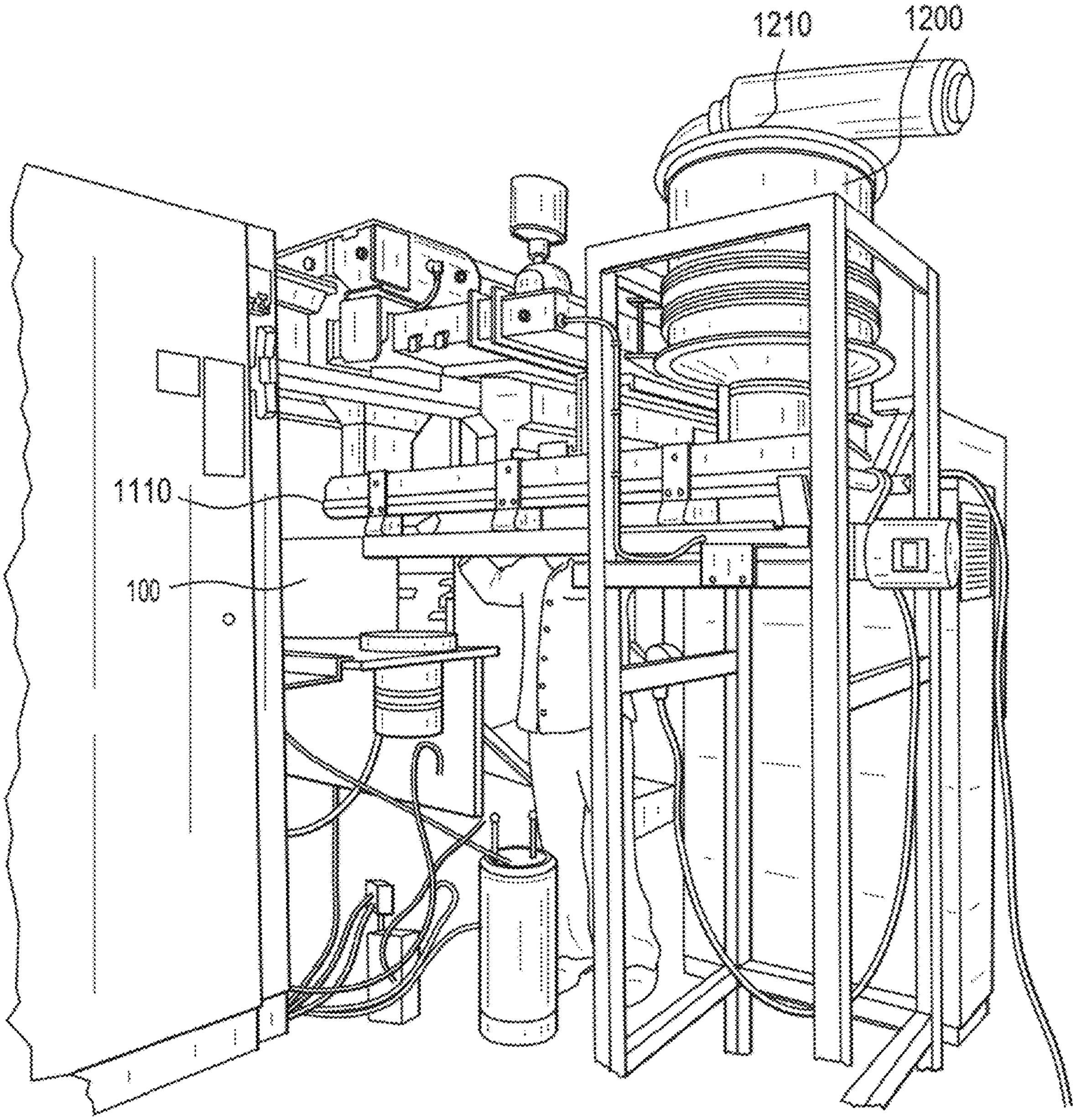
FIG. 1I is a partial rear perspective view of an apparatus for forming a pouch product including a filler material distribution system according to some example embodiments.
Figure 1J:
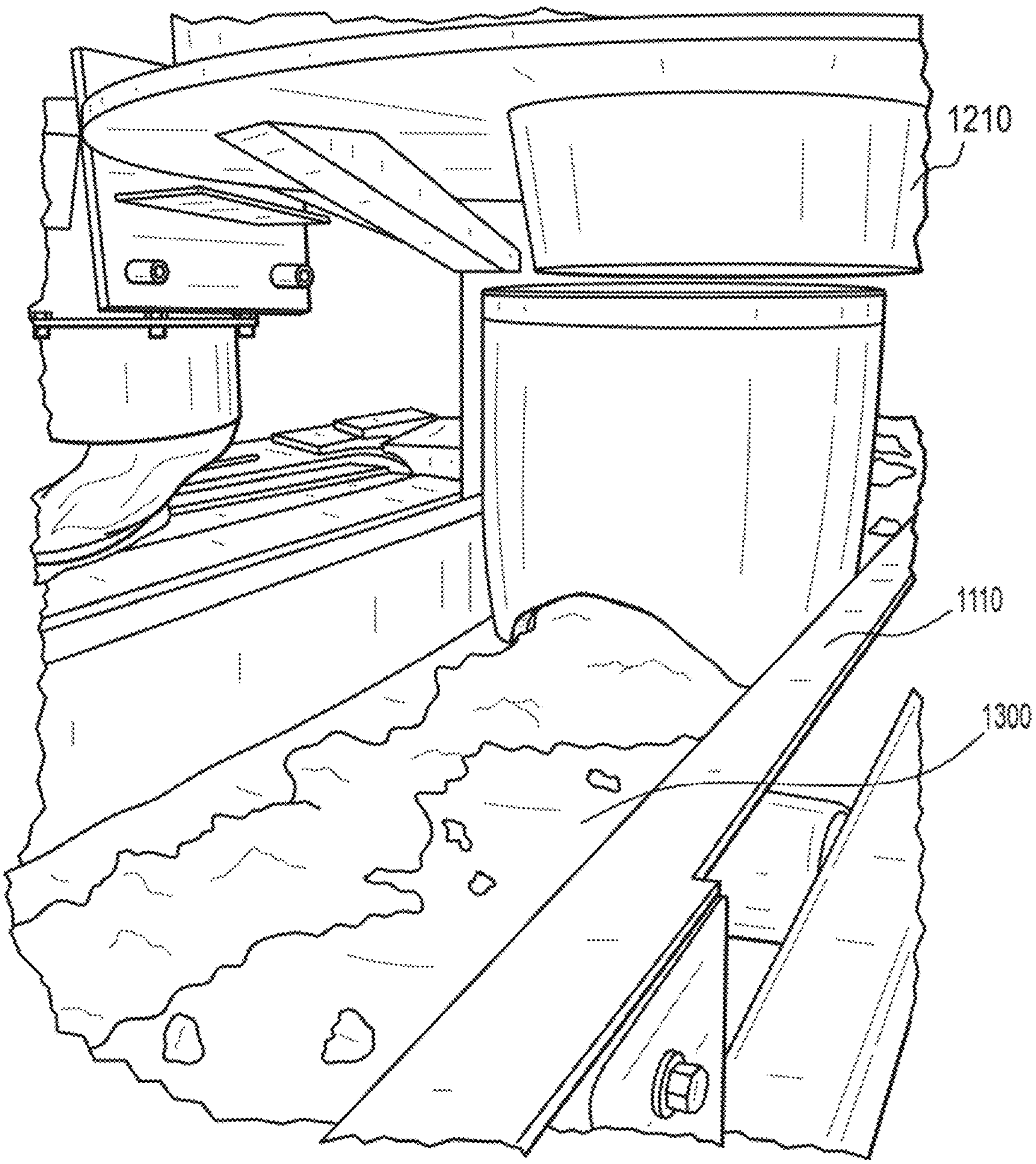
FIG. 1J is an enlarged view of a portion of the filler material distribution system of FIG. 1I according to some example embodiments.

FIG. 1A is a front perspective view of an apparatus for forming a pouch product according to some example embodiments. FIG. 1B is an illustration of a first material dispensing station of the apparatus of FIG. 1A according to some example embodiments. FIG. 1C is an illustration of a second material dispensing station of the apparatus of FIG. 1A according to some example embodiments. FIG. 1D is a partial view of a first receiving location, a dosing location, a cleaning location, and a second receiving location of the apparatus of FIG. 1A according to some example embodiments. FIG. 1E is a top perspective view of a conveyor system of the apparatus of FIG. 1A according to some example embodiments. FIG. 1F is a top perspective view of a conveyor system of the apparatus of FIG. 1A according to some example embodiments. FIG. 1G is a top view of the apparatus of FIG. 1A according to some example embodiments. FIG. 1H is a rear perspective view of an apparatus for forming a pouch product according to some example embodiments. FIG. 1I is a partial rear perspective view of an apparatus for forming a pouch product including a filler material distribution system according to some example embodiments. FIG. 1J is an enlarged view of a portion of the filler material distribution system of FIG. 1I according to some example embodiments.

Referring to FIG. 1A, in some example embodiments, an apparatus 1000 for forming a pouch product includes a housing or frame 102 configured to house at least a portion of the apparatus 1000. The apparatus 1000 also includes a control interface 104, a control system 106, a first material dispensing station 110, a conveyor system (e.g., a rotatable drum 1125) and a doser assembly 100. The apparatus 1000 also includes a second material dispensing station 170, a conveyor system 175, a container conveyor system 180, and a waste removal system 190. The apparatus 1000 also includes a cleaner assembly 2600. It will be understood that in some example embodiments, at least some of the afore-mentioned stations, systems, and assemblies of apparatus 1000 may be absent from the apparatus 1000.

In some example embodiments, a first receiving location 120, a dosing location 130, a second receiving location 150, a cleaning location 164, and a cutting and sealing location 160 are along the path of the rotatable drum 1125. In some example embodiments, the rotatable drum 1125 may move in a generally clockwise direction. In some example embodiments, the rotatable drum 1125 may move in a counterclockwise direction. The first receiving location 120 may be at about an 11 o'clock position along the path, the dosing location 130 may be at about a 12 o'clock position along the path, the cleaning location 164 may be at about a 1 o'clock position along the path, the second receiving location may be at about a 2 o'clock position along the path, and the cutting and sealing location 160 may be at about a 4 o'clock position along the path. In some example embodiments, where a linear conveyor is used instead of the rotatable drum 1125, the first receiving location 120 may be upstream of the dosing location 130, the second receiving location 150, and the cutting and sealing location 160. The dosing location 130 may be between the first receiving location 120 and the second receiving location 150, the second receiving location 150 may be between the dosing location 130 and the cutting and sealing location 160, and the cleaning location 164 may be between the dosing location and the second receiving location 150.

In some example embodiments, the first material dispensing station 110 is configured to deliver (e.g., transfer) a first material 1500 to the first receiving location 120. The first material dispensing station 110 includes a first roll holder 112 (also referred to herein as a dispenser roller) configured to hold a roll of the first material 1500. A description of the first material 1500 follows with regard to at least FIGS. 2A-2C. The first material 1500, as shown and discussed further with respect to FIGS. 2A-2C, generally includes a first elastic layer **1512*a* and a first support layer 1514. The first roll holder 112 may include a generally cylindrical roller on a shaft. The first roll holder 112 is configured to rotate as the first material 1500 is pulled therefrom. In some example embodiments, the first roll holder 112 may not rotate, and instead, the first material 1500 may be held on a material roller that is placed on the first roll holder 112, such that the material roller may rotate about the first roll holder 112**.

In some example embodiments, the first material dispensing station 110 also includes a first set of rollers 114 including a first tensioner 114A, a first dewrinkling roller 117, a first stripper plate 118, and a first scrap roll holder 119. The first set of rollers 114 may include one to twenty rollers. The first set of rollers 114 may extend between the first roll holder 112 and/or the first dewrinkling roller 117. The first set of rollers 114 includes any roller over which the first material 1500 travels except for the first dewrinkling roller 117. Each roller of the first set of rollers 114 may include a generally cylindrical body mounted on a shaft extending from a first backing board 122. The first backing board 122 may be within and/or supported by the housing or frame 102. Each roller of the first set of rollers 114 is configured to rotate about the respective shaft in either a clockwise or counterclockwise direction so as to aid in transferring the first material 1500 from the first roll holder 112 to the first receiving location 120 and aid in transferring a removed portion of the support layer from the first receiving location 120 to the first scrap roll holder 119. In some example embodiments, one or more of the rollers of the first set of rollers 114 may be mechanically coupled to a driver (also referred to herein as a motor, drive motor, or the like) which may include a servoactuator or any known type of drive motor and which may be configured to cause the roller to rotate to at least partially induce conveyance of the first material 1500 from the first roll holder 112 to the first receiving location 120. Such a driver may be communicatively coupled to the control system 106 via control interface 104, such that the control system 106 may be configured to control the driver to control the transfer of first material 1500 to the first receiving location 120.

In some example embodiments, the first tensioner 114A, is configured to maintain tension along the first material 1500. The first tensioner 114A may be any tensioning roller including tension sensing rollers generally known to a person having ordinary skill in the art. Where a tension sensing roller is used, the tension sensing roller may sense a tension of the first material, and the control system 106 may be configured to receive a signal from the tension sensing roller regarding the tension, compare the tension to a desired tension stored in a memory 108, and adjust the tension applied by the first tensioner 114A if necessary and/or desired.

The first material dispensing station 110 also includes the first dewrinkling roller 117, which is configured to reduce and/or prevent wrinkles in the first material 1500. The first dewrinkling roller 117 may have a bowed surface configured to remove any wrinkles from the first material 1500 as the first material 1500 passes over the first dewrinkling roller 117. The first dewrinkling roller 117 may be adjacent the first receiving location 120.

In some example embodiments, the rollers of the first material dispensing station 110 are arranged as shown in FIG. 1A. However, in some example embodiments, the arrangement of the rollers may vary as required based on the location of the first receiving location 120 with respect to the first material dispensing station 110.

In some example embodiments, the first stripper plate 118 is adjacent to the first receiving location 120. The first stripper plate 118 is configured to remove at least a portion of the first support layer 1514 from the first elastic layer **1512*a* of the first material 1500 at the first receiving location 120. The removed portion or portions of the support layer 1514 are rolled onto the first scrap roll holder 119**.

In some example embodiments, the dosing location 130 is along the path of the rotatable drum 1125. The doser assembly 100 according to any of the example embodiments is positioned at or adjacent the dosing location 130 and is configured to deliver a desired (or, alternatively predetermined) portion of a filler material at the dosing location 130. The doser assembly 100 may be moveable with respect to the dosing location 130 so as to allow for maintenance of the rotatable drum 1125 and/or other portions of the apparatus 1000. A description of the cleaner assembly 2600 according to some example embodiments follows with regard to at least FIGS. 18A-27. The doser assembly 100 may be the doser assembly according to any of the example embodiments, including any of the example embodiments described with reference to FIGS. 4A-18C, but example embodiments are not limited thereto.

In some example embodiments, the apparatus 1000 includes the second material dispensing station 170, which is configured to transfer a second material 1500' to the second receiving location 150. The second receiving location 150 may be between the dosing location 130 and the cutting and sealing location 160. The second receiving location 150 may further be between the cleaning location 164 and the cutting and sealing location 160. The second material 1500' generally includes a second elastic layer 1512*b* and a second support layer 1514'. The second material 1500' may be the same as or substantially the same as the first material 1500 and is discussed in detail with respect to FIGS. 2A-2C. In some example embodiments, the second material 1500' may be different than or substantially different than the first material 1500.

In some example embodiments, the second material dispensing station 170 includes a second backing board 171 and a second roll holder 172 configured to hold a roll of the second material 1500'. The second roll holder 172 may include a generally cylindrical roller on a shaft. The second roll holder 172 is configured to rotate as the second material 1500' is pulled therefrom. In some example embodiments, the second roll holder 172 may not rotate, and instead, the second material 1500' may be held on a material roller that is placed on the second roll holder 172, such that the material roller may rotate about the second roll holder 172. The second roll holder 172 may be mounted on the second backing board 171. In some example embodiments, the second roll holder 172 may be removably mounted.

In some example embodiments, the second material dispensing station 170 also includes a second set of rollers 174 including a second tensioner 174A, a second dewrinkling roller 177, rollers 178, the second stripper plate 155, and the second scrap roll holder 179. The second material 1500' runs through the second set of rollers 174, and over the second tensioner 174A, which is configured to maintain tension along the second material 1500'. The second set of rollers 174 may include one to ten rollers, which may be between the second roll holder 172, the second dewrinkling roller 177, rollers 178, the second stripper plate 155, and the second scrap roll holder 179. In some example embodiments, one or more of the rollers of the second set of rollers 174 may be mechanically coupled to a driver (also referred to herein as a motor, drive motor, or the like) which may include a servoactuator or any known type of drive motor and which may be configured to cause the roller to rotate to at least partially induce conveyance of the second material 1500' from the second roll holder 172 to the second receiving location 150. Such a driver may be communicatively coupled to the control system 106 via control interface 104, such that the control system 106 may be configured to control the driver to control the transfer of second material 1500' to the second receiving location 150.

In some example embodiments, the second tensioner 174A is generally the same as the first tensioner 114A. In other example embodiments, the second tensioner 174A is different than the first tensioner 114A.

In some example embodiments, the second dewrinkling roller 177 is configured to reduce and/or prevent wrinkles in the second material 1500' as the second material 1500' passes over the second dewrinkling roller 177. The second dewrinkling roller 177 may be the same as the first dewrinkling roller 117. The second dewrinkling roller 177 may have a bowed surface configured to remove any wrinkles from the second material 1500' as the second material 1500' passes thereover.

In some example embodiments, the rollers of the second material dispensing station 170 are arranged as shown in FIG. 1A. However, in some example embodiments, the arrangement of the rollers may vary as required based on the location of the second receiving location 150 with respect to the second material dispensing station 170.

In some example embodiments, the second material dispensing station 170 also includes a second stripper plate 155. The second stripper plate 155 may be adjacent the second receiving location 150. The second stripper plate 155 is configured to remove at least a portion of the second support layer 1514' from the second elastic layer 1512*b* of the second material 1500' at the second receiving location 150. The removed portion or portions of the second support layer 1514' are rolled onto the second scrap roll holder 179.

In some example embodiments, the apparatus 1000 includes a sealer and cutter, such as a heat knife assembly 5000 adjacent the cutting and sealing location 160. The heat knife assembly 5000 is configured to seal a portion of the first elastic layer 1512*a* to a portion of the second elastic layer 1512*b* around the filler material, and then cut around the seal to form a pouch product. In some example embodiments, the seal (not shown) is formed by heat sealing. In some example embodiments, a seal may be formed using an adhesive, such as a food-grade adhesive, or formed by ultrasonic welding and/or laser.

In some example embodiments, the apparatus 1000 includes a cleaner assembly 2600 at a cleaning location 164 that may be between the dosing location 130 and the second receiving location 150. The cleaner assembly 2600 may remove excess filler material from the exposed upper surface of the first elastic layer 1512*a* in order to reduce the risk of filler material being trapped in the seal formed at the heat knife assembly 5000. The cleaner assembly 2600 may compress the portions of filler material delivered at the dosing location 130 into divots 1400 of the rotatable drum 1125 to improve density uniformity of the portions of filler material and to reduce the risk of any part of the portion of filler material exiting the divots prior to the pouch product being formed around the filler material. A description of the cleaner assembly 2600 according to some example embodiments follows with regard to at least FIGS. 18A-27.

In some example embodiments, the apparatus 1000 includes a container conveyor system 180 configured to deliver a plurality of containers to an ejection location 192 along the path of the rotatable drum 1125. The container conveyor system 180 runs below the rotatable drum 1125 as shown in FIG. 1A. The container conveyor system 180 may be any suitable container conveyor system generally known to a person having ordinary skill in the art.

In some example embodiments, the ejection location 192 may be at about a 6 o'clock position along the path of the rotatable drum 1125. At the ejection location 192, pouch products are ejected from the rotatable drum 1125 after formation, and placed into the plurality of containers moving along the container conveyor system 180.

In some example embodiments, the apparatus 1000 also includes a waste removal system 190, which may include a vacuum configured to remove excess portions of the first material and the second material that are not part of the pouch product, and/or any other dust and/or waste produced during manufacture of the pouch products.

In some example embodiments, the control interface 104 may be configured to receive control commands, including commands provided by an operator based on manual interaction with the control interface 104. The control interface 104 may be a manual interface, including a touchscreen display interface, a button interface, a mouse interface, a keyboard interface, some combination thereof, or the like. Control commands received at the control interface 104 may be forwarded to the control system 106, which may include a processor, and the control system 106 may execute one or more programs of instructions, for example to adjust operation of one or more portions of the apparatus 1000, based on the control commands. In some example embodiments, the control interface 104 may be included as part of the control system 106 and may not be a separate part in relation to the control system 106.

In some example embodiments, the control system 106 (e.g., the processor executing a program of instructions) may include a memory 108. The memory 108 may be configured to store information and look-up tables indicating a desired tension of the first and second material, a desired weight of filled containers, etc. The control system 106 may be configured to determine when a container has been filled based on a weight of the container and/or determine a tension of the first and second materials. In some example embodiments, the memory 108 may be included as part of the control system 106 and may not be a separate part in relation to the control system 106.

In some example embodiments, the control system 106 is configured to control a supply of a first material and a second material, control a tension of the first material and/or the second material, control a speed of rotation of the rollers and/or the rotatable drum 1125, etc. In some example embodiments, the control system 106 is configured to control one or more drivers, servoactuators, motors, or the like in any of the elements, stations, assemblies, or the like of the apparatus 1000 in order to control the operation of any portion of the apparatus 1000.

In some example embodiments, the apparatus 1000 may include a weight sensor (e.g., a weight scale) (not shown) configured to generate data signals associated with the weight of a formed pouch product. The control system 106 may process received sensor data to determine a weight of the formed pouch products and adjust the doser assembly 100 or other portions of the apparatus 1000 to ensure uniformity of formed pouch products.

The control system 106 according to some example embodiments may be implemented using hardware, or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code (also referred to herein as a program of instructions) by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto (e.g., any of the methods according to any of the example embodiments, including the cascade control method according to some example embodiments, including the example embodiments as described with reference to FIGS. 15-17, the method of making a pouch product according to some example embodiments, including the example embodiments as described with reference to FIG. 28, or the like), thereby transforming the processor into a special purpose processor.

Figure 15:
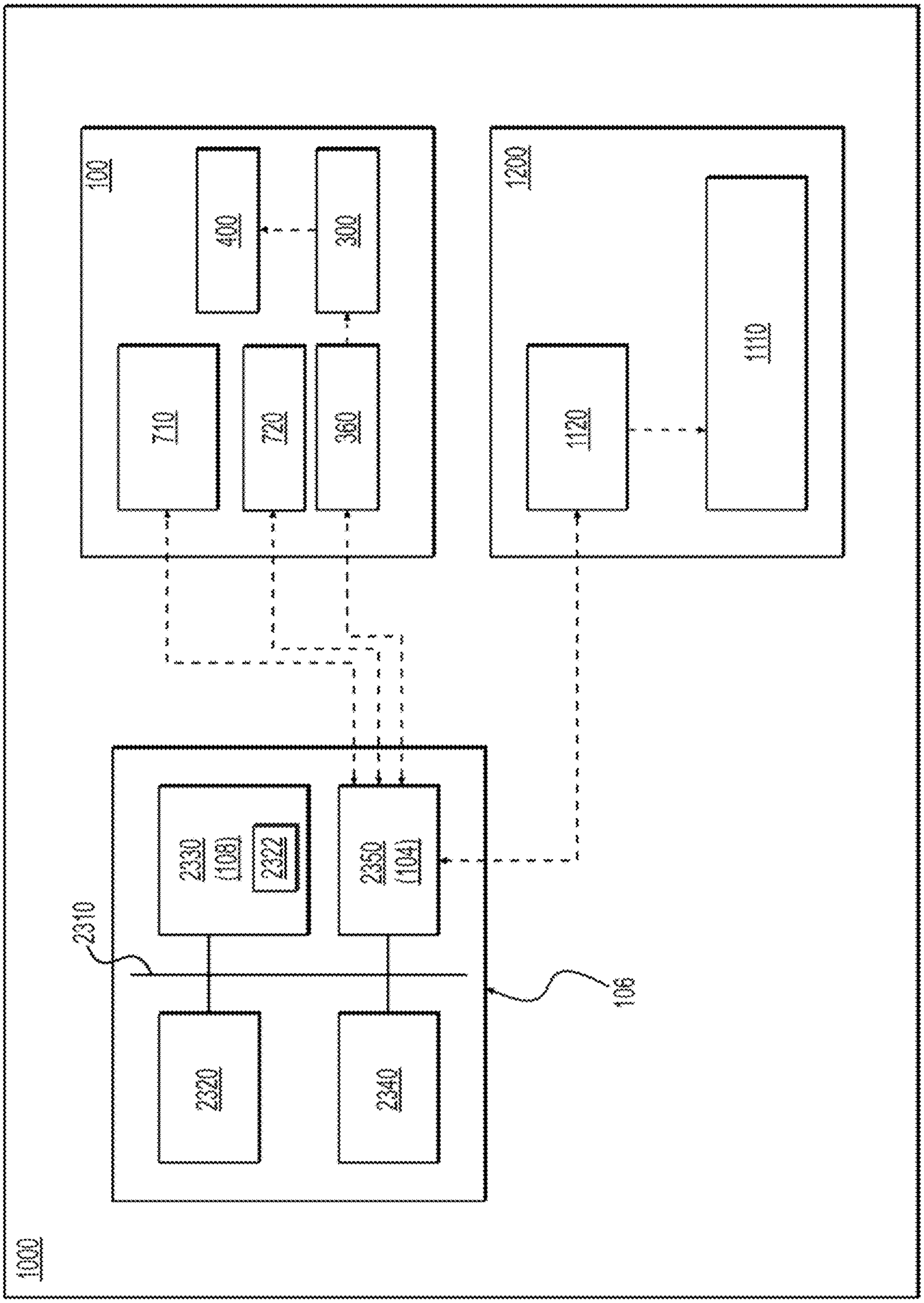
FIG. 15 is a schematic view of an apparatus including a filler material distribution system, a doser assembly, and a control system according to some example embodiments.

An example of the control system 106 with an integrated control interface 104 according to some example embodiments is shown in FIG. 15.

According to some example embodiments, computer processing devices may be described as including various functional units that perform various operations and/or functions to increase the clarity of the description. However, computer processing devices are not intended to be limited to these functional units. For example, in some example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to some example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software may include a computer program, program code, instructions, or some combination thereof, for independently or collectively instructing or configuring a hardware device to operate as desired. The computer program and/or program code may include program or computer-readable instructions, software modules, data files, data structures, and/or the like, capable of being implemented by one or more hardware devices, such as one or more of the hardware devices mentioned above. Examples of program code include both machine code produced by a compiler and higher level program code that is executed using an interpreter.

Software and/or data may be embodied permanently or temporarily in any type of machine, element, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media or memory 108 discussed herein.

FIG. 1B is an illustration of a first material dispensing station of the apparatus of FIG. 1A according to some example embodiments.

In some example embodiments, as shown in FIG. 1B, the first material dispensing station 110 may include the first roll holder 112, the first set of rollers 114 including the first tensioner 114A, the first dewrinkling roller 117, the first stripper plate 118, and the first scrap roll holder 119 on the first backing board 122. A path of travel of the first material 1500 through the first material dispensing station 110 is illustrated by line 1500. As shown, the first material 1500 may extend from the first roll holder 112 and through a portion of the first set of rollers 114 including the first tensioner 114A, the first dewrinkling roller 117, and to the first stripper plate 118 as shown. The apparatus 1000 may also include a first tracking controller 116 configured to maintain the first material 1500 on track and at a desired tension.

In some example embodiments, the first stripper plate 118 is a stationary plate that abuts the rotatable drum 1125 (shown in FIG. 1D) at the first receiving location 120.

FIG. 1C is an illustration of a second material dispensing station of the apparatus of FIG. 1A according to some example embodiments.

In some example embodiments, the second material dispensing station 170 is arranged generally the same as the first material dispensing station 110 shown in FIG. 1B. The second material dispensing station 170 includes the second roll holder 172, the second set of rollers 174 including the second tensioner 174A, the second dewrinkling roller 177, rollers 178, the second stripper plate 155, and the second scrap roll holder 179 on a second backing board 171. The second material 1500' may extend from the second roll holder 172 and through the second set of rollers 174, the second tensioner 174A, the second dewrinkling roller 177, rollers 178, and to the second stripper plate 155 as shown. A path of travel of the second material 1500' through the second material dispensing station 170 is illustrated by line 1500'. Further, the second tensioner 174A may include a second tracking controller 176 configured to keep the second material 1500' on track and maintain tension of the second material 1500' as the second material 1500' passes through the second material dispensing station 170. In some example embodiments, the second tracking controller 176 is the same as the first tracking controller 116.

In some example embodiments, the second stripper plate 155 is a stationary plate that abuts the rotatable drum 1125 (shown in FIGS. 1D-1E) at the second receiving location 150.

FIG. 1D is a perspective view of a first receiving location, a dosing location, and a second receiving location of the apparatus of FIG. 1A according to some example embodiments.

In some example embodiments, as shown in FIG. 1D, the first receiving location 120, the dosing location 130, the cleaning location 164, and the second receiving location 150 are positioned along the rotatable drum 1125.

In some example embodiments, as shown in FIG. 1D, the first stripper plate 118 abuts the rotatable drum 1125 at the first receiving location 120.

Figure 2A:
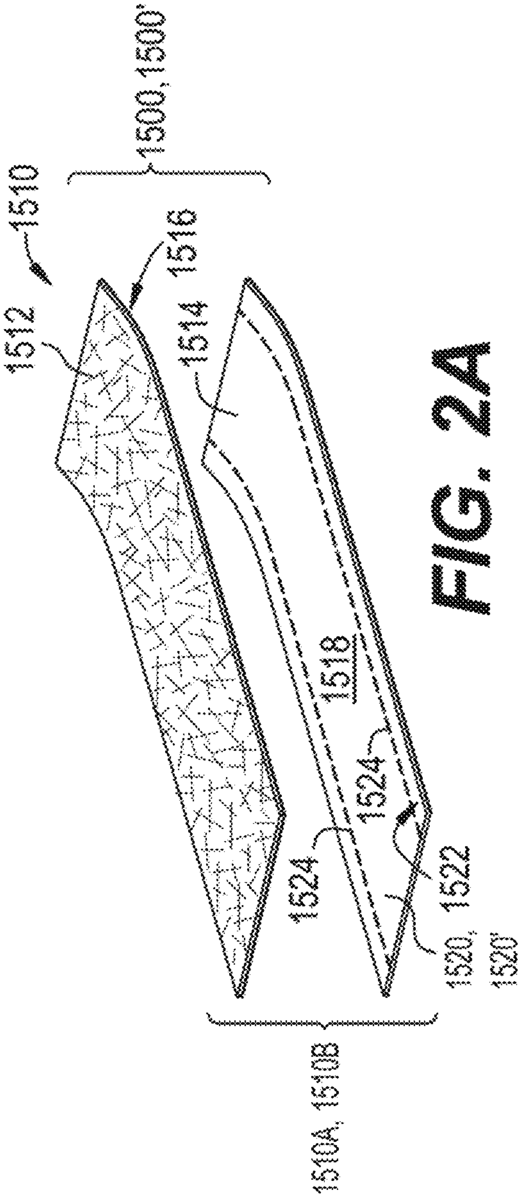
FIGS. 2A, 2B, and 2C are illustration of the first material and/or the second material for use in an apparatus according to some example embodiments.
Figure 2C:
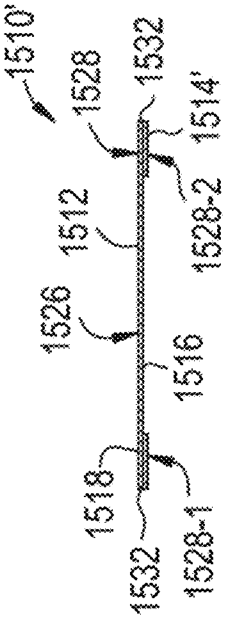
Figure 2B:
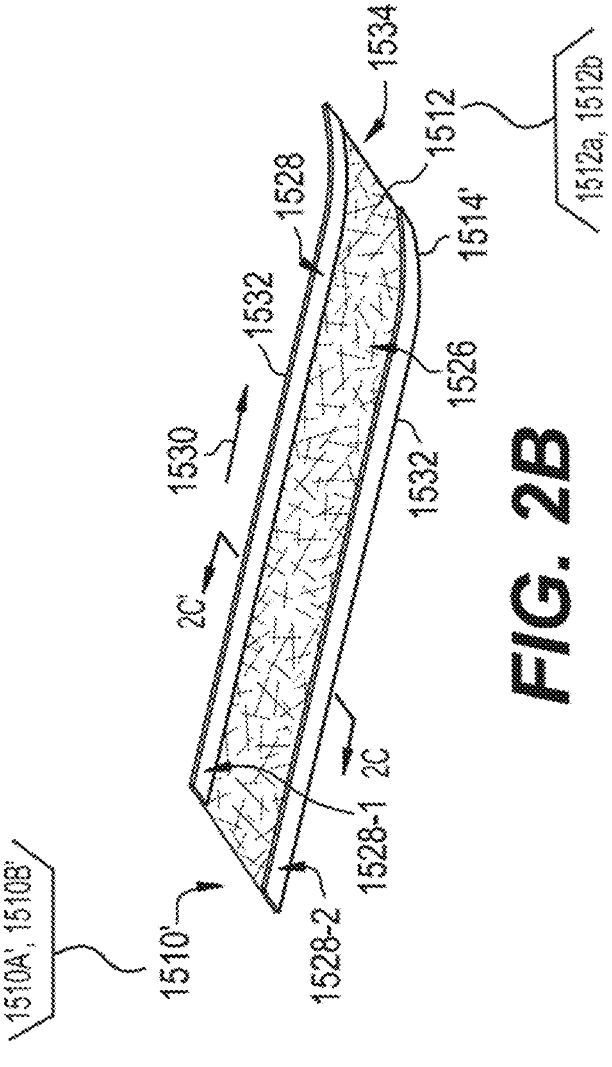

In some example embodiments, the rotatable drum 1125 includes a plurality of separate lanes of divots 1400 extending in parallel around an outer circumferential surface 1125_S of the rotatable drum 1125. For example, as shown, the rotatable drum 1125 includes two lanes 1420, 1440 of divots 1400 extending in parallel around the outer circumferential surface 1125_S of the rotatable drum 1125. Each of the divots 1400 in each of the lanes 1420, 1440 is configured to receive the first elastic layer 1512*a* and remaining portion (portion 1522 as shown in FIGS. 2A-2C) of the first supporting layer 1514 of the first material 1500 after the portion of the first support layer is removed therefrom. At the dosing location 130, a filler material (e.g., a portion of filler material) is provided into each divot 1400 by the doser assembly 100 (e.g., based on the filler material falling into the divots 1400 under gravity and/or pressure of overlying filler material in the doser assembly 100 as described herein with reference to FIGS. 4A-18C). After dosing, the rotatable drum 1125 moves the filled first elastic layer 1512*a* to the cleaning location 164, where excess filler material on the upper surface of the first elastic layer 1512*a* may be removed and/or moved into the divots 1400 to be added to the portion of filler material included therein, and where the portion of filler material in the divots 1400 may be compressed further into the divots 1400. After such compression, the rotatable drum 1125 moves the filled/compressed first elastic layer

1512*a* to the second receiving location 150. The second stripper plate 155 is adjacent the second receiving location 150.

In some example embodiments, the apparatus 1000 further includes a vacuum source 1410 configured to communicate a vacuum to an inner portion of the rotatable drum 1125 between about the first receiving location 120 and the second receiving location 150. The rotatable drum 1125 may include baffles (not shown) therein that generally align with the location of the first receiving location 120 and the second receiving location 150 so as to focus the vacuum on the area between the first receiving location 120 and the second receiving location 150.

FIG. 1E is a partial view of a first receiving location, a dosing location, a cleaning location, a second receiving location, and a cutting and sealing location along a path of a rotatable drum of the apparatus 1000 of FIG. 1A according to some example embodiments.

In some example embodiments, as shown in FIG. 1E, the cutting and sealing location 160 is along the path of the rotatable drum 1125. The cutting and sealing location 160 is adjacent the second receiving location 150.

In some example embodiments, the heat knife assembly 5000 is adjacent the cutting and sealing location 160. The heat knife assembly 5000 includes a heat knife assembly roller 5505 and a plurality of heat knives 5510. The heat knife assembly roller 5505 is configured to rotate on a shaft 5520 extending through the heat knife assembly roller 5505. The heat knife assembly roller 5505 rotates in a direction opposite to the direction in which the rotatable drum 1125 rotates. The heat knife assembly roller 5505 may be driven by a motor (not shown). A speed of rotation of the heat knife assembly roller 5505 may be greater than a speed of rotation of the rotatable drum 1125. As the heat knife assembly roller 5505 and the rotatable drum 1125 rotate, the divots 1400 and respective ones of the plurality of heat knives 5510 align.

In some example embodiments, each of the plurality of heat knives 5510 is sized and configured to fit around a respective one of the divots 1400 along the rotatable drum 1125. Thus, the size and shape of each of the heat knives 5510 is about the same as the size and shape of each of the divots. For example, each divot 1400 and each heat knife 5510 may be generally oval in shape, and the heat knife 5510 may be slightly larger than the respective divot 1400. The speed of rotation of the heat knife assembly roller 5505 may be controlled by the control system 106, such that respective ones of the plurality of heat knives 5510 match up to and/or substantially align with respective divots 1400 along the rotatable drum 1125.

In some example embodiments, the plurality of heat knives 5510 include at least a portion that is formed of metal. A heater or rotary engine (not shown), may be in the heat knife assembly roller 5505 and configured to heat the plurality of heat knives 5510 to a temperature sufficient to heat seal a portion of the first elastic layer 1512*a* to a portion of the second elastic layer 1512*b*. The temperature may range from about 100° C. to about 500° C. depending on the material used to form the first and second elastic layers 1512*a* and 1512*b*. For example, the heat knives 5510 may be heated to a temperature of about 400° C. The chosen temperature is sufficient to melt the first and second elastic layers 1512*a* and 1512*b* thereby at least partially cutting through the first and second elastic layers 1512*a* and 1512*b* as the seal is formed.

FIG. 1F is a top perspective view of a conveyor system of the apparatus of FIG. 1A according to some example embodiments.

In some example embodiments, as shown in FIG. 1F, the conveyor system may include at least the rotatable drum 1125. The rotatable drum 1125 may be configured to rotate on a shaft 1640. Further, the rotatable drum 1125 includes a plurality of plates 1600. The plurality of plates 1600 are spaced apart along an outer surface (e.g., the outer circumferential surface 1125_S) of the rotatable drum 1125. The plurality of plates 1600 may be substantially uniformly spaced apart. However, in some example embodiments, the plurality of plates 1600 may not be uniformly spaced apart. Each of the plurality of plates 1600 may define two divots 1400 therein so as to form the two lanes 1420, 1440 along the rotatable drum 1125. The apparatus 1000 may be configured to form about 100 pouch products per minute, but the number of pouch products formed may vary based on a speed of rotation of the rotatable drum 1125, the number of plates 1600, and the number of lanes. For example, the number of lanes may be increased or decreased to alter the number of pouch products formed per minute. In some example embodiments, each of the plurality of plates 1600 may include three or more divots 1400, such that additional lanes are formed along the rotatable drum 1125. As shown in FIGS. 22A-27, each of the plurality of plates 1600 may include four or more divots 1400, such that additional lanes are formed along the rotatable drum 1125. Thus, a number of pouch products produced may be increased by increasing a number of lanes along the rotatable drum 1125. Thus, a number of pouch products produced may be increased by increasing a number of lanes along the rotatable drum 1125.

As shown in FIG. 1F, a motor 1660 is configured to drive the shaft 5520 on which the heat knife assembly roller 5505 rotates. A second motor 1670 is configured to drive the shaft 1640 on which the rotatable drum 1125 rotates.

FIG. 1G is a top view of a conveyor system and a cutting and sealing system of the apparatus of FIG. 1A according to some example embodiments.

In some example embodiments, as shown in FIG. 1G, the plurality of plates 1600 are attached to a top surface extending along the rotatable drum 1125. Each of the plurality of plates 1600 includes two or more divots 1400. As shown, the divots 1400 includes a plurality of air inlets 700 through which vacuum is communicated (e.g., via vacuum conduits 1430 that establish fluid communication between the air inlets 700 and a vacuum source 1410 as shown in FIG. 18C) so as to pull the first elastic layer 1512*a* into each of the divots 1400 as the rotatable drum 1125 rotates from the first receiving location 120 to the second receiving location 150. Further, as shown, each of the divots 1400 may be generally oval in shape. In some example embodiments, the divots 1400 may be round, square, polygonal, or any other shape. For example, as shown in FIGS. 22A-27, the divots 1400 may be a rounded rectangular shape.

In some example embodiments, the heat knife assembly roller 5505 includes a plurality of plates 705 including at least one heat knife 5510 thereon. In some example embodiments, the number of heat knives 5510 per plate is the same as the number of divots 1400 per plate 1600 in the rotatable drum 1125.

In some example embodiments, each of the heat knives 5510 is generally oval in shape. In some example embodiments, the heat knives 5510 may be round, square, rounded rectangular, polygonal, or any other shape. A shape of the heat knives may be generally the same as a shape of the divots 1400. In some example embodiments, the shape of the heat knives 5510 is different than the shape of the divots 1400.

In some example embodiments, the rotatable drum 1125 may include a plurality of grippers 1710. The grippers 1710 may be air inlets through which vacuum may be communicated. In some example embodiments, the grippers 1710 may be raised bumps that are configured to aid in retaining the first material 1500 in which the portion of the support layer remains along the plurality of grippers 1710 as the rotatable drum 1125 rotates.

FIG. 1H is a rear perspective view of an apparatus for forming a pouch product according to some example embodiments.

In some example embodiments, as shown in FIG. 1H, the apparatus 1000 may include the housing or frame 102. Further, the apparatus 1000 may include a filler material conveyor system 1110 along which the filler material travels before reaching the doser assembly 100. An end of the filler material conveyor system 1110 may at least partially extend through a window 1105 in the frame 102, such that the filter material falls off the end of the filler material conveyor system 1110 and into a hopper opening of the doser assembly 100.

In some example embodiments, the filler material conveyor system 1110 may be retractable to allow for easy access to the doser assembly 100 for maintenance, etc. Further, the filler material conveyor system 1110 may include sensors configured to sense a level of filler material on the conveyor as is generally known to a person having ordinary skill in the art. The control system 106 may receive a signal from the sensors and determine a level of filler material and adjust the level of filler material based on requirements of the doser assembly 100.

Figure 14A:
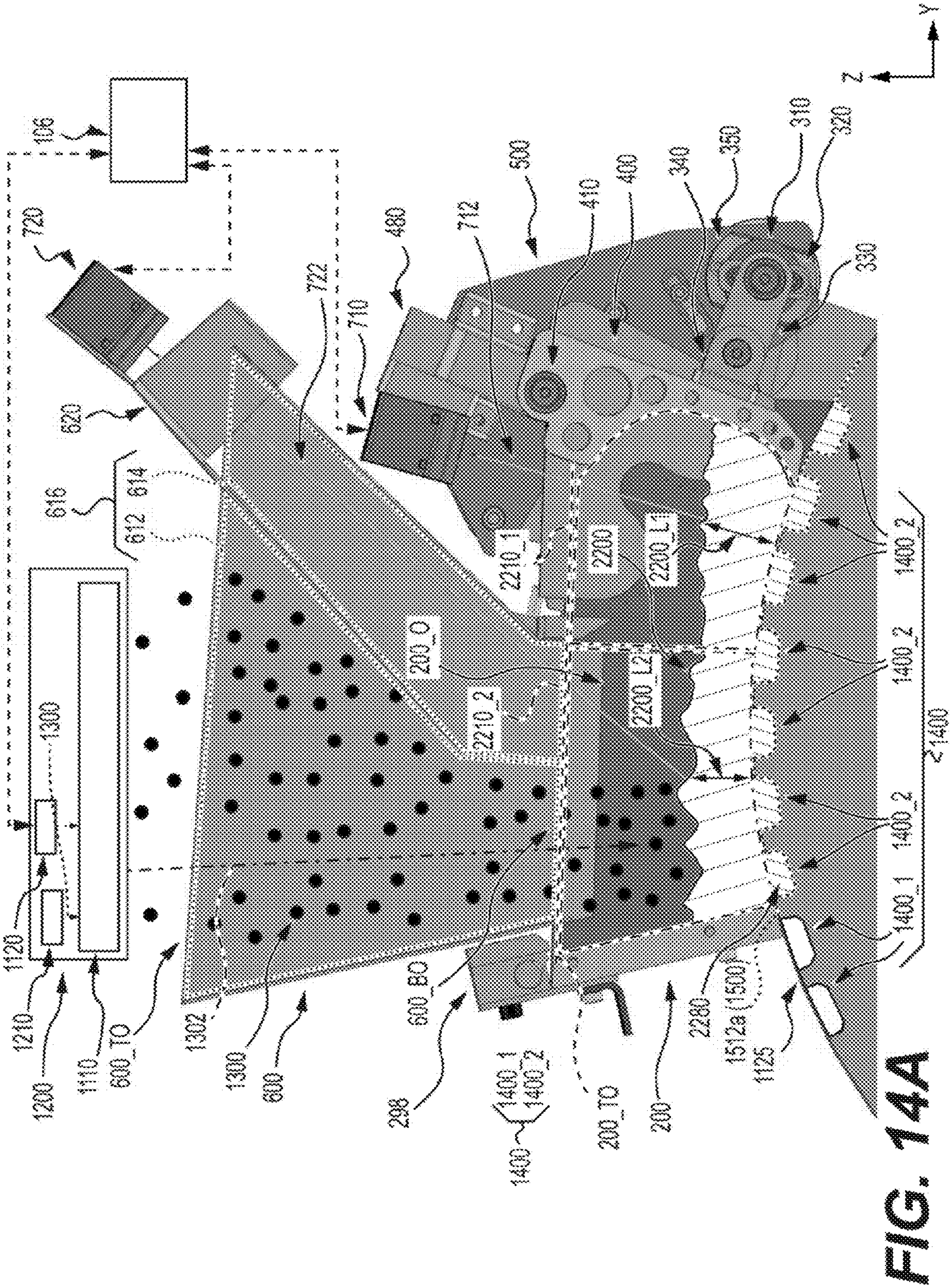
FIG. 14A is a plan cross-sectional view of the doser assembly of FIGS. 4A-4E along line 9A-9A' shown in FIG. 8C according to some example embodiments.

As described herein with reference to at least FIGS. 14A and 15, the filler material distribution system 1200 may include a motor 1120 that is coupled to the filler material conveyor system 1110 and configured to control the operation of the filler material conveyor system 1110. The control system 106 may be electrically and/or communicatively coupled to the motor 1120 and may be configured to generate and transmit control signals to the motor 1120 to cause the motor 1120 to control the filler material conveyor system 1110 to control the rate of supply of filler material to the doser assembly 100 based on implementing a cascade control system, using sensor data generated by two separate sensor devices (e.g., level sensor devices) of the doser assembly 100 which generate sensor data indicating respective levels of filler material in two separate regions of a hopper opening of the doser assembly.

FIG. 1I is a partial rear perspective view of an apparatus for forming a pouch product including a filler material distribution system according to some example embodiments.

In some example embodiments, as shown in FIG. 1I, the apparatus 1000 includes a filler material distribution system 1200 including the filler material conveyor system 1110 and a hopper 1210, also referred to herein as a filler material reservoir. In some example embodiments, the hopper 1210 may include a vibration mechanism used to shake the filler material and consistently deliver the filler material to the filler material conveyor system 1110. In some example embodiments, the hopper 1210 may be a vibrating bin, such as a live bottom bin. In some example embodiments, the filler material conveyor system 1110 may include a conveyor belt device, a vibrating feed pan device, or the like. As described herein, the filler material distribution system 1200 may include a motor 1120 (e.g., drive motor, servoactuator, or the like) that is mechanically coupled to the filler material conveyor system 1110 and is communicatively coupled to the control system 106 of the apparatus 1000 (e.g., via control interface 104) and is configured to control operation of the filler material conveyor system 1110 (e.g., operating speed of a filler material conveyor system 1110 that is a conveyor belt, vibration frequency, stroke length, and/or amplitude of a filler material conveyor system 1110 that is a vibrating feed pan, etc.) based on control signals received from the control system 106 of the apparatus 1000.

FIG. 1J is an enlarged view of a portion of the filler material distribution system of FIG. 1I according to some example embodiments.

In some example embodiments, as shown in FIG. 1J, the hopper 1210 is configured to release filler material 1300 from a bottom thereof directly onto the filler material conveyor system 1110, which may be driven by a motor 1120 (e.g., a drive motor, a servoactuator, or the like) to convey the filler material 1300 to the doser assembly 100.

FIGS. 2A, 2B, and 2C are illustration of the first material and/or the second material for use in the apparatus 1000 according to some example embodiments.

As shown in FIGS. 2A-2C, the first material 1500 comprises a composite material 1510A and the second material 1500' comprises a composite material 1510B. The composite material 1510A is the same as the composite material 1510B. The composite material 1510A, 1510B includes a first or elastic layer 1512 and a second or support layer 1514. In some example embodiments, the elastic layer 1512 comprises a sheet of non-woven elastomeric material and the support layer 1514 comprises a sheet of woven material. The elastic layer 1512 may be stacked with the support layer 1514. In at least some example embodiments, the elastic layer 1512 is disposed on top of the support layer 1514 and extends coextensive with the support layer 1514. In at least some other example embodiments, a support layer 1514 may be disposed on top of the elastic layer 1512. At least a portion of the elastic layer 1512 may be coupled to the support layer 1514.

In at least some example embodiments, a first surface of the elastic layer 1512, herein referred to as an upper surface 1516 of the elastic layer 1512, may engage a first surface 1518 of the support layer 1514. In at least some example embodiments, the elastic layer 1512 is coupled to the support layer 1514 by physical characteristics of the elastic layer 1512 and the support layer 1514, for example, by adhesive friction. In some example embodiments, the elastic layer 1512 comprises polyurethane and the support layer comprises polypropylene.

The support layer 1514 may include a first portion 1520 and a second portion 1522. In at least some example embodiments, the second portion 1522 comprises a pair of second portions 1522, with the first portion 1520 being disposed between the pair of second portions 1522. In at least some example embodiments, the first portion 1520 and each of the pair of second portions 1522 is generally rectangular. The second portions 1522 may have substantially similar shapes and dimensions, and extend substantially parallel to one another. In at least some example embodiments, the support layer 1514 may be sized, shaped, and/or sub-divided (such as into the first and second portions 1520, 1522) to reduce or minimize interference of the support layer 1514 with regions of the elastic layer 1512 that will be involved in subsequent manufacturing processes.

In some example embodiments, boundaries between the first and second portions 1520, 1522 are at least partially defined by a plurality of perforations 1524 and the first portion 1520 is configured to be separated from the second portion 1522 at the plurality of perforations 1524. In at least some other example embodiments, boundaries between the first and second portions 1520, 1522 are separated by cuts or weak regions, such as thinner regions. Thus, the first and second portions 1520, 1522 may be configured to be separated from one another.

The second portion 1522 of the support layer 1514 may remain coupled to the elastic layer 1512 when the first portion 1520 is removed. In at least some example embodiments, the composite material 1510A, 1510B may be assembled, stored, and transported with the first and second portions 1520, 1522 remaining together. Accordingly, when the elastic and support layers 1512 and 1514 are coextensive, the composite material 1510A, 1510B may be stored, such as on a roll or in stacks of sheets, without adjacent elastic layers 1512 substantially sticking to one another. In at least some other example embodiments, the first portion 1520 of the support layer 1514 may be removed from the second portion 1522 prior to storage and/or transport. Thus, the composite material 1510A, 1510B may further comprise an interleaf layer to reduce and/or prevent sticking between adjacent elastic layers 1512 (not shown). In still other example embodiments, the composite material is manufactured with a support layer that includes only second portions and is substantially free of a first portion (not shown).

FIG. 2B is a perspective view of the composite material of FIG. 2A having a portion of a support layer removed according to some example embodiments. FIG. 2C is a cross-sectional view of the composite material of FIG. 2B, taken at line 2C-2C'.

In some example embodiments, the first portion 1520 of the support layer 1514 may be removed from the composite material 1510A, 1510B to create a composite material 1510A', 1510B', as shown in FIGS. 2B-2C. The composite material 1510A', 1510B' includes the elastic layer 1512 and a support layer 1514'. The support layer 1514' includes the pair of second portions 1522, with the first portion 1520, 1520' (FIG. 2A) having been removed. Accordingly, a portion of the upper surface 1516 of the elastic layer 1512 is exposed and free to interact with a product portion during a manufacturing process.

The composite material 1510A', 1510B' includes a first or product region 1526 and a second or apparatus region 1528. The product region 1526 comprises a portion of the elastic layer 1512 free from the support layer 1514' (e.g., the portions where the pair of second portions 1522 remain). In some example embodiments, the apparatus region 1528 is configured to engage an apparatus (not shown) to facilitate conveyance of the composite material 1510A', 1510B' through the apparatus in a machine direction 1530. In some example embodiments, the presence of the support layer 1514' in the apparatus region 1528 may maintain tensile strength of the composite material 1510A', 1510B' in the machine direction 1530 to facilitate conveyance of the composite material 1510A', 1510B' and/or may facilitate holding the composite material 1510A', 1510B' on an apparatus (e.g., on a top surface of the apparatus) during a manufacturing process. In at least some example embodiments, the composite material 1510A', 1510B' can be registered by and conveyed through the apparatus.

In the example embodiment shown in FIGS. 2B-2C, the apparatus region 1528 includes a first apparatus region 1528-1 and a second apparatus region 1528-2. The first and second apparatus regions 1528-1, 1528-2 may be disposed on opposite sides of the product region 1526. In some example embodiments, each of the product region 1526, the first apparatus region 1528-1, and the second apparatus region 1528-2 is rectangular or substantially rectangular. The first and second apparatus regions 1528-1, 1528-2 may extend along opposing edges 1532 of the composite material 1510A', 1510B'. In some example embodiments, the first and second apparatus regions 1528-1, 1528-2 extend continuously between a first end 1534 of the composite material 1510A', 1510B' and a second end 1536 of the composite material 1510A', 1510B' to maintain tensile strength of the composite material 1510A', 1510B' as it is conveyed through the apparatus in the machine direction 1530. In some example embodiments, the first and second apparatus regions 1528-1, 1528-2 extend substantially parallel to one another.

The product region 1526 is free to stretch and deform (such as in a direction perpendicular to the upper surface 1516) to permit the performance of additional manufacturing steps, such as product placement, sealing of the elastic layer 1512 to itself or another elastic layer to form a pouch around the product, sealing the elastic layer 1512 around the product, and/or cutting or other methods of separation. The first and second apparatus regions 1528-1, 1528-2 may continue to engage the apparatus while other manufacturing steps are performed within the product region 1526.

The elastic layer 1512 composite material 1510A' may be referred to herein as a first elastic layer 1512*a*. The elastic layer 1512 of the composite material 1510B' may be referred to herein as a second elastic layer 1512*b*. The first and second elastic layers 1512*a*, 1512*b* may be formed of the same materials or different materials. In some example embodiments, the first elastic layer 1512*a* and/or the second elastic layer 1512*b* may include a material that is the same as or similar to an elastomeric polymer pouch material such as, for example, polypropylene, polyurethane, styrene, styrenes (including styrene block copolymers), EVA (ethyl vinyl acetate), polyether block amides, EPAMOULD (Epaflex), EPALINE (Epaflex), TEXIN (Bayer), DESMOPAN (Bayer), HYDROPHAN (AdvanceSourse Biomaterials), ESTANE (Lubrizol), PELLETHANE (Lubrizol), PEARLTHANE (Merquinsa), IROGRAN (Huntsman), ISOTHANE (Greco), ZYTHANE (Alliance Polymers and Services), VISTAMAX (ExxonMobil), TEXIN RXT70A (Bayer), MD-6717 (Kraton), or any combination thereof. Other suitable materials may also be used.

Figure 3A:
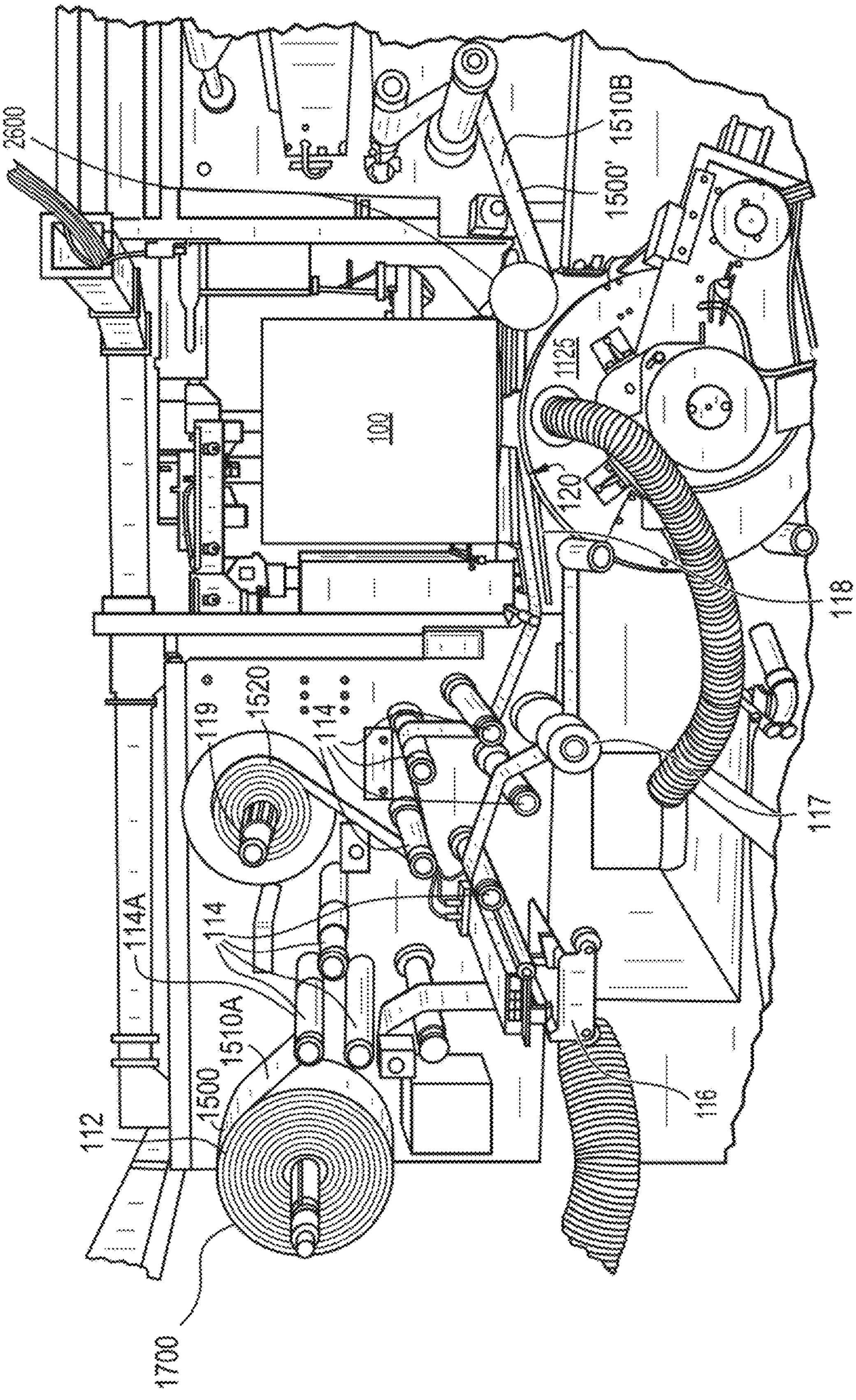
FIG. 3A is a partial front view of the apparatus of FIG. 1A according to some example embodiments.
Figure 3B:
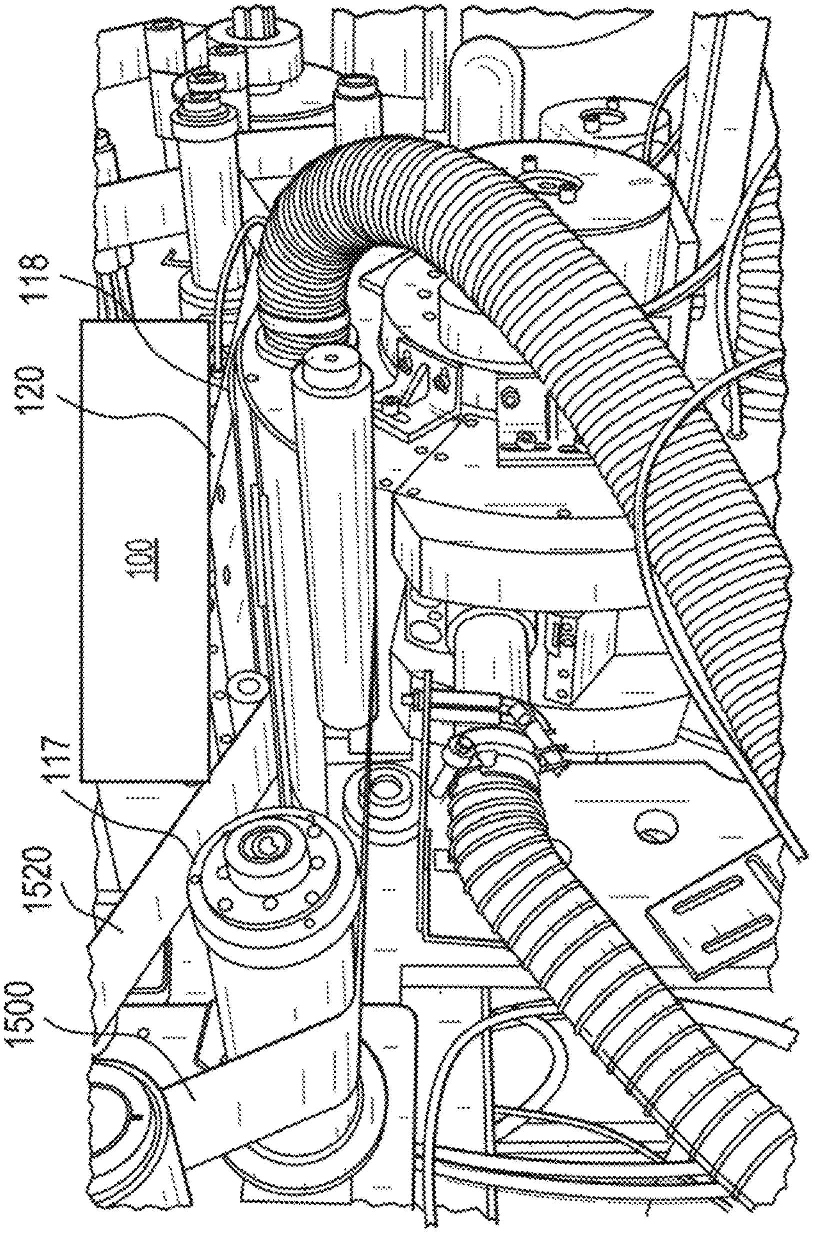
FIG. 3B is a perspective view of a first receiving location of the apparatus of FIG. 1A according to some example embodiments.
Figure 3C:
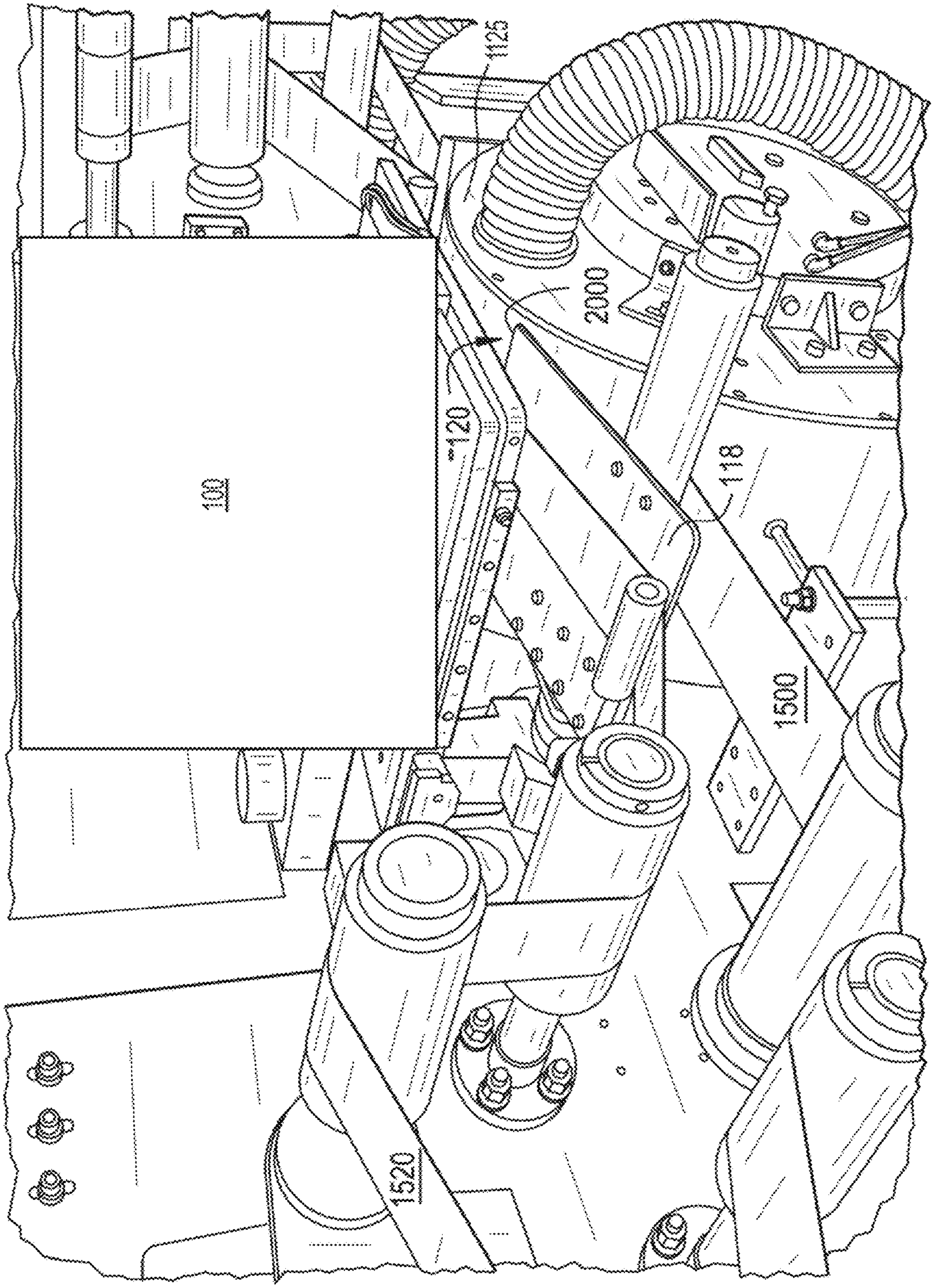
FIG. 3C is a perspective view of a first receiving location and a dosing location of the apparatus of FIG. 1A according to some example embodiments.
Figure 3D:
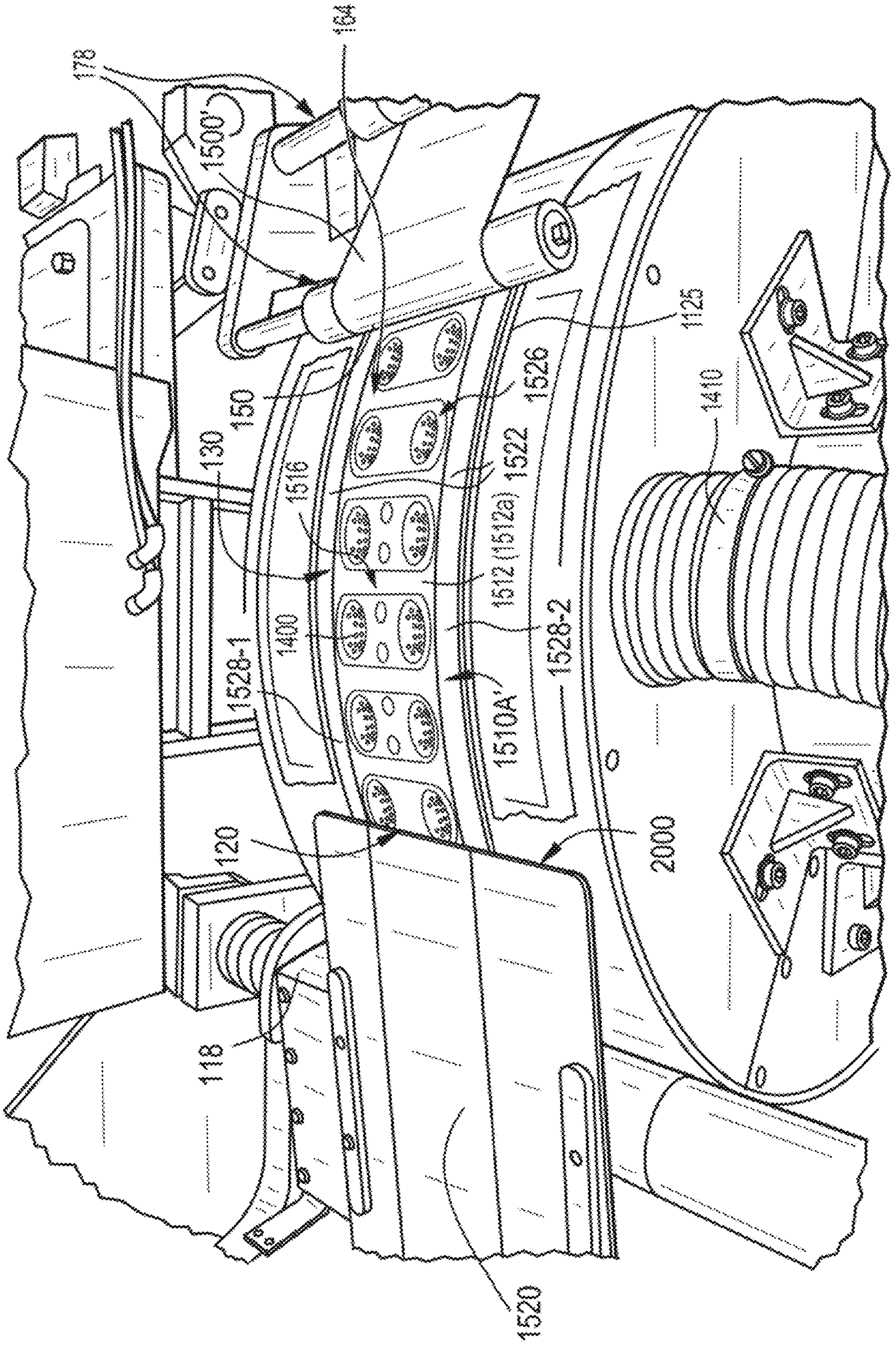
FIG. 3D is a top perspective view of the dosing location and the cleaning location with the doser assembly and cleaner assembly removed according to some example embodiments.
Figure 3E:
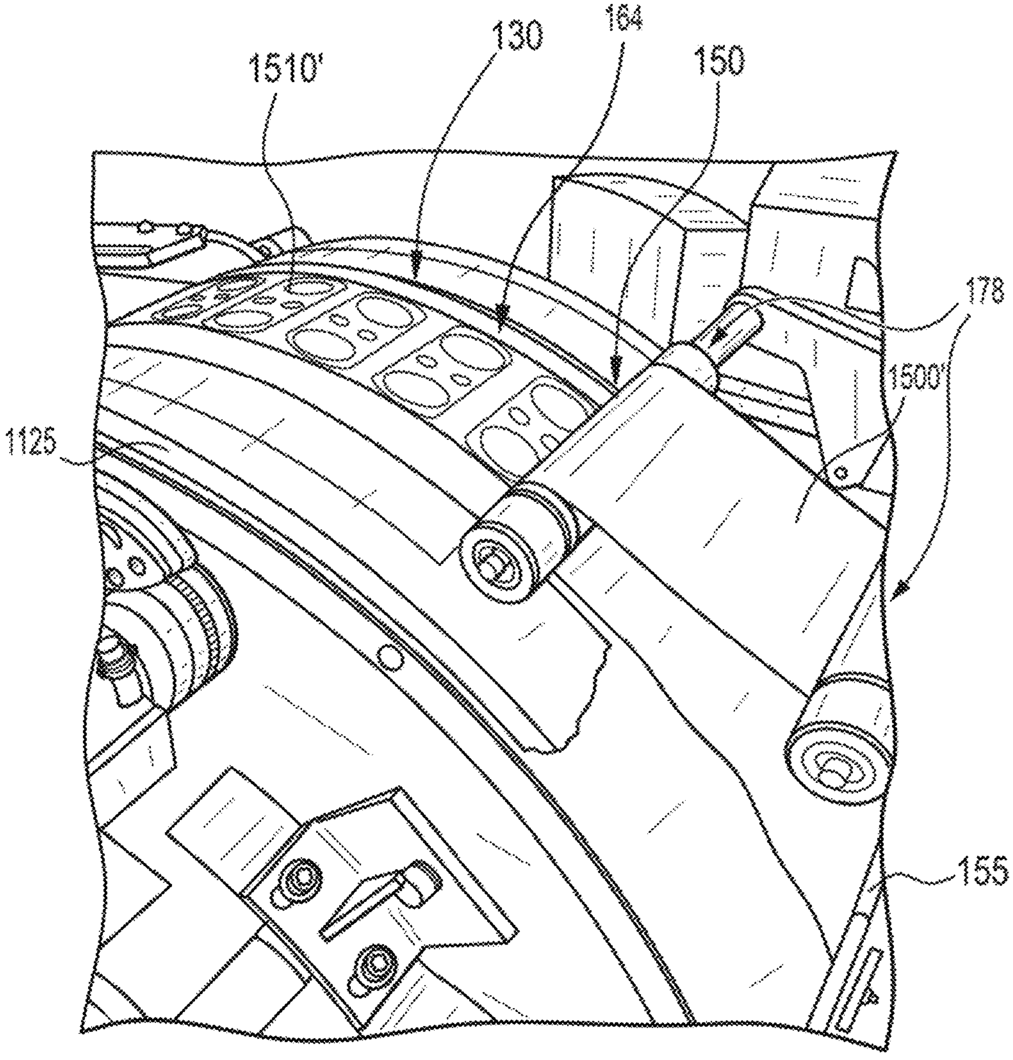
FIG. 3E is a top perspective view of the dosing location and cleaning location with the doser assembly and cleaner assembly removed and a second receiving location according to some example embodiments.
Figure 3F:
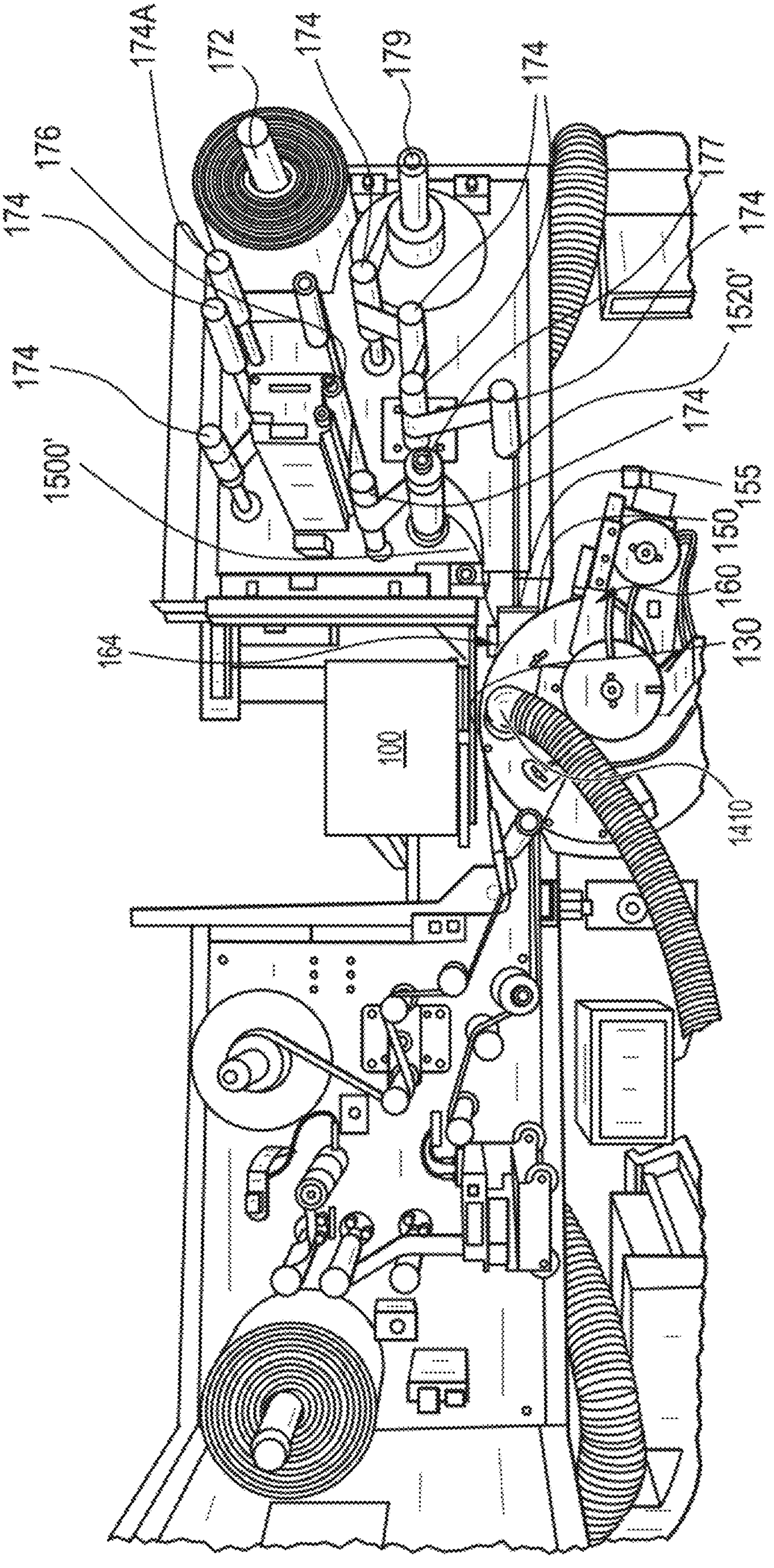
FIG. 3F is a partial front view of an apparatus for forming a pouch product including a first material roll extending through the first material distribution station and a second material roll extending through the second material distribution station according to some example embodiments.
Figure 3G:
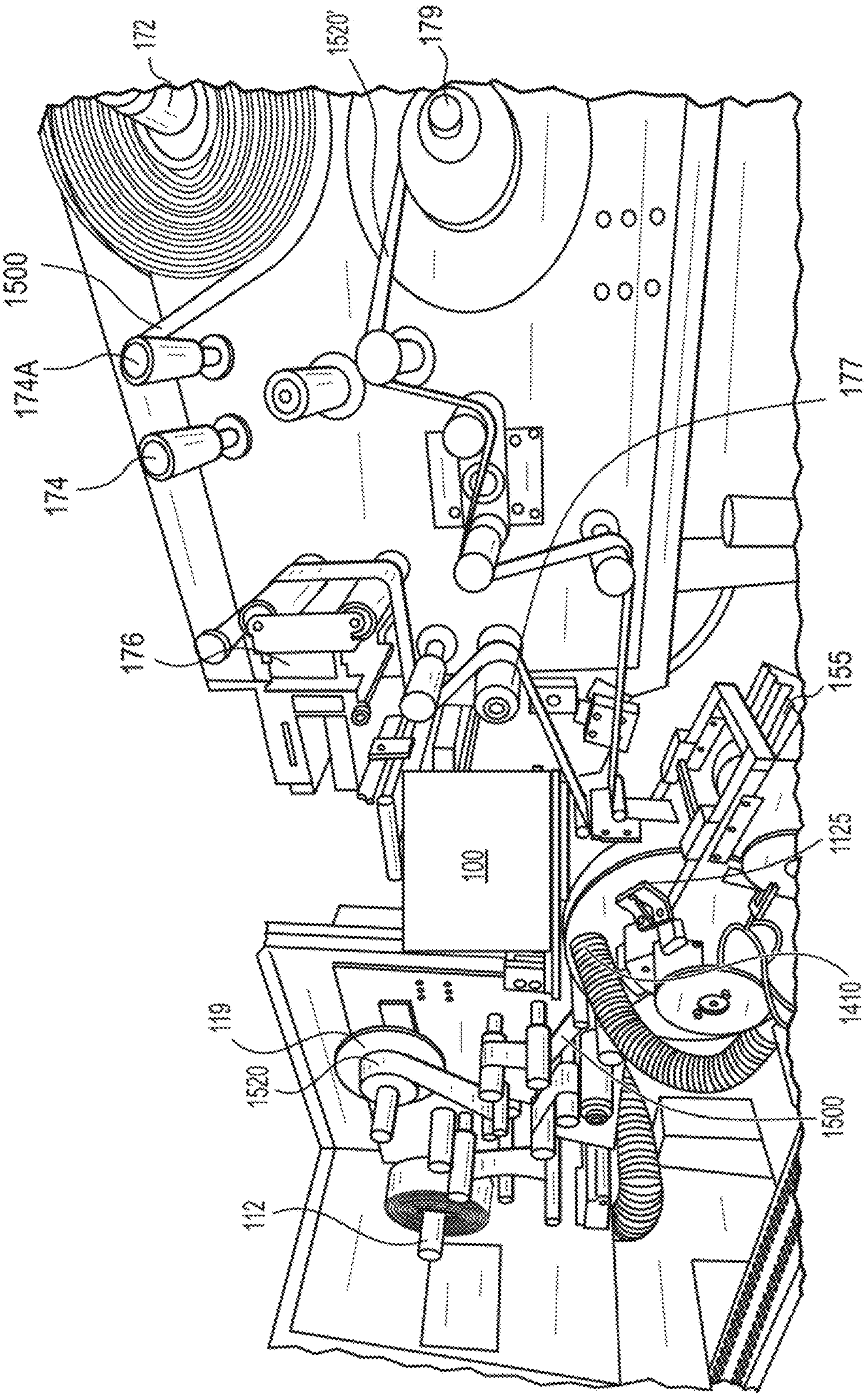
FIG. 3G is a front perspective view showing the second material extending through the second material distribution station according to some example embodiments.
Figure 3H:
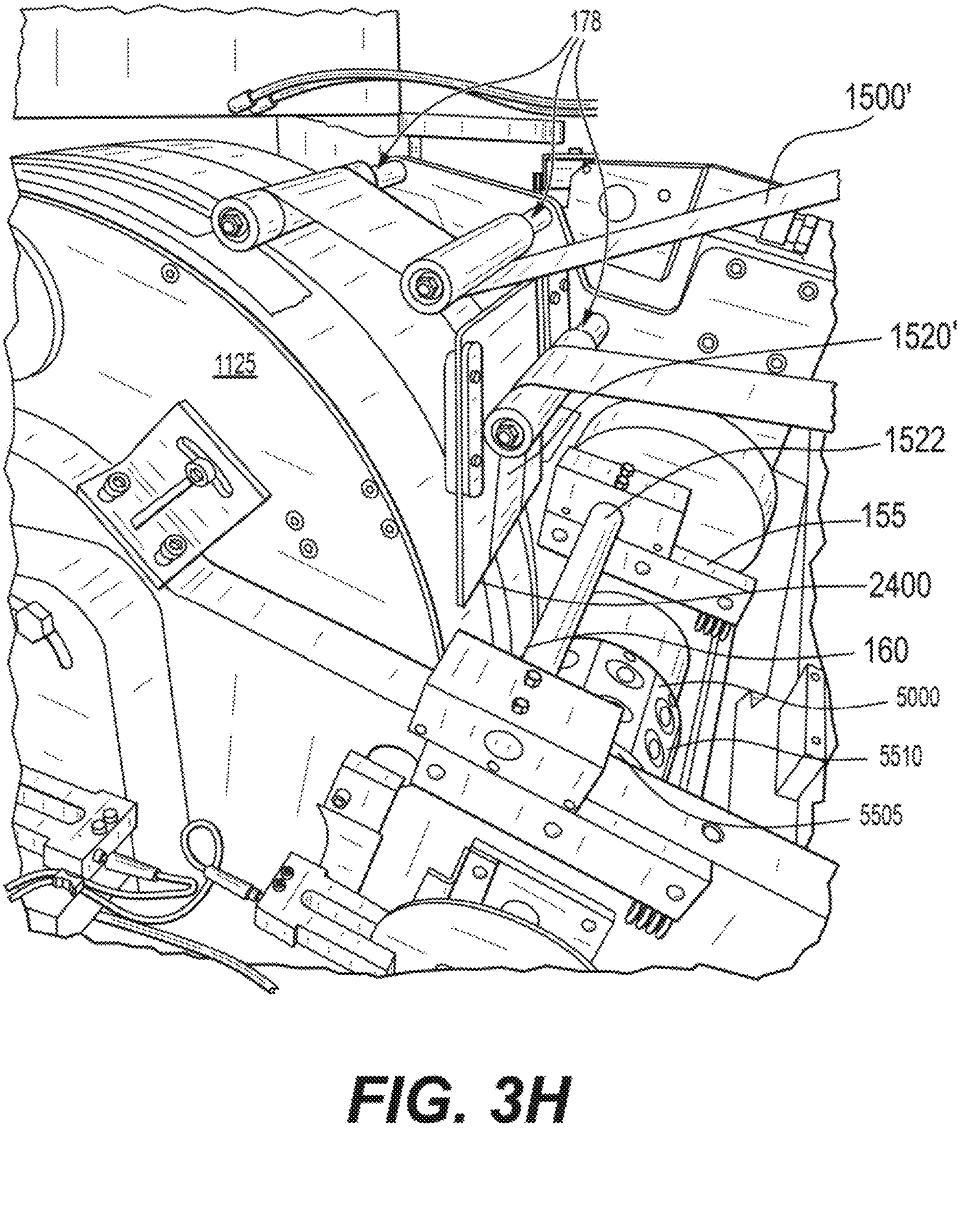
FIG. 3H is a side perspective view of the dosing location and the cleaning location with the doser assembly and the cleaner assembly removed and a second receiving location according to some example embodiments.
Figure 3I:
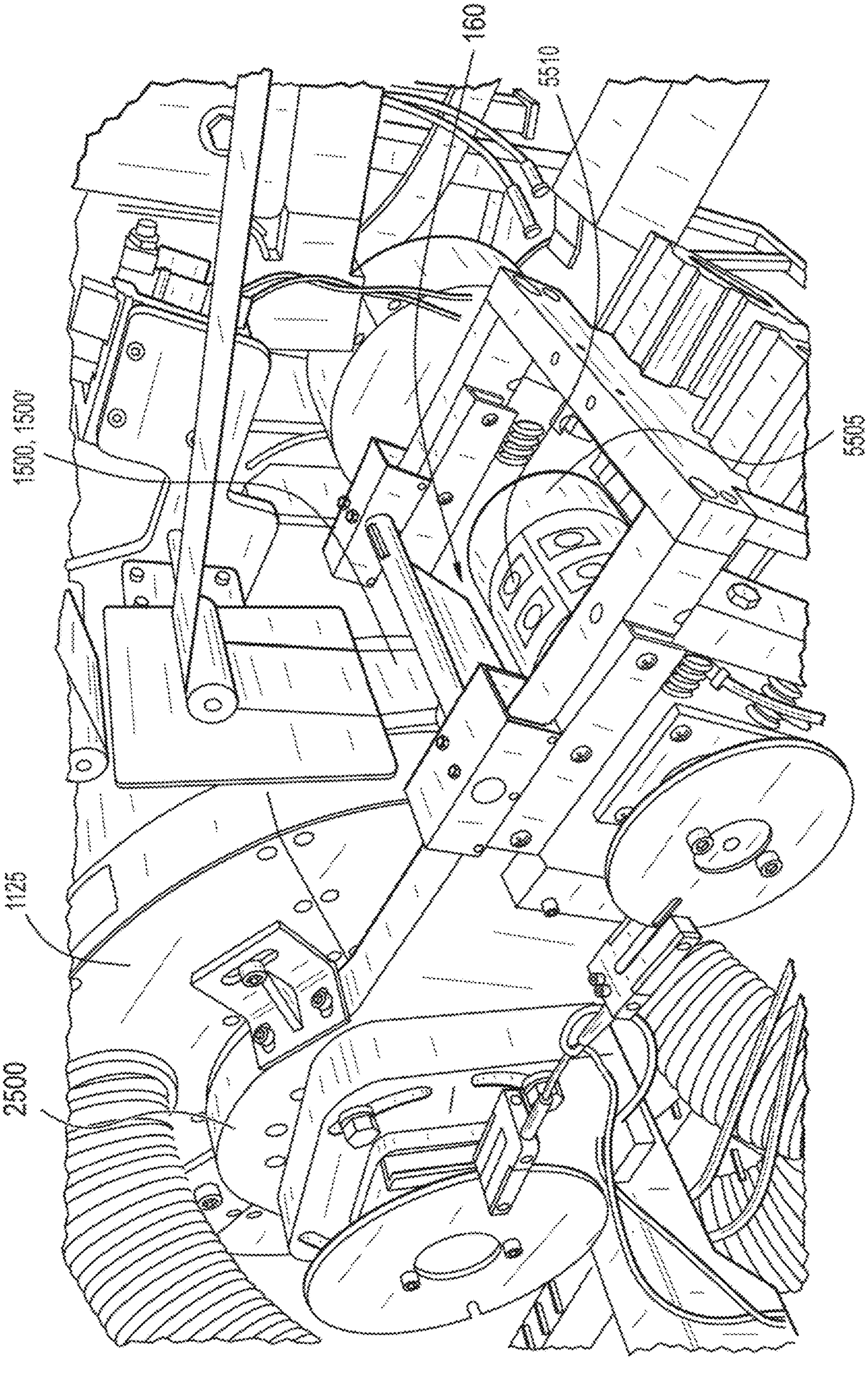
FIG. 3I is a partial view of the apparatus of FIG. 1A showing the second receiving location and the cutting and sealing location according to some example embodiments.

FIG. 3A is a partial front view of the apparatus of FIG. 1A according to some example embodiments. FIG. 3B is a perspective view of a first receiving location of the apparatus of FIG. 1A according to some example embodiments. FIG. 3C is a perspective view of a first receiving location and a dosing location of the apparatus of FIG. 1A according to some example embodiments. FIG. 3D is a top perspective view of the dosing location and the cleaning location with the doser assembly and cleaner assembly removed according to some example embodiments. FIG. 3E is a top perspective view of the dosing location and cleaning location with the doser assembly and cleaner assembly removed and a second receiving location according to some example embodiments. FIG. 3F is a partial front view of an apparatus for forming a pouch product including a first material roll extending through the first material distribution station and a second material roll extending through the second material distribution station according to some example embodiments. FIG. 3G is a front perspective view showing the second material extending through the second material distribution station according to some example embodiments. FIG. 3H is a side perspective view of the dosing location and the cleaning location with the doser assembly and the cleaner assembly removed and a second receiving location according to some example embodiments. FIG. 3I is a partial view of the apparatus of FIG. 1A showing the second receiving location and the cutting and sealing location according to some example embodiments.

As shown in FIGS. 3A-3I, during operation of the apparatus 1000, the first material 1500 travels from a first roll 1700 at the first roll holder 112 to the first receiving location 120. As the first material 1500 travels, the first material 1500 runs through the first tensioner 114A which may include the first tracking controller 116. The first tensioner 114A may include at least one tension sensing roller, as generally known to a person having ordinary skill in the art. The first tracking controller 116 and the first tensioner 114A are configured keep the first material 1500 on track and at a desired tension as the first material 1500 passes along the various rollers. The first tracking controller is configured to pivot a set of rollers around a center axis so as to maintain web tracking. The first tracking controller 116 is in constant movement so as to maintain the edge of the web within the target area of an edge sensor (not shown).

In some example embodiments, the first material 1500 then travels along the first dewrinkling roller 117, which has a bowed (convex) surface that is configured to reduce and/or prevent wrinkles in the first material 1500.

Once the first material 1500 arrives at the first receiving location 120, portions of the first material 1500 are aligned with the rotatable drum 1125, while the first portion 1520 of the first support layer 1514 is removed. Removal of the first portion 1520 along the perforations 1524 occurs as the first stripper plate 118 and remaining ones of the first set of rollers 114 roll up the first portion 1520, such that only the elastic layer 1512 (e.g., the first elastic layer 1512*a*) and portions 1522 of the first support layer 1514 of the first material 1500 remain at the first receiving location 120 and in contact with the rotatable drum 1125. The motion of the rotatable drum 1125 simultaneously pulls the elastic layer 1512 and the second portions 1522 of the support layer 1514 away from the removed portion 1520 thereby aiding in the removal of the first portion 1520. The first stripper plate 118 puts pressure along the first material 1500, and the first portion 1520 is pulled back over the first stripper plate 118 on the first scrap roll holder 119 and remaining ones of the first set of rollers 114 pull the portion 1520 from the elastic layer 1512 and the second portions 1522 of the support layer 1514.

In some example embodiments, at the first receiving location 120, the elastic layer 1512 and the second portions 1522 of the support layer 1514 are aligned with the rotatable drum 1125, such that the elastic layer 1512 and the second portions 1522 of the support layer 1514 move with the rotatable drum 1125 in a machine direction towards the dosing location 130. Thus, the elastic layer 1512 (e.g., first elastic layer) and the second portions 1522 of the support layer 1514 of the first material 1500 are conveyed through the apparatus 1000 in the machine direction. The elastic layer 1512 and the second portions 1522 of the support layer 1514 of the first material 1500 includes the product region 1526 and the apparatus region 1528 (shown in FIGS. 2A-2C). The product region 1526 includes the elastic layer 1512 (e.g., the first elastic layer 1512*a*), and the apparatus region 1528 includes the elastic layer 1512 and the support layer 1514', which prevents stretching of the elastic layer 1512 as the composite material 1510A' passes through the apparatus 100.

FIG. 3B is a perspective view of a first receiving location of the apparatus of FIG. 1A according to some example embodiments.

In some example embodiments, as shown in FIG. 3B, the movement of the first material 1500 to the first receiving location 120 is shown in more detail. As shown, the first material 1500 moves along the first dewrinkling roller 117 to the first receiving location 120. At the first receiving location 120 along the path of the rotatable drum 1125, the first material 1500 is brought into contact with a portion of the rotatable drum 1125 while the first portion 1520 is pulled away from the elastic layer 1512 and the second portions 1522 by the first stripper plate 118 and the remaining rollers. As shown, the first portion 1520 is pulled in a direction substantially opposite to the direction in which the rotatable drum 1125 rotates.

FIG. 3C is a perspective view of a first receiving location and a dosing location of the apparatus of FIG. 1A according to some example embodiments.

In some example embodiments, as shown in FIG. 3C, an edge 2000 of the first stripper plate 118 abuts a portion of the rotatable drum 1125 at the first receiving location 120. Once the first material 1500 aligns with the rotatable drum 1125, the first portion 1520 of the support layer 1514 is pulled over the edge 2000 and the body of the first stripper plate 118 as the rotatable drum 1125 rotates clockwise away from the first stripper plate 118. Substantially simultaneously, the removed first portion 1520 of the support layer 1514 is being pulled by the rollers and the first scrap roll holder 119 (shown in FIG. 3A).

FIG. 3D is a top perspective view of the dosing location and the cleaning location with the doser assembly and cleaner assembly removed according to some example embodiments.

In some example embodiments, as shown in FIG. 3D, the first material 1500 including the elastic layer 1512 (e.g., first elastic layer 1512*a*) and the second portions 1522 of the support layer 1514 moves along the rotatable drum 1125 from the first receiving location 120 to the dosing location 130. The first edge 2000 of the first stripper plate 118 abuts the first material 1500 at the first receiving location 120. As the elastic layer 1512 and the second portions 1522 rotate with the rotatable drum 1125, the removed first portion 1520 is pulled away from the elastic layer 1512 and the second portions 1522. The first portion 1520 is pulled in a direction opposite of the direction of rotation of the rotatable drum 1125. The first portion 1520 extends over the first stripper plate 118. The remaining composite material 1510A' that is on the rotatable drum 1125 and which includes the elastic layer 1512 and the second portions 1522 of the first material 1500 may be referred to herein as a first web.

Further, as shown, the elastic layer 1512 is semi-transparent such that the divots 1400 along the rotatable drum 1125 can be seen therethrough. As the rotatable drum 1125 rotates, a vacuum is pulled via the vacuum source 1410 and vacuum conduits 1430 (shown in FIG. 18C) so as to conform at least a portion of the first elastic layer 1512*a*, which includes the first product region 1526, and the second portions 1522 to a surface of the apparatus 1000. Thus, the vacuum pulls separate, respective portions of the first elastic layer 1512*a* into each of the divots 1400 prior to dosing by the doser assembly 100. Such separate, respective portions of the first elastic layer 1512*a* that are drawn into the divots 1400 may be referred to as "first web portions."

In some example embodiments, the rotatable drum 1125 may also include the grippers 1710 (shown in FIG. 1G), which may be air inlets at which the vacuum is communicated to the second portions 1522 and/or raised bumps that grip the first material 1500. In some example embodiments, when the grippers 1710 include air inlets, the vacuum can be applied so as to pull and hold the first material 1500 against a surface of the rotatable drum 1125.

After the elastic layer 1512 is pulled into the divots 1400, portions of filler material are placed into separate, respective divots 1400 on top of the first elastic layer 1512*a* by the doser assembly 100, and the rotatable drum 1125 continues to rotate towards the second receiving location 150 via the cleaning location 164. The first web portions located in the divots 1400 into which portions of filler material are provided by the doser assembly 100 may be referred to herein as "filled first web portions."

At the cleaning location 164, the cleaner assembly 2600 as described with regard to FIGS. 18A-27 removes excess filler material from the exposed upper surface 1516 of the first elastic layer 1512*a* and/or moves such excess filler material from the exposed upper surface 1516 of the first elastic layer 1512*a* into one or more of the divots 1400 that hold portions of filler material to add to such portions of filler material and may further compress the portions of filler material held in the divots 1400. The rotatable drum then 1255 continues to rotate toward the second receiving location 150.

At the second receiving location 150, the second material 1500' is aligned with the first elastic layer 1512*a* and the second portions 1522 of the support layer 1514 of the "first web" of the first material 1500, such that the portions of filler material held in the divots 1400 with the filled first web portions are sandwiched between the elastic layer 1512 of the first material 1500 (e.g., the first elastic layer 1512) and the second material 1500'.

FIG. 3E is a top perspective view of the dosing location and cleaning location with the doser assembly and cleaner assembly removed and a second receiving location according to some example embodiments.

In some example embodiments, as shown in FIG. 3E, the second material 1500' is aligned with the elastic layer 1512 and the second portions 1522 of the first material 1500 (e.g., the first web which includes the first elastic layer 1512*a* and the filled first web portions) at the second receiving location 150, which is along the rotatable drum 1125 as the rotatable drum 1125 continuously rotates.

FIG. 3F is a partial front view of an apparatus for forming a pouch product including a first material roll extending through the first material distribution station and a second material roll extending through the second material distribution station according to some example embodiments.

In some example embodiments, as shown in FIG. 3F, the elastic layer 1512 and the second portions 1522 of the support layer 1514 of the first material 1500 move along the rotatable drum 1125 to the dosing location 130 after the elastic layer 1512 of the first material 1500 (e.g., the first elastic layer 1512*a*) has been pulled into the divots 1400 by vacuum as discussed with respect to at least FIG. 3D.

At the dosing location 130, a desired amount (e.g., portion) of filler material may be provided into each divot 1400 on top of the first elastic layer 1512*a* by the doser assembly 100 to form the filled first web portions in the divots 1400. The doser assembly 100 may be any of the doser assemblies according to any of the example embodiments, including any of the doser assemblies 100 according to FIGS. 4A-18C.

The rotatable drum 1125 continues rotating from the dosing location 130 to the second receiving location 150 via the cleaning location 164, such that the filled divots 1400 continue moving along the rotatable drum 1125 towards the second receiving location 150.

At the second receiving location 150, the second material 1500' is delivered to the rotatable drum 1125 via the second roll holder 172, the second set of rollers 174 including the second tensioner 174A, and the second dewrinkling roller 177. The second material 1500' is then aligned with the elastic layer 1512 (e.g., first elastic layer 1512*a*) and the second portions 1522 of the first material 1500, such that the portions of filler material in the divots 1400 are sandwiched between the elastic layer 1512 of the first material 1500 (e.g., the first elastic layer 1512*a*) and the second material 1500'.

At the second receiving location 150, as with the first material 1500, the first portion 1520' of the support layer 1514 of the second material 1500' is removed as the second stripper plate 155 and second scrap roll holder 179 pull the first portion 1520' away from the remaining second portions 1522' along the perforations 1524. The first portion 1520' is continuously rolled onto the second scrap roll holder 179 while the remaining second portions 1522' of the second material 1500' are aligned with the elastic layer 1512 (e.g., the first elastic layer 1512*a*) and the second portions 1522 of the support layer 1514 of the first material 1500 as the rotatable drum 1125 continuously rotates towards the cutting and sealing location 160.

FIG. 3G is a front perspective view showing the second material extending through the second material distribution station according to some example embodiments.

In some example embodiments, as shown in FIG. 3G, the first portion 1520' of the second material 1500' is pulled away from the remainder of the second material as the rotatable drum 1125 rotates and the second stripper plate 155 presses against the second material. The second scrap roll holder 179 continuously rolls the removed first portion 1520' to aid in pulling the removed material from the remainder of the second material 1500'.

FIG. 3H is a side perspective view of the second receiving location and the cutting and sealing location according to some example embodiments.

In some example embodiments, as shown in FIG. 3H, after the elastic layer 1512 (e.g., the first and second elastic layers 1512*a* and 1512*b*) and the remaining second portions 1522 of the first material 1500 and the second material 1500' are aligned along the rotatable drum 1125, the aligned materials move into contact with an edge 2400 of the second stripper plate 155. The edge 2400 abuts the rotatable drum 1125 and the first portion 1520' of the second material 1500' is pulled from the second portions 1522 of the second material 1500' along the perforations 1524 (shown in FIGS. 2A-2C). The edge 2400 provides a point at which pressure is applied to the second material 1500' as the first portion 1520' of the support layer 1514 is pulled and removed along the perforations 1524 in the support layer 1514 of the second material 1500'.

The remaining portions of the first material 1500 and the second material 1500' continue to travel along the rotatable drum 1125 to the cutting and sealing location 160, which may be at about a 4 o'clock position along the rotatable drum 1125. As the rotatable drum 1125 rotates clockwise, the heat knife assembly roller 5505 rotates counterclockwise, such that the heat knives 5510 align with respective ones of the divots 1400 along the rotatable drum 1125. The heat knives 5510 are heated to a temperature sufficient to at least partially melt the first and second elastic layers 1512*a* and 1512*b* so as to form a seal between the elastic layers of the first material 1500 and the second material 1500'. In some example embodiments, the heating is sufficient to at least partially cut the newly formed pouch product from the surrounding waste material simultaneous to the sealing.

FIG. 3I is a partial view of the apparatus of FIG. 1A showing the second receiving location and the cutting and sealing location according to some example embodiments.

In some example embodiments, as shown in FIG. 3I, the first and second elastic layers 1512*a* and 1512*b* are aligned and travel to the cutting and sealing location 160.

In some example embodiments, the apparatus 1000 also includes a drum register 2500 configured to adjust a speed of rotation of the rotatable drum 1125. The rotatable drum 1125 is servo controlled to follow speed and position commands using motion move position cam instructions synchronized to follow a master virtual axis. Servo configuration allows each motor to know how far to move over the course of one pouch, taking in account motor speed and powertrain setup (gear box ratios etc.). Speeds are therefore set in pouches/sec. The rotatable drum 1125 has an attached disk with a small slot cut near outside perimeter. A homing sensor on each of the two disks detects the slots to provide a “Home” position. This home position is offset in software so as to provide accurate alignment of the two drums.

Further, as shown the heat knives 5510 align with the divots 1400 as the rotatable drum 1125 rotates clockwise, and the heat knife assembly roller 5505 rotates counter-clockwise, and the first and second elastic layers 1512*a* and 1512*b* pass therebetween.

As described herein, a “filler material” may include particulate matter comprising particles. The filler material may be a powder-like substance that may flow freely when shaken or tilted. In some example embodiments, the filler material may have a particle size (e.g., particle diameter) between about 0.1 μm to about 500 μm. In some example embodiments, the filler material may have a particle size (e.g., particle diameter) between about 0.1 μm to about 200 μm. In some example embodiments, the filler material may have a particle size between about 0.5 mm to about 1 mm, about 0.25 mm to about 0.5 mm, about 125 μm to about 250 μm, about 60 μm to about 125 μm, about 4 μm to about 60 μm, about 1 μm to about 4 μm, any combination thereof, or the like.

In some example embodiments, the filler material may have an average particle size of about 50 μm. In some example embodiments, the filler material may have an average particle size of about 200 μm. In some example embodiments, the filler material may have an average particle size of about 400 μm.

The filler material may partially or entirely comprise particles having a maximum diameter that is between about 0.1 μm to about 1 μm. The filler material may partially or entirely comprise particles having a maximum diameter that is equal to or greater than 1 μm.

The filler material may contain and/or partially or completely comprise at least one substance. In some example embodiments, the at least one substance is a consumer product.

In some example embodiments, the at least one substance and/or the consumer product is an inert powder material. In some example embodiments, the filler material may contain and/or partially or completely comprise a substance that is microcrystalline cellulose (MCC).

In some example embodiments, the at least one substance and/or the consumer product includes (e.g., partially or completely comprises) an oral product.

In some example embodiments, the oral product is an oral tobacco product, an oral non-tobacco product, an oral *cannabis* product, or any combination thereof. The oral product may be in a form of loose material (e.g., loose cellulosic material), shaped material (e.g., plugs or twists), pouched material, tablets, lozenges, chews, gums, films, any other oral product, or any combination thereof.

The oral product may include chewing tobacco, snus, moist snuff tobacco, dry snuff tobacco, other smokeless tobacco and non-tobacco products for oral consumption, or any combination thereof.

Where the oral product is an oral tobacco product including smokeless tobacco product, the smokeless tobacco product may include tobacco that is whole, shredded, cut, granulated, reconstituted, cured, aged, fermented, pasteurized, or otherwise processed. Tobacco may be present as whole or portions of leaves, flowers, roots, stems, extracts (e.g., nicotine), or any combination thereof.

In some example embodiments, the oral product includes a tobacco extract, such as a tobacco-derived nicotine extract, and/or synthetic nicotine. The oral product may include nicotine alone or in combination with a carrier (e.g., white snus), such as a cellulosic material. The carrier may be a non-tobacco material (e.g., microcrystalline cellulose) or a tobacco material (e.g., tobacco fibers having reduced or eliminated nicotine content, which may be referred to as “exhausted tobacco plant tissue or fibers”). In some example embodiments, the exhausted tobacco plant tissue or fibers can be treated to remove at least 25%, 40%, 50%, 60%, 70%, 75%, 80%, 85%, 90%, or 95% of the nicotine. For example, the tobacco plant tissue can be washed with water or another solvent to remove the nicotine.

In other example embodiments, the oral product may include *cannabis*, such as *cannabis* plant tissue and/or *cannabis* extracts. In some example embodiments, the *cannabis* material includes leaf and/or flower material from one or more species of *cannabis* plants and/or extracts from the one or more species of *cannabis* plants. The one or more species of *cannabis* plants may include *Cannabis sativa, Cannabis* indica, and/or *Cannabis ruderalis*. In some example embodiments, the *cannabis* may be in the form of fibers. In some example embodiments, the *cannabis* may include a cannabinoid, a terpene, and/or a flavonoid. In some example embodiments, the *cannabis* material may be a *cannabis*-derived *cannabis* material, such as a *cannabis*-derived cannabinoid, a *cannabis*-derived terpene, and/or a *cannabis*-derived flavonoid.

The oral product (e.g., the oral tobacco product, the oral non-tobacco product, or the oral *cannabis* product) may have various ranges of moisture. In some example embodiments, the oral product is a dry oral product having a moisture content ranging from 5% by weight to 10% by weight. In some example embodiments, the oral product has a medium moisture content, such as a moisture content ranging from 20% by weight to 35% by weight. In some example embodiments, the oral product is a wet oral product having a moisture content ranging from 40% by weight to 55% by weight.

In some example embodiments, oral product may further include one or more elements such as a mouth-stable polymer, a mouth-soluble polymer, a sweetener (e.g., a synthetic sweetener and/or a natural sweetener), an energizing agent, a soothing agent, a focusing agent, a plasticizer, mouth-soluble fibers, an alkaloid, a mineral, a vitamin, a dietary supplement, a nutraceutical, a coloring agent, an amino acid, a chemesthetic agent, an antioxidant, a food-grade emulsifier, a pH modifier, a botanical, a tooth-whitening agent, a therapeutic agent, a processing aid, a stearate, a wax, a stabilizer, a disintegrating agent, a lubricant, a preservative, a filler, a flavorant, flavor masking agents, a bitterness receptor site blocker, a receptor site enhancers, other additives, or any combination thereof.

In some example embodiments, the filler material may contain any product or substance. For example, the filler material may contain confectionary products, food products, medicines, or any other product.

Hereinafter, a non-limiting example of a doser assembly 100 that may be included in an apparatus 1000 according to any of the example embodiments, for example placed on top of and/or over a conveyor system including a rotatable drum 1125 of the apparatus 1000, is described, but inventive concepts are not limited thereto.

Figure 4A:
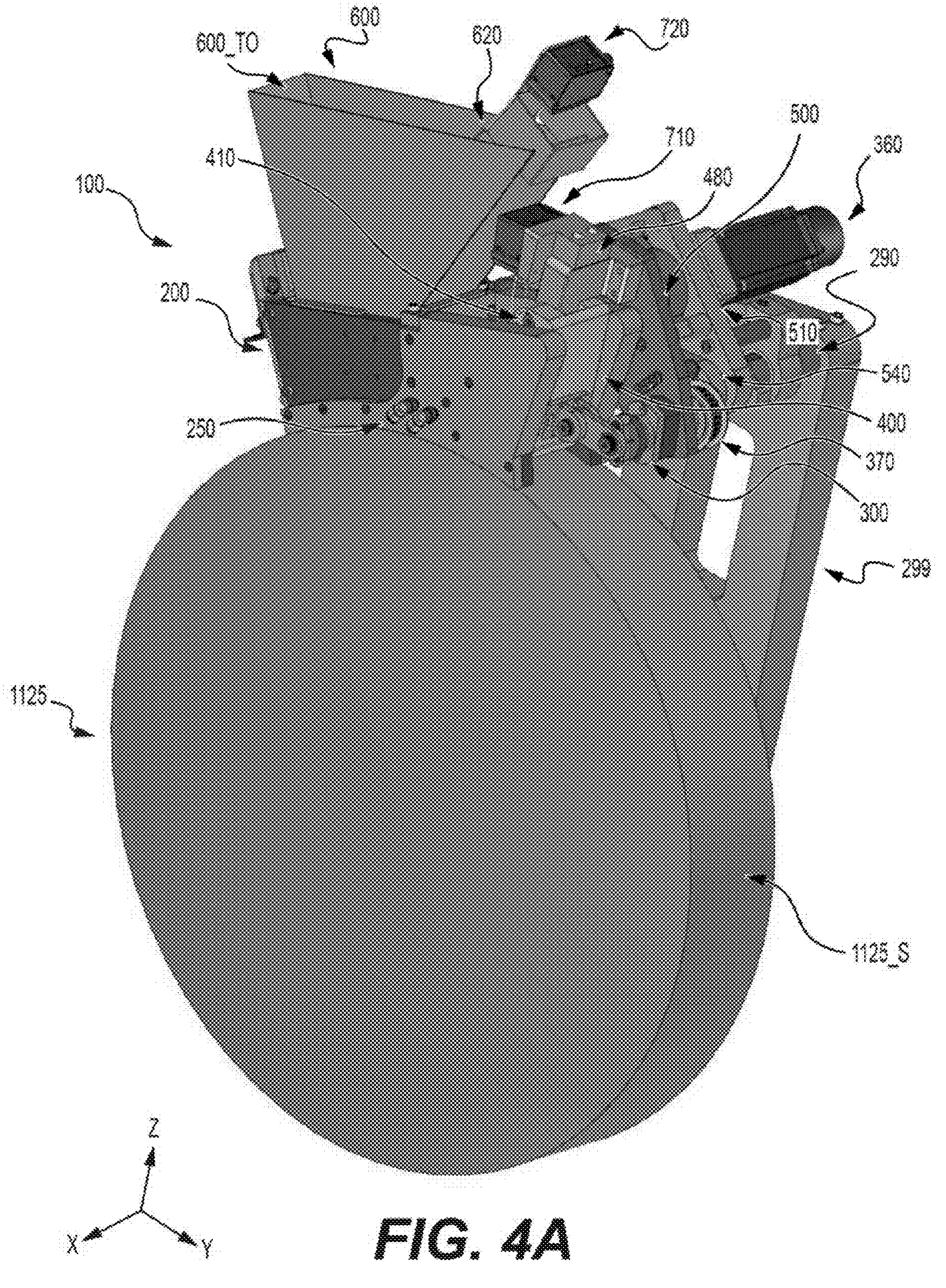
FIGS. 4A, 4B, 4C, 4D, and 4E are perspective views of an apparatus including a doser assembly and a rotatable drum according to some example embodiments, with FIG. 4D being a perspective cross-sectional view along line 4D-4D' shown in apparatus of FIG. 4C.
Figure 4B:
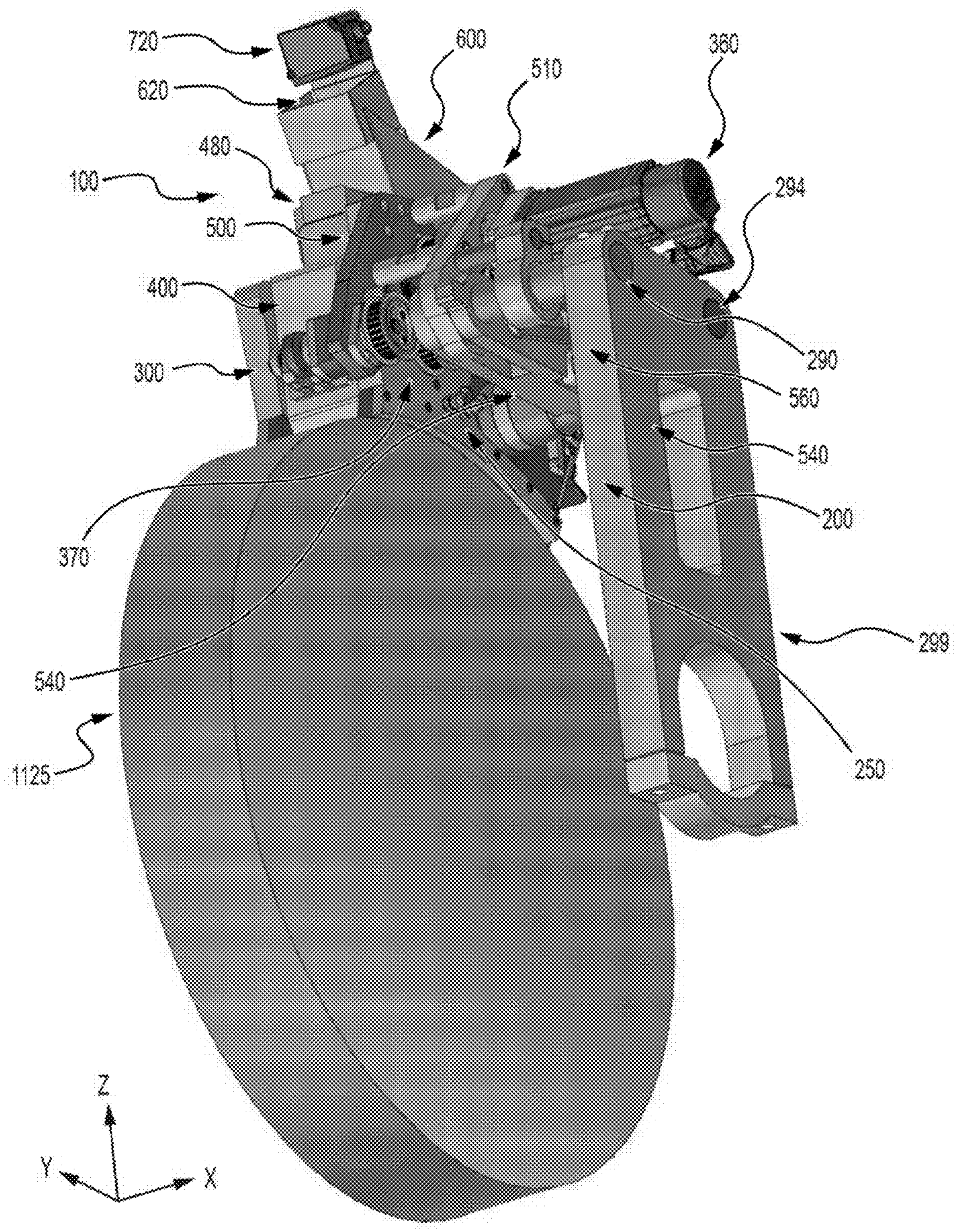
Figure 4C:
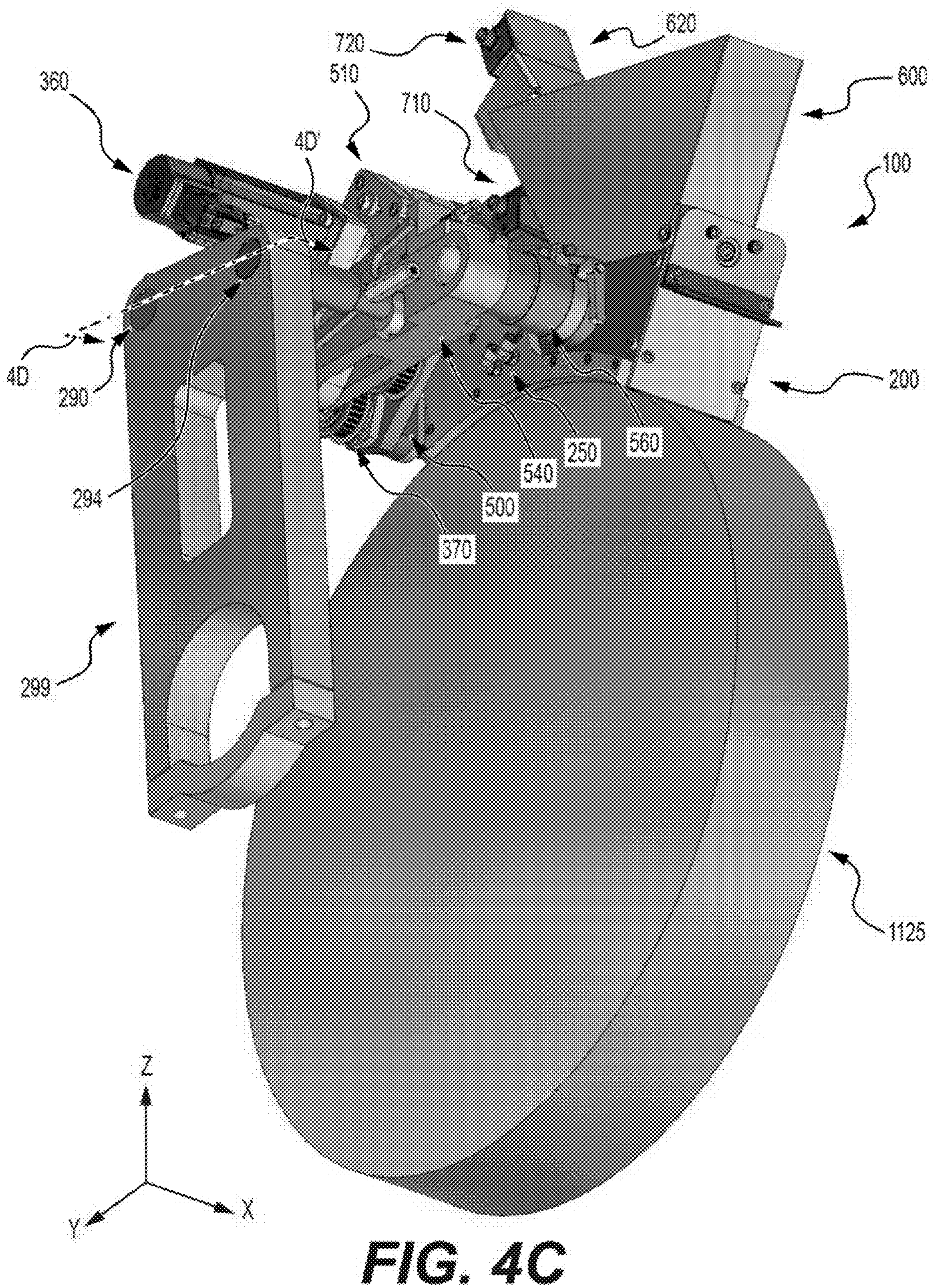
Figure 4D:
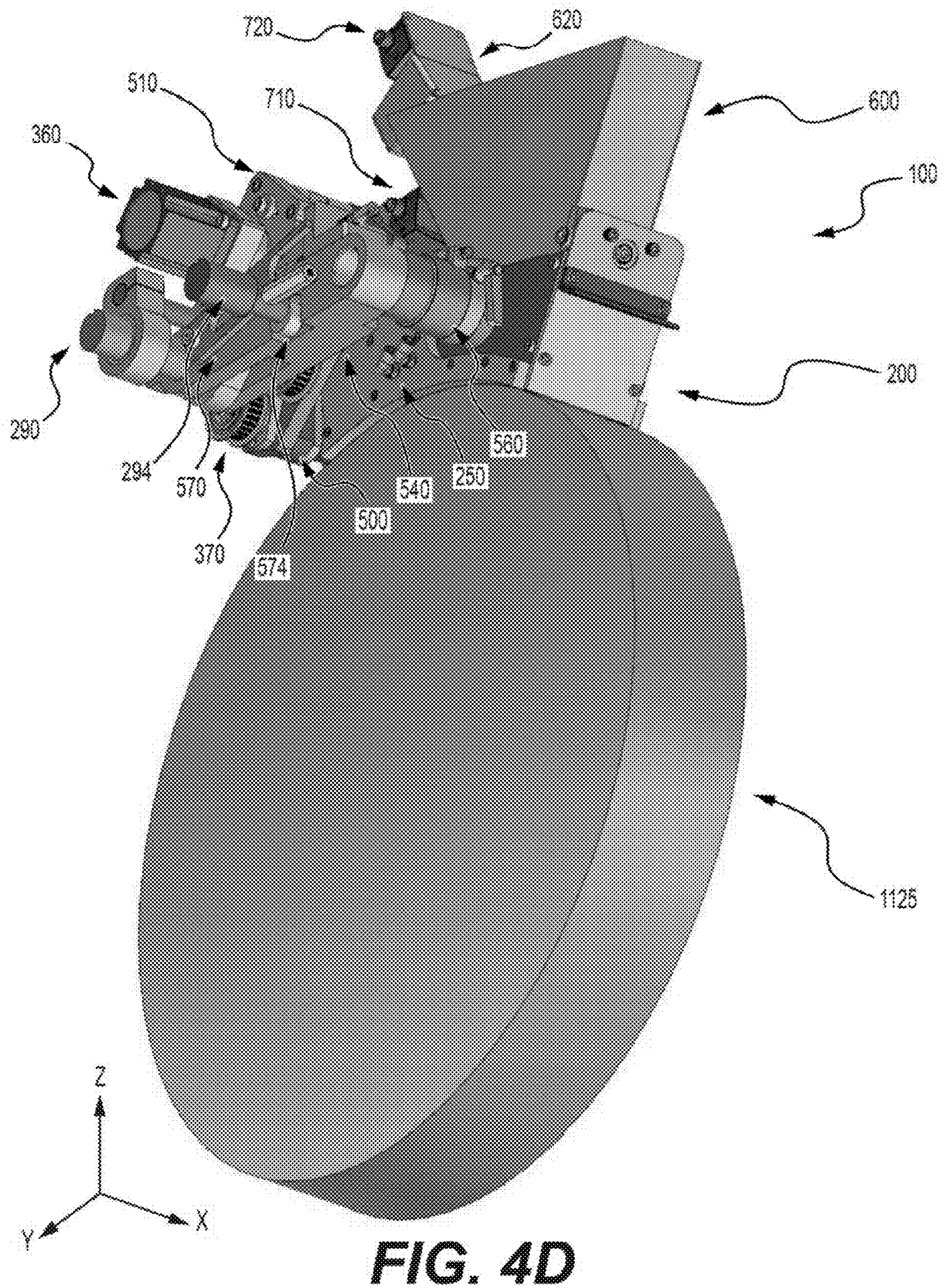
Figure 4E:
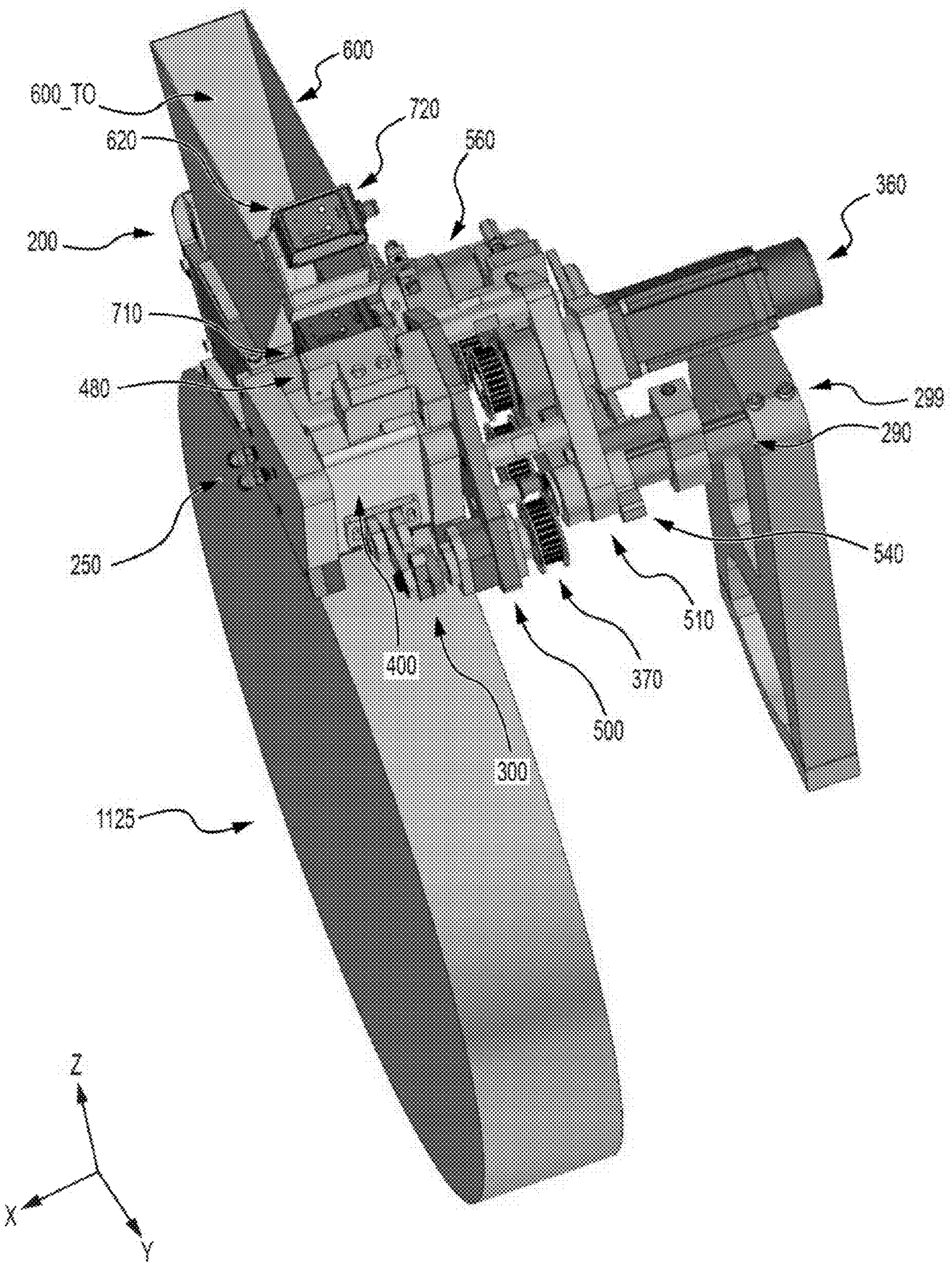
Figure 5A:
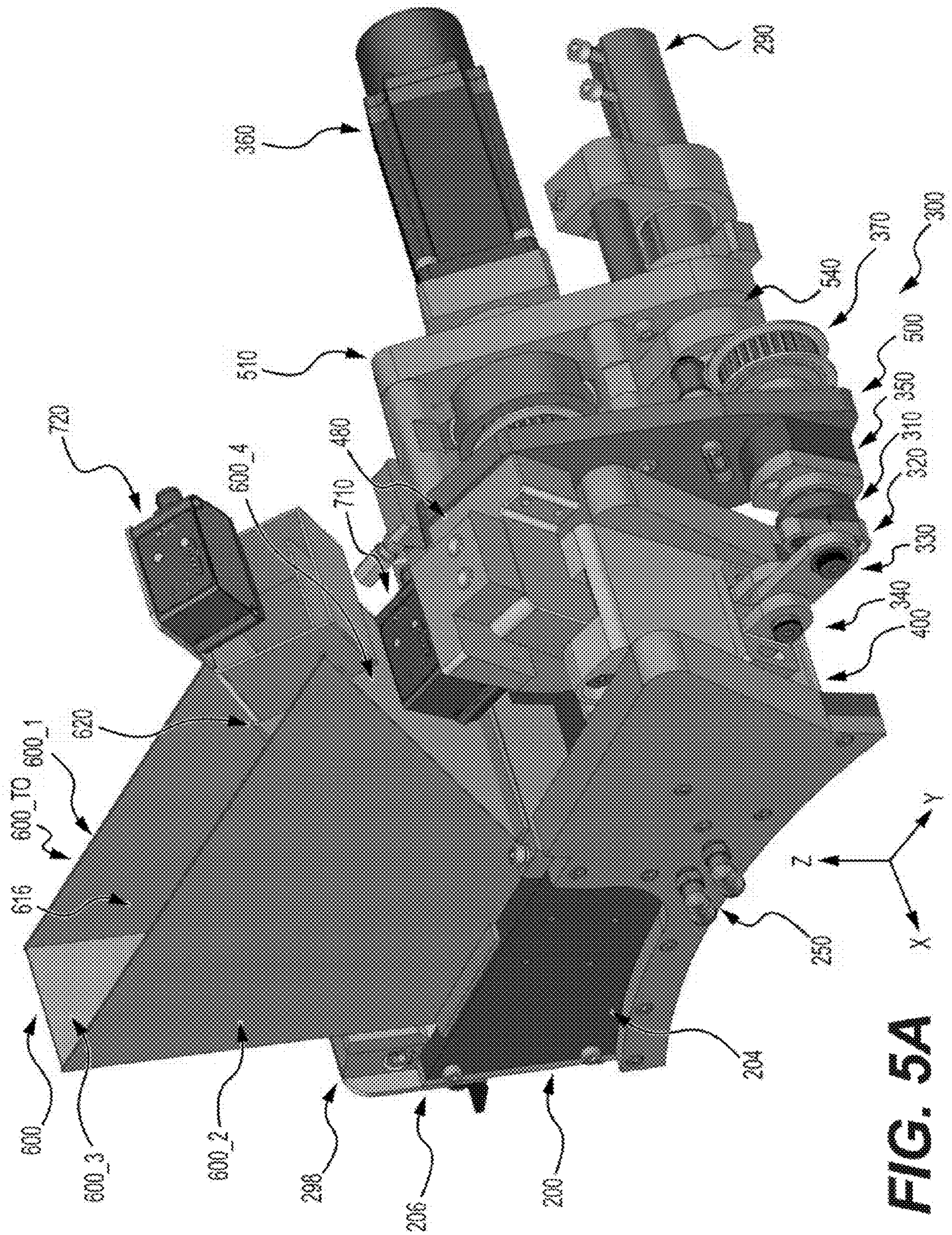
FIGS. 5A and 5B are perspective views of the doser assembly of FIGS. 4A-4E according to some example embodiments.
Figure 5B:
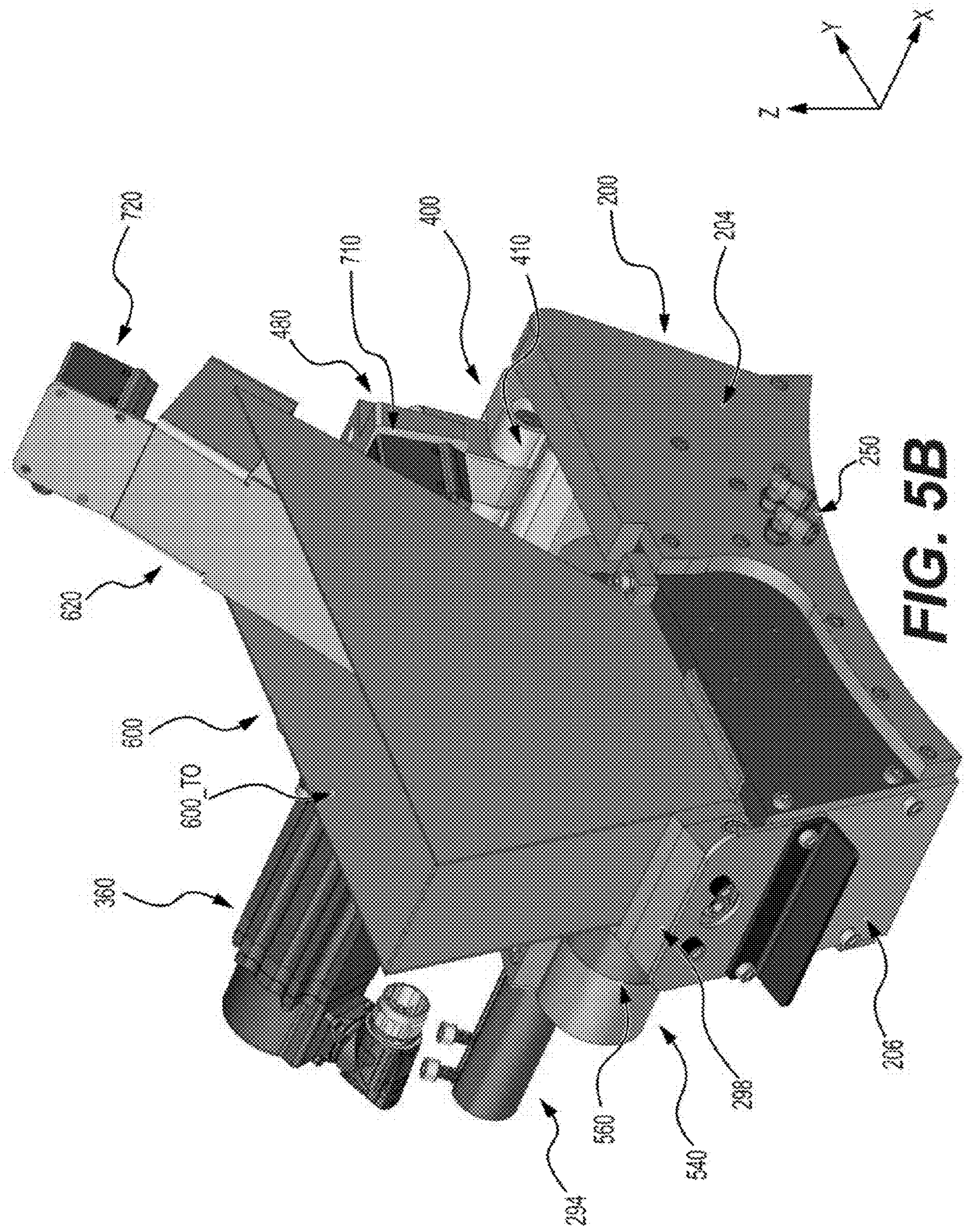
Figure 6A:
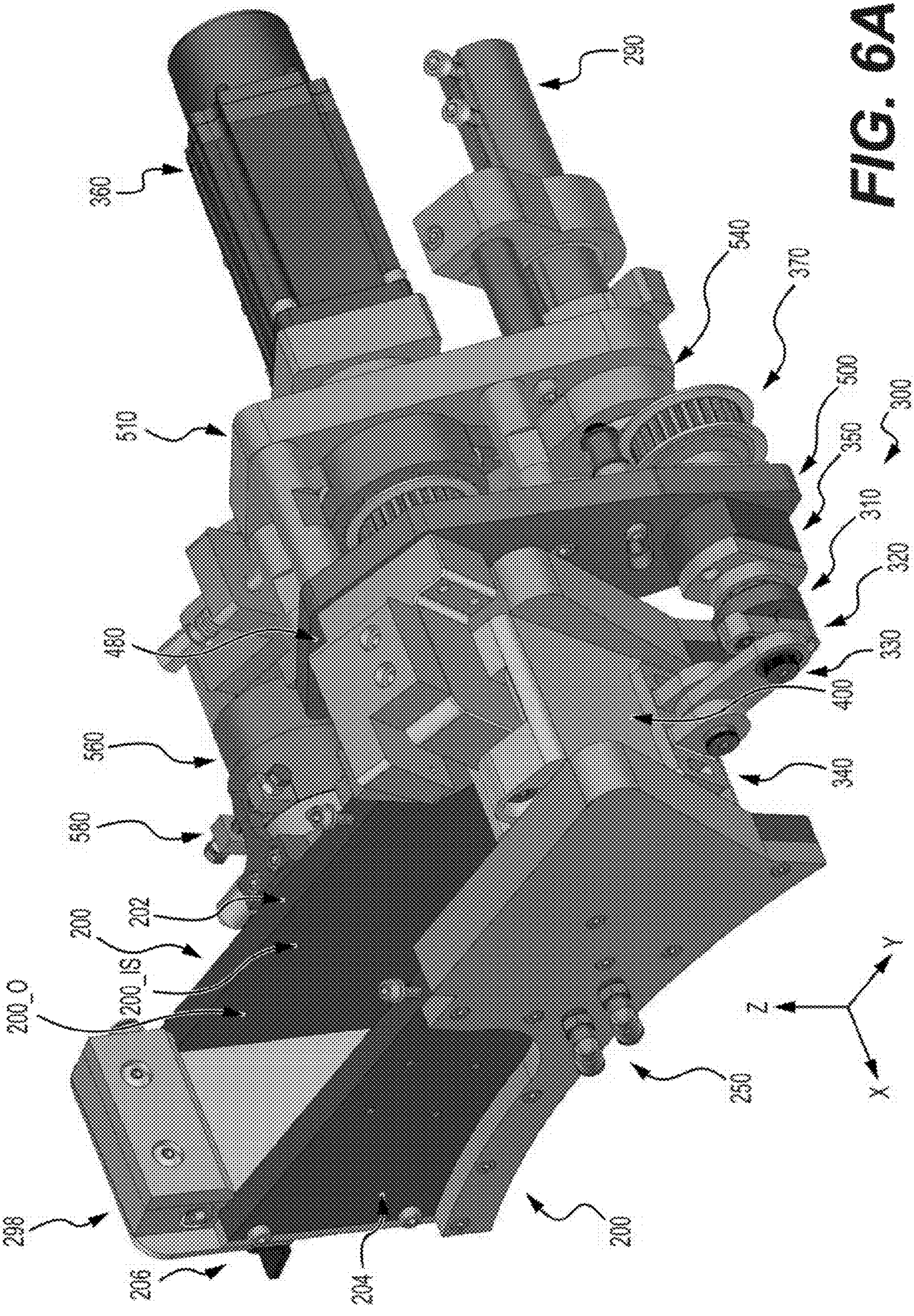
FIGS. 6A, 6B, 6C, and 6D are partial views of the doser assembly of FIGS. 4A-4E with some structures omitted and with FIG. 6D being a cross-sectional view along line 6D-6D' shown in FIG. 6C, according to some example embodiments.
Figure 6B:
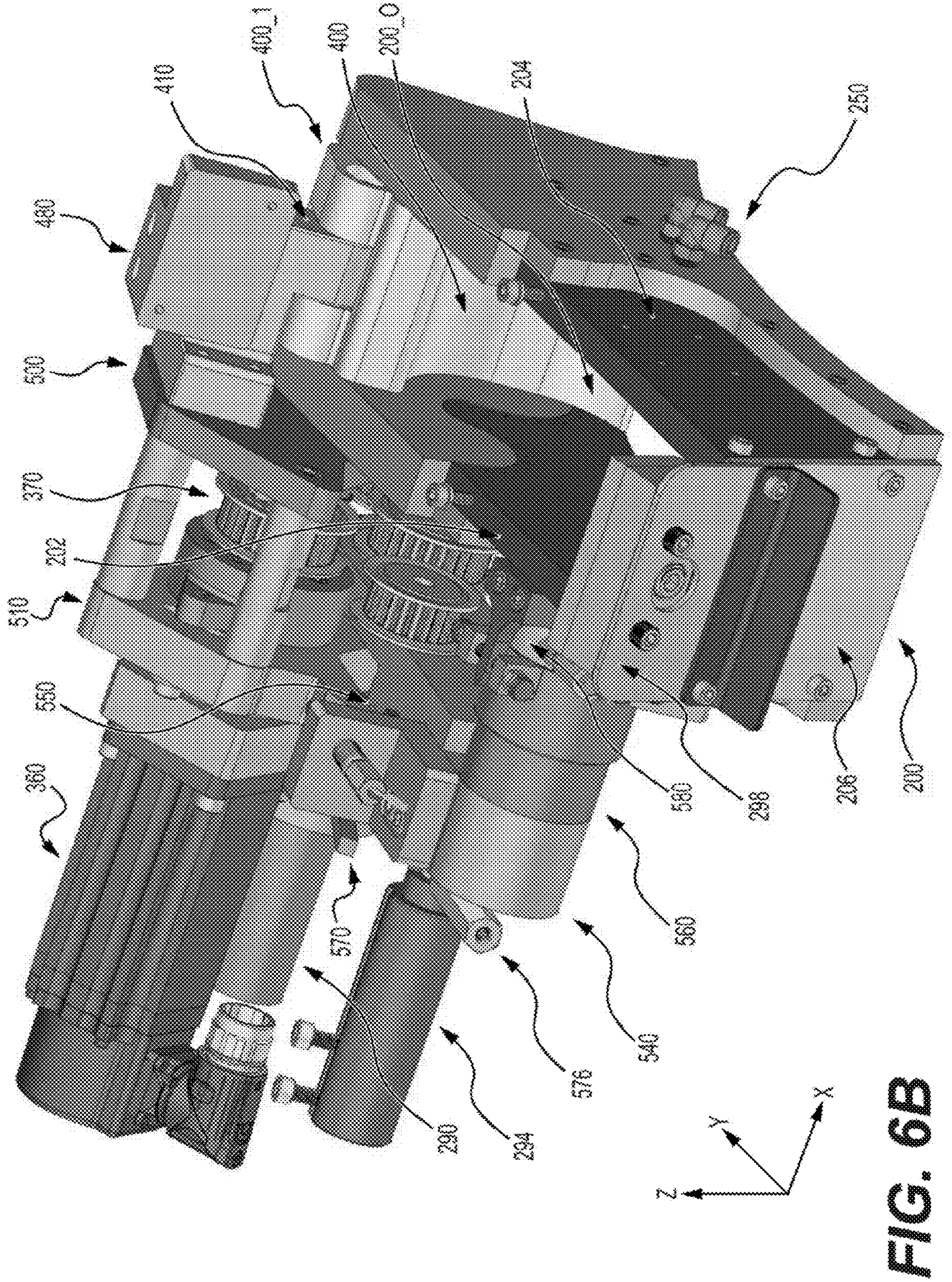
Figure 6C:
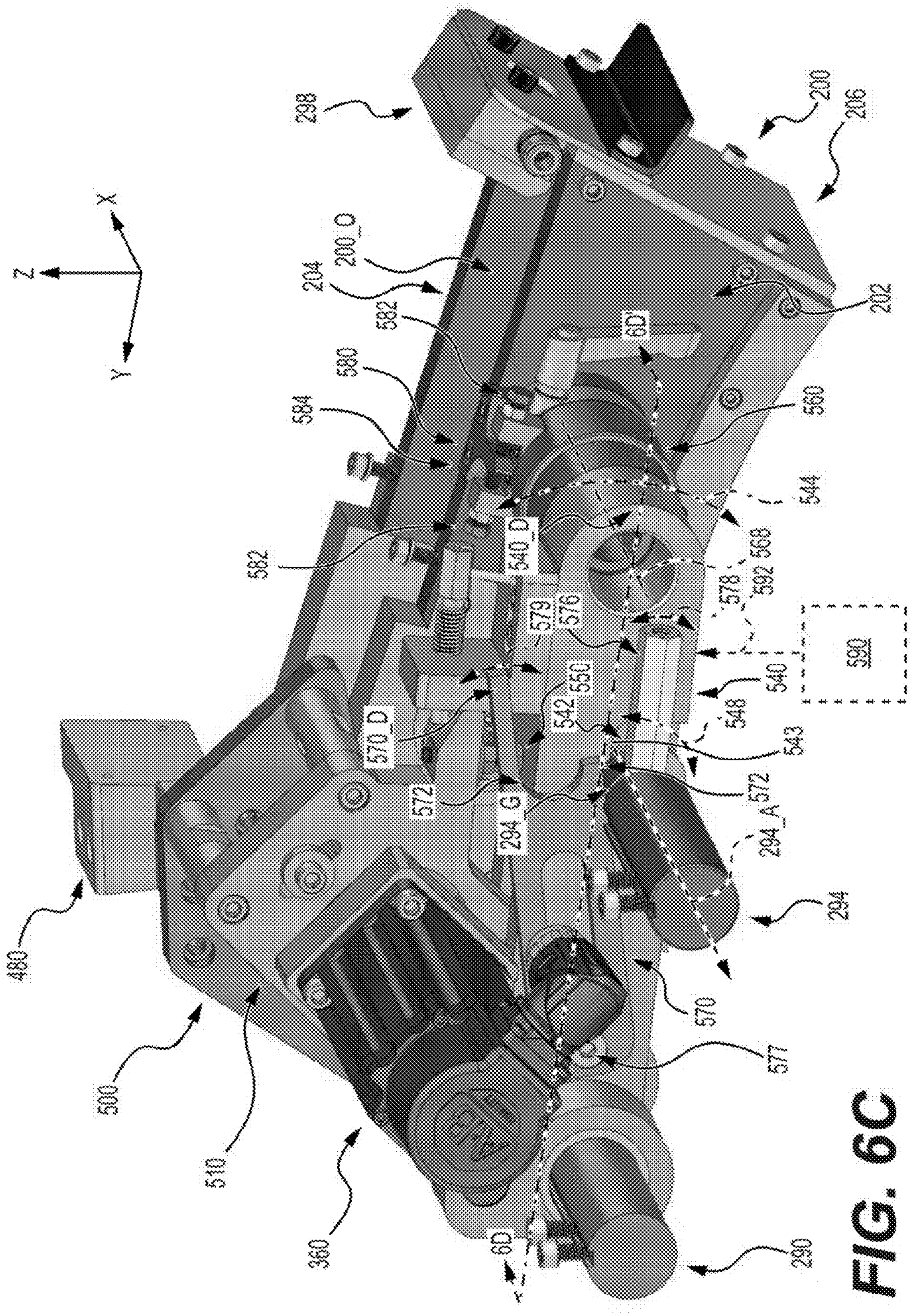
Figure 6D:
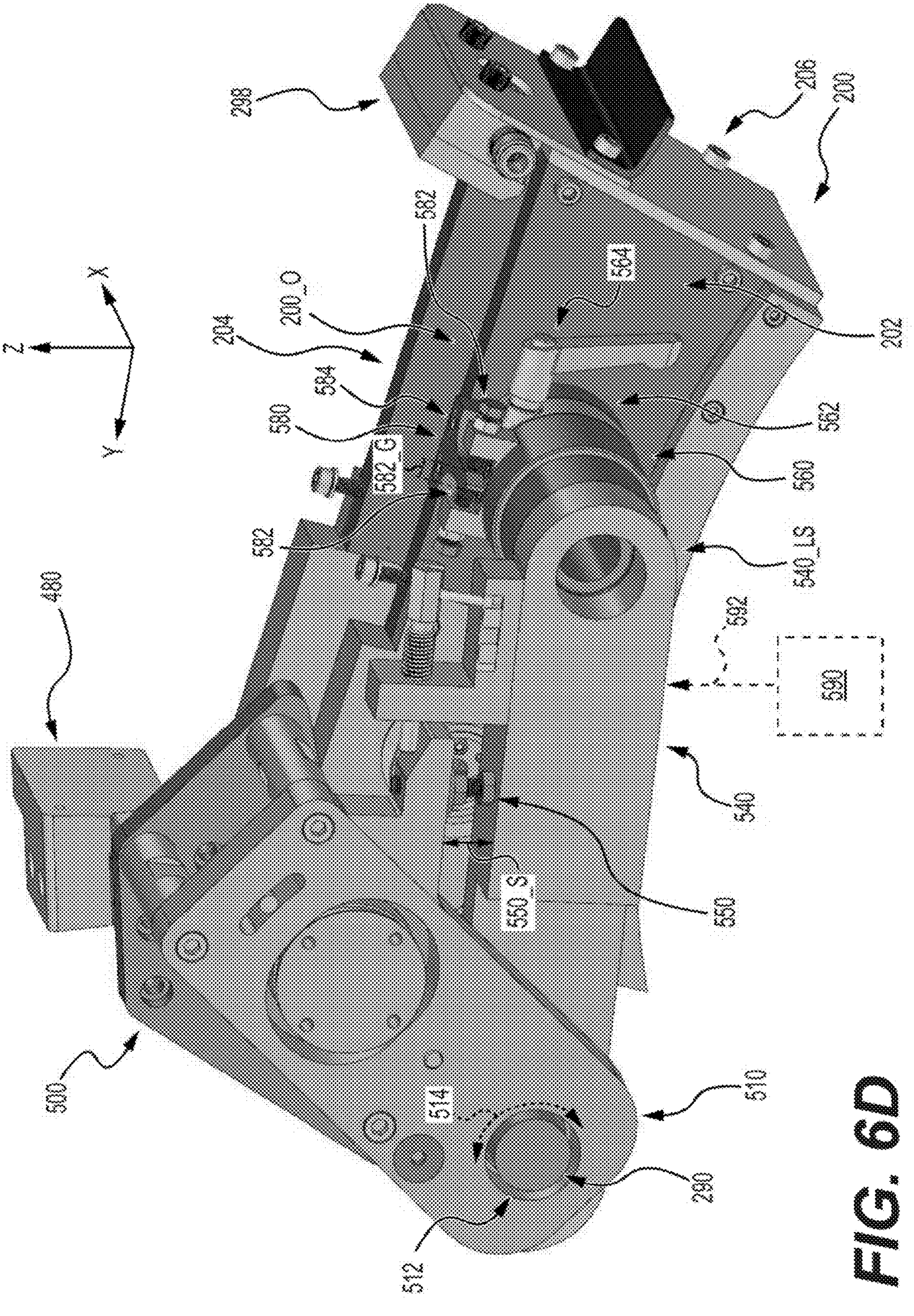
Figure 7A:
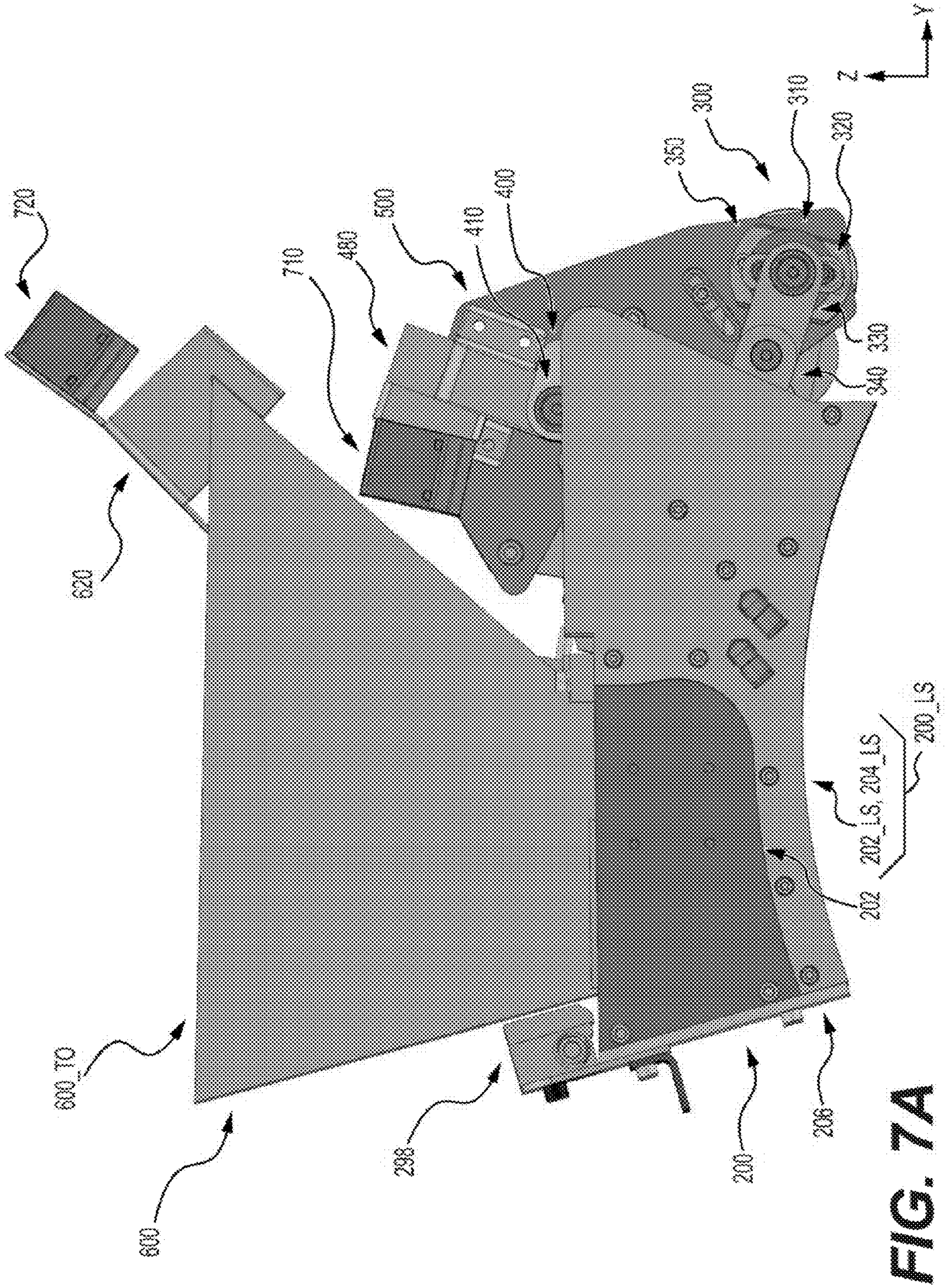
FIGS. 7A, 7B, 7C, 7D, 7E, and 7F are plan views of the doser assembly of FIGS. 4A-4E according to some example embodiments.
Figure 7B:
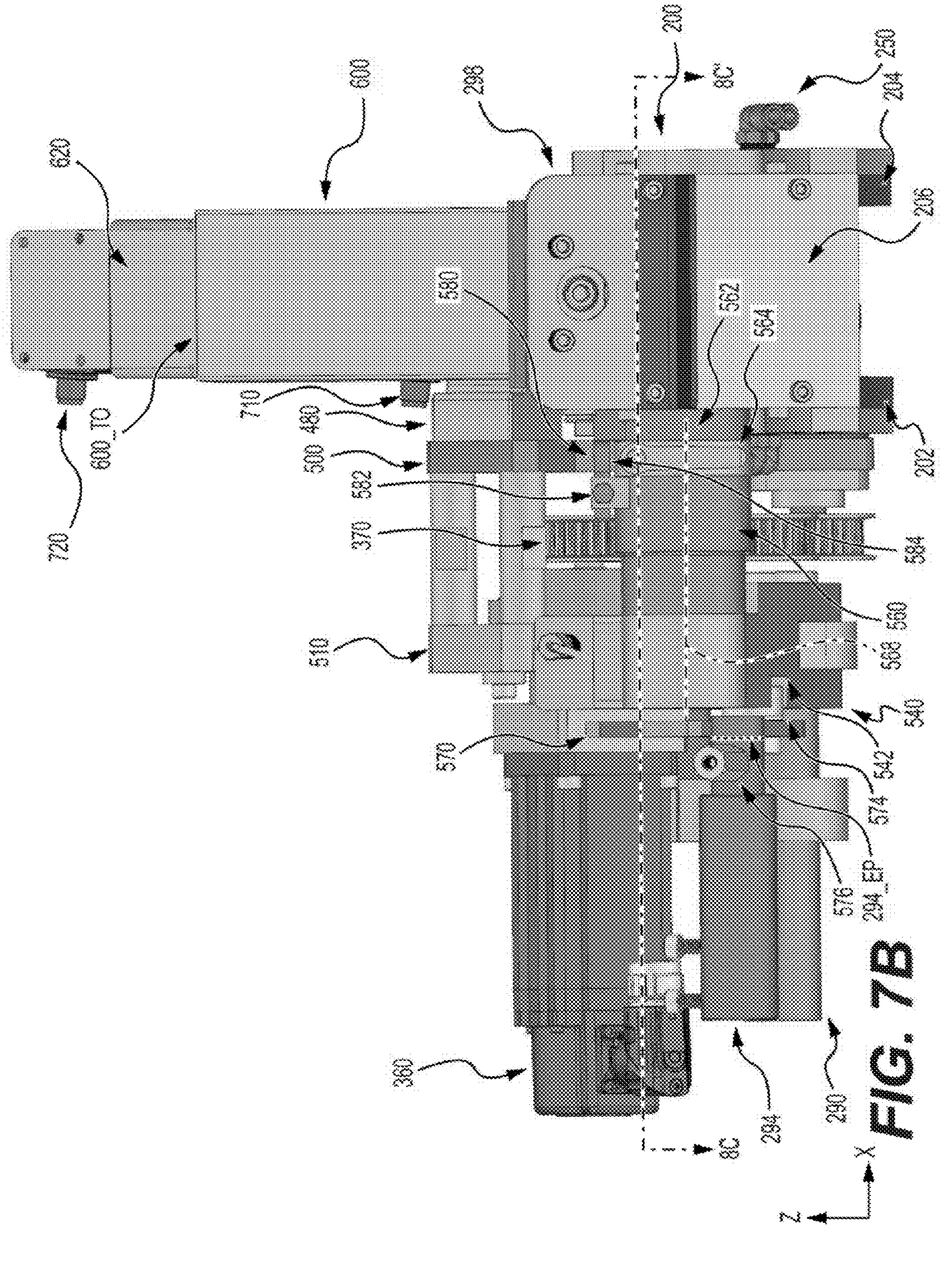
Figure 7C:
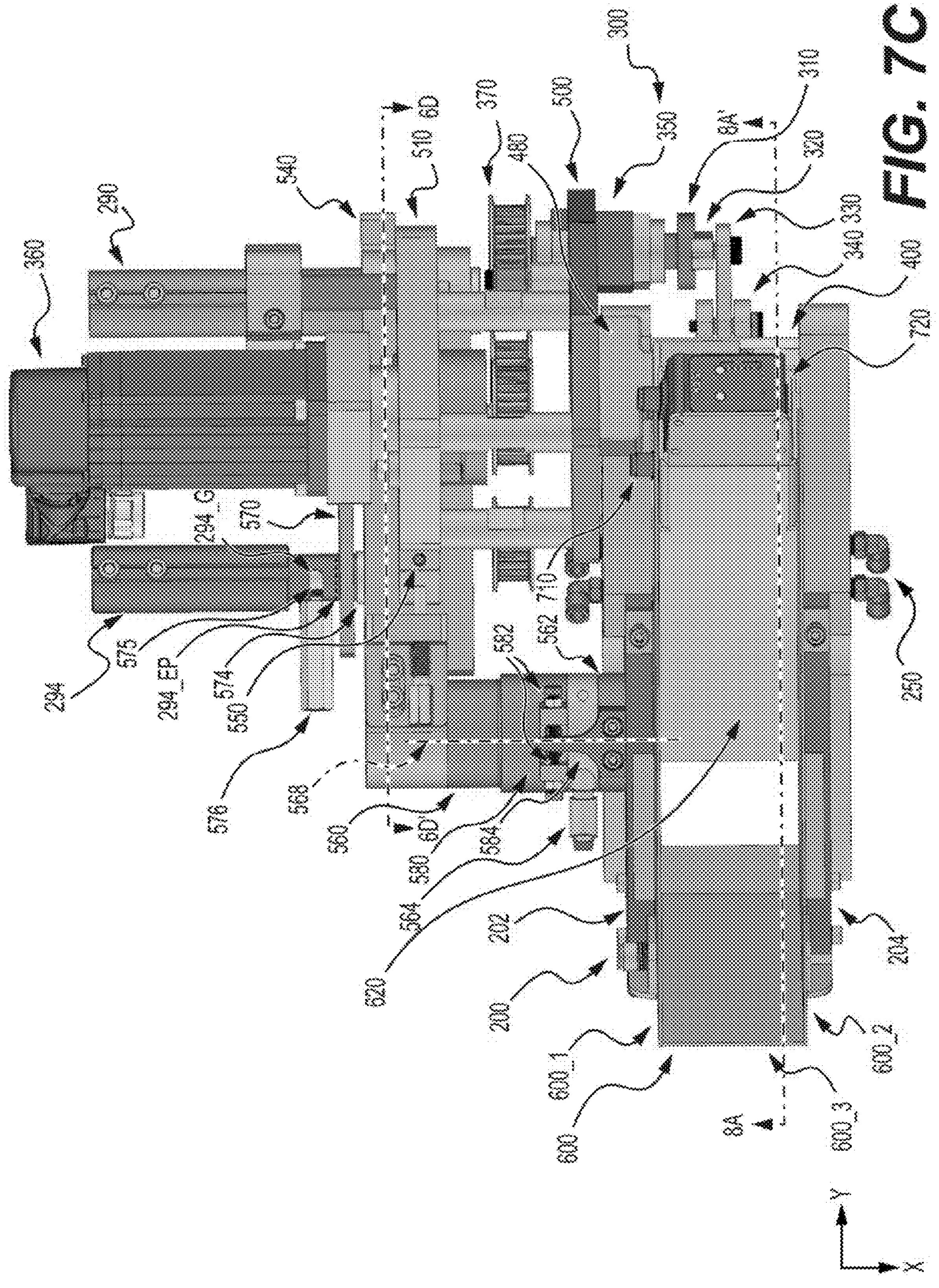
Figure 7D:
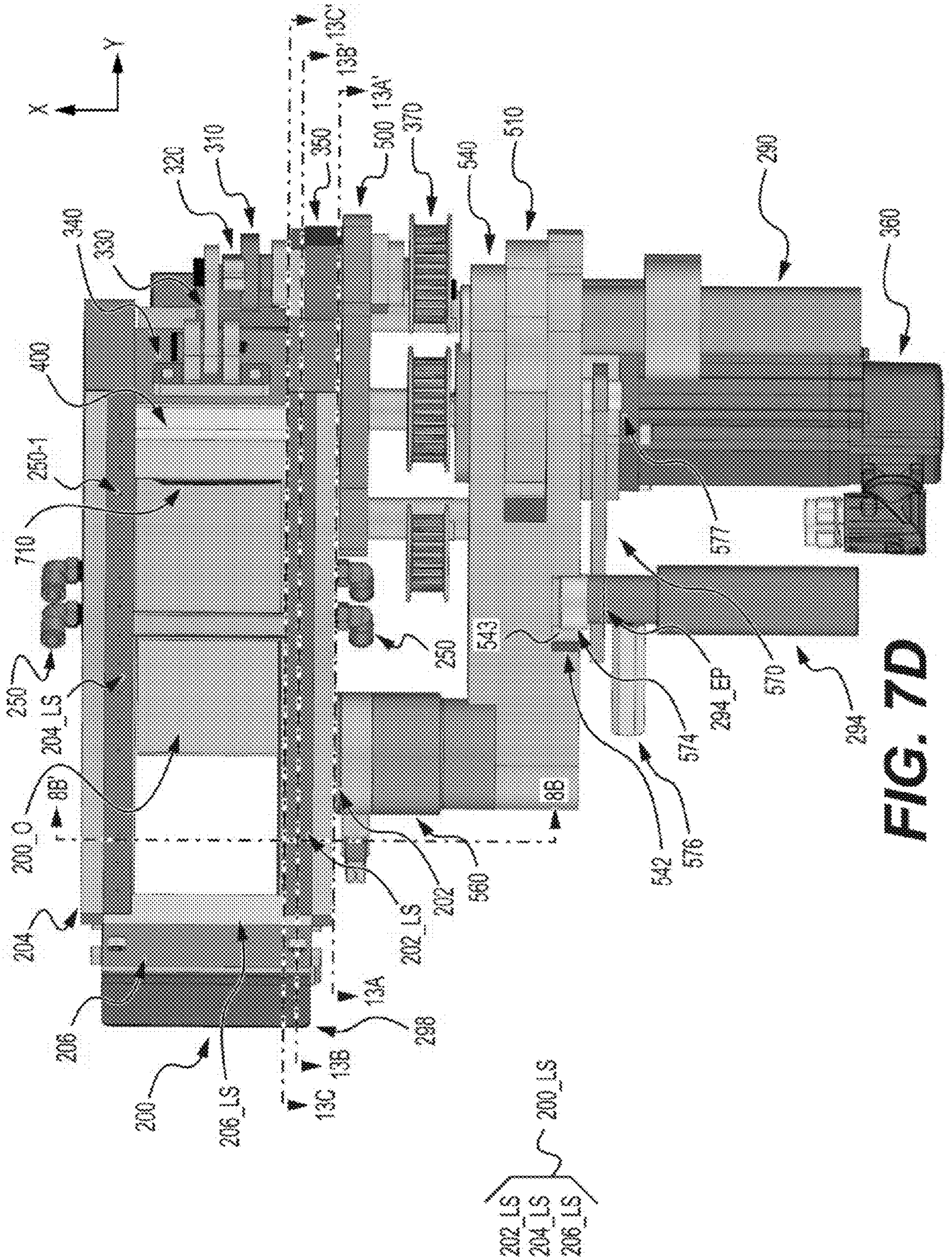
Figure 7E:
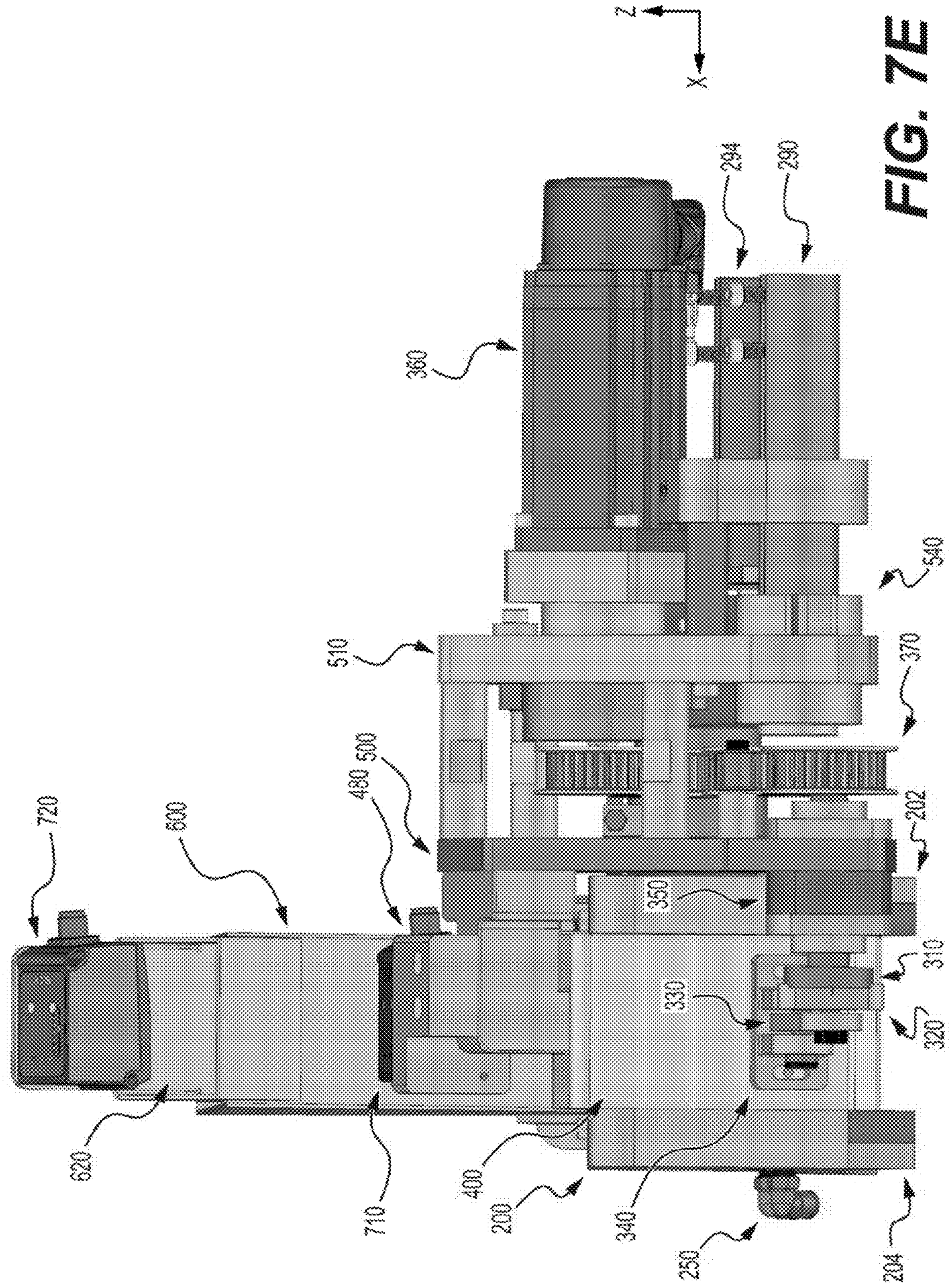
Figure 7F:
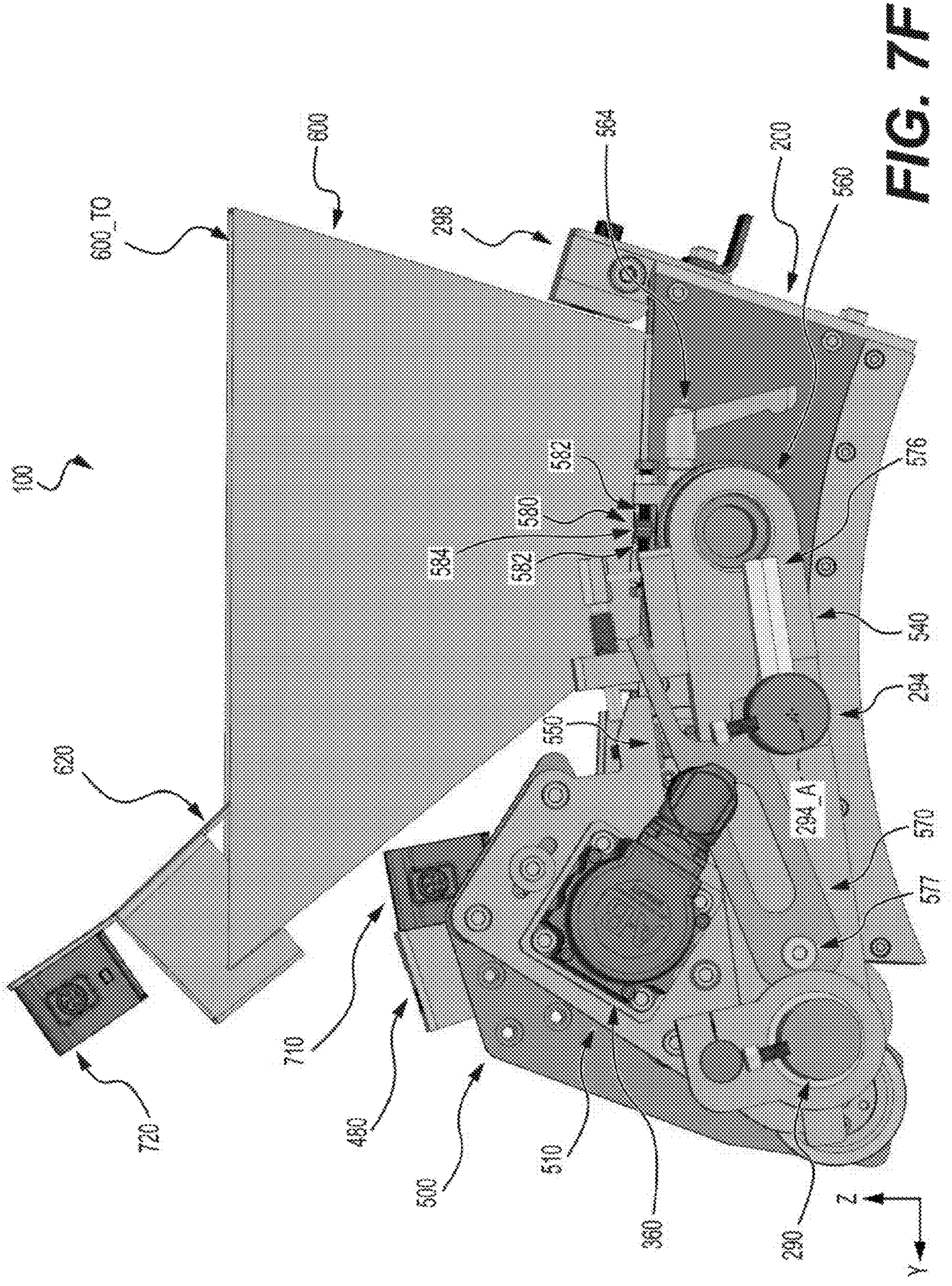
Figure 8A:
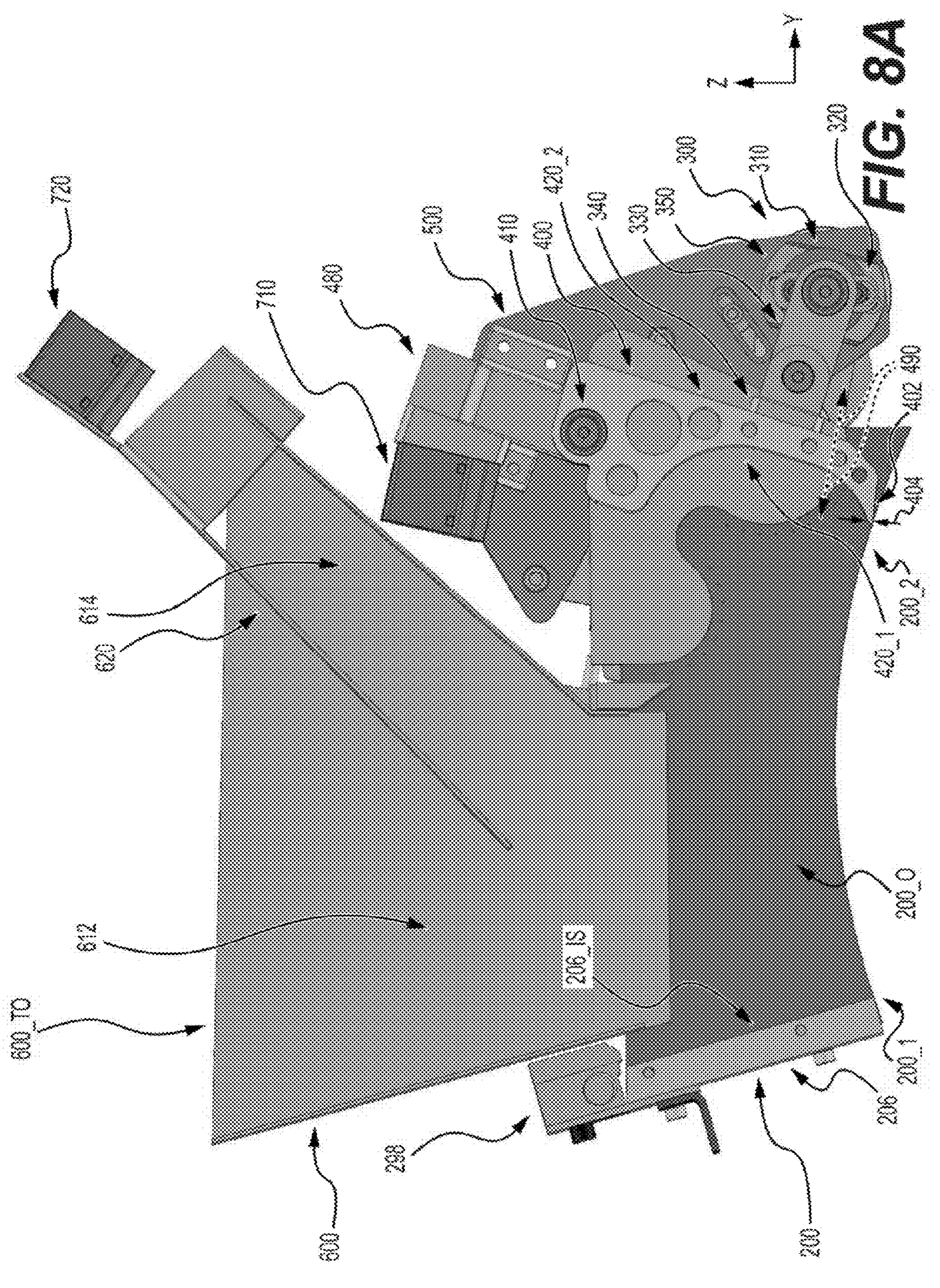
FIG. 8A is a cross-sectional plan view of the doser assembly of FIGS. 4A-4E along line 8A-8A' shown in FIG. 7C according to some example embodiments.
Figure 8B:
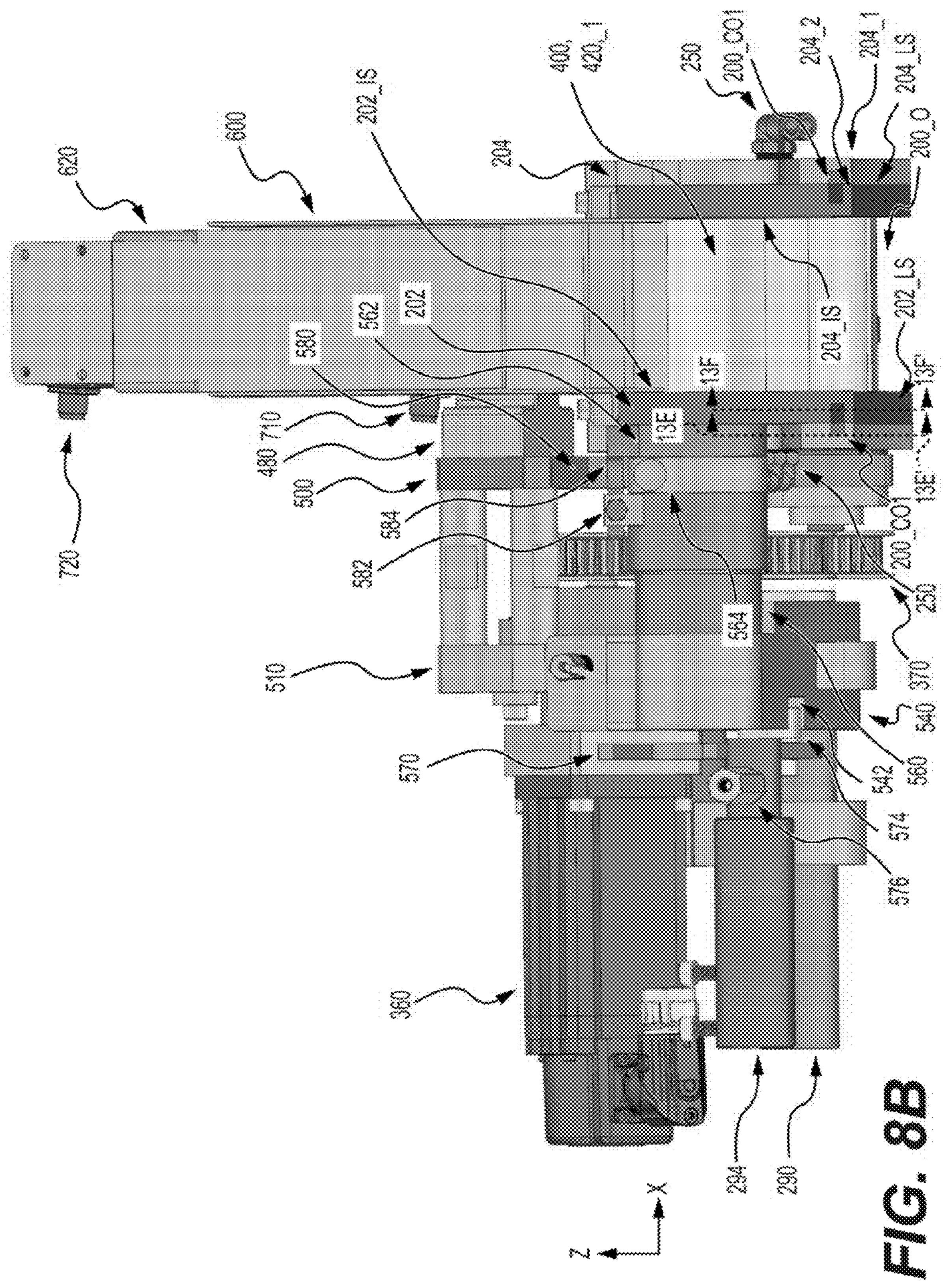
FIG. 8B is a cross-sectional plan view of the doser assembly of FIGS. 4A-4E along line 8B-8B' shown in FIG. 7D according to some example embodiments.
Figure 8C:
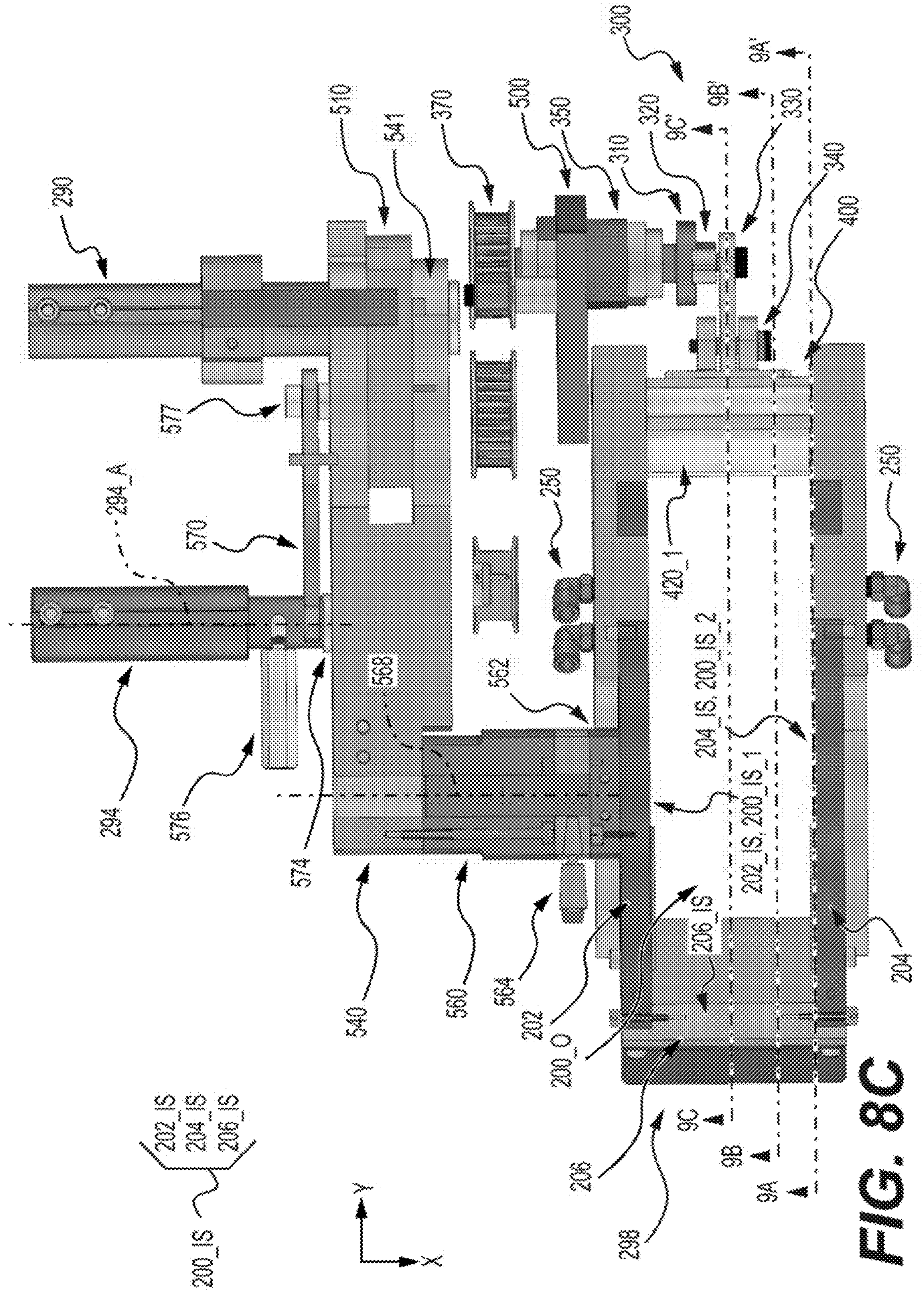
FIG. 8C is a cross-sectional plan view of the doser assembly of FIGS. 4A-4E along line 8C-8C' shown in FIG. 7B according to some example embodiments.
Figure 9A:
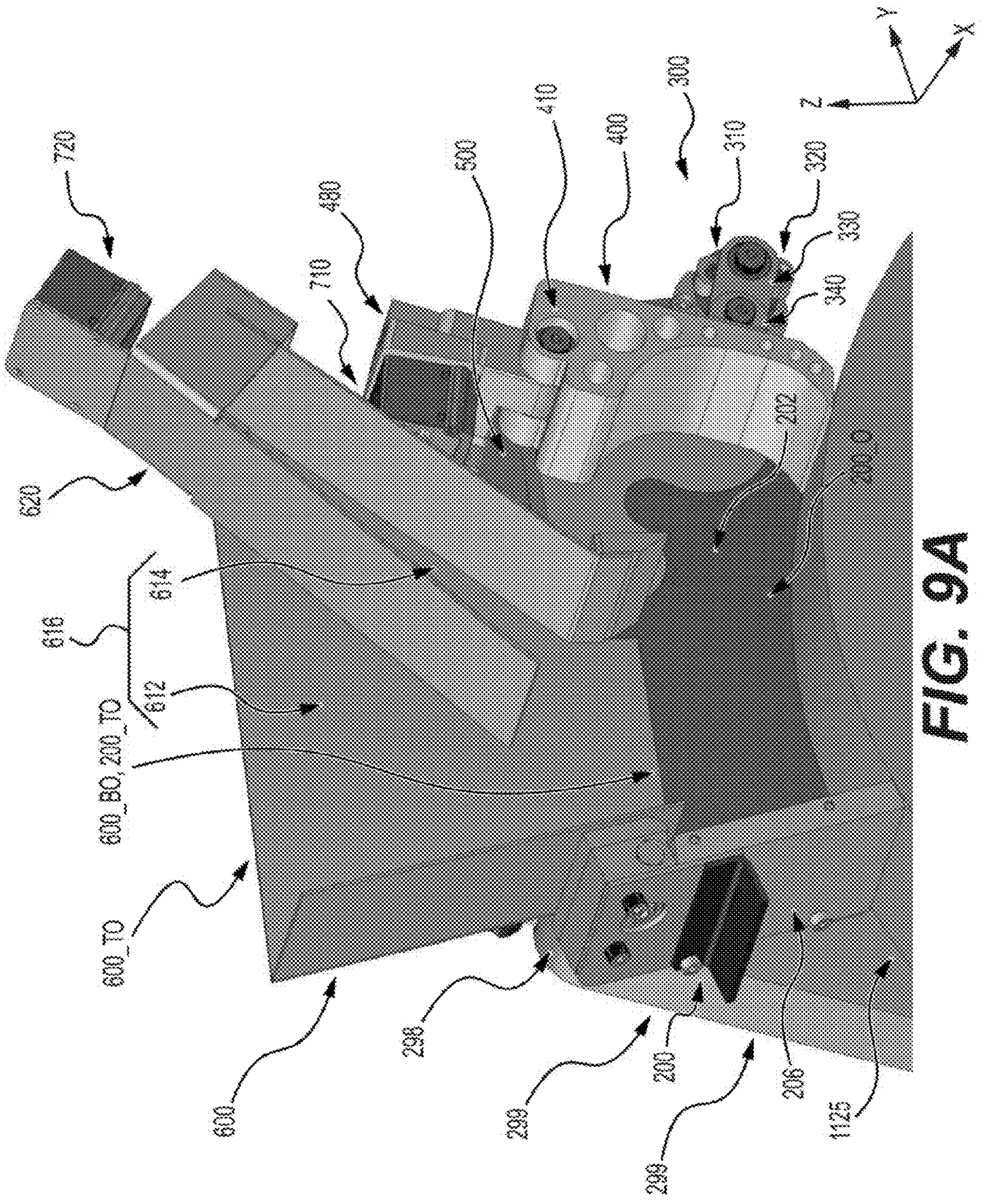
FIG. 9A is a cross-sectional perspective view of the doser assembly of FIGS. 4A-4E along line 9A-9A' shown in FIG. 8C according to some example embodiments.
Figure 9B:
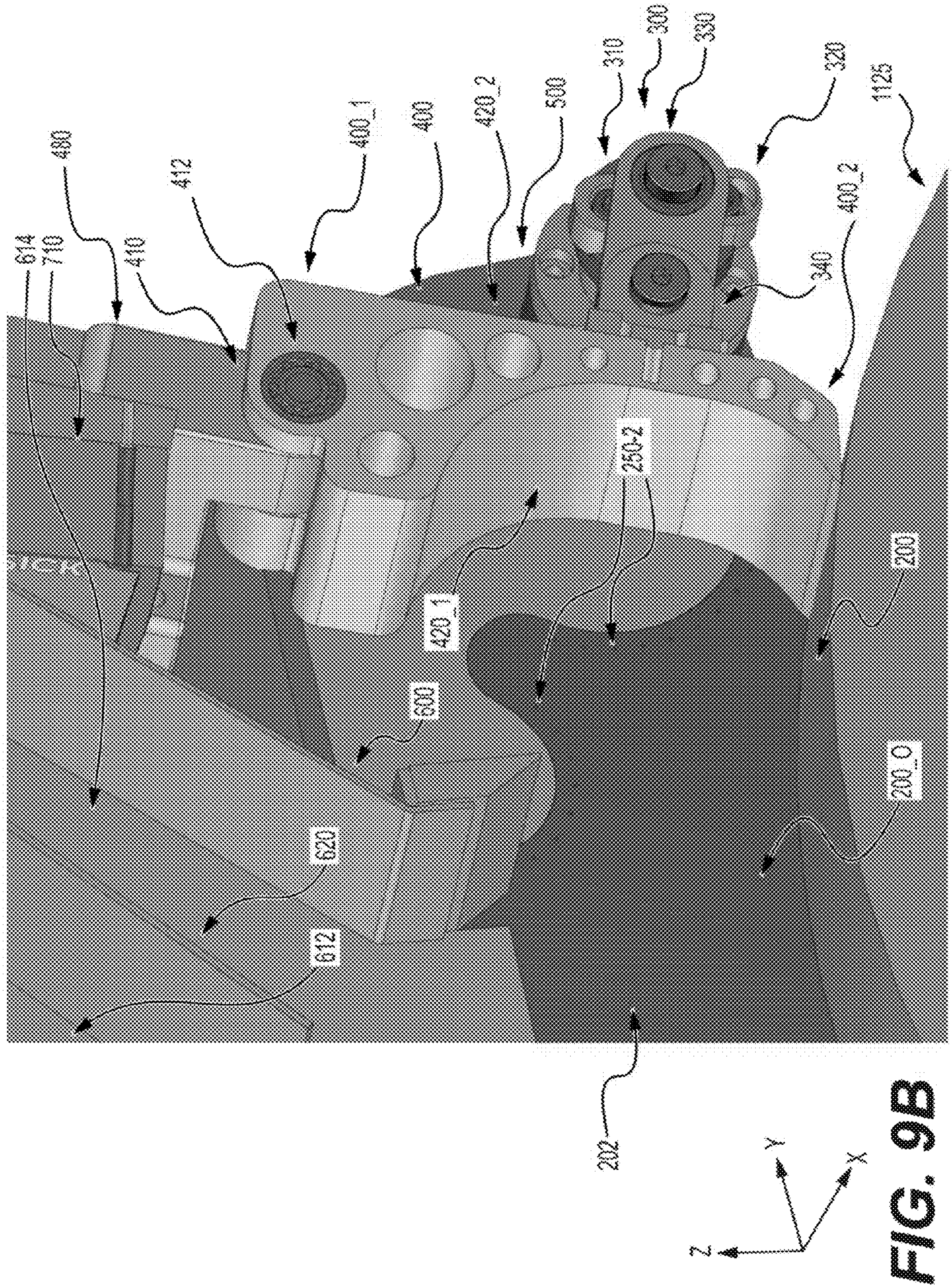
FIGS. 9B and 9C are cross-sectional perspective views of a paddle of the doser assembly of FIGS. 4A-4E along lines 9B-9B' and 9C-9C', respectively, shown in FIG. 8C according to some example embodiments.
Figure 9C:
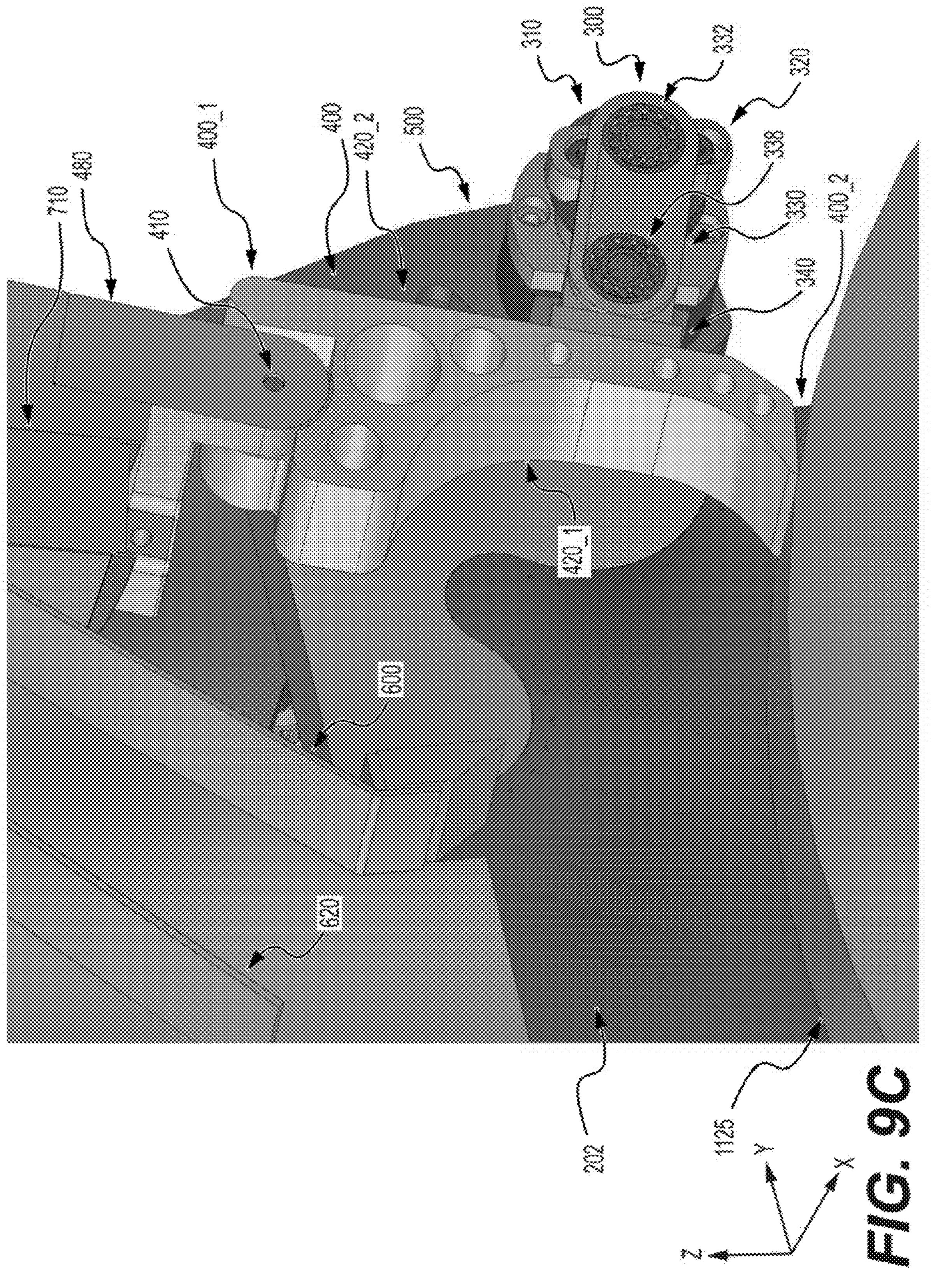
Figure 10A:
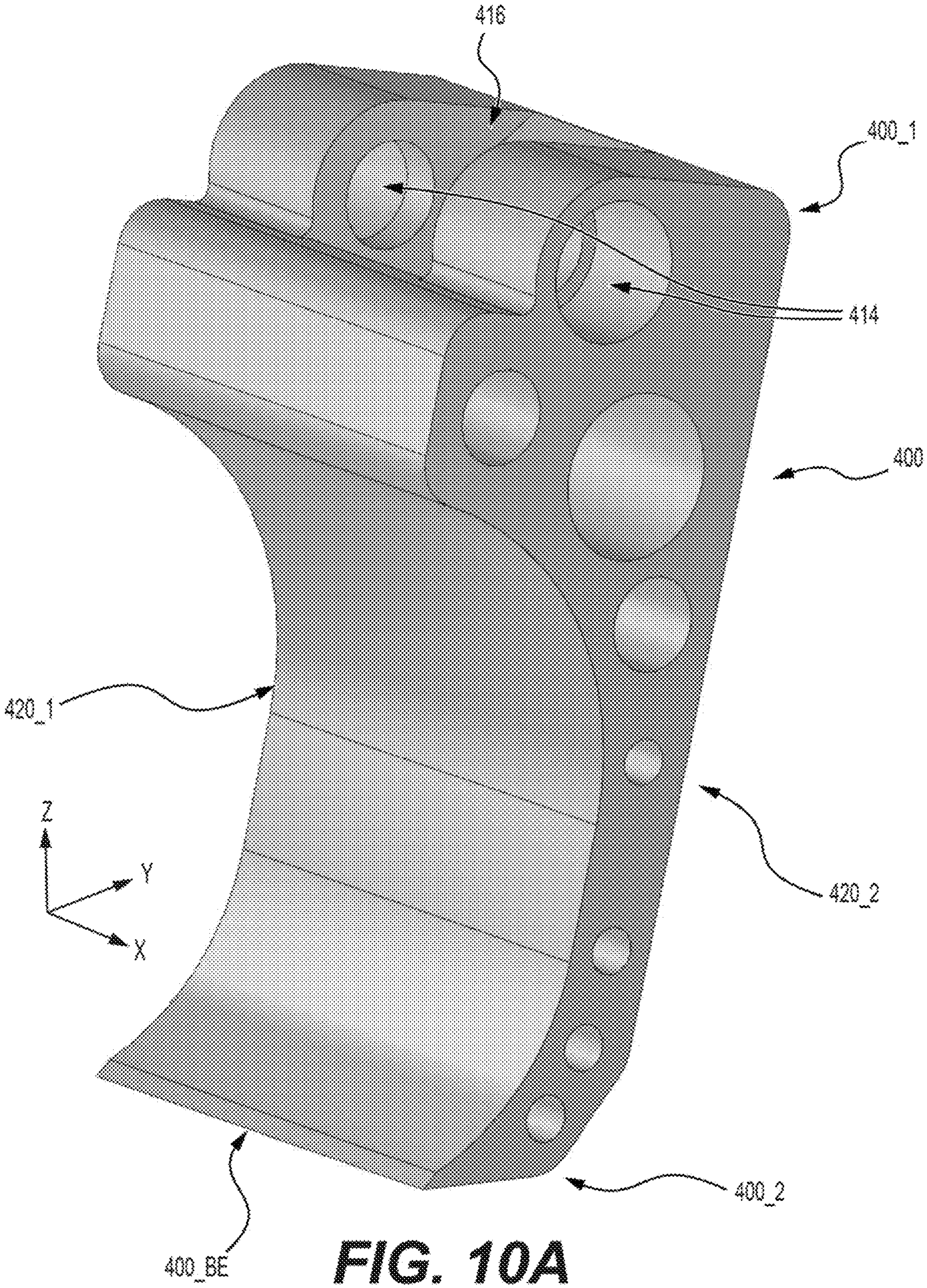
FIGS. 10A, 10B, 10C, and 10D are perspective views of a paddle of the doser assembly of FIGS. 4A-4E according to some example embodiments.
Figure 10B:
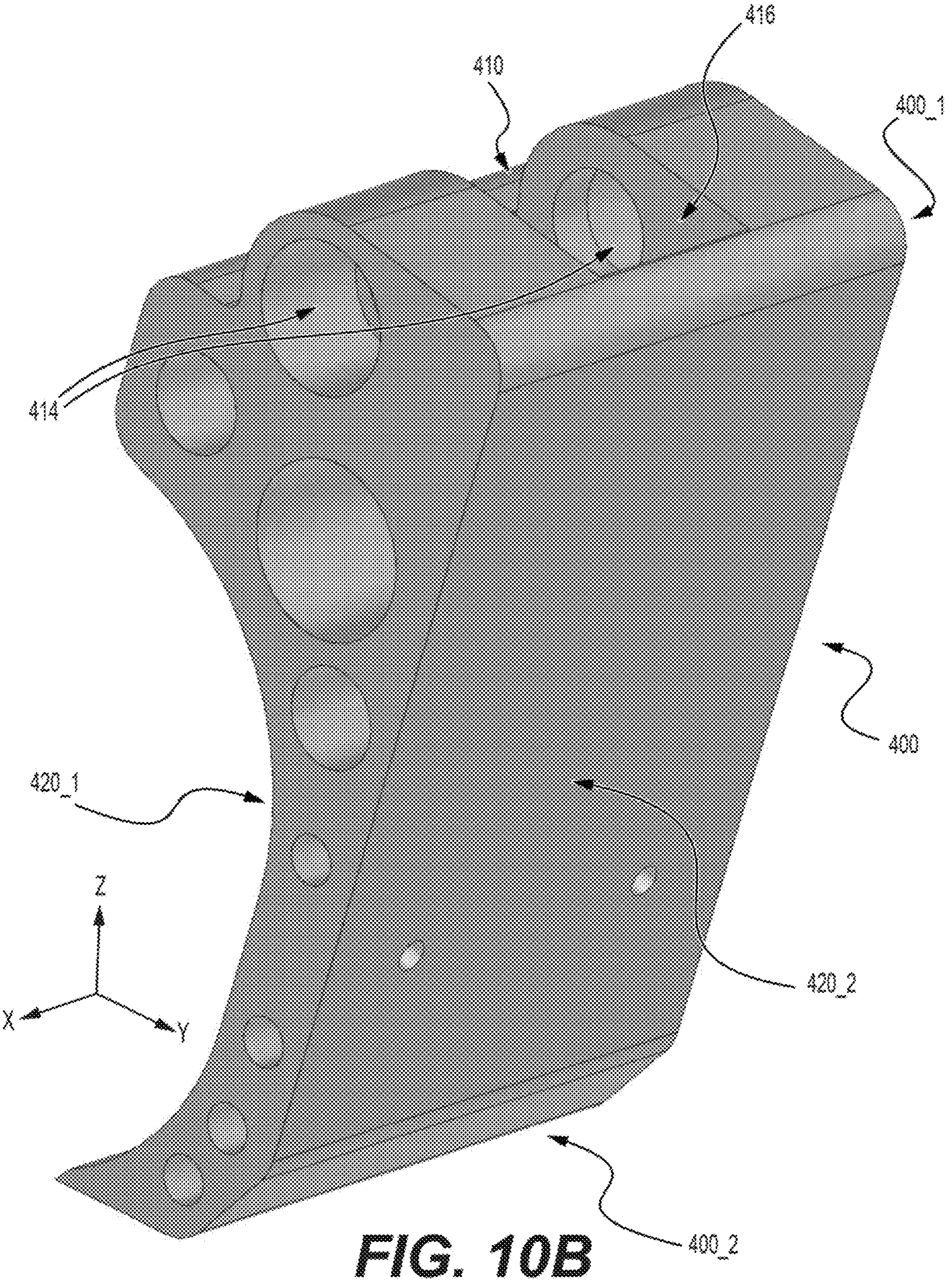
Figure 10C:
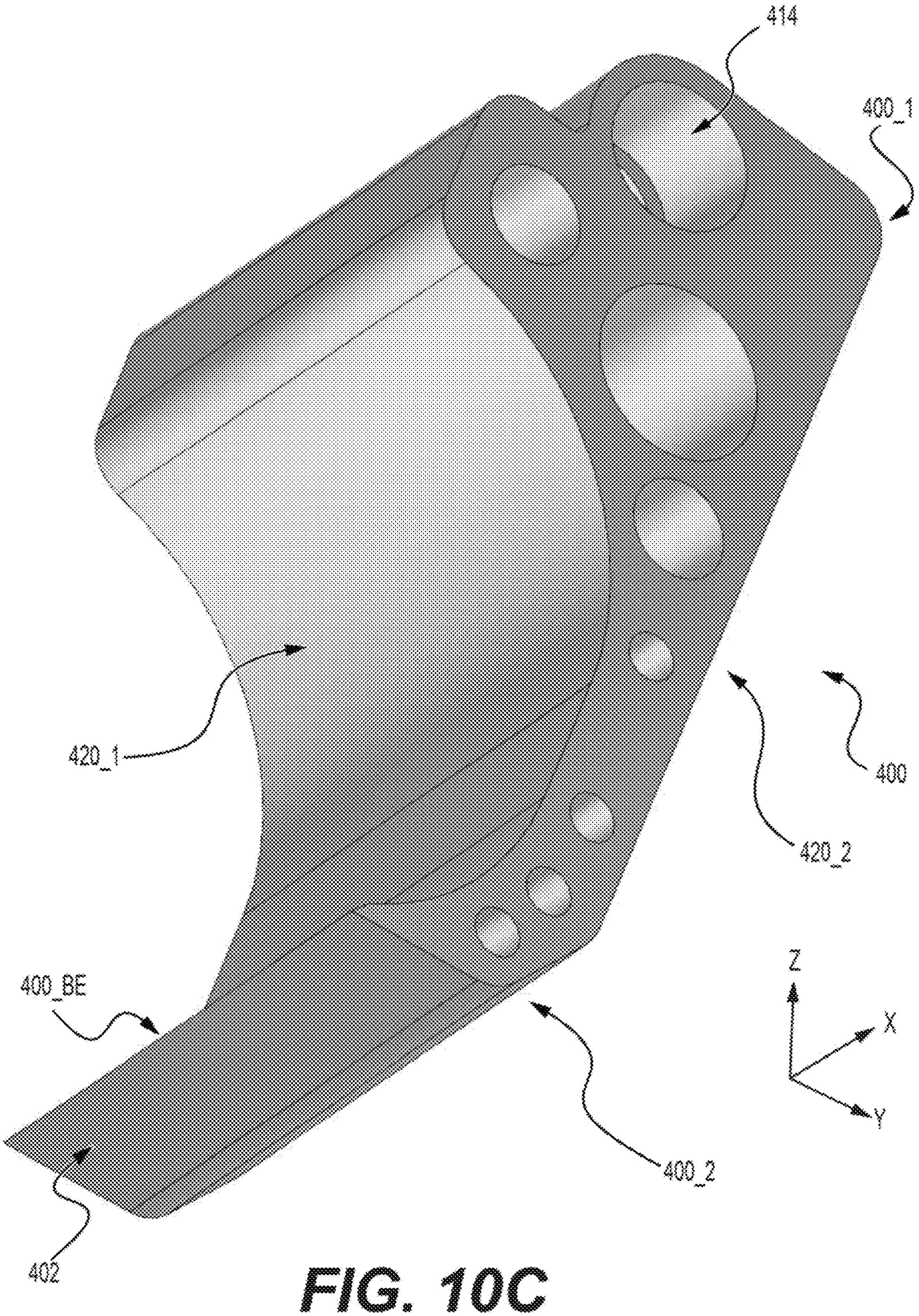
Figure 10D:
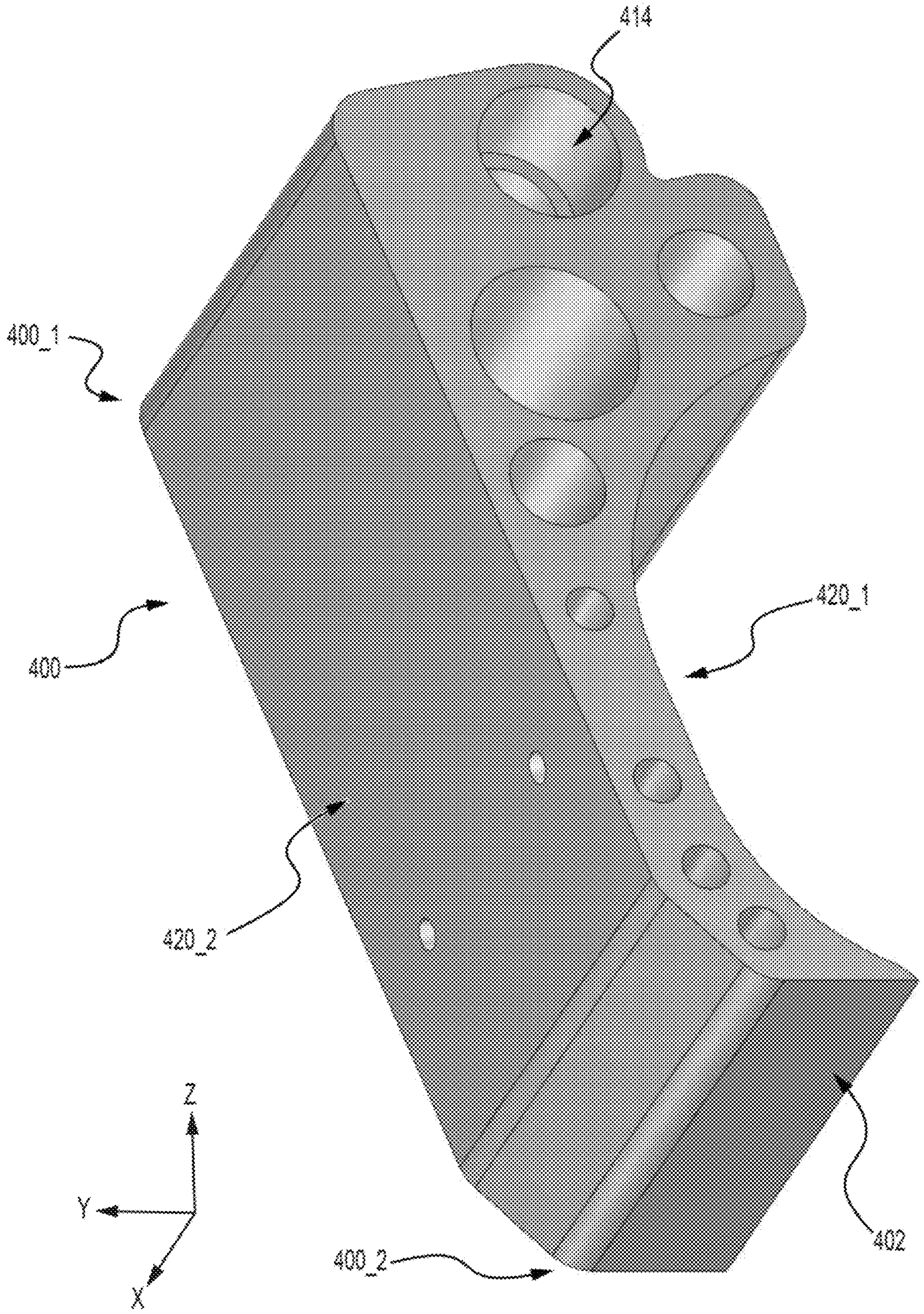
Figure 10E:
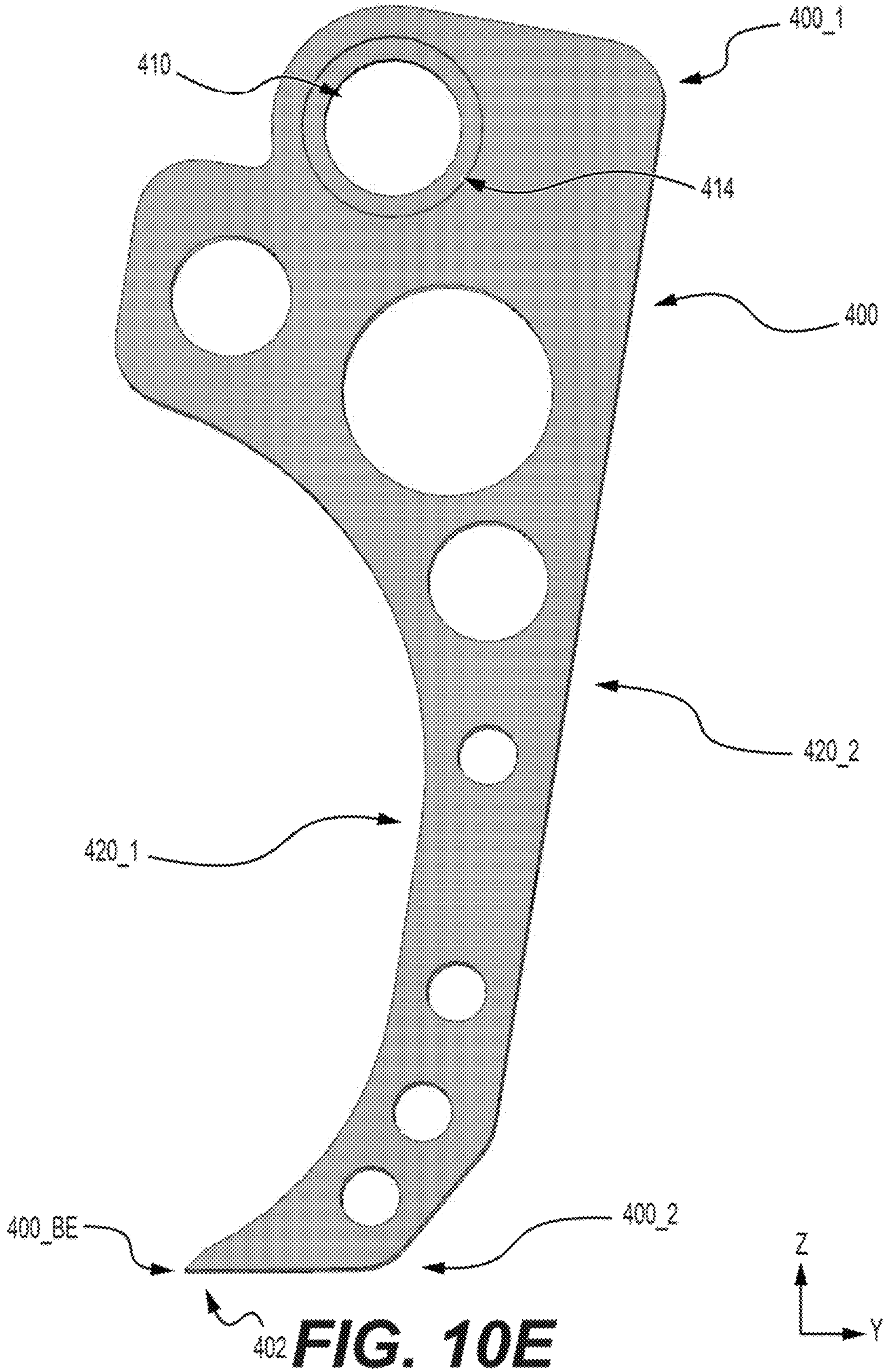
FIGS. 10E, 10F, 10G, and 10H are plan views of a paddle of the doser assembly of FIGS. 4A-4E according to some example embodiments.
Figure 10F:
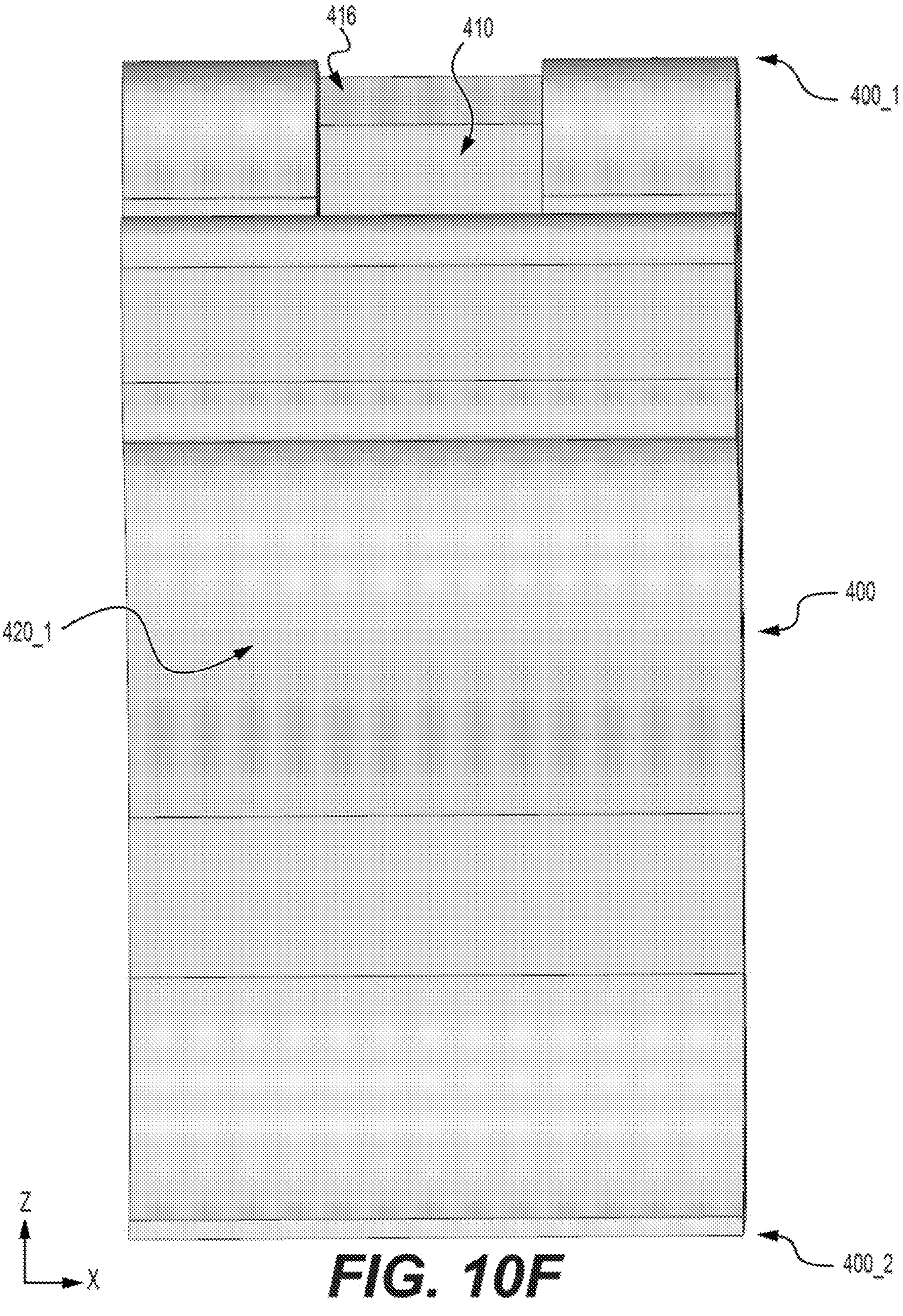
Figure 10G:
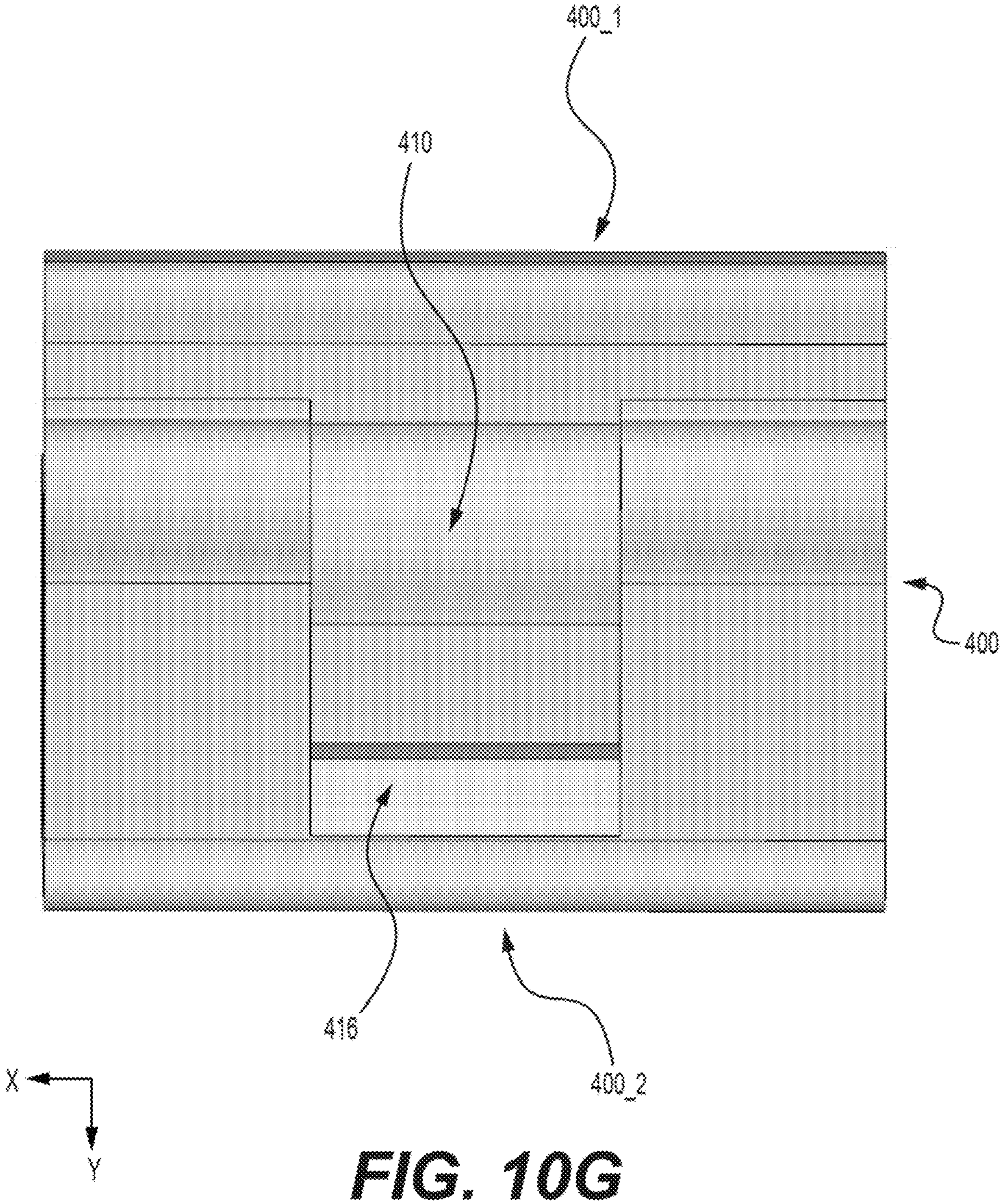
Figure 10H:
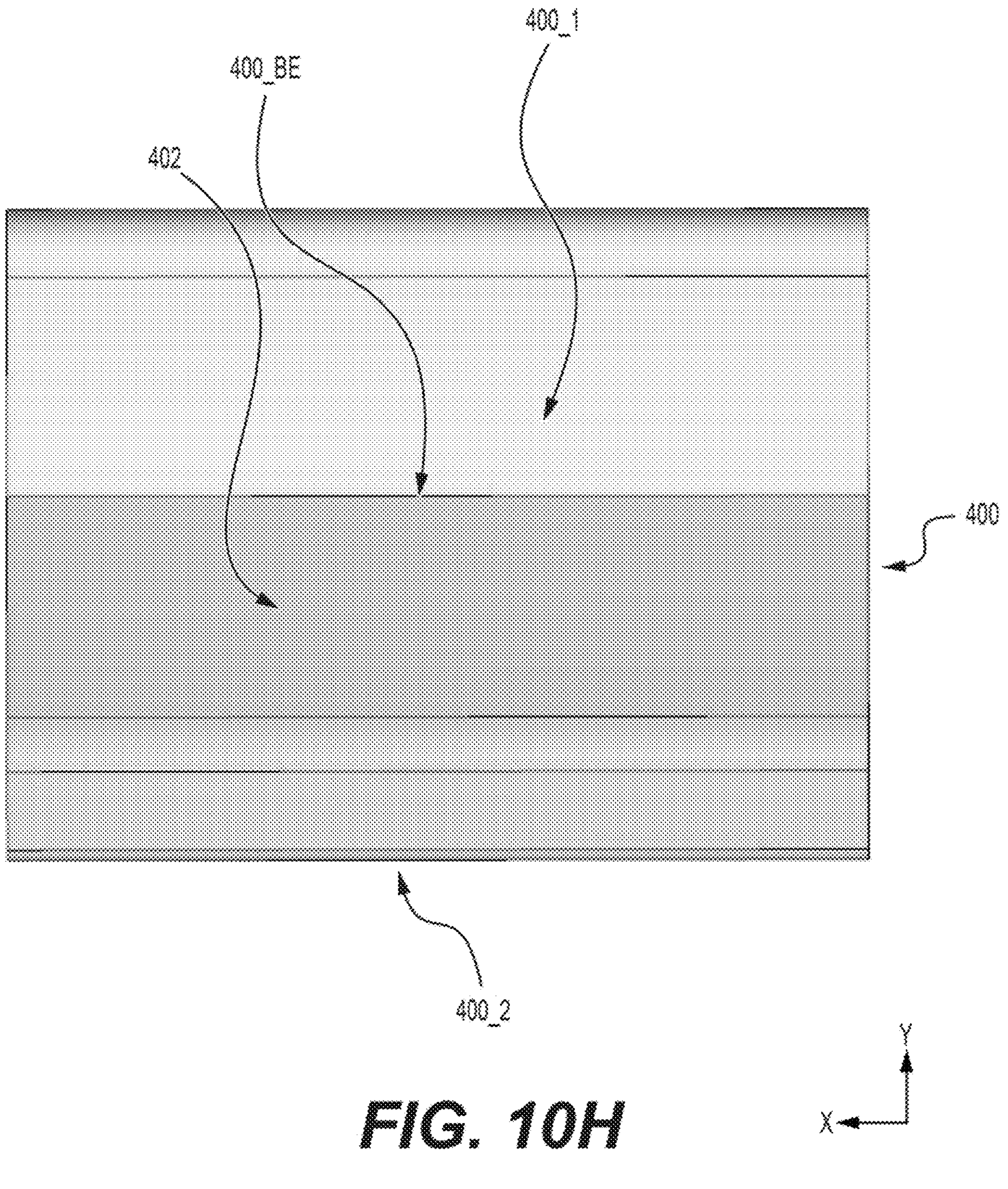
Figure 11A:
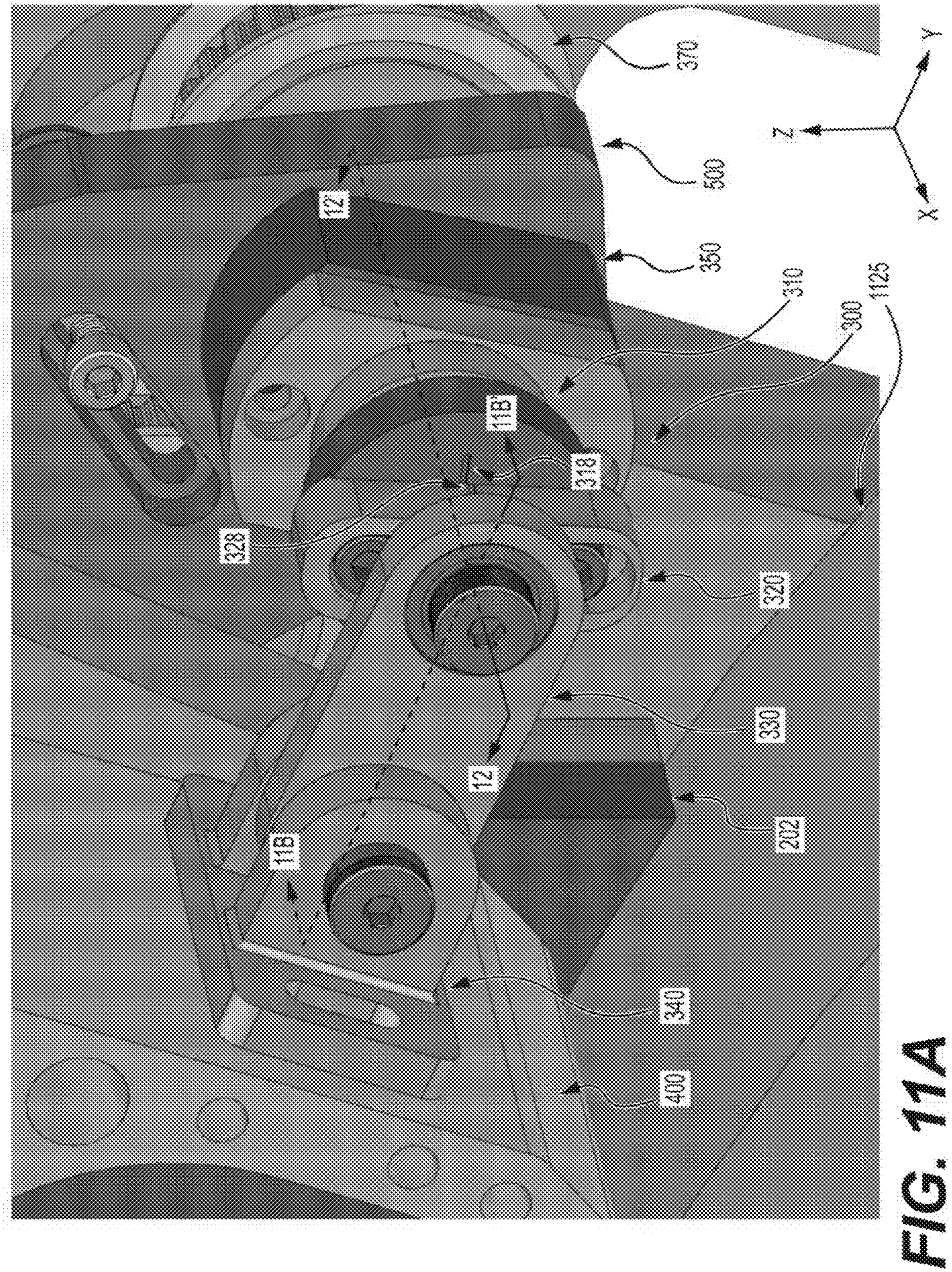
FIG. 11A is a view of a vibration transmission assembly of the doser assembly of FIGS. 4A-4E according to some example embodiments.
Figure 11B:
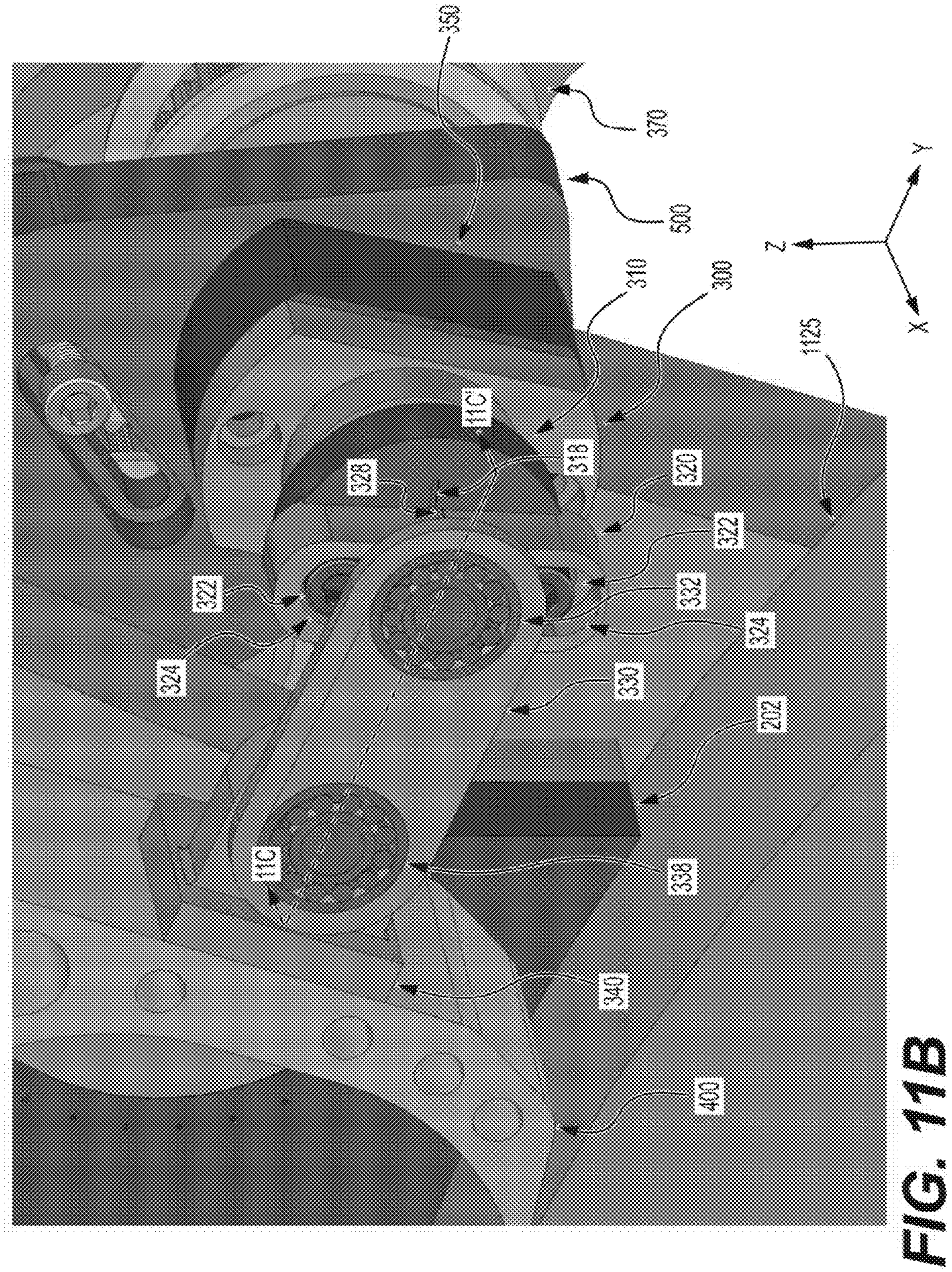
FIG. 11B is a cross-sectional view of the vibration transmission assembly of the doser assembly of FIGS. 4A-4E along line 11B-11B' shown in FIG. 11A according to some example embodiments.
Figure 11C:
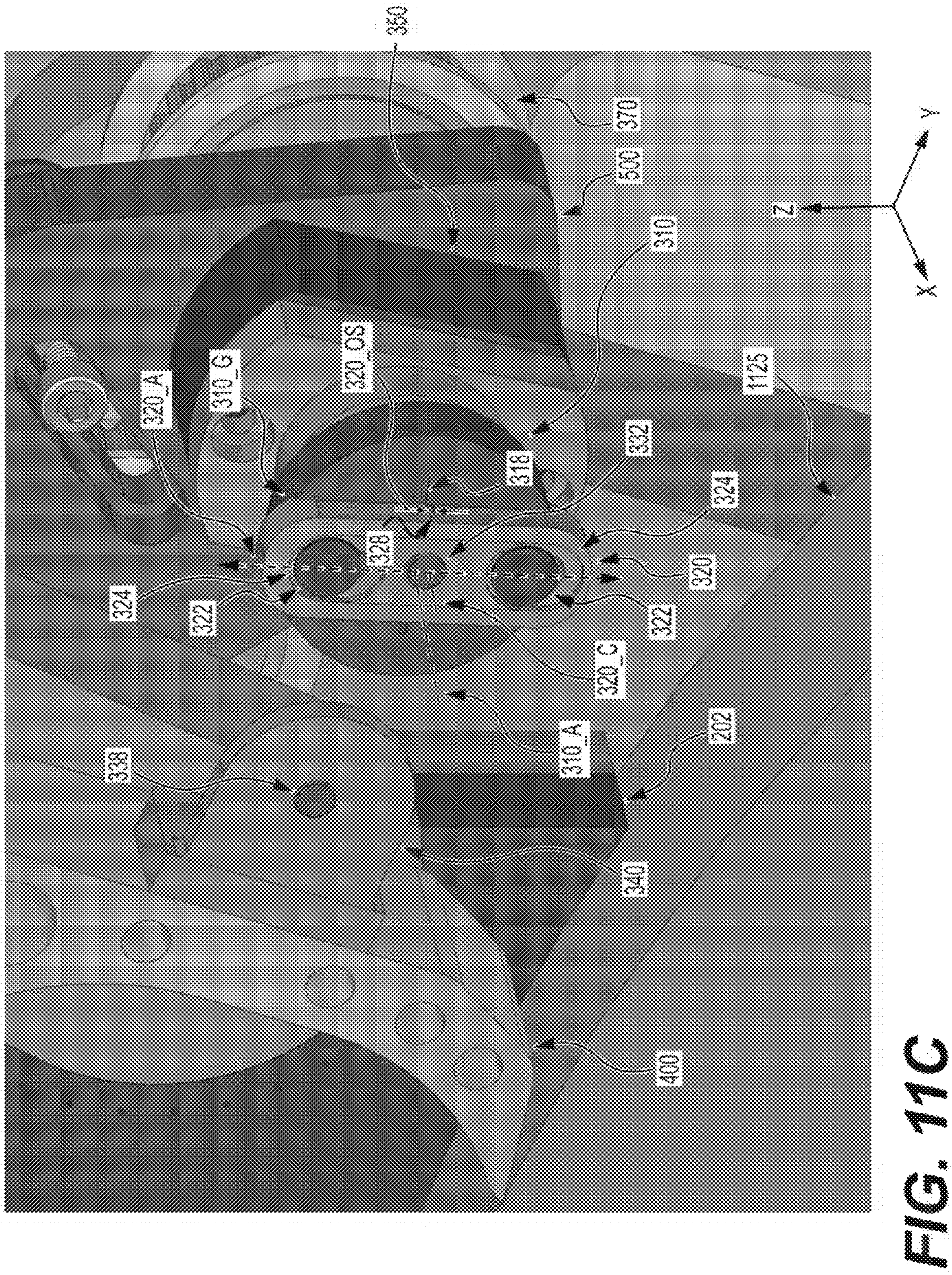
FIG. 11C is a cross-sectional view of the vibration transmission assembly of the doser assembly of FIGS. 4A-4E along line 11C-11C' shown in FIG. 11B according to some example embodiments.
Figure 12:
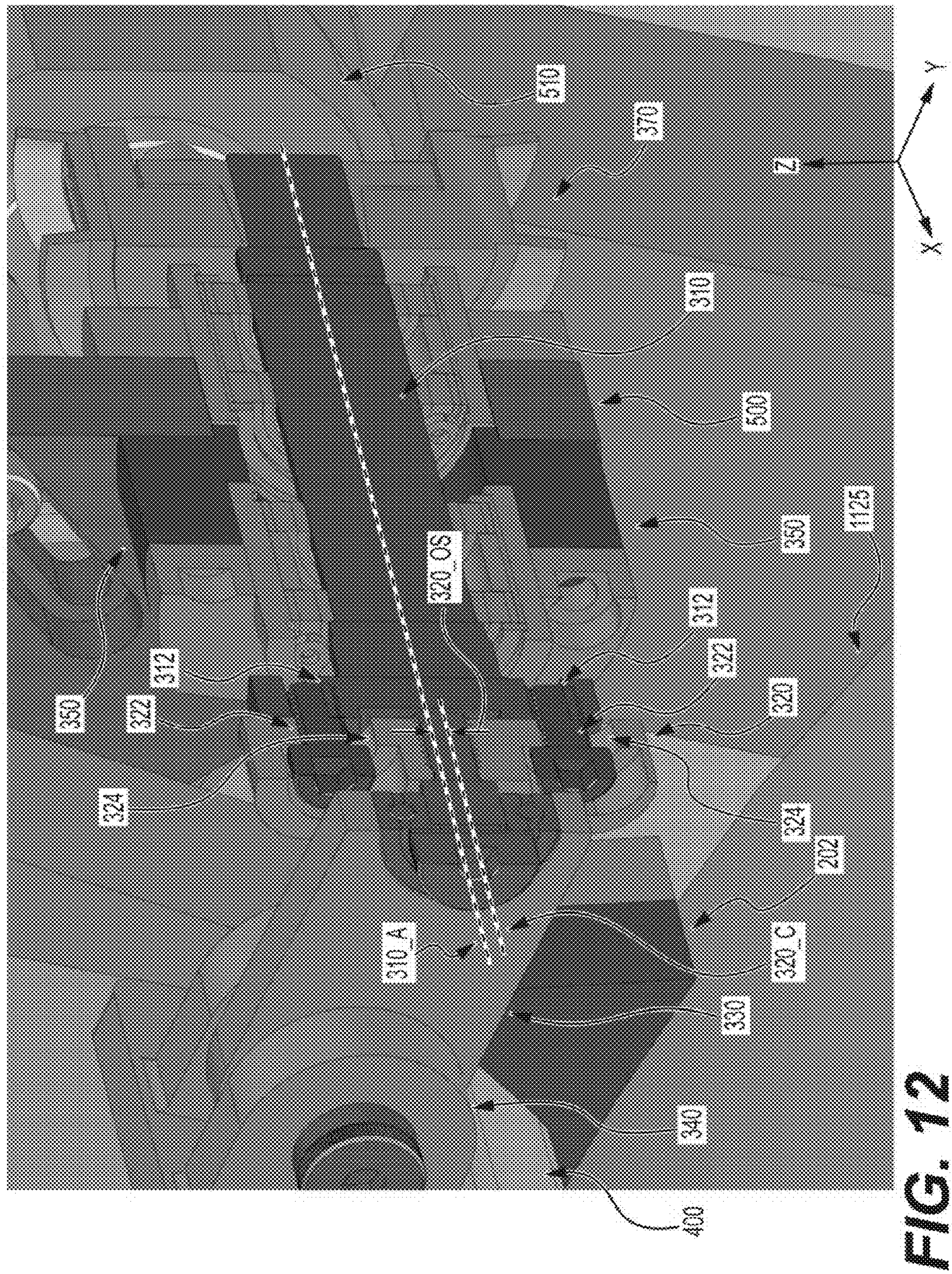
FIG. 12 is a cross-sectional view of the vibration transmission assembly of the doser assembly of FIGS. 4A-4E along line 12-12' shown in FIG. 11A according to some example embodiments.
Figure 13A:
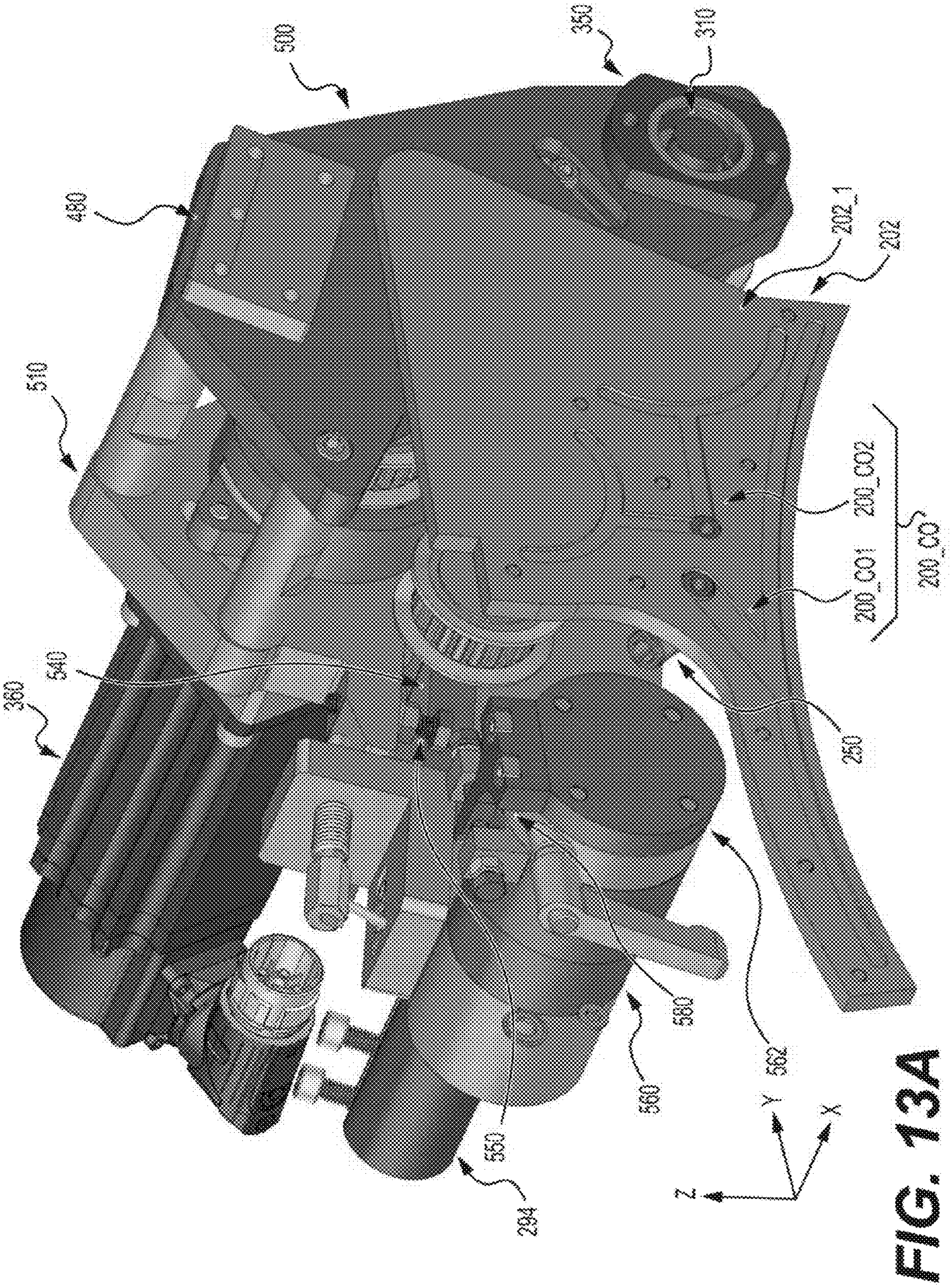
FIGS. 13A, 13B, and 13C are cross-sectional views of the doser assembly of FIGS. 4A-4E along lines 13A-13A', 13B-13B', and 13C-13C', respectively, shown in FIG. 8C according to some example embodiments.
Figure 13B:
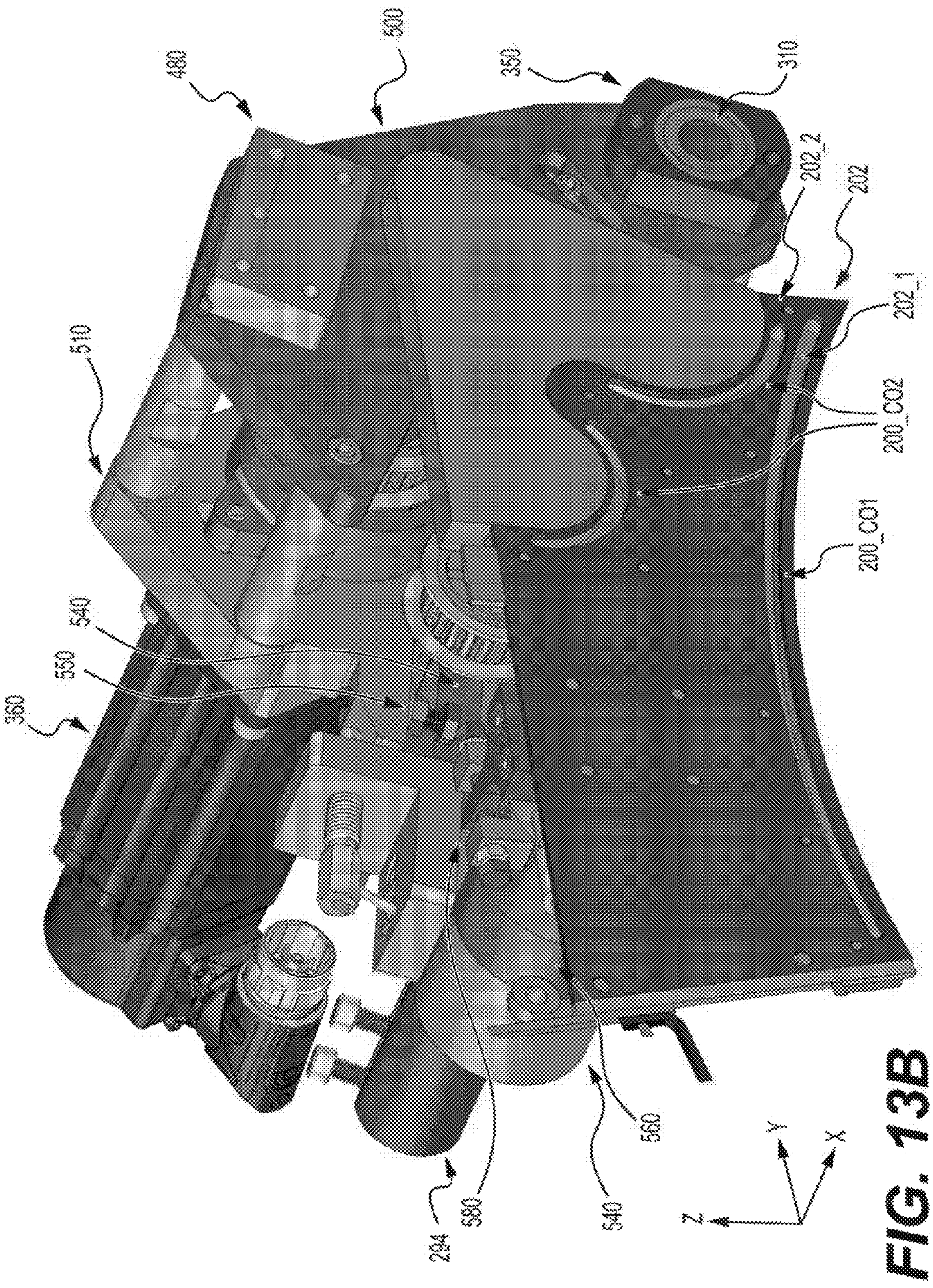
Figure 13C:
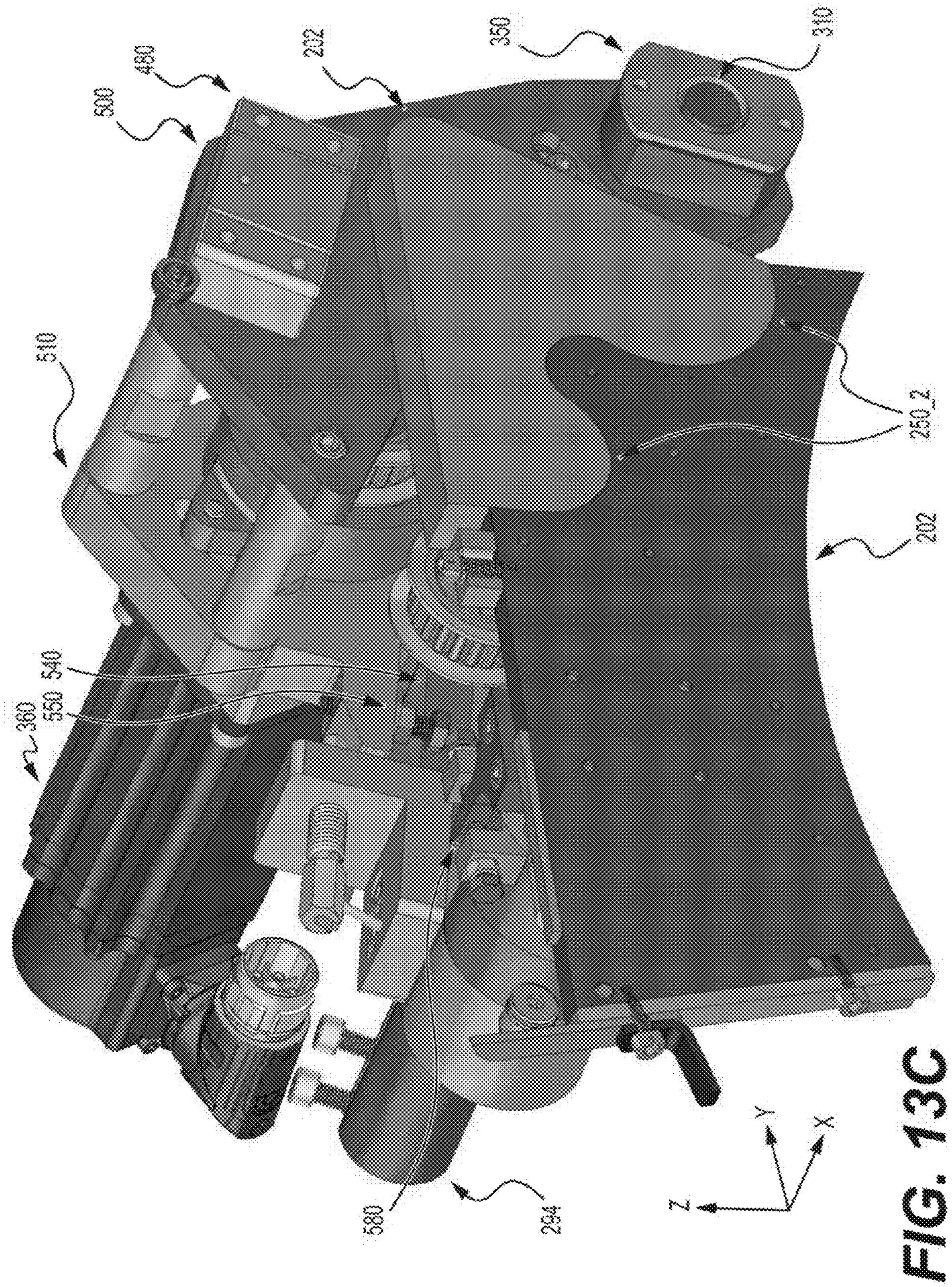
Figure 13D:
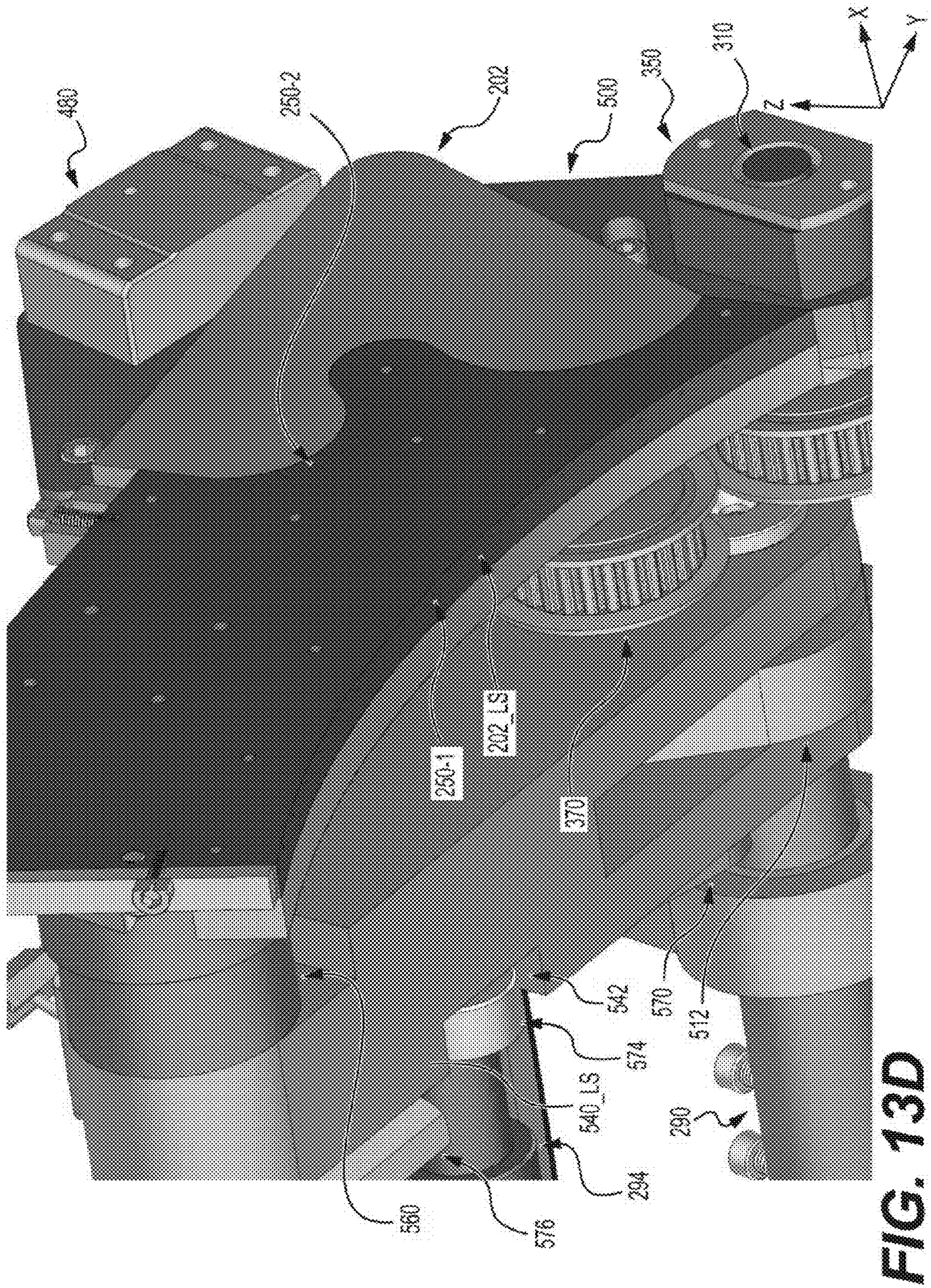
FIG. 13D is a perspective cross-sectional view of the doser assembly of FIG.
Figure 13E:
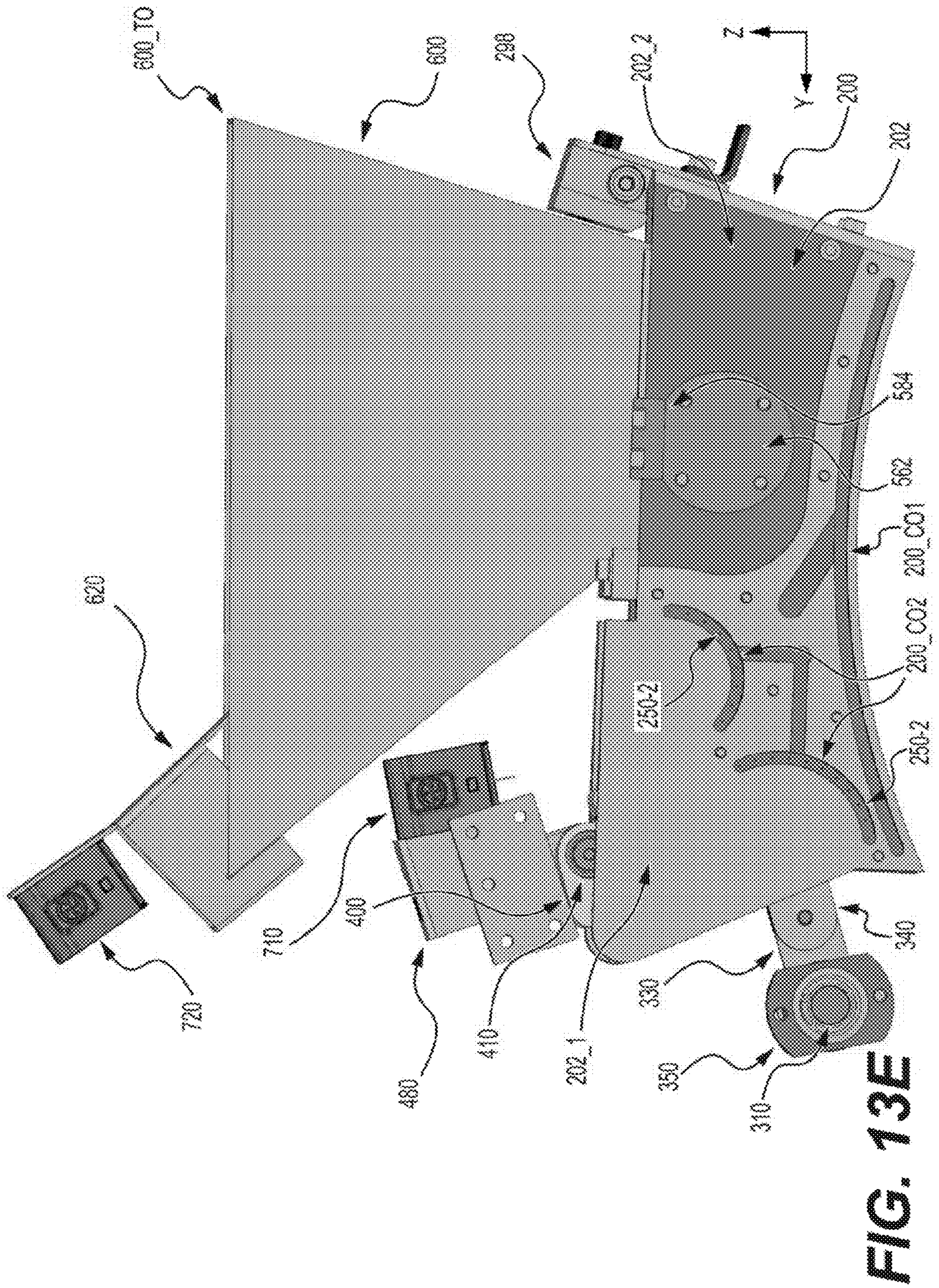
FIGS. 13E and 13F are cross-sectional views of the doser assembly of FIGS. 4A-4E along lines 13E-13E' and 13F-13F', respectively, shown in FIG. 8B according to some example embodiments.
Figure 13F:
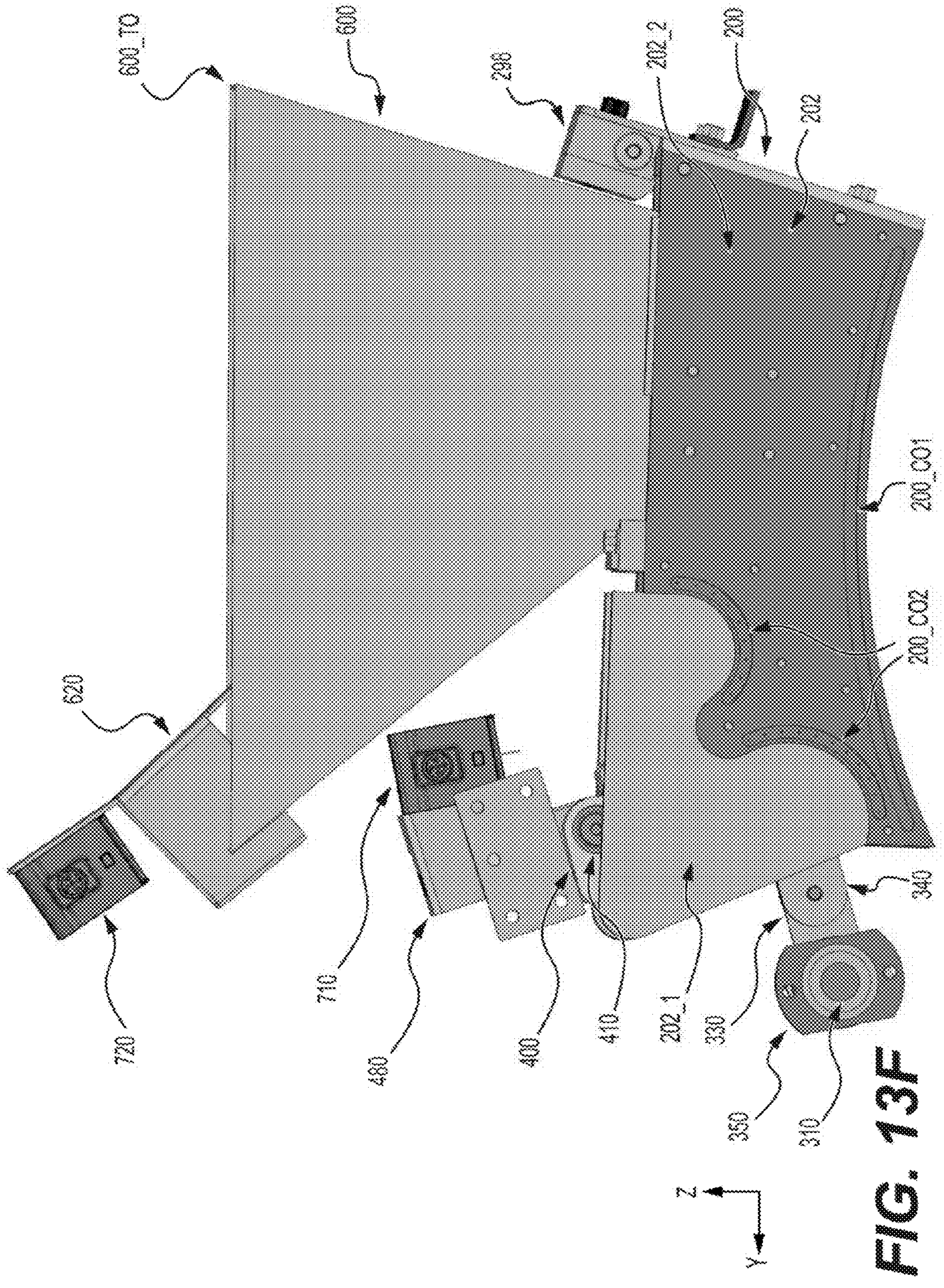
Figure 13G:
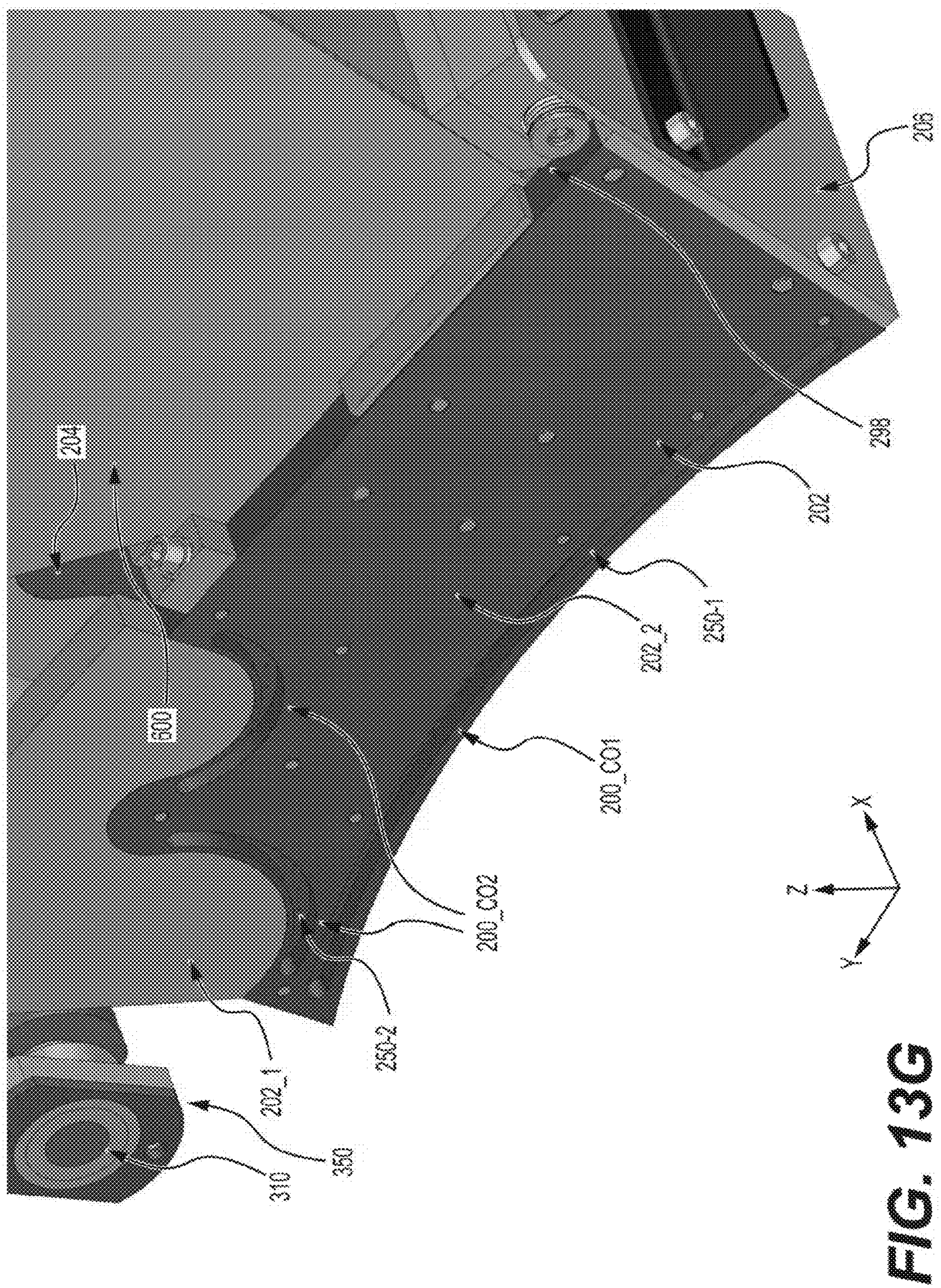
FIG. 13G is a perspective cross-sectional view of the doser assembly of FIGS. 4A-4E along line 13F-13F' shown in FIG. 8B according to some example embodiments.
Figure 14B:
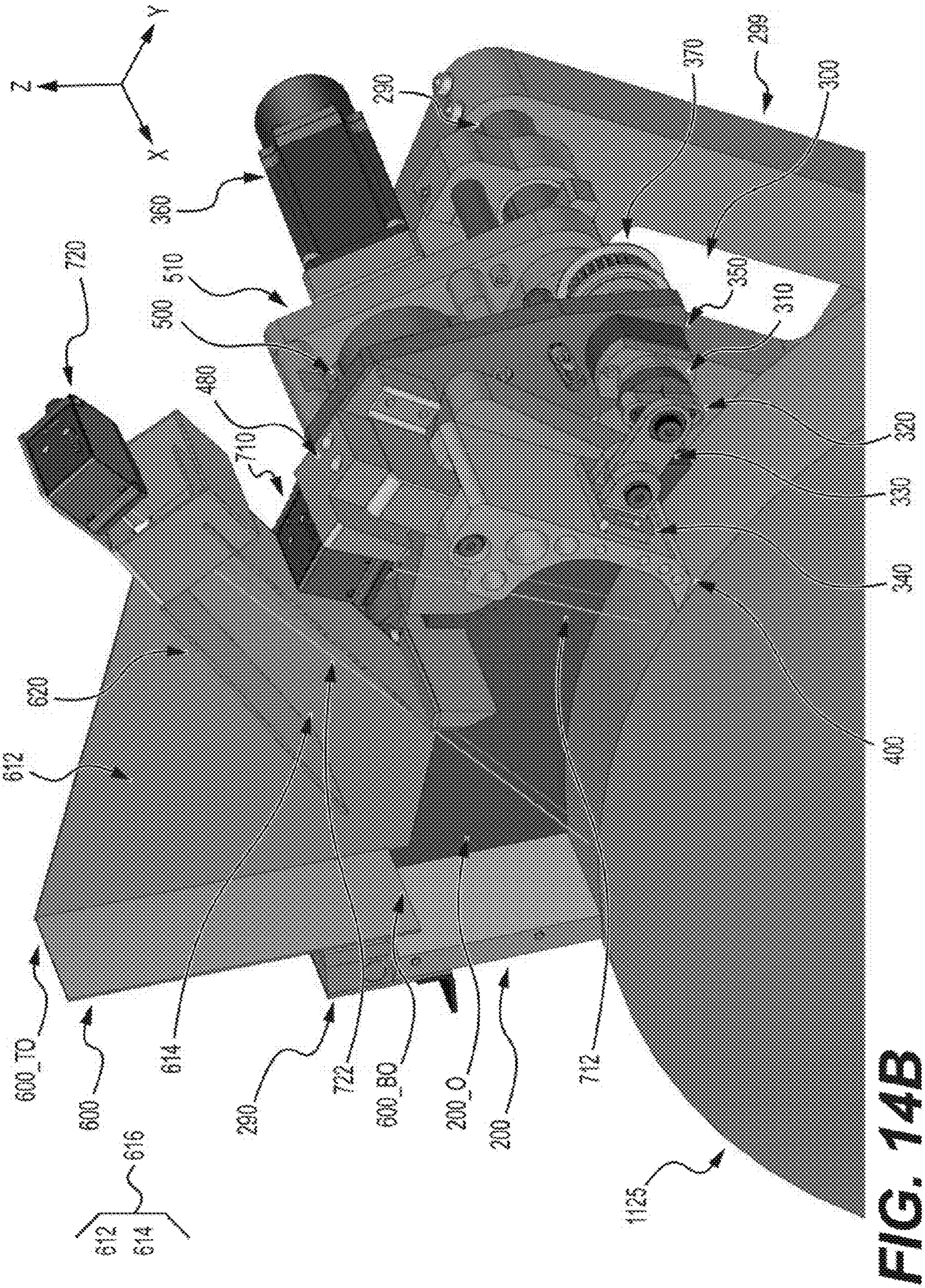
FIG. 14B is a perspective cross-sectional view of the doser assembly of FIGS. 4A-4E along line 9A-9A' shown in FIG. 8C according to some example embodiments

FIGS. 4A, 4B, 4C, 4D, and 4E are perspective views of an apparatus including a doser assembly and a rotatable drum according to some example embodiments, with FIG. 4D being a perspective cross-sectional view along line 4D-4D' shown in FIG. 4C. FIGS. 5A and 5B are perspective views of the doser assembly of FIGS. 4A-4E according to some example embodiments. FIGS. 6A, 6B, 6C, and 6D are partial views of the doser assembly of FIGS. 4A-4E with some structures omitted and with FIG. 6D being a cross-sectional view along line 6D-6D' shown in FIG. 6C, according to some example embodiments. FIGS. 7A, 7B, 7C, 7D, 7E, and 7F are plan views of the doser assembly of FIGS. 4A-4E according to some example embodiments. FIG. 8A is a cross-sectional plan view of the doser assembly of FIGS. 4A-4E along line 8A-8A' shown in FIG. 7C according to some example embodiments. FIG. 8B is a cross-sectional plan view of the doser assembly of FIGS. 4A-4E along line 8B-8B' shown in FIG. 7D according to some example embodiments. FIG. 8C is a cross-sectional plan view of the doser assembly of FIGS. 4A-4E along line 8C-8C' shown in FIG. 7B according to some example embodiments. FIG. 9A is a cross-sectional perspective view of the doser assembly of FIGS. 4A-4E along line 9A-9A' shown in FIG. 8C according to some example embodiments. FIGS. 9B and 9C are cross-sectional perspective views of a paddle of the doser assembly of FIGS. 4A-4E along lines 9B-9B' and 9C-9C', respectively, shown in FIG. 8C according to some example embodiments. FIGS. 10A, 10B, 10C, and 10D are perspective views of a paddle of the doser assembly of FIGS. 4A-4E according to some example embodiments. FIGS. 10E, 10F, 10G, and 10H are plan views of a paddle of the doser assembly of FIGS. 4A-4E according to some example embodiments. FIG. 11A is a view of a vibration transmission assembly of the doser assembly of FIGS. 4A-4E according to some example embodiments. FIG. 11B is a cross-sectional view of the vibration transmission assembly of the doser assembly of FIGS. 4A-4E along line 11B-11B' shown in FIG. 11A according to some example embodiments. FIG. 11C is a cross-sectional view of the vibration transmission assembly of the doser assembly of FIGS. 4A-4E along line 11C-11C' shown in FIG. 11B according to some example embodiments. FIG. 12 is a cross-sectional view of the vibration transmission assembly of the doser assembly of FIGS. 4A-4E along line 12-12' shown in FIG. 11A according to some example embodiments. FIGS. 13A, 13B, and 13C are cross-sectional views of the doser assembly of FIGS. 4A-4E along lines 13A-13A', 13B-13B', and 13C-13C', respectively, shown in FIG. 8C according to some example embodiments. FIG. 13D is a perspective cross-sectional view of the doser assembly of FIG. FIGS. 4A-4E along line 13C-13C' shown in FIG. 7D according to some example embodiments. FIGS. 13E and 13F are cross-sectional views of the doser assembly of FIGS. 4A-4E along lines 13E-13E' and 13F-13F', respectively, shown in FIG. 8B according to some example embodiments. FIG. 13G is a perspective cross-sectional view of the doser assembly of FIGS. 4A-4E along line 13F-13F' shown in FIG. 8B according to some example embodiments. FIG. 14A is a plan cross-sectional view of the doser assembly of FIGS. 4A-4E along line 9A-9A' shown in FIG. 8C according to some example embodiments. FIG. 14B is a perspective cross-sectional view of the doser assembly of FIGS. 4A-4E along line 9A-9A' shown in FIG. 8C according to some example embodiments.

Referring to FIGS. 4A-14B, in some example embodiments, a doser assembly 100 may include at least a hopper assembly 200, a vibration transmission assembly 300, and a paddle 400. According to some example embodiments, the doser assembly 100 may be configured to provide (e.g., "dose," "supply," etc.) portions (e.g., volumes, amounts, instances, etc.) of filler material to be packaged into "doses" or pouches of filler material. As shown with regards to at least FIGS. 1A-3I and as further shown in FIGS. 4A-4E, the doser assembly 100 may be located on a rotatable drum 1125 that includes multiple plates 1600 of divots 1400 on an outer circumferential surface 1125_S of the rotatable drum 1125. The doser assembly 100 may be located on the outer circumferential surface 1125_S of the rotatable drum 1125 and may be configured to supply portions of filler material 2200 into the divots 1400 that are on the outer circumferential surface 1125_S, and in which "first web portions" of a first elastic layer are drawn as described with reference to FIGS. 1A-3I, to provide "portions" or "doses" of filler material 2280 to be packaged into pouches of filler material.

As shown in FIGS. 1-10G, an interior surface 200_IS of the hopper assembly 200 may at least partially define a hopper opening 200_O that extends through the hopper assembly 200. The hopper opening 200_O may also be referred to herein as an interior volume space within the hopper assembly 200 that is at least partially defined by one or more interior surfaces of one or more structures of the hopper assembly 200. As described herein, the bottom boundary of the hopper opening 200_O may be defined by the lower surfaces 200_LS of the hopper assembly 200. As shown in FIGS. 1A-3I and 4A-4E, the doser assembly 100 may be on the rotatable drum 1125 such that the outer circumferential surface 1125_S of the rotatable drum 1125, which may include divots 1400 and on which the first web that includes first elastic layer 1512*a* is located, is directly exposed to the hopper opening 200_O and may at least partially close the bottom boundary of the hopper opening 200_O.

The hopper assembly 200 may be configured to receive a flow 1302 of filler material 1300 into the hopper opening 200_O, for example from the filler material conveyor system 1110 of the filler material distribution system 1200 of apparatus 1000 as described with reference to FIGS. 1A-3I. The filler material may be provided into the hopper opening 200_O from above the hopper assembly 200, and may be provided manually and/or using machinery, for example from the filler material conveyor system 1110 of the filler material distribution system 1200, either directly or via a hopper chute 600 as shown. In some example embodiments, the filler material conveyor system 1110 (not shown in FIGS. 4A and 4B) above the doser assembly 100, which may include a conveyor belt, vibrating feed pan, or the like, may provide the filler material 1300 into the hopper opening 200_O of the doser assembly 100, but other means may be used to provide the filler material 1300 to the doser assembly 100.

Referring to FIGS. 4A-14B and further referring to at least FIGS. 14A-14C, where the doser assembly 100 is on the rotatable drum 1125 that includes divots 1400 on the outer circumferential surface 1125_S thereof as described herein, the filler material 1300 that is supplied into the hopper opening 200_O by the filler material distribution system 1200 may be held within the hopper opening 200_O as filler material 2200 and may fall, at least partially due to gravity, into empty divots 1400_1 of the rotatable drum 1125 that are directly exposed to the hopper opening 200_O (and into which first web portions of the first elastic layer 1512*a* may be further drawn under vacuum via vacuum source 1410 and conduit 1420 a as described with reference to FIGS. 1A-3I and as shown in at least FIG. 18C) to establish portions 2280 of filler material 2200 within the divots 1400 and thus establish filled divots 1400_2 containing the portions 2280 of filler material and thus form filled first web portions.

As described further herein with reference to FIGS. 1A-3I, the filler material 2200 that falls into the divots 1400 under gravity may cover the separate, respective portions of the first elastic layer 1512*a* drawn into the separate, respective divots 1400 under vacuum to form the filled first web portions including the respective portions of the first elastic layer 1512 and separate, respective portions 2280 of filler material thereon in the respective divots 1400. Additionally, the weight of additional filler material 2200 in the hopper opening 200_O overlaying the divots 1400 may further push filler material 2200 at the bottom of the hopper opening 200_O into exposed divots 1400 and may further at least partially compress the portions 2280 of filler material within the divots 1400. Based on rotation of the rotatable drum 1125 in relation to the doser assembly 100, the filled divots 1400 that hold the portions 2280 of filler material may be rotated out of exposure to the hopper opening 200_O, for example to the second receiving location 150 of apparatus 1000 as described with reference to FIGS. 1A-3I to be covered with second elastic material of the second elastic layer 1512*b*. Corresponding elastic material portions of the first and second elastic layers 1512*a* and 1512*b* on the filled divots 1400 may be sealed together and cut from the remaining elastic material portions of the first and second elastic layers 1512*a* and 1512*b* by a heat knife assembly 5000 as described herein to form sealed pouches containing separate, respective portions 2280 of the filler material.

Still referring to FIGS. 4A-14B, in some example embodiments, the paddle 400 may be caused to vibrate 490 (e.g., reciprocatingly pivot). The paddle 400 may vibrate 490 concurrently with filler material 1300 being supplied into the hopper opening 200_O by a filler material distribution system 1200 and concurrently with rotation of the rotatable drum 1125 to move empty divots 1400 (covered with first web including first elastic layer 1512*a*) into direct exposure to the hopper opening 200_O to be filled with portions 2280 of filler material 2200 (e.g., based on rotation of the rotatable drum 1125 to move divots 1400 to the dosing location 130 as shown in FIGS. 1A-3I) and to move filled divots 1400 out of direct exposure to the hopper opening 200_O (e.g., based on rotation of the rotatable drum 1125 to move divots 1400 away from the dosing location 130 as shown in FIGS. 1A-3I). The paddle 400 may vibrate 490 to push filler material 2200 into the divots 1400, clear excess filler material 2200 from the top of filled divots 1400_2 as the filled divots 1400_2 move out of exposure to the hopper opening 200_O (e.g., away from the dosing location 130 of apparatus 1000 and thus away from the doser assembly 100) due to rotation of the rotatable drum 1125 in relation to the doser assembly 100, and/or cause the filler material 2200 to be retained within the hopper opening 200_O as the rotatable drum 1125 rotates in relation to the doser assembly 100 to cause plates 1600 with filled divots 1400_2 to move out of exposure to the hopper opening 200_O under the paddle 400.

The paddle 400 may include a surface, configured to face into the hopper opening 200_O, that is configured to impact, move, and/or "cup" the filler material 2200 that is resting above the tops of filled divots 1400 in the hopper opening 200_O based on the "vibration" of the paddle 400, to induce movement of the filler material 2200 back into a portion of hopper opening 200_O distal from the paddle 400. Restated, with reference to FIGS. 1A-3I, the paddle 400 may vibrate 490 to clear excess filler material 2200 from the tops of the filled divots 1400_2 that are exiting the dosing location 130 of the apparatus 1000 based on rotation of the rotatable drum 1125, similar to how one uses a knife to level material (e.g., flour or sugar) in a measuring cup, so the height of the filler material in the divots 1400 may be equal to (or substantially equal to) the height of the divot 1400 filled by the filler material. Accordingly, the paddle 400 may improve the uniformity and consistency of the amount of filler material 2200 that fills the divots 1400 (e.g., the amount of the portions 2280 of filler material) from divot 1400 to divot 1400. Additionally, the paddle 400 may be configured to clear excess filler material 2200 and/or cause filler material 2200 not located in the divots 1400 to be retained in the hopper opening 200_O while reducing or minimizing excess release/ejection/discharge of filler material 2200 into the ambient environment and/or out of the hopper opening 200_O, for example as clouds or sprays of material. As a result, the paddle 400 may enable reduced maintenance costs associated with cleanup of released/discharged excess filler material out of the doser assembly 100. Additionally as a result, the paddle 400 may enable improved performance of an apparatus 1000 that includes the doser assembly 100 based on reducing contamination of machine/mechanical portions of the apparatus 1000 (e.g., motors, bearings, etc.) with excess filler material 2200.

The vibration transmission assembly 300 may be coupled, directly or indirectly as shown in FIGS. 4A-14B, to the hopper assembly 200. As shown, the vibration transmission assembly 300 may include a shaft 310 (e.g., a rotatable shaft, drive shaft, etc.) that is configured to rotate around a central axis of rotation 310_A, an eccentric 320 that is fixed to the shaft 310 and has a center 320_C (also referred to as a central rotation axis of the eccentric 320) that is radially offset 320_OS from the central rotation axis 310_A of the shaft 310, a connecting rod 330 that is pivotably connected (e.g., via pivot joint 332 which may include a bearing, such as a rolling-element bearing and/or a ball bearing as shown) to the center of the eccentric 320, and a bracket 340 that is pivotably connected (e.g., via pivot joint 338 which may include a bearing, such as a rolling-element bearing and/or a ball bearing as shown) to the connecting rod 330. As described herein, a "pivot joint" may be interchangeably referred to as a "pivot," "hinge joint," "hinge," or the like.

As shown in FIGS. 4A-14B, the doser assembly 100 may include a motor 360 that is mechanically coupled to one end of the shaft 310. The motor 360 may be coupled to the shaft 310 via drive transmission 370 (which may be a gearbox), which as shown may include multiple belt-driven gears (the one or more belts mechanically coupling the gears are not shown). In some example embodiments, the drive transmission 370 may be absent and the shaft 310 may be directly driven by the motor 360. The motor 360 may be a servo-actuator, or any known type of drive motor. The motor 360 may be configured to induce the rotary motion of the shaft 310 around the central axis of rotation 310_A of the shaft 310.

The paddle 400 is located in a portion of the hopper opening 200_O of the hopper assembly 200 and/or is understood to be configured to define at least a portion of a boundary of the hopper opening 200_O. As shown, the paddle 400 may extend in a direction (e.g., a horizontal direction, shown as the X direction) between a first part 200_IS_1 of the interior surface 200_IS of the hopper assembly 200 and a second part 200_IS_2 of the interior surface 200_IS of the hopper assembly 200. A first end 400_1 of the paddle 400 is pivotably coupled (directly or indirectly) to the hopper assembly 200 at a paddle pivot joint 410 which may include a bearing 412 such as a rolling-element bearing and/or a ball bearing as shown. As shown, the paddle 400 may be fixed to the bracket 340 of the vibration transmission assembly 300 separately from the hopper assembly 200, such that the vibration transmission assembly 300 may be configured to cause the paddle 400 to reciprocatingly pivot around the paddle pivot joint 410 based on converting rotary motion of the shaft 310 into reciprocating motion of at least the bracket 340.

In some example embodiments, a material of any portion of the doser assembly 100, including hopper assembly 200, the paddle 400, any part of the vibration transmission assembly 300, or the like may include one of a metal (e.g., aluminum), a metal alloy (e.g., steel), a plastic (e.g., polyether ketone (PEEK), polyoxymethylene (an acetal homopolymer resin corresponding to the trademark DELRIN®, held by DuPont™), a sub-combination thereof, or a combination thereof. A material of the paddle 400 may include a plastic, such as one of PEEK, polyoxymethylene, or both PEEK and polyoxymethylene. However, example embodiments are not limited thereto and the paddle 400 may alternatively be formed of other materials such as a metal, a metal alloy, and/or a different plastic.

As shown in FIGS. 4A-14B, the hopper assembly 200 may include a first hopper wall 202 and a second hopper wall 204 that face each other (e.g., are opposing hopper walls) and are spaced apart from each other (e.g., spaced apart in the X direction as shown). As shown, the inner surface 202_IS of the first hopper wall 202 may include and/or define the first part 200_IS_1 of the interior surface 200_IS of the hopper assembly 200 and the inner surface 204_IS of the second hopper wall 204 may include and/or define the second part 200_IS_2 of the interior surface 200_IS of the hopper assembly 200.

As shown, the first hopper wall 202 may include a lower surface 202_LS that is concave in shape, and the second hopper wall 204 may include a lower surface 204_LS that is concave in shape. The lower surfaces 202_LS and 204_LS may collectively at least partially define a lower surface 200_LS of the hopper assembly 200 which may be configured to be located on (e.g., to rest upon) the outer circumferential surface 1125_S of the rotatable drum 1125.

As shown, the lower surface 202_LS of the first hopper wall 202 may be level (e.g., level in a vertical direction or Z direction as shown) with the lower surface 204_LS of the second hopper wall 204 and aligned with the lower surface 204_LS of the second hopper wall 204. For example, as shown, the concave shapes of the lower surfaces 202_LS and 204_LS may be horizontally aligned in at least the X direction so that the lower surfaces 202_LS, 204_LS collectively define a common concave-shaped curved surface. As shown, the concave lower surfaces 202_LS, 204_LS may be configured to be complementary to the curvature of the outer circumferential surface 1125_S of the rotatable drum 1125 so as to establish a flush fit (e.g., complementary fit) between the lower surface 200_LS of the hopper assembly 200 and the rotatable drum 1125_S when the doser assembly 100 is on the rotatable drum 1125 (with at least the second portions 1522 of the support layer 1514 of the "first web" of the first material 1500 therebetween).

It will be understood that, as described herein, at least a portion (e.g., edge portion, including portions 1522 of the support layer 1514) of the "first web" of the first material 1500 may be located between the lower surface 200_LS of the hopper assembly 200 and the rotatable drum 1125 when a flush fit is established between the lower surface 200_LS of the hopper assembly 200 and the rotatable drum 1125_S. The edge portion of the first web of the first material 1500 (e.g., portions 1522 of the support layer 1514) may be sufficiently thin and flexible to fit between the complementary curvatures of the lower surface 200_LS and outer circumferential surface 1125_S and enable the flush fit therebetween. As described herein, the hopper assembly 200 may be adjustably oriented (e.g., in the YZ plane) in relation to the rotatable drum 1125 to adjust the complementary fit between the concave curvatures of the lower surfaces 202_LS and 204_LS and the convex curvature of the outer circumferential surface 1125_S of the rotatable drum 1125.

Still referring to FIGS. 4A-14B, the hopper assembly 200 may include a third hopper wall 206 that is connected to the first hopper wall 202 and the second hopper wall 204 at a first end region 200_1 of the hopper assembly, and the paddle 400 may be pivotably coupled to the hopper assembly 200 (via at least the paddle pivot joint 410) at an opposite, second end region 200_2 of the hopper assembly 200. As a result, the inner surface 206_IS of the third hopper wall 206 and the first outer surface 420_1 of the paddle 400 may be spaced apart from each other (e.g., in the Y direction) and may be configured to face each other, and may at least partially define opposite sides of the hopper opening 200_O.

As shown, the inner surface 206_IS of the third hopper wall 206 may, together with the inner surfaces 202_IS and 204_IS of the first and second hopper walls 202 and 204, at least partially define the inner surface 200_IS of the hopper assembly 200 that at least partially defines the side boundaries of the hopper opening 200_O. In some example embodiments, the first outer surface 420_1 of the paddle 400 may be configured to be a part of the inner surface 200_IS of the hopper opening 200_O and/or may be consider to collectively, together with the inner surface 200_IS of the hopper assembly 200 that includes inner surfaces 202_IS, 204_IS, and 206_IS, at least partially define the side boundaries of the hopper opening 200_O.

As further shown, the lower surface 206_LS of the third hopper wall 206 may, together with the lower surfaces 202_LS and 204_LS of the first and second hopper walls 202 and 204, collectively define the lower surface 200_LS of the hopper assembly 200.

Still referring to FIGS. 4A-14B, and referring particularly to FIGS. 13A-14B, the first hopper wall 202 may include an outer base frame 202_1 and an inner wall 202_2. The outer base frame 202_1 and the inner wall 202_2 may collectively define a set of one or more conduit openings 200_CO within an interior of the first hopper wall 202. The conduit openings 200_CO may include a first conduit opening 200_CO1 at a lower region of the first hopper wall 202 and a second conduit opening 200_CO2 at a lower-mid region of the first hopper wall 202. As shown, the hopper assembly 200 may further include one or more conduit lines 250 which may extend into the conduit openings 200_CO and may be coupled t one or more gas sources, a vacuum source, or any combination thereof.

The first conduit opening 200_CO1 is in fluid communication with the lower surface 202_LS of the first hopper wall 202 via first apertures 250-1 that extend through the interior of the inner wall 202_2 between the first conduit opening 200_CO1 and the lower surface 202_LS. When the doser assembly 100 is on the rotatable drum 1125, the first apertures 250-1 may direct gases supplied to the first conduit opening 200_CO1 by a conduit line 250 to the interface between the lower surface 202_LS and the material that the lower surface 202-LS is located on, which may be the outer circumferential surface 1125_S of the rotatable drum 1125, an upper surface of an edge portion of a first material 1500 (e.g., a portion 1522 of the support layer 1514 of the first material 1500) that is on the outer circumferential surface 1125_S and thus is between surfaces 202_LS and 1125_LS, or any combination thereof. The first apertures 250-1 may direct the gases to the interface to form an "air curtain" that may serve as a bearing between the doser assembly 100 and the rotatable drum 1125 and/or first material 1500 (e.g., support portions 1522 of the first web) on which the doser assembly 100 is located as the rotatable drum 1125 rotates beneath the hopper assembly 200. The "air curtain" may restrict and/or reduce discharge of filler material 2200 out of the hopper opening 200_O through the interface between the lower surface 202_LS and the rotatable drum 1125 and/or first material 1500 thereon.

The second conduit openings 200_CO2 are in fluid communication with the hopper opening 200_O via second apertures 250-2 that extend through the interior of the inner wall 202_2 between the second conduit openings 200_CO2 and the inner surface 202_IS. When the paddle 400 is vibrating 490 during operation of the doser assembly 100, the second apertures 250-2 may direct gases supplied to the second conduit openings 200_CO2 by a conduit line 250 to the hopper opening 200_O to form an "air bearing" between the interior surface 200_IS of the hopper assembly 200 and the vibrating paddle 400 and to further or alternatively serve as an "air curtain" to restrict and/or reduce discharge of filler material 2200 out of the hopper opening 200_O through the interface between the interior surface 200_IS (e.g., inner surface 202_IS) and the paddle 400.

It will be understood that, in some example embodiments, the second conduit openings 200_CO2 and second apertures 250-2 may be absent from the doser assembly 100. It will be understood that, in some example embodiments, the first conduit openings 200_CO1 and first apertures 250-1 may be absent from the doser assembly 100.

While the above description is provided with regard to conduit openings 200_CO in the first hopper wall 202, it will be understood that, similarly, the second hopper wall 204 may include an outer base frame 204_1 and an inner wall 204_2 that may collectively define a separate set of one or more conduit openings 200_CO within an interior of the second hopper wall 204 and which may be connected to a set of conduit lines 250 which may be configured to operate similarly to the conduit lines 250 connected to the conduit openings 200_CO within the first hopper wall 202. Accordingly, both the first and second hopper walls 202 and 204 may be configured to provide "air curtains" at opposite sides of the lower surface 200_LS of the hopper assembly 200 to restrict or reduce discharge of filler material 2200 out of the hopper opening 200_O through the interface between the lower surface 200_LS and the rotatable drum 1125 and/or first material 1500.

In view of the above, it will be understood that the conduit lines 250 may be configured to provide vacuum, gases, or both vacuum and gases into the hopper assembly 200 through corresponding conduit openings 200_CO in the hopper assembly 200, and that the conduit lines 250 may extend into the conduit openings 200_CO and may be in fluid communication with an exterior (e.g., lower surface 200_LS) of the hopper assembly 200 and/or with the hopper opening 200_O via apertures 250-1 and/or 250-2.

Additionally, as shown in FIGS. 4A-14B, the hopper assembly 200 may include an air knife 298 that may be coupled to the third hopper wall 206 and may be configured to direct a stream of air downwards (e.g., in the −Z direction) along inner surface 206_IS of the third hopper wall 206 to form a curtain of air that restricts filler material 2200 from leaving the hopper opening 200_O via a space between the third hopper wall 206 and the first elastic layer 1512*a* that is on the rotatable drum 1125.

As shown in FIGS. 4A-14B, and referring particularly to FIGS. 9A-10H, the paddle 400 may have a first outer surface 420_1 that at least partially defines the hopper opening 200_O, and the paddle 400 may have a second outer surface 420_2 that is configured to be fixed to the bracket 340 of the vibration transmission assembly 300 (e.g., via fasteners including but not limited to bolts, via adhesion, via the bracket 340 and the paddle 400 being separate portions of a single, unitary piece of material, etc.). As shown, the first and second outer surfaces 420_1 and 420_2 are opposite surfaces of the paddle 400.

As shown in FIGS. 4A-14B, the first end 400_1 of the paddle 400 may include holes 414 and recess 416 configured to receive the bracket 480 and bearings 412 to establish the paddle pivot joint 410 at the first end 400_1 of the paddle 400. As shown in FIGS. 4A-14B, the second end 400_2 of the paddle 400, which is an opposite end from the first end 400_1, may include a distal surface 402 that is opposite from the paddle pivot joint 410 at the first end 400_1 of the paddle 400. As shown in FIGS. 4A-14B, the first outer surface 420_1 may be an at least partially curved surface that defines a concave shape and which at least partially defines the hopper opening 200_O. In some example embodiments, the concave shape may extend to the second end 400_2 of the paddle 400. Based on having an at least partially concave-shaped first outer surface 420_1 that faces into the hopper opening 200_O, the paddle 400 may be configured to "cup" the excess filler material 2200 located in the hopper opening 200_O during vibration 490 of the paddle 400 (e.g., reciprocating pivoting of the paddle 400 around the paddle pivot joint 410) to induce movement of the excess filler material 2200 away from filled divots 1400_2 of the rotatable drum 1125 that are moving underneath and past the paddle 400 and out of exposure to the hopper opening 200_O and to further induce movement of the excess filler material 2200 further into the interior of the hopper opening 200_O.

As shown, in some example embodiments, the second end 400_2 of the paddle 400 may at least partially define a blade edge 400_BE that at least partially defines the hopper opening 200_O. The blade edge 400_BE may face into the hopper opening 200_O. During operation of the doser assembly 100, the vibration 490 of the paddle 400 as driven by the vibration transmission assembly 300 may cause the blade edge 400_BE to "cut" into the excess filler material 2200 that is located in the hopper opening 200_O on the filled divots 1400_2 to facilitate movement of the excess filler material 2200 to remain within the hopper opening 200_O, thereby further reducing release/drainage of filler material 2200 out of the hopper opening 200_O independently of the divots 1400 of the rotatable drum 1125.

As shown in FIGS. 4A-14B, the paddle 400 may be coupled to the hopper assembly 200 such that the distal surface 402 of the paddle 400 may protrude downwards in a vertical direction (e.g., the −Z direction as shown) away from the lower surface 202_LS of the first hopper wall 202 and the lower surface 204_LS of the second hopper wall 204 (e.g., away from the lower surface 200_LS of the hopper assembly 200) and towards the outer circumferential surface 1125_S of the rotatable drum 1125 by a paddle protrusion distance 404. The paddle protrusion distance 404 may be equal to or less than a thickness of the first web of the first material 1500 that may overlay the rotatable drum 1125 on which the doser assembly 100 may be located. The paddle protrusion distance 404 may be equal to or greater than 0 inches and equal to or less than about ⅛ inches. For example, the paddle protrusion distance 404 may be about 1/16 inches. Based on the distal surface 402 protruding by the paddle protrusion distance 404, contact between the distal surface 402 of the paddle 400 and the upper surface 1516 of the first elastic layer 1512*a* may be controlled to improve clearing of excess filler material 2200 from the tops of the filled divots 1400_2.

Referring to the vibration transmission assembly 300 as shown in FIGS. 4A-14B, and particularly referring to FIGS. 11A-12, the vibration transmission assembly 300 may include an eccentric 320 that is fixed to the shaft 310 via fasteners 322 (e.g., bolts as shown) that extend through slots 324 in the eccentric such that the fasteners 322 to engage (e.g., thread ably engage) with shaft holes 312 (e.g., threaded holes) of the shaft 310, thereby fastening (e.g., fixing, holding in place, etc.) the eccentric 320 between the fasteners 322 and the shaft 310. The eccentric 320 may be pivotably connected, at the center 320_C thereof (also referred to as a central rotation axis of the eccentric 320), to one end of the connecting rod 330 via pivot joint 332 which may include a rotatable-element bearing as shown. The connecting rod 330 may be pivotably connected, at another end thereof, to the bracket 340 via pivot joint 338 which may include a rotatable-element bearing as shown. Accordingly, the connecting rod 330 is pivotably connected at opposite ends between the bracket 340 and the eccentric 320, where the eccentric 320 is configured to be fixed to the shaft 310 by at least the fasteners 322. Accordingly, based on rotation of the shaft 310 (which may be driven by motor 360 directly or via a drive transmission 370), the movement of the shaft 310 may be transferred to the bracket 340 via the eccentric 320 and the connecting rod 330.

As further shown, the shaft 310 may include a groove 310_G that extends in a particular direction and extending through and crossing the central axis of rotation 310_A and the holes 312. The eccentric 320 is configured to be held in the groove 310_G by the fasteners 322 engaged with shaft holes 312 through the slots 324. As shown, the slots 324 may be elongated in the direction of axis 320_A (which may be parallel to the longitudinal axis of the eccentric 320) so that the eccentric 320 may be adjustably offset in relation to the shaft 310 in the groove 310_G while still enabling the fasteners 322 to engage respective shaft holes 312 of the shaft 310 to fix the eccentric 320 to the shaft 310 such that the eccentric 320 is at least partially in the groove 310_G. As result, the eccentric 320 may be adjustably fixed to the shaft 310 (e.g., via the fasteners 322 being adjustably tightened in the slots 324) so that the center 320_C of the eccentric 320 is radially offset 320_OS from the central axis of rotation 310_A of the shaft 310 along an axis 320_A that extends in parallel with a line intersecting the slots 324 (and may extend in parallel with a longitudinal axis of the eccentric 320), in parallel to the groove 310_G (and may extend in parallel with a longitudinal axis of the groove 310_G), in parallel with a line intersecting the holes 312, and crossing axis 310_A and center 320_C. As shown in at least FIG. 11C, the eccentric 320 may include an indicator 328 that is aligned with the center 320_C (also referred to as central axis of rotation) of the eccentric 320, and the shaft 310 may include an indicator 318 that is aligned with the central axis of rotation 310_A of the shaft 310. A magnitude of the offset between the indicators 318, 328 as shown may indicate a magnitude of the offset 320_OS (also referred to herein as an offset distance) between the central rotation axis 310_A of the shaft 310 and the center 320_C of the eccentric 320, thereby enabling external observation and/or measurement (e.g., with measurement tools such as a measuring tape or caliper) of the magnitude of the offset 320_OS and therefore improving ease of accuracy of adjustments of the magnitude of the offset 320_OS.

The magnitude of the offset 320_OS may be adjusted based on loosening the engagement of fasteners 322 with the eccentric 320 via slots 324 (e.g., based on adjustably loosening the engagement of the fasteners 322 with the shaft holes 312), sliding the eccentric 320 in the groove 310_G in parallel with the axis 320_A to adjust the magnitude of the offset 320_OS, and re-tightening the fasteners 322 in the shaft holes 312 through the slots 324 to re-tighten the engagement of eccentric 320 between the fasteners 322 and the shaft 310 to re-fix the eccentric 320 at a new offset 320_OS.

Based on the adjustable offset 320_OS between the center 320_C of the eccentric 320 and the central axis of rotation 310_A of the shaft 310, the rotary motion of the shaft 310 around central axis of rotation 310_A may cause the center 320_C, and thus the pivotable connection between the eccentric 320 and the connecting rod 330, to move in a circular path that orbits the central axis of rotation 310_A, which further causes the bracket 340 to move in a reciprocating path, which further causes the paddle 400 that is fixed (e.g., fastened) to the bracket 340 to reciprocatingly pivot around the paddle pivot joint 410. Thus, the eccentric 320 may be configured to function as a crank arm having an adjustable arm length, based on the eccentric 320 being configured to be adjustably positioned in relation to the shaft 310.

As a result of such reciprocating pivot motion of the paddle 400, the paddle may "vibrate" 480 (e.g., at a rate of 1,500 rpm). The vibration of the paddle 400 may induce movement of the filler material in the hopper opening 200_O.

Referring back to FIGS. 1A-3I and further referring to FIGS. 14A-14B and 18A-18C, as the vacuum source 1410 pulls portions of the first web of the first material 1500 including the first elastic layer 1512*a* (e.g., first web portions) into the divots 1400 (e.g., via conduits 1420 as shown in FIG. 18C) while the rotatable drum 1125 rotates and moves the first web between the doser assembly 100 and the top of the rotatable drum 1125, filler material 1300 may be provided into the hopper opening 200_O (see FIGS. 4A-14B) of the doser assembly 100 (as filler material 2200). Such filler material 2200 may thus fall to the bottom of the hopper opening 200_O and thus fall onto exposed portions of the upper surface 1516 of the first elastic layer 1512*a* (which may be on the outer circumferential surface 1125_S of the rotatable drum 1125 and/or may be drawn into the divots 1400 under vacuum). As described herein, the upper surface 1516 of the first elastic layer 1512*a* may at least partially comprise (e.g., alone or together with respective upper surfaces of the portions 1522 of the support layer 1514) an upper surface of the first material 1500.

The filler material conveyor system 1110 (see FIGS. 1H-1J) may provide a flow 1302 of filler material 1300 into the hopper opening 200_O of the doser assembly 100 to establish filler material 2200 within the hopper opening 200_O. At least a portion of the filler material 2200 at the bottom of the hopper opening 200_O may fill the portions of the first elastic layer 1512*a* pulled into the divots 1400, based on said filler material 2200 falling into the divots 1400 under gravity and/or based on downwards pressure exerted on the filler material 2200 by the weight of overlaying filler material 2200 on top of the filler material 2200 that fills the divots 1400 at the bottom of the hopper opening 200_O. As shown in at least FIG. 14A, the filler material 2200 that fills a given divot 1400 that is a filled divot 1400_2 may be referred to as a portion 2280 of filler material, and the portion of first elastic layer 1512*a* of the first material 1500 in the given filled divot 1400_2 may be referred to as a filled first web portion.

As the rotatable drum 1125 rotates, the first web (including first elastic layer 1512*a*) and plates 1600 may move under the doser assembly 100 and the paddle 400 may be caused by the vibration transmission assembly 300 to reciprocatingly pivot (e.g., vibrate 490) around the paddle pivot joint 410 to push filler material 2200 into the divots 1400, clear excess filler material 2200 from the tops of the divots 1400, and/or cause the filler material 2200 to be retained within the hopper opening 200_O as the rotatable drum 1125 rotates to cause plates 1600 with filled divots 1400_2 to move out of the hopper opening 200_O under the paddle 400.

As noted herein, the vibration transmission assembly 300 may be configured to cause the paddle 400 to vibrate 490 at a rate that is equal to or greater than 1,500 reciprocation cycles per minute, 3,000 reciprocation cycles per minute, or the like, but example embodiments are not limited thereto. The first outer surface 420_1 of the paddle 400, which may be concave shaped, and the second end 400_2 of the paddle 400, which may include a blade edge 400_BE, may clear excess filler material 2200 so the filler material 2200 does not overfill the divots 1400. In other words, the paddle 400 may clear the excess filler material 2200 from the divots 1400, similar to how one uses a knife to level material (e.g., flour or sugar) in a measuring cup, so the height of the filler material 2200 in the divots 1400 (e.g., the height of the portion 2280 of filler material in each filled divot 1400_2 from the bottom 1480 of said divot) may be equal to (or substantially equal to) the height of the divot 1400 filled by the portion 2280 of filler material. Accordingly, the paddle 400 may ensure the amount of filler material 2200 of the portions 2280 of filler material that fill the divots 1400 may be consistent from divot 1400 to divot 1400.

Additionally, the paddle 400 may be configured to clear excess filler material 2200 and/or cause filler material 2200 not located in the divots 1400 to be retained in the hopper opening 200_O while reducing or minimizing excess release/discharge of filler material 2200 into the ambient environment and/or out of the hopper opening 200_O, for example as clouds of material. As a result, the paddle 400 may enable reduced maintenance costs associated with cleanup of released/discharged excess filler material 2200 out of the doser assembly 100.

The vertical distance between the paddle 400 and the upper surface of the first material 1500 (e.g., the upper surface 1516 of the first elastic layer 1512*a*) may be adjusted using the adjustable bearing 550 described with regard to FIGS. 4A-14B to adjust the relative position of the drive plate 500 and adjustment plate 510, and thus the paddle 400 connected to the drive plate 500 via bracket 480, in relation to the hopper assembly 200 having lower surfaces 200_LS that rest on the outer circumferential surface 1125_S of the rotatable drum 1125. Additionally, as the first web (including first elastic layer 1512*a*) and plates 1600 move under doser assembly 100 with the rotation of the rotatable drum 1125, sides of the hopper assembly 200 in the doser assembly 100, such as the hopper walls 202, 204, 206 described in FIGS. 4A-14B, may limit and/or prevent filler material 2200 from spreading laterally off of the rotatable drum 1125.

Reciprocation frequency, amplitude, and/or stroke distance of the vibration 490 of the paddle 400 may be adjusted, for example based on adjustably repositioning the magnitude of the offset 320_OS of the eccentric 320 in relation to the shaft 310, for desired performance. For example, the reciprocation frequency and/or stroke distance of the paddle 400 may be increased to improve the ability of the paddle 400 to push filler material into the divots 1400 and/or clear excess filler material from the divots 1400. At the same time, the reciprocation frequency and/or stroke distance of the paddle 400 may be reduced to limit and/or avoid damage to the first web, including the first elastic layer 1512*a*.

Additionally, the first apertures 250-1 described in FIGS. 4A-14B may discharge air between the lower surfaces 200_LS of the hopper assembly 200 and the upper edge surfaces of the first web of the first material 1500 (e.g., upper surfaces of the remaining portions 1522 of the support layer 1514 of the first web) to function as an "air curtain" to both serve as an air bearing between the first material 1500 and the hopper assembly 200 and further to restrict filler material 2200 from leaving the hopper opening 200_O via any space between the hopper walls 202, 204 and the first material 1500.

Additionally, as shown in FIGS. 4A-14B, the hopper assembly 200 may include an air knife 298 that is configured to direct a stream of air along inner surface 206_IS of the third hopper wall 206 to form a curtain of air that restricts filler material 2200 from leaving the hopper opening 200_O via a space between the third hopper wall 206 and the first material 1500.

In other words, the hopper assembly 200 of the doser assembly 100 may guide and/or contain the filler material 2200 so the filler material 2200 fills the divots 1400 and does not fall off of the rotatable drum 1125.

While FIGS. 1A to 3I and 18A-18C illustrate a non-limiting example where the rotatable drum 1125 includes one lane of plates 1600 spaced apart from each other along the rotatable drum 1125, where each plate 1600 includes two divots 1400, example embodiments are not limited thereto. In some embodiments, a plurality of lanes of plates 1600 may be provided along the rotatable drum 1125 and/or the plates 1600 may include more or fewer than two divots 1400 per plate 1600.

Still referring to FIGS. 4A-14B, the doser assembly 100 may include a drive plate 500 that is fixed to the vibration transmission assembly 300 (e.g., via bushing 350, which may be a bearing such as a rotatable-element bearing) such that the drive plate 500 is fixed in relation to the position of the shaft 310.

As further shown, the drive plate 500 may be connected to the paddle pivot joint 410, and thus to the paddle 400, for example by bracket 480, such that a position of the paddle pivot joint 410 is fixed in relation to the drive plate 500. As shown, the paddle 400 may be connected to the drive plate 500 independently of the hopper assembly 200, such that the paddle 400 is coupled to the hopper assembly 200 through at least the drive plate 500. For example, the paddle 400 may be connected to the drive plate 500 through the bracket 480 such that the paddle 400 is not directly connected to the hopper assembly 200 independently of the drive plate 500. As a result, a position of the paddle 400 in relation to the hopper assembly 200 may be adjusted, for example based on adjustable positioning of at least the drive plate 500.

As shown, the drive plate 500 may be fixed to adjustment plate 510. Adjustment plate 510 may be pivotably connected to pivot bar 290 (e.g., via a bushing 512 which may be a bearing, such as a rotatable-element bearing) that is further fixed to a fixed support structure 299, which may be a clamp structure that may be fixed to an external stationary structure of the apparatus 1000 as described herein, a foundation, or the like. In some example embodiments, the fixed support structure 299 may be fixed to a frame of the rotatable drum 1125. Accordingly, the adjustment plate 510 and the drive plate 500 fixed thereto may be configured to be adjustably pivoted 514 around pivot bar 290 and thus pivoted in relation to the fixed support structure 299 and thus in pivoted in relation to an external structure such as the rotatable drum 1125. As further shown, the doser assembly 100 may include a support plate 540 that is configured to be fixed in place in relation to the hopper assembly 200 by at least connection parts 560, 562 and clamp 564.

The support plate 540 may be pivotably connected to pivot bar 290 (e.g., via a bushing 541 which may be a bearing, such as a rotatable-element bearing). Accordingly, the support plate 540 and hopper assembly 200 fixed thereto may be configured to be adjustably pivoted 544 around pivot bar 290 and thus pivoted in relation to the fixed support structure 299 and thus in pivoted in relation to an external structure such as the rotatable drum 1125.

In some example embodiments, the adjustment plate 510 may be configured to pivot in relation to the support plate 540 and thus in relation to the hopper assembly 200 based on pivoting 514 around the pivot bar 290. As shown in FIGS. 4A-14B, the adjustment plate 510 may be adjustably coupled to the support plate 540 (and adjustably positioned in relation thereto) by adjustable bearing 550, which may be a threaded adjustment bearing as shown. The adjustable bearing 550 may be adjusted (e.g., based on rotation of one or more threaded nuts on the threaded shaft of the adjustable bearing 550 as shown) to adjust a magnitude of a spacing 550_S between connected portions of the adjustment plate 510 and the support plate 540, thereby adjusting a pivot 514 of the adjustment plate 510 around pivot bar 290 in relation to the support plate 540, and thus adjusting a position of the adjustment plate 510 in relation to the support plate 540.

As a result of adjusting a position of the adjustment plate 510 in relation to the support plate 540 via the pivoting 514, a position of the drive plate 500 in relation to the hopper assembly 200 may be adjusted. Accordingly, based on adjustment of the adjustment plate 510 position in relation to the support plate 540 position, a position of the paddle 400, which is fixed in position in relation to the drive plate 500 and thus the adjustment plate 510 via at least the bracket 480, may be adjusted in relation to a position of the hopper assembly 200, which is fixed in position in relation to the support plate 540 via the connection parts 560, 562. Accordingly, a protrusion level of the distal surface 402 of the paddle 400 from the lower surface 200_LS of the hopper assembly 200 may be adjusted, which may adjust a magnitude of contact or impingement of the distal surface 402 on an upper surface 1516 of a first elastic layer 1512*a* that covers the outer circumferential surface 1125_S of the rotatable drum 1125 when the paddle 400 is vibrating 490 during operation of the doser assembly 100. Such adjustment of the position of the paddle 400 in relation to the hopper assembly 200 may enable reduced or mitigated abrasion of the first elastic layer 1512*a* during operation of the doser assembly 100.

It will be understood that, in some example embodiments, the doser assembly 100 may not include the drive plate 500, adjustable plate 510, support plate 540, or any part or combination of parts of the doser assembly 100. For example, in some example embodiments, at least the drive plate 500 the adjustable plate 510 may be omitted from the doser assembly 100, and the paddle 400 may be connected to eh hopper assembly 200 via bracket 480 which may be directly connected to the hopper assembly 200, and the bushing 350 of the vibration transmission assembly 300 may be connected (e.g., directly or indirectly connected) to the support plate 540 to hold the vibration transmission assembly in place in relation to the support plate 540. In some example embodiments, the support plate 540 may be omitted and/or may be integrated with the fixed support structure 299, such that both the hopper assembly 200 (to which the paddle 400 may be coupled directly or indirectly via bracket 480) and the vibration transmission assembly 300 may be connected (e.g., directly or indirectly) to the fixed support structure 299.

Still referring to FIGS. 4A-14B, the doser assembly 100 may include an adjustable swivel joint 580 and adjustable clamp 264 between connection parts 560 and 562, where connection part 560 is fixed to the support plate 540, connection part 562 is fixed to the hopper assembly 200, and adjustable clamp 264 is configured to tighten and loosen the engagement between the connection parts 560 and 562 to adjustably fasten (e.g., fix) the support plate 540 to the hopper assembly 200 via the connection parts 560 and 562 via adjustable clamp 264. The adjustable swivel joint 580 may enable adjustment of the orientation of the hopper assembly 200 (e.g., rotation of the hopper assembly 200) in relation to the support plate 540. Accordingly, it will be understood that the hopper assembly 200 may be configured to be pivotably coupled to the support plate 540 via the adjustable swivel joint 580 through the connection parts 560 and 562. Additionally, because the support plate 240 is coupled to the fixed support structure 299, and the fixed support structure is configured to be fixed to a stationary support structure such as a frame of the rotatable drum 1125, it will be understood that the hopper assembly 200 may be configured to be pivotably coupled to the fixed support structure 299, pivotably coupled to the stationary support structure plate 540, and/or pivotably coupled to the stationary support structure in relation to the rotatable drum 1125, via at least the swivel joint 580 through the connection parts 560 and 562.

As the support plate 540 may be fixed in relation to a stationary support structure through at least the pivot bar 290 and fixed support structure 299 as shown, and as the rotatable drum 1125 may be further fixed in position to the stationary support structure (e.g., in relation to the apparatus 1000 as described herein), adjustment of orientation of the hopper assembly 200 in relation to the support plate 540 may adjust an orientation of the lower surface 200_LS of the hopper assembly 200 in relation to the outer circumferential surface 1125_S of the rotatable drum 1125 so that the lower surface 200_LS (which may be concave) may be concentric with the outer circumferential surface 1125_S of the rotatable drum 1125. Where the lower surface 200_LS includes concave lower surfaces 202_LS and 204_LS as described herein, the adjusting of orientation of the hopper assembly 200 may enable adjustment of the complementary (e.g., flush, concentric, etc.) fit between the concave lower surfaces 202_LS and 204_LS in relation to the curvature of the outer circumferential surface 1125_S when the hopper assembly 200 is on the rotatable drum 1125 as shown.

As shown, the connection parts 560 and 562 may each include respective cylindrical parts, where the cylindrical part of the connection part 562 may extend coaxially within the cylindrical part of the connection part 560, so that the cylindrical part of the connection part 562 may rotate around its central longitudinal axis 568, to implement the adjustable orientation of the hopper assembly 200 that is connected to the connection part 562 in relation to the support plate 540 that is connected to the connection part 560. The central longitudinal axis 568 of the cylindrical part of the connection part 562 may be coaxial with the central axis of the cylindrical part of the connection part 560, such that longitudinal axis 568 may be understood to be a common central longitudinal axis of both of the connection parts 560 and 562. Accordingly, the hopper assembly 200 may be understood to be adjustably rotated and/or re-oriented in relation to the support plate 540 based on the connection parts 560 and 562 being adjustably rotated/re-oriented in relation to each other around central longitudinal axis 568. However, it will be understood that example embodiments are not limited thereto, and the connection parts 560 and 562 may have different central longitudinal axes that may be parallel to each other and the connection parts 560 and 562 may be configured to be rotated around one or both of their respective longitudinal axes and/or a separate axis that is different from the longitudinal axes of connection parts 560 and 562.

As further shown, the adjustable clamp 264 may be fixed to the connection part 560 and may be configured to adjustably tighten engagement with the cylindrical part of the connection part 562 to adjustably tighten engagement between the connection parts 560 and 562. Based on the adjustable clamp 264 being loosened, the cylindrical part of connection part 562 may slide in or out of the cylindrical part of the connection part 560 in order to engage or disengage the hopper assembly 200 with the support plate 540.

As shown, the adjustable swivel joint 580 includes opposing, adjustable threaded bolts 582 that are connected to the connection part 560 and a nose piece, or nose 584 that is connected to the connection part 562 and is configured to extend between opposing ends of the threaded bolts 582. The threaded bolts 582 may be adjustably threaded in relation to the connection part 560 to adjust a position and/or size of a gap 582_G between the opposing ends of the threaded bolts 582 in which the nose 584 may be held. As shown, the threaded bolts 582 may be adjusted to engage opposite surfaces of the nose 584 to hold the nose 584 in place in relation to the threaded bolts 582, thereby holding the connection part 562 and hopper assembly 200 in a fixed orientation in relation to the connection part 560 and the support plate 540.

In some example embodiments, because the support plate 540 is coupled to the fixed support structure 299, which may be coupled to a stationary structure to which the rotatable drum 1125 may be coupled, adjustment of the orientation of the connection part 562 in relation to the connection part 560 via the adjustable swivel joint 580 may implement adjustment of the relative orientation of the hopper assembly 200 in relation to the rotatable drum 1125, thereby enabling the lower surface 200_LS thereof to be adjustable oriented to be complementary (e.g., concentric) with the outer circumferential surface 1125_S of the rotatable drum 1125. In some example embodiments, because the relative orientation of the hopper assembly 200 in relation to the support plate 540 (and thus to the rotatable drum 1125 via a stationary support structure such as a part of the apparatus 1000 to which both the support plate 540 and the rotatable drum 1125 may be fixed) may be set by the positions of the threaded bolts 582 in relation to the connection part 560 (thereby setting a position and/or size of the gap 582_G in which the nose 584 is held in relation to the connection part 560), the orientation of the hopper assembly 200 in relation to the support plate 540 (and for example to the rotatable drum 1125) may be easily re-set when the hopper assembly 200 is detached from the support plate 540 via disengagement of connection parts 560 and 562 (e.g., for maintenance) and later re-attached via re-engagement of connection parts 560 and 562.

For example, when the clamp 564 is loosened, to loosen the engagement between connection parts 560 and 562, and connection parts 560 and 562 may be detached/disengaged from each other, the nose 584 may be removed from the gap 582_G between the threaded bolts 582, but the threaded bolts 582 may retain their position in relation to the connection part 560, thereby retaining the position of the gap 582_G between opposing ends of the threaded bolts 582 in relation to the connection part 560. When the connection part 562 is re-engaged with the connection part 560, the connection part 562 may be easily rotated in relation to the connection part 560 to re-align the nose 584 with the retained gap 582_G between the opposing surfaces of the threaded bolts 582 and re-place the nose 584 with the gap 582_G when the connection parts 560 and 562 are re-engaged and the adjustable clamp 264 is re-tightened to fix the connection parts 560 and 562 together. As a result, ease of maintenance and re-alignment/re-orientation of the hopper assembly 200 in relation to the support plate 540 and thus to the rotatable drum 1125 may be improved by reducing effort needed to re-align and/or re-orient the hopper assembly 200 upon reattachment to the support plate 540 via connection parts 560, 562.

It will be understood that, in some example embodiments, the connection parts 560 and 562, the adjustable clamp 564, or any combination thereof may be considered to be part of the adjustable swivel joint 580, together with the threaded bolts 582 and the nose 584.

It will be understood that, in some example embodiments, the doser assembly 100 may not include the adjustable swivel joint 580, or any part or combination of parts of the doser assembly 100. For example, in some example embodiments, the hopper assembly 200 may be configured to be connected to the support plate 540 and may not be configured to rotate and/or re-orient in relation to the support plate 540 around a longitudinal axis 568.

Still referring to FIGS. 4A-14B, the support plate 540 may include a lower recess 542 into the lower surface 540_LS thereof, and the support bar 294, which may be fixed to the fixed support structure 299 at one end, may be coupled at a distal end to an eccentric 574 having a center that is radially offset from the central longitudinal axis 294_A of the support bar 294. As further shown, the eccentric 574 may be coupled to a shaft 575 that extends coaxially with the central longitudinal axis 294_A through an interior of the support bar 294, and a lever 576 may be coupled to the shaft 575 through a gap 294_G extending through the support bar 294. Additionally, as shown, the eccentric 574 may be vertically aligned with the lower recess 542 of the support plate 540 such that the inner surface 543 of the lower recess 542 may rest on the eccentric 574. The eccentric 574 may thus provide at least some of the structural support to the support plate 540 from the fixed support structure 299, via support bar 294, to hold the support plate 540 in place. As a result, a relative position of the support plate 540 in relation to the fixed support structure 299 (and thus, in some example embodiments, to the rotatable drum 1125) may be based on the position of the engagement between the eccentric 574 and the inner surface 543 of the lower recess 542 in relation to the fixed support structure 299 and support bar 294.

In some example embodiments, the lever 576 may be moved 578 through the gap, to thus rotate the shaft 575 and thus to rotate 548 the eccentric 574 coupled to the shaft 575 at the distal end of the support bar 294. As the center of the eccentric 574 is radially offset from the central longitudinal axis 294_A while the shaft 575 is coaxial to the central longitudinal axis 294_A, rotation 548 of the eccentric 574 due to rotation of the shaft 575 may cause the eccentric 574 to move upwards or downwards vertically (e.g., in the Z direction), thereby raising or lowering a position of the inner surface 543 of the lower recess 542 that is in contact with the eccentric 574. As a result, the portion of the support plate 540 that is proximate to the recess 542 may be adjustably raised or lowered (in the Z direction), thereby adjustably pivoting 544 the support plate 540 around the pivot bar 290. Therefore, the doser assembly 100 may be configured to enable, via movement 578 of the lever 576 and resultant rotation of the eccentric 574, adjustment and/or fine-tuning of the position of the support plate 540, and thus of the hopper assembly 200 that may be coupled thereto via connection parts 560 and 562, in relation to the support bar 294 and thus to the fixed support structure 299 and any stationary structures coupled thereto (and, for example, the rotatable drum 1125). Such enabled adjustment of the position of the support plate 540 and hopper assembly 200 may enable the hopper assembly 200 to be lifted/lowered a relatively small distance to enable small adjustments/inspections of the rotatable drum 1125 and/or first material 1500 thereof, enable various maintenance operations, enable various adjustments to the doser assembly 100 and/or apparatus 1000 thereof to adjust operational performance, or the like.

Still referring to FIGS. 4A-14B, the doser assembly 100 may include a kickstand 570 that is pivotably coupled to support plate 540 via pivot 577 at a first end thereof and includes a recess 572 at an opposite, second end 570_D thereof. As shown in at least FIG. 6C, the kickstand 570 may rest in place at the second end on an end portion 294_EP of the support bar 294 during operation of the doser assembly 100. In some example embodiments, the support plate 540 may be configured to pivot 544 around the pivot bar 290 such that the inner surface 543 of the recess 542 disengages from the eccentric 574 and the distal end 540_D of the support plate 540 that is distal from the pivot bar 290 rises vertically (e.g., in the Z direction), which may cause the pivot 577 to move vertically to enable the kickstand 570 to pivot 579 around the pivot 577 so that the second end 570_D of the kickstand 570 that is distal from the pivot 577 falls downwards (e.g., in the Z direction) to contact the outer surface of the end portion 294_EP of the support bar 294, so that the recess 572 of the kickstand 570 receives and engages the end portion 294_EP. The kickstand 570 may then rest on the support bar 294 via the engagement between the recess 572 and the end portion 294_EP, thereby holding the support plate 540 in place in an elevated, pivoted position where the distal end 540_D is elevated in relation to a rest position and where the inner surface 543 remains disengaged from the eccentric 574. When the support plate 540 is in such an elevated, pivoted position, the hopper assembly 200 is further lifted into an elevated position that is disengaged from the rotatable drum 1125, based on the connection between the hopper assembly 200 and the support plate 540 via connection parts 560 and 562, thereby enabling ease of maintenance on the hopper assembly 200, the rotatable drum 1125, any combination thereof, or the like. When it is desired to return the support plate 540 to a position where the support plate 540 rests on the eccentric 574 and where the hopper assembly 200 is returned to be on the rotatable drum 1125, the distal end 540_D may be raised to disengage the recess 572 of the kickstand 570 from the end portion 294_EP of the support bar 294, and which point the distal end 570_D of the kickstand 570 may be raised to pivot 579 the kickstand 570 upwards, and the support plate 540 may be pivoted 544 downwards to rest the inner surface 543 of the recess 542 on the eccentric 574 and to return an outer surface of the kickstand 570 to rest on the end portion 294_EP, thereby, in some example embodiments, returning the support plate 540 and hopper assembly 200 to an operation position in which the doser assembly 100 may be configured to operate.

In some example embodiments, the doser assembly 100 may include an actuator 590, which may be an actuator such as an air cylinder that raises/lowers a piston based on a compressed air supply, which may apply force 592 against a lower surface 540_LS of the support plate 540 (e.g., via said piston of an air cylinder actuator 590 engaging the lower surface 540_LS) to adjustably raise/lower the distal end 540_D of the support plate 540 and thus adjustably pivot 544 the support plate 540 around pivot bar 290. The actuator 590 may thus enable adjustable positioning of the support plate 540 and thus the hopper assembly 200 connected thereto (e.g., to move the support plate 540 and hopper assembly 200 to/from an elevated position where the kickstand 570 recess 572 engages with the end portion 294_EP to hold the support plate 540 and hopper assembly 200 in place in the elevated position) with reduced manual lifting/adjustment of the support plate 540 and hopper assembly 200.

It will be understood that, in some example embodiments, the doser assembly 100 may not include the eccentric 574, the shaft 575, the lever 576, the kickstand 570, the actuator 590, or any part or combination of parts of the doser assembly 100. For example, in some example embodiments, the eccentric 574, shaft 575, and lever 576 may be omitted such that at least a distal part of the end portion 294_EP of the support bar 294 is configured to be received into the lower recess 542 of the support plate 540 and contact the inner surface 543 so that the support plate 540 may rest directly on at least the distal part the end portion 294_EP.

Still referring to FIGS. 4A-14B and further referring to FIGS. 14A-14B, the doser assembly 100 may include a chute 600 that is coupled to the hopper assembly 200 and which is configured to direct filler material into the hopper opening 200_O, for example from a filler material conveyor system 1110 of a filler material distribution system 1200 as described herein.

As shown, the hopper opening 200_O may have a top opening 200_TO, and the chute 600 may be coupled to the hopper assembly 200 to be configured to direct filler material 1300 received from the filler material conveyor system 1110 into the hopper opening 200_O via the top opening 200_TO.

As shown, the hopper chute 600 may include chute plates 600_1, 600_2, 600_3, and 600_4 that collectively at least partially define the outer body of the chute 600 and whose respective inner surfaces collectively define an interior volume space 616 of the chute 600 that extends from a chute top opening 600_TO to a chute bottom opening 600_BO. As shown, the chute top opening 600_TO may be larger than the chute bottom opening 600_BO so that the chute 600 is configured to funnel a flow 1302 of filler material 1300 down into the hopper opening 200_O through the chute bottom opening 600_BO, but example embodiments are not limited thereto.

As further shown, the hopper assembly 200 may include a diverter plate 620 that extends through the interior volume space 616 of the hopper chute 600 (e.g., downwards and into the interior volume space 616 from one edge of the top chute opening 600_TO as shown in FIGS. 4A-14B) to at least partially partition the interior volume space 616 into two separate volume spaces: a first volume space 612 and a second volume space 614. The first volume space 612 is open (e.g., directly exposed) to both the top and bottom chute openings 600_TO and 600_BO. The second volume space 614 is at least partially partitioned from the first volume space 612 by the diverter plate 620 and is completely partitioned from (e.g., isolated from direct exposure to) the chute top opening 600_TO while remaining open to the chute bottom opening 600_BO. As a result, the hopper chute 600 and the diverter plate 620 may collectively define, within the interior volume space 616 of the hopper chute 600, a first volume space 612 that is configured to direct a flow of filler material 1300 into the hopper opening 200_O via the top chute opening 600_TO and the bottom chute opening 600_BO and a second volume space 614 that is partitioned from the top chute opening 600_TO by the diverter plate 620. As shown, the diverter plate 620 at least partially partitions the first and second volume spaces 612 and 614 from each other, and the diverter plate 620 is configured to isolate the second volume space 614 from the flow 1302 of filler material 1300 into the hopper opening 200_O via the first volume space 612. As a result, the second volume space 614 remains open to at least a portion of the hopper opening 200_O via the bottom chute opening 600_BO without a flow 1302 (e.g., stream) of filler material 1300 entering the second volume space 614 from the top chute opening 600_TO.

Referring now to FIGS. 4A-14B and 14A-14B, the doser assembly 100 may include a first level sensor device 710 and a second level sensor device 720. Each of the first and second level sensor devices 720 may be a level sensor device configured to generate sensor data indicating a distance from the sensor to a target and thus indicating a level of a material in a region. The first and second level sensor devices 710 and 720 may be any known type of level sensor device. For example, each of the first and second level sensor devices 710 and 720 may be a laser rangefinder device that generates sensor data indicating a distance from the device to and from a target based on determining a time of flight of a laser beam emitted from the device and reflected from the target back to the device to be detected at the device based on the reflection. The first and second level sensor devices 710 and 720 may be a same type of sensor device or different types of sensor devices.

As shown in at least FIG. 14A, the doser assembly 100 may be configured to direct a flow 1302 of filler material 1300 received from a filler material conveyor system 1110 into the hopper opening 200_O via the hopper chute 600. The filler material 1300 received into the hopper opening 200_O may collect as filler material 2200 at the bottom of the hopper opening 200_O on the portion of the rotatable drum 1125 and/or first web of first material 1500 therein, including first elastic layer 1512*a*, that are exposed at the bottom of the hopper opening 200_O. As shown, at least some of the filler material 2200 may fall into one or more divots 1400 of the rotatable drum 1125 that include separate, respective first web portions (e.g., separate, respective portions of the first elastic layer 1512*a* that are drawn into the divots 1400 under vacuum) that are exposed to the hopper opening 200_O to fill the divots 1400, thereby forming filled first web portions containing portions 2280 of filler material within filled divots 1400_2.

As further shown in at least FIG. 14A, the level 2200_L of filler material 2200 in the hopper opening 200_O may build up to various levels in various regions of the hopper opening 200_O on the divots 1400, and the weight of the filler material 2200 on the divots 1400 in the hopper opening 200_O may push some of the filler material 2200 into one or more of the exposed empty divots 1400_1 (which may include separate, respective first web portions the first material 1500, including separate, respective portions of first elastic layer 1512*a*, drawn therein) to fill the divots 1400 to establish filled divots 1400_2 with filled first web portions having portions 2280 of filler material. The weight of the filler material 2200 may further compress the portions 2280 of filler material in the filled divots 1400 to establish a more uniform density of filler material within the divots 1400.

As shown in at least FIGS. 14A-14B, the first level sensor device 710 is configured to direct a first sensor beam 712 into a first region 2210_1 of the hopper opening 200_O that is proximate to the paddle 400 and distal from the bottom chute opening 600_BO. Accordingly, the first level sensor device 710 may be configured to generate first sensor data that is associated with (e.g., indicates) a first level 2200_L1 of filler material 2200 in the first region 2210_1 of the hopper opening 200_O.

As shown in at least FIGS. 14A-14B, the second level sensor device 720 is configured to direct a second sensor beam 722 into a second region 2210_2 of the hopper opening 200_O that at least partially vertically overlaps the bottom chute opening 600_BO and is distal from the paddle 400 in relation to the first region 2210_1. Accordingly, the second level sensor device 720 may be configured to generate second sensor data that is associated with (e.g., indicates) a second level 2200_L2 of filler material 2200 in the second region 2210_2 of the hopper opening 200_O.

Each of the first and second level sensor devices 710 and 720 may be configured to generate sensor data indicating a value of the respective first and second levels 2200_L1 and 2200_L2 based on empirically based calibration. Each level sensor device 710 and 720 may be configured to generate sensor data indicating a level value based on detecting reflection of a respective sensor beam 712 and 722 emitted therefrom. In some example embodiments, each level sensor device may be calibrated based on causing the sensor device to generate sensor data when filler material 2200 is absent from the hopper opening and identifying the level value in such sensor data as being associated with a "zero" level value (e.g., a level value of 0) and also causing the sensor device to generate sensor data when filler material 2200 is filled in the hopper opening 200_O to a maximum level 2200_L (e.g., a level of the top opening 200_TO of the hopper opening 200_O) and identifying the level value in such sensor data as being associated with a "max" level value (e.g., a level value of 100).

In some example embodiments, sensor data values associated with various level values between empty and maximum level of filler material 2200 in the hopper opening 200_O may be generated by the first and second level sensor devices 710 and 720 based on empirically varying the levels of filler material 2200 in the various regions 2210_1 and 2210_2 of the hopper opening 200_O between known level values (e.g., known values of 2200_L1 and 2200_L2) and monitoring the resulting sensor data output by the first and second level sensor devices 710 and 720 for each known value of filler material 2200 levels 2200_L1 and 2200_L2 in the respective regions. Such various known values of the first and second levels of filler material 2200_L1 and 2200_L2 may be associated with the corresponding sensor data values generated by the respective first and second level sensor devices 710 and 720 when the filler material levels are at the known values in a look-up table that 1) associates values of first sensor data generated by the first level sensor device 710 with corresponding known first level 2200_L1 values and 2) associates values of second sensor data generated by the second level sensor device 720 with corresponding known second level 2200_L2 values. The sensor data generated by (and thus output from) a level sensor device 710 and/or 720 during operation to the doser assembly 100 may be compared with values in an empirically-determined look-up table to determine a resultant level 2200_L1 and/or 2200_L2 of filler material in the first and/or second regions 2210_1 and/or 2210_2 of the hopper opening 200_O. In some example embodiments, the look-up table may store a set of discrete values of first and second levels of filler material 220_L1 and 2200_L2 that are associated with separate, respective data values generated by the respective first and second level sensor devices 710 and 720, while the first and/or second level sensor devices 710 and 720 may generate a sensor data value that is between the discrete sensor data values stored in the look-up table and thus corresponds to a value of a first and/or second level of filler material 2200_L1 and/or 2200_L2 that is not stored in the look-up table. Accordingly, determination of a resultant level during operation to the doser assembly 100 may include comparing sensor data (e.g., a sensor data value) generated by (and thus output from) a level sensor device 710 and/or 720 with the look-up table to determine the two stored sensor data values that the generated sensor data value is between (e.g., respective high and low stored sensor data values that are the respective closest discrete sensor data value above and below the generated sensor data value in the look-up table). An interpolation operation may be performed between these two stored sensor data values in view of the generated sensor data value, along with the two filler material level values that respectively correspond to the two stored sensor data values in the look-up table, to determine a resultant filler material level value 2200_L1 and/or 2200_L2 that corresponds to the generated sensor data value, according to, for example, equation (1):

$$y = y_1 + (x - x_1)\frac{(y_2 - y_1)}{(x_2 - x_1)} \qquad (1)$$

where, in equation (1), “x” is the generated sensor data value of sensor data received from a level sensor device (e.g., 710 and/or 720) during operation of the doser assembly 100, $x_1$ and $x_2$ are the stored sensor data values in the look-up table that the generated sensor data value “x” is between in value magnitude, $y_1$ and $y_2$ are the respective filler material level values that are associated with the stored sensor data values $x_1$ and $x_2$, respectively, in the look-up table, and “y” is the resultant filler material level corresponding to the generated sensor data value “x.”

Referring to FIGS. 14A-14B, the first level sensor device 710 is configured to direct the first sensor beam 712 to a location in the hopper opening 200_O in the first region 2210_1 that is proximate to (e.g., adjacent to) the paddle 400, so that the first level sensor device 710 is configured to generate first sensor data indicating a value of the first level 2200_L1 of filler material 2200 on the divots 1400 under the hopper opening 200_O adjacent to the paddle 400. As shown, the first level sensor device 710 is configured to direct the first sensor beam 712 to a first region 2210_1 that is distal from the bottom chute opening 600_BO so that the sensor data generated by the first level sensor device 710 is influenced by at least the vibration of the paddle 400 to retain filler material 2200 in the hopper opening 200_O and on the filled divots 1400_2 of the rotatable drum 1125 on which the doser assembly 100 is located.

Referring to FIGS. 14A-14B, the second level sensor device 720 is configured to direct the second sensor beam 722 to a location in the hopper opening 200_O in the second region 2210_2 that is proximate to (e.g., adjacent to) and/or vertically overlapping the bottom chute opening 600_BO and further distal from the paddle 400, so that the second level sensor device 720 is configured to generate second sensor data indicating a value of the second level 2200_L2 of filler material 2200 on the divots 1400 in a second region 2210_2 that is under the hopper opening 200_O vertically overlapping the bottom chute opening 600_BO and/or distal from the paddle 400, which may be a region in which the flow 1302 of filler material 1300 is received into the hopper opening 200_O from the filler material distribution system 1200.

As shown, the second level sensor device 720 is configured to direct the second sensor beam 722 through the second volume space 614 of the hopper chute 600 that is partitioned from the top chute opening 600_TO, and thus isolated from direct exposure to the top chute opening 600_TO, so that interference by particles of the flow 1302 of filler material 1300 falling into the hopper opening 200_O via the top chute opening 600_TO and the first volume space 612 of the chute 600 is reduced or minimized. Thus, the accuracy and reliability of second sensor data generated by the second level sensor device 720, indicating a second level 2200_L2 of filler material in the second region 2210_2 of the hopper opening 200_O may be improved, thereby enabling improved performance of a control system that utilizes the second sensor data generated by the second level sensor device 720 as an input process variable may be improved.

As shown, the second level sensor device 720 may be connected to the diverter plate 620 independently of the chute 600, and the first level sensor device 710 may be connected to the bracket 480. But example embodiments are not limited thereto, and the first and second level sensor devices 710 and 720 may be connected to any parts of the doser assembly 100. In some example embodiments, one or both of the first and second level sensor devices 710 and 720 may be connected to part of the apparatus 1000 that are external to the doser assembly 100 and may be connected to said parts independently of the doser assembly 100. In some example embodiments, the hopper chute 600 may be omitted from the doser assembly 100 and the second level sensor device 720 may be connected to the hopper assembly 200 or some other part of the doser assembly 100 (e.g., support plate 540) via a separate bracket or connection structure.

While the example embodiments of the doser assembly 100 show the chute 600, diverter plate 620, and first and second level sensor devices 710 and 720 in a doser assembly that includes the paddle 400, vibration transmission assembly 300, adjustable plate 510, drive plate 500, support plate 540, and the like, it will be understood that some or any of the elements of the doser assembly 100 as shown in FIGS. 4A-14B may be omitted from the doser assembly 100. For example, in some example embodiments the paddle 400 may be replaced by a rotating wheel, or a fourth hopper wall that extends between the first and second hopper walls 202 and 204 and faces the third hopper wall 206, while the first and second level sensor devices 710 and 720 and chute 600 and diverter plate 620 may remain present in the doser assembly 100. In another example, one or both of the first and second sensor devices 710 and 720 may be omitted from the doser assembly 100; such a doser assembly 100 may omit the diverter plate 620 from the chute 600 and may further omit the chute 600.

Figure 16:
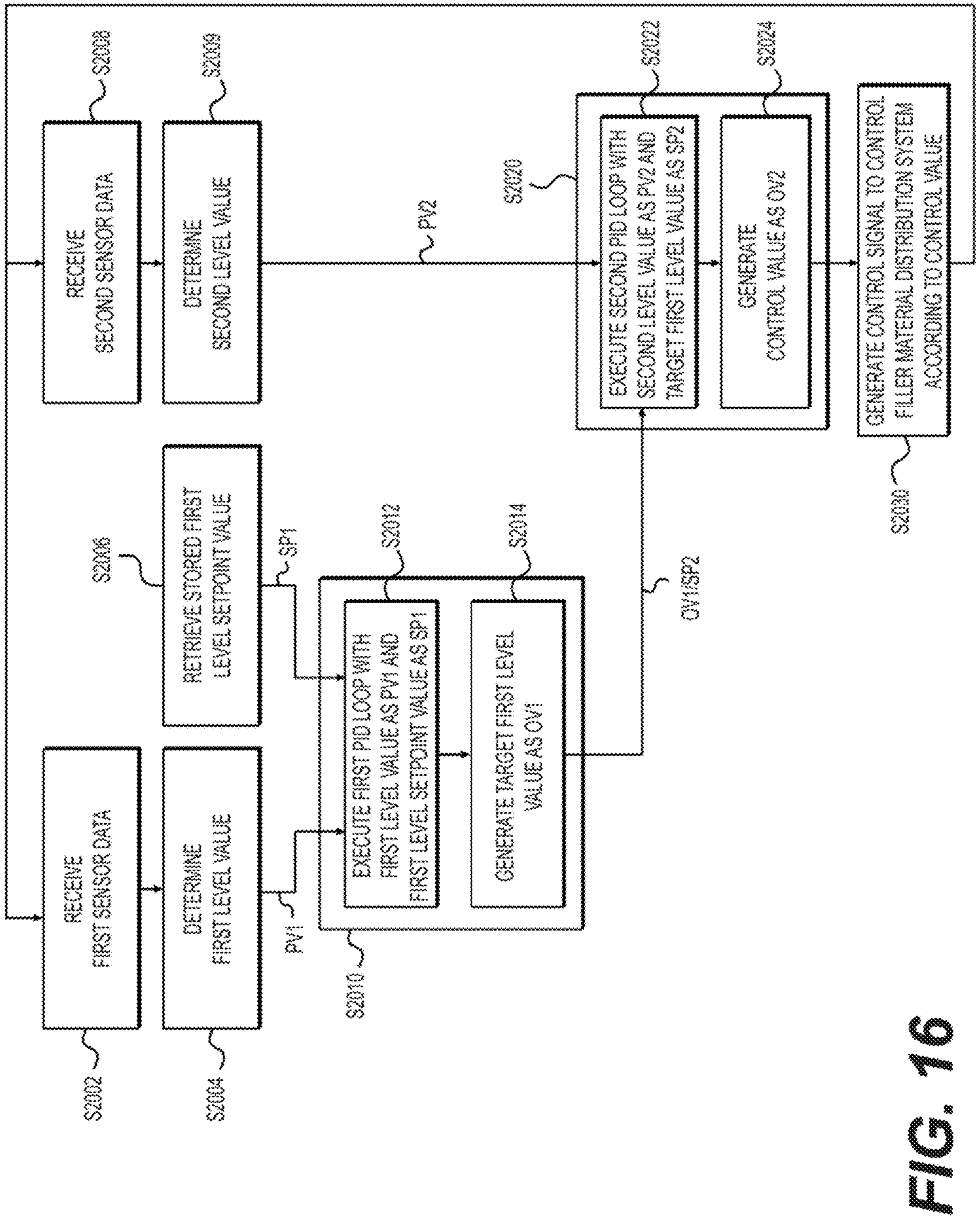
FIG. 16 is a flowchart illustrating a cascade control method according to some example embodiments.
Figure 17:
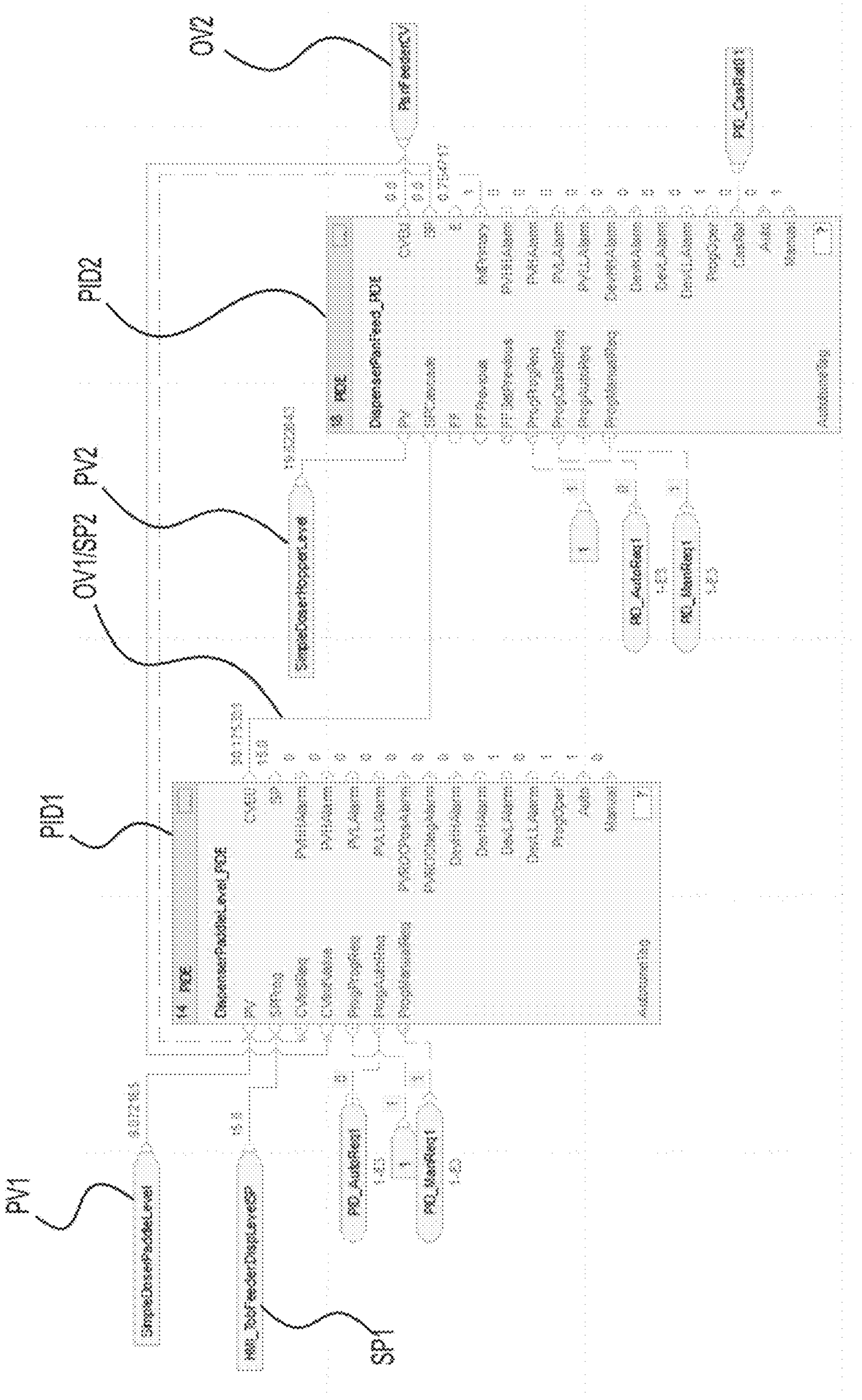
FIG. 17 is a schematic illustrating a cascade control method according to some example embodiments.

FIG. 15 is a schematic view of an apparatus 1000 including a filler material distribution system 1200, a doser assembly 100, and a control system 106 according to some example embodiments. FIG. 16 is a flowchart illustrating a cascade control method according to some example embodiments. FIG. 17 is a schematic illustrating a cascade control method according to some example embodiments. The apparatus 1000 shown in FIG. 23 may the same as the apparatus 1000 according to any of the example embodiments.

The control system 106 shown in FIG. 15 may be the same as the control system 106 according to any example embodiments, including the control system 106 shown in FIG. 1A. As shown, the control system 106 may include a processor 2320 (e.g., a central processing unit, or CPU), a memory 2330 (e.g., a solid state drive, or SSD), a power supply 2340 (e.g., a connection to an external power source), and a communication interface 2350 (e.g., a wired electronic and/or communication connection interface, including for example a wired or wireless network communication transceiver) that are electrically and/or communicatively coupled together via a communication bus 2310. As shown, in some example embodiments the communication interface 2350 may include and/or may be the control interface 104 of apparatus 1000 as described herein according to some example embodiments. The control system 106 may be configured (e.g., based on memory 2330 storing a program of instructions and processor 2320 executing the program of instructions) to perform any of the methods according to any of the example embodiments.

The doser assembly 100 shown in FIG. 15 may be the same as the doser assembly 100 according to any example embodiments, including the control system 106 shown in FIGS. 4A-14B. As shown, the doser assembly 100 may include the first and second level sensor devices 710 and 720 as described herein, and the control system 106 may be electrically and/or communicatively coupled to the first and second level sensor devices 710 and 720 of the doser assembly 100 via a wired or wireless communication link and/or electronic link with the communication interface 2350.

As shown, the control system 106 may be electrically and/or communicatively coupled to the motor 360 of the doser assembly 100 and the control system 106 may be configured to generate control signals, transmitted to the motor 360 via interface 2350, to control operation of the motor 360 and thus to control vibration 490 (e.g., vibration frequency) of the paddle 400 via the vibration transmission assembly 300.

Still referring to FIG. 15, the filler material distribution system 1200 may include a filler material conveyor system 1110 (e.g., a vibrating feed pan, a conveyor belt, etc.) and a motor 1120 (e.g., a servoactuator, a drive motor, etc.) that is configured to control the filler material conveyor system 1110 to cause the filler material conveyor system 1110 to convey filler material 1300 from the hopper 1210 of the filler material distribution system 1200 to the doser assembly 100 and thus to the hopper opening 200_O via the hopper chute 600. As shown, the control system 106 may be electrically and/or communicatively coupled to the motor 1120 and the control system 106 may be configured to generate control signals, transmitted to the motor 1120 via communication interface 2350, to control operation of the motor 1120 and thus to control operation of the filler material distribution system 1200 (e.g., control operation of at least the filler material conveyor system 1110), including for example controlling a rate of speed, vibration frequency, vibration amplitude or stroke length of vibration of a vibrator feed pan of filler material conveyor system 1110, a rate of speed of a conveyor belt of filler material conveyor system 1110, or the like.

Referring generally to FIG. 15 and further referring to FIGS. 14A-14B and FIGS. 16-17, the control system 106 may be configured (e.g., based on memory 2330 storing a program of instructions, also referred to herein as a cascade control program 2322, and the processor 2320 executing the program of instructions) to implement a cascade control method that controls the first and second levels 2200_L1 and 2200_L2 of filler material 2200 in the first and second regions 2210_1 and 2210_2 of the hopper opening 200_O, respectively.

Referring generally to the cascade control method shown in FIGS. 16-17, which may be implemented by the control system 106 based on the processor 2320 executing a program of instructions stored at memory 2330, implementing the cascade control program 2322 may include receiving and processing first sensor data generated by the first level sensor device 710 to determine a value of the first level 2200_L1 of filler material 2200 in the first region 2210_1 of the hopper opening 200_O, executing a first proportional-integral-derivative (PID) control loop PID1 to generate a first output value OV1 indicating a target first level 2200_L1 of filler material in the first region 2210_1, based on a first process variable PV1 that is the determined value of the first level 2200_L1 of filler material 2200 and a first level setpoint value, or "first setpoint" SP1 that is a stored first level setpoint value, processing the second sensor data generated by the second level sensor device 720 to determine a value of the second level 2200_L2 of filler material in the second region 2210_2, executing a second PID control loop PID2 to generate a second output value OV2 that is a control value to control the filler material distribution system 1200 (e.g., at least the filler material conveyor system 1110), based on a second process variable PV2 that is the determined value of the second level 2200_L2 of filler material and further based on a second level setpoint value, or "second setpoint" SP2 that is the first output value OV1, and controlling the filler material distribution system 1200 (e.g., at least the filler material conveyor system 1110) based on the second output value OV2 to control both the first level 2200_L1 of filler material in the first region 2210_1 and the second level 2200_L2 of filler material in the second region 2210_2.

Still referring generally to FIGS. 16-17, the control system 106 may be configured to implement (e.g., execute) cascading PID control loops PID1 and PID2 based on using the first and second sensor data generated by the first and second level sensor devices 710 and 720 as respective input process variables PV1 and PV2 of the PID control loops PID1 and PID2.

Each PID loop PID1 and PID2 (e.g., PIDx) may operate as a control loop implementing a PID algorithm according to equation (2):

$$u(t) = K_p e(t) + K_i \int_0^t e(\tau)d\tau + K_d \frac{de(t)}{dt} \quad \text{(C)}$$

where, in equation (2), "u(t)" is the output variable (e.g., OVx) of the PID loop PIDx, "$K_p$" is a proportional gain value (e.g., a tuning parameter), "$K_i$" is an integral gain value (e.g., a tuning parameter), "$K_d$" is a derivative gain value (e.g., a tuning parameter), "t" is the present time or instantaneous time, an "τ" is a variable of integration, and "e(t)" is an error according to equation (3):

$$e(t) = SPx - PV(t)) \quad (3)$$

where, in equation (3), "SPx" is the setpoint value or "setpoint" of the PID loop PIDx, and "PV (t)" is the instantaneous value of the process variable of the PID loop PIDx. The values of the proportional, derivative, and derivative gain values $K_p$, $K_i$, and $K_d$, may be experimentally determined values and may be constant values that may be stored at the control system 106 (e.g., in memory 2330).

As shown in FIG. 17, the first PID loop PID1 may use a particular, or predetermined, first level setpoint value SP1 (e.g., a level value of "15.0" in a level value range of 0-100) which may be stored at the control system 106 and may use a received first sensor data value indicating the first level 2200_L1 of filler material (e.g., 9.072165 as shown in FIG. 17), indicated by the first sensor data generated by the first level sensor device 710, as the process variable PV1 of the first PID loop PID1. The first PID loop PID1 may implement a PID loop as described herein, using at least the process value PV1 and setpoint value SP1, to generate a first output value OV1 (e.g., 30.175331 against a setpoint value SP1 of 15.0).

As shown in FIG. 17, the output value OV1 of the first PID loop PID1 (e.g., 30.175331) may be used as the second setpoint value SP2 of the second PID loop PID2, and the second PID loop PID2 may use a value indicating the second level 2200_L2 of filler material (e.g., 19.622643 as shown in FIG. 25), indicated by the second sensor data generated by the second level sensor device 720, as the process variable PV2 of the second PID loop PID2. The second PID loop PID2 may implement a PID loop as described herein, using the process value PV2 and setpoint value SP2, to generate a second output value OV2.

The second output value OV2 may serve as a control value to control the filler material distribution system 1200 (e.g., the filler material conveyor system 1110). For example, when the filler material conveyor system 1110 includes a vibrating feed pan driven by a motor 1120 that is a servoactuator, the control value that is the output value OV2 may indicate a signal that, when received by the motor 1120, causes the motor 1120 to control the amplitude, stroke, and/or vibration frequency of vibration of the vibrating feed pan that controls the rate at which filler material 1300 is conveyed into the hopper opening 200_O of the doser assembly 100. In another example, when the filler material conveyor system 1110 includes a conveyor belt driven by a motor 1120 that is a servoactuator, the control value that is the output value OV2 may indicate a signal that, when received by the motor 1120, causes the motor 1120 to control the rate of speed of the conveyor belt that controls the rate at which filler material 1300 is conveyed into the hopper opening 200_O of the doser assembly 100. In some example embodiments, the value (magnitude) of OV2 may indicate a specific motor speed (e.g., specific rate of rotation) of motor 1120, and the control system 106 may process OV2 to generate a command signal that is transmitted to motor 1120 to cause the motor 1120 to responsively operate (e.g., rotate) as specified by OV2 (e.g., rotate at the specific motor speed indicated by OV2). In some example embodiments, the control system 106 may directly transmit OV2 to motor 1120 to cause the motor 1120 to responsively operate as specified by OV2 (e.g., rotate at a specific motor speed indicated by OV2). The motor 1120 may be configured to process OV2 and responsively adjust the motor speed to the specific motor speed indicated by OV2. In some example embodiments, the value (magnitude) of OV2 may indicate a specific property (e.g., voltage and/or current) of electrical power to be supplied to the motor 1120 to cause the motor 1120 to rotate at a specific motor speed, and the control system 106 may process OV2 and, based on OV2, adjustably control one or more properties (e.g., current, voltage, etc.) of a supply of electrical power to the motor 1120 (e.g., from a power supply such as mains power to the motor 1120 via control system 106 and/or switchgear controlled by the control system 106) to cause the motor 1120 to rotate at the specific motor speed. The control system 106 may include any known power supply circuitry (e.g., a voltage regulator) configured to adjust properties (e.g., voltage and/or current) of electrical power supplied to various motors of the apparatus 1000, including motor 1120.

Referring now to FIG. 16, the control system 106 may be configured to implement the method shown in FIG. 16 to implement the cascade control program 2322 as described herein, for example based on the processor 2320 executing a program of instructions stored at the memory 2330 (e.g., the program 2322).

At S2002, the control system 106 receives the first sensor data generated by the first level sensor device 710. At S2004, the control system 106 processes the first sensor data to determine a value of the first level 2200_L1 of filler material in the first region 2210_1 of the hopper opening 200_O (e.g., determine a first level value of the filler material in the first region 2210_1) at a given instantaneous time "t". As shown, the determined first level value may be input into the first PID loop PID1 as a first process variable PV1 of the first PID loop PID1. At S2006 a stored first level setpoint value, indicating a target value of the first level 2200_L1 of filler material in the first region 2200_1 of the hopper opening 200_O, may be retrieved and input into the first PID loop PID1 as a first setpoint SP1 of the first PID loop PID1.

At S2010, the first PID loop PID1 is executed (S2012) using the first process variable PV1 and the first setpoint SP1, using for example equations (2) and (3) as described herein with stored gain values to generate a first output variable OV1 of the first PID loop PID1 that indicates a target first level value indicating a target first level 2200_L1 of filler material in the first region 2210_1 (e.g., a target first level 2200_L1 of filler material in the first region 2210_1).

As shown in FIG. 16, the output variable OV1 may be input as the second setpoint SP2 of the second PID loop PID2.

At S2008, the control system 106 receives the second sensor data generated by the second level sensor device 720. At S2009, the control system 106 processes the second sensor data to determine a second level value indicating the second level 2200_L2 of filler material in the second region 2210_2 of the hopper opening 200_O (e.g., determine a second level value of the filler material in the second region 2210_2) at a given instantaneous time "t" (which may be the same time or different time associated with the first level value determined at S2004). As shown, the determined second level value may be input into the second PID loop PID2 as a second process variable PV2 of the second PID loop PID2.

At S2020, the second PID loop PID2 is executed (S2022) using the second process variable PV2 and the second setpoint SP2, using for example equations (2) and (3) as described herein with stored gain values (which may be the same or different as the gain values used for the first PID loop PID1) to generate a second output variable OV2 of the second PID loop PID2 that indicates a control value of a control signal to control the filler material distribution system 1200 (e.g., control the filler material conveyor system 1110) via control of motor 1120.

At S2030, a control signal is generated based on the value of the second output variable OV2 and transmitted to motor 1120 to cause the motor 1120 to control the filler material distribution system 1200 (e.g., control the filler material conveyor system 1110, for example control a conveyor belt speed, vibration frequency, vibration stroke, vibration amplitude, etc. of the filler material conveyor system 1110) in order to control the rate of supply of filler material 1300 (e.g., control the rate, such as mass flow rate, volume flow rate, etc. of the flow 1302 thereof) into the hopper opening 200_O.

Referring back to FIGS. 14A-14B, the filler material 1300 supplied into the hopper opening 200_O (e.g., the rate of the flow 1302 thereof) may be initially deposited into the second region 2210_2 of the hopper opening 200_O based on the second region 2210_2 vertically overlapping the bottom chute opening 600_BO, thereby increasing the value of the second level 2200_L2. The filler material 2200 may progressively move towards the paddle 400, and thus toward the first region 2210_1 in the hopper opening 200_O, as the rotatable drum 1125 and first material 1500 thereon rotate beneath the doser assembly 100. The paddle 400 may vibrate 490 to cause excess filler material 2200 that is not within the filled divots 1400_2 to remain in the hopper opening 200_O, thereby adjusting the first level 2200_L1 of filler material in the first region 2210_1 of the hopper opening 200_O that is proximate to the paddle 400.

Referring generally to FIGS. 14A-17, the cascade control program 2322 implemented by the control system 106, to control the motor 1120 based on the first and second sensor data generated by the first and second level sensor devices 710 and 720, may control the rate of the flow 1302 of filler material 1300 into the hopper opening 200_O to control the levels 2200_L1 and 2200_L2 to improve the uniformity and consistency of the amount and/or density of filler material filling the divots 1400 during operation of the apparatus 1000 over time. For example, the cascade control program 2322, when performed by control system 106 to control the apparatus 1000, may cause the second level 2200_L2 to be equal to or greater than a threshold value (which may be stored at the control system 106 and may, for example, be a second level 2200_L2 value of 19.0) so that the weight of excess filler material 2200 in the second region 2210_2 consistently pushes the filler material 2200 into the empty divots 1400_1 and compresses the portions 2280 of filler material in the filled divots 1400_2 to at least a threshold density. The cascade control program 2322 may thus further include performing the second PID loop PID2 based on the stored threshold value of level 2200_L2 to cause the determined value 2200_L2 to approach, meet, and be equal to or greater than the stored threshold value. Additionally, by keeping the second level 2200_L2 to be equal to or greater than the stored threshold value, the weight of excess filler material 2200 in the second region 2210_2 may cause the density of the portions 2280 of filler material 2200 in the filled divots 1400_2 to have improved consistency and uniformity of mass, shape, volume, density, etc. over time, thereby configuring the apparatus 1000 to form pouch products having an improved consistency and uniformity of mass, shape, volume, density, etc. over time.

Simultaneously with the above, the cascade control program 2322 implemented by the control system 106 to control the apparatus 1000 may cause a reduced time-variation in the first level 2200_L1, which may therefore further improve the uniformity and consistency of the underlying portions 2280 of filler material in the filled divots 1400_2 under the first region 2210_1 due to the weight of the first level 2200_L1 of filler material in the first region 2210_1. As a result, the cascade control program 2322 implemented by the control system 106 may cause an apparatus 1000 to produce pouch products of filler material that have improved consistency and uniformity of mass, shape, volume, density, etc. over time, thereby configuring the apparatus 1000 to form pouch products having an improved consistency and uniformity of mass, shape, volume, density, etc. over time.

It will be understood that, in some example embodiments, the apparatus 1000 configured to implement the cascade control program 2322 as described herein may include a doser assembly 100 that does not include the paddle 400, the hopper chute 600, the diverter plate 620, or any part or combination of parts of the doser assembly 100. It will be understood that, in some example embodiments, the apparatus 1000 configured to implement the cascade control program 2322 as described herein may include or omit the cleaner assembly 2600 as described herein.

Figure 18A:
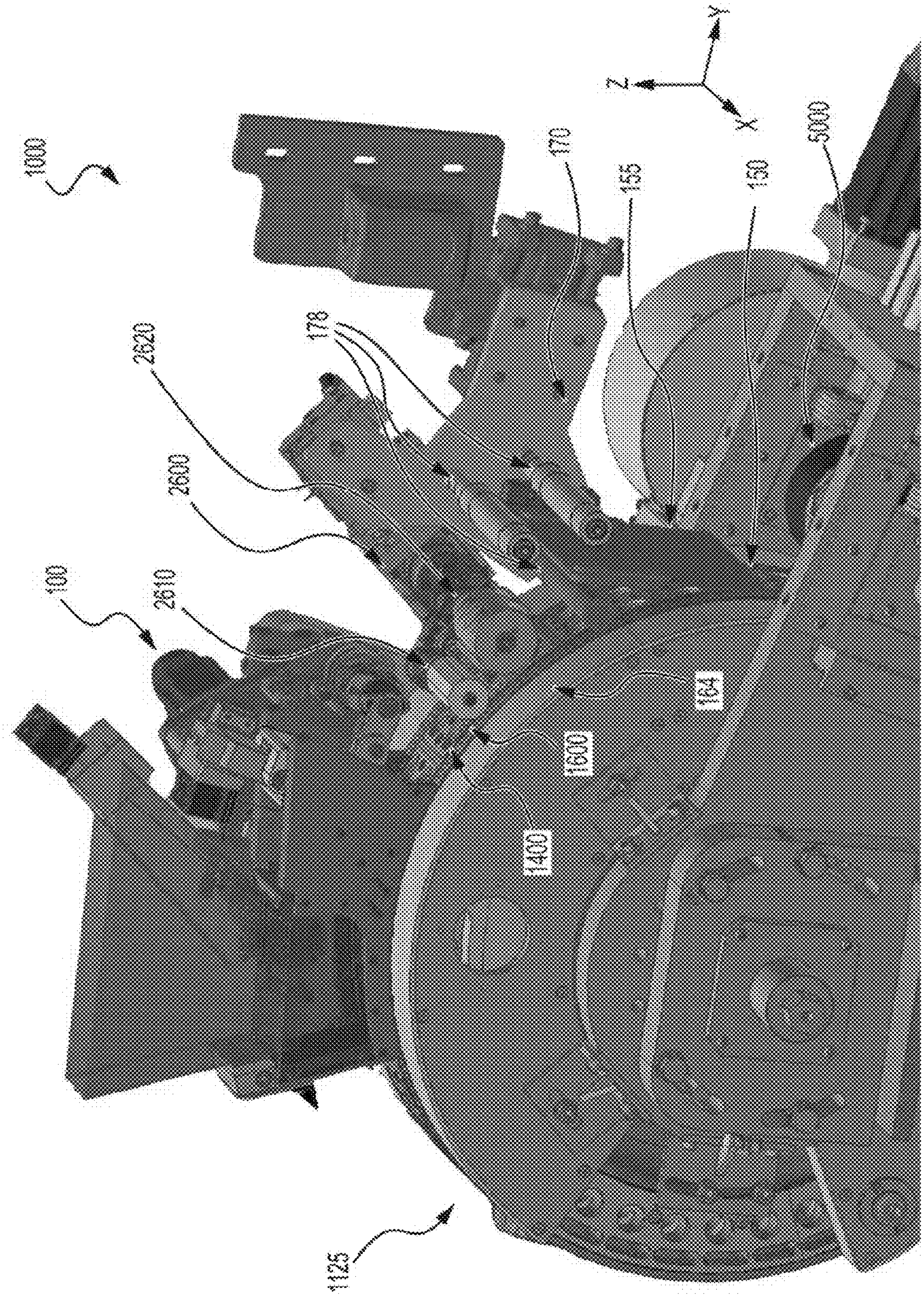
FIG. 18A is a perspective view of an apparatus 1000 including the doser assembly of FIGS. 4A-14B and a cleaner assembly 2600 according to some example embodiments.
Figure 18B:
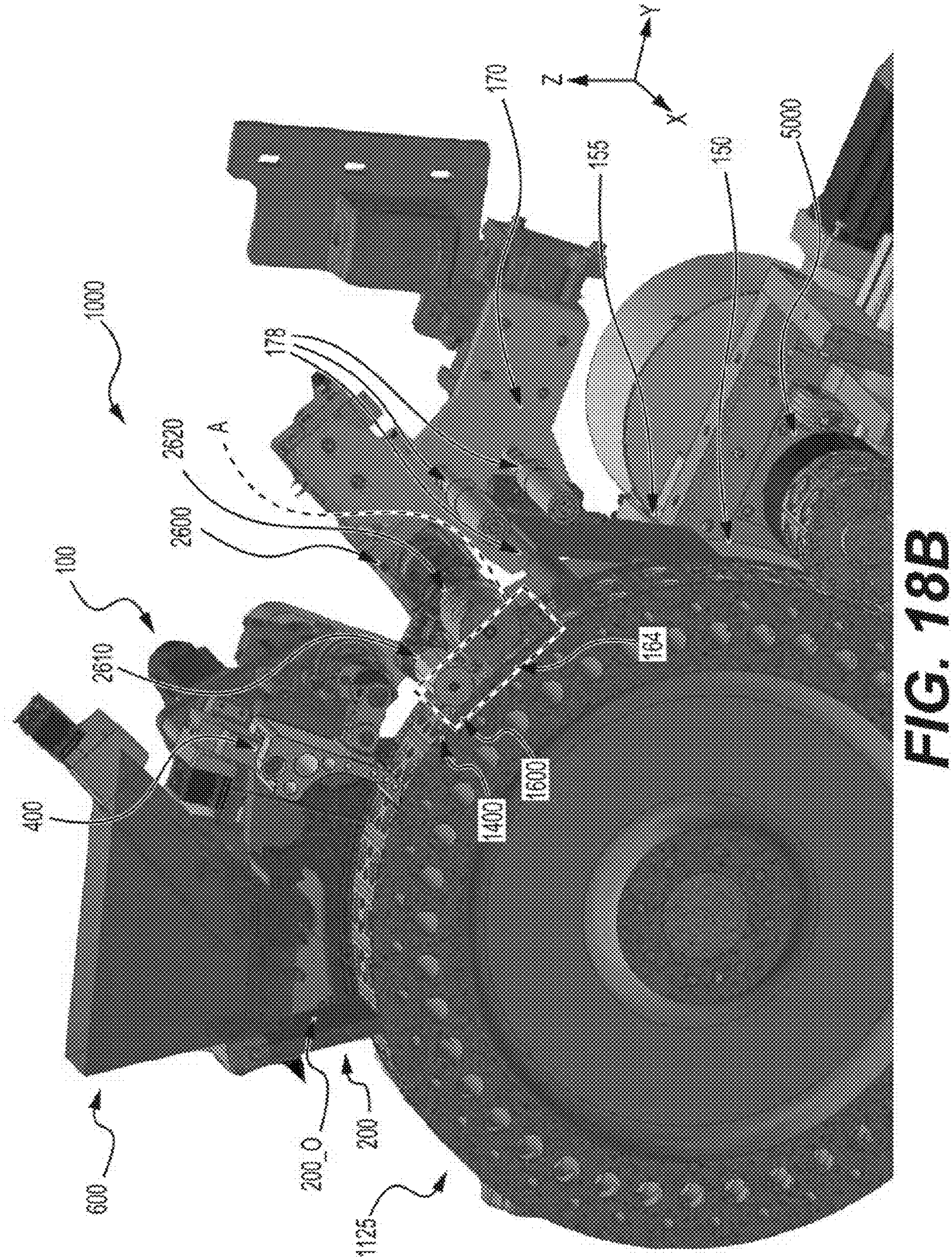
FIG. 18B is a perspective cross-section view of the apparatus 1000 of FIG. 18A.
Figure 18C:
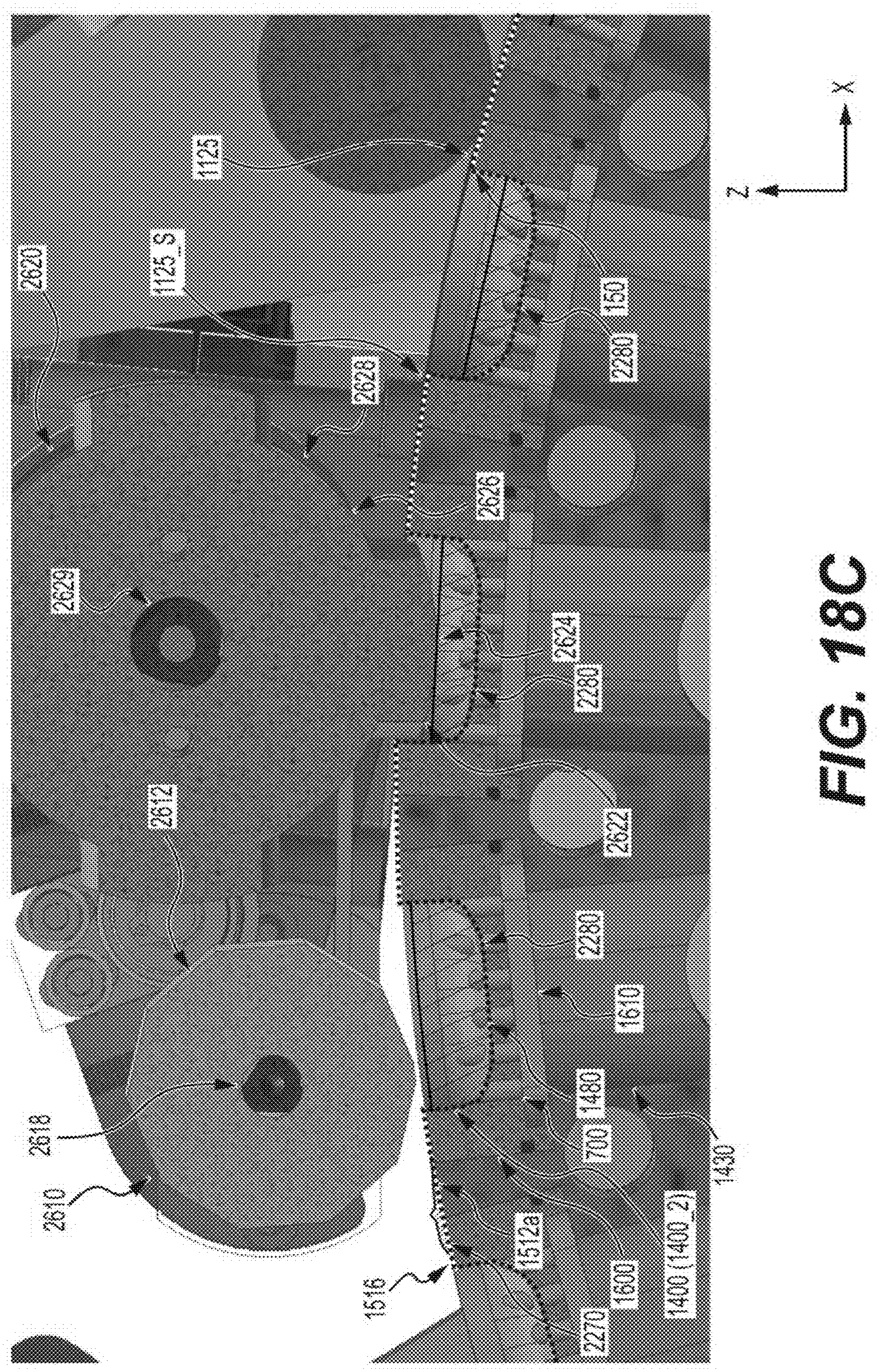
FIG. 18C is a cross-section view of region A of FIG. 18B.
Figure 19:
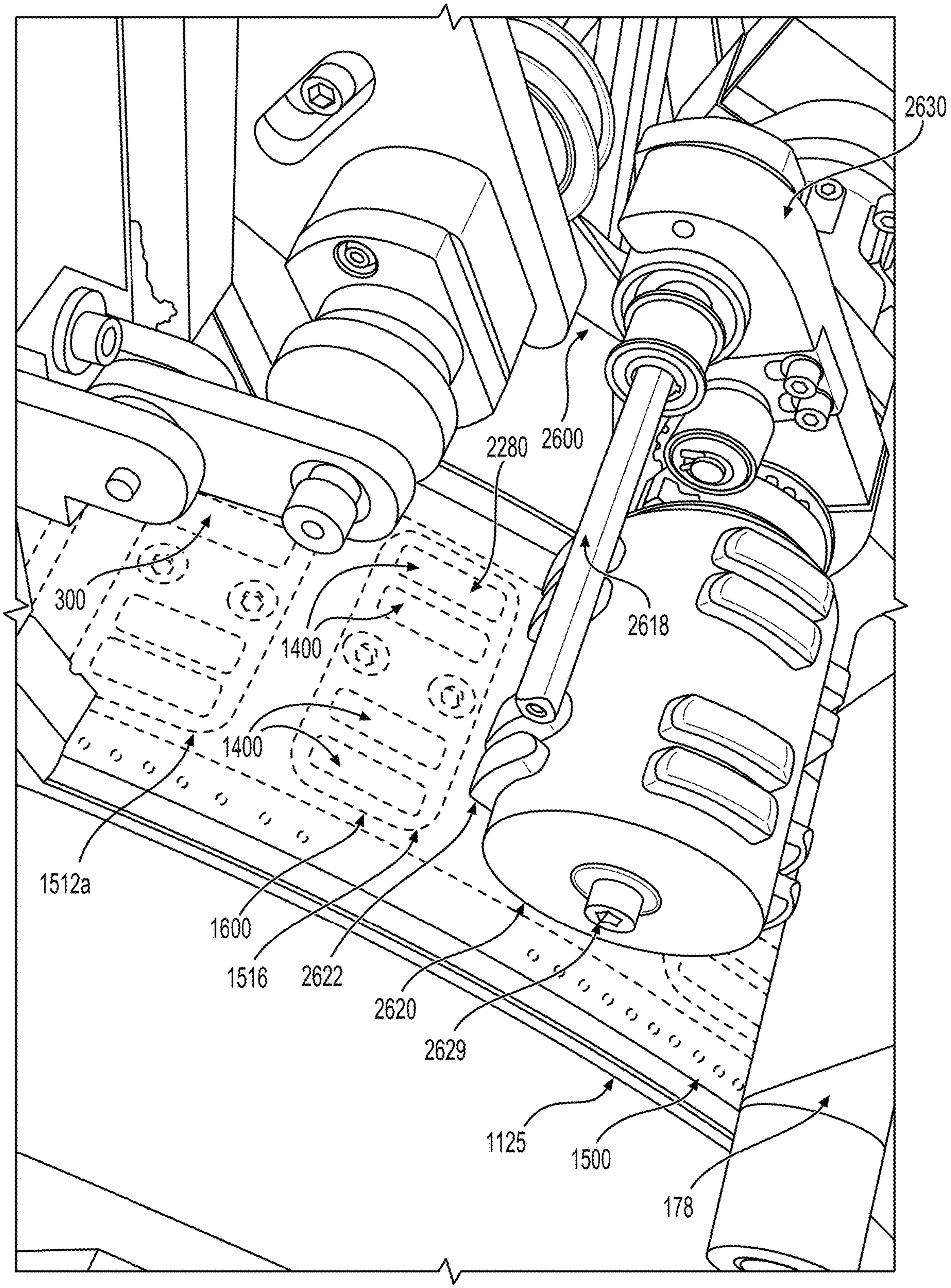
FIG. 19 is an image of an apparatus including a doser assembly, rotatable drum, and cleaner assembly with partially removed and lifted cleaner roller of an apparatus according to some example embodiments.
Figure 20A:
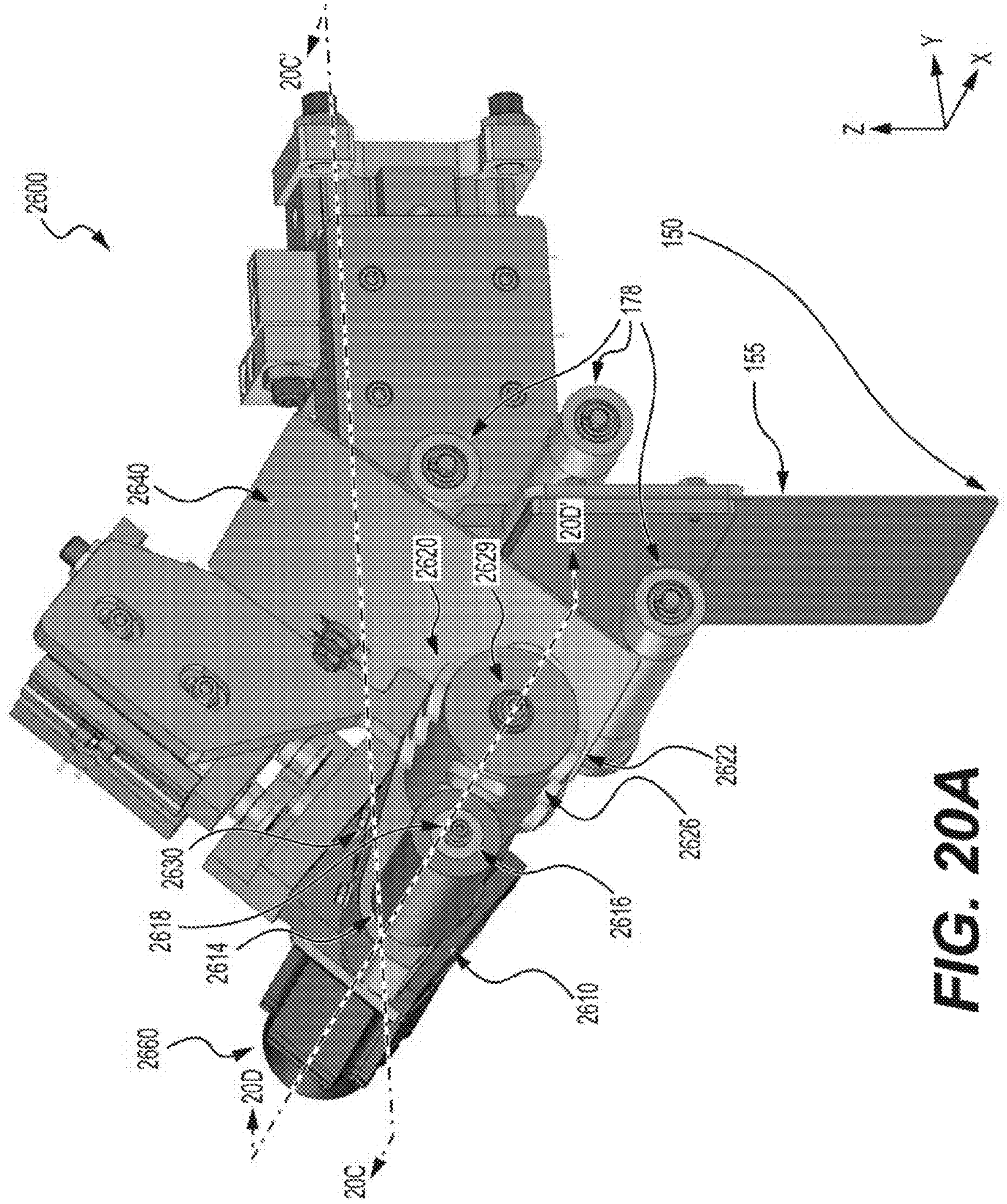
FIGS. 20A and 20B are perspective view of a cleaner assembly 2600 according to some example embodiments.
Figure 20B:
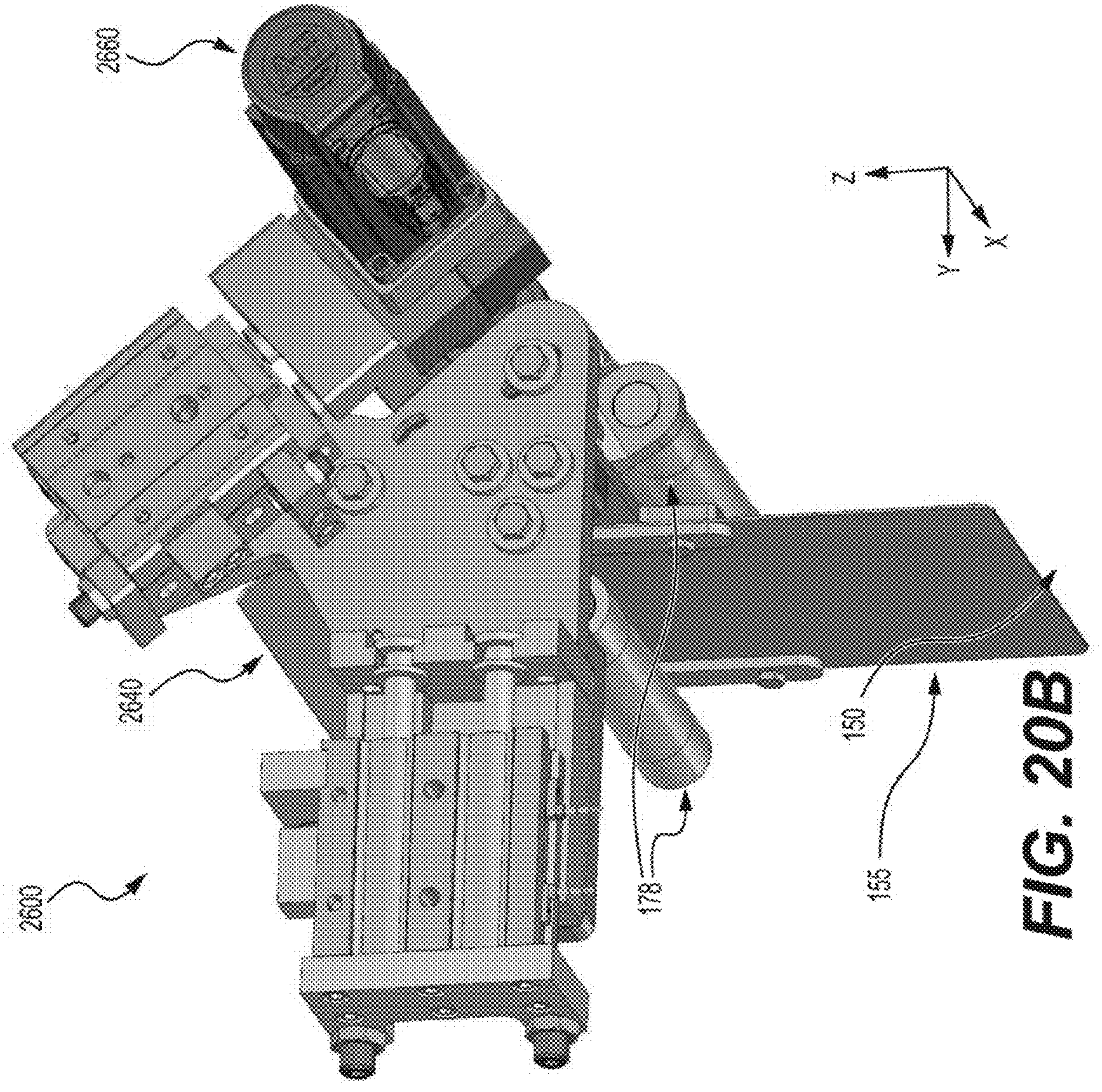
Figure 20C:
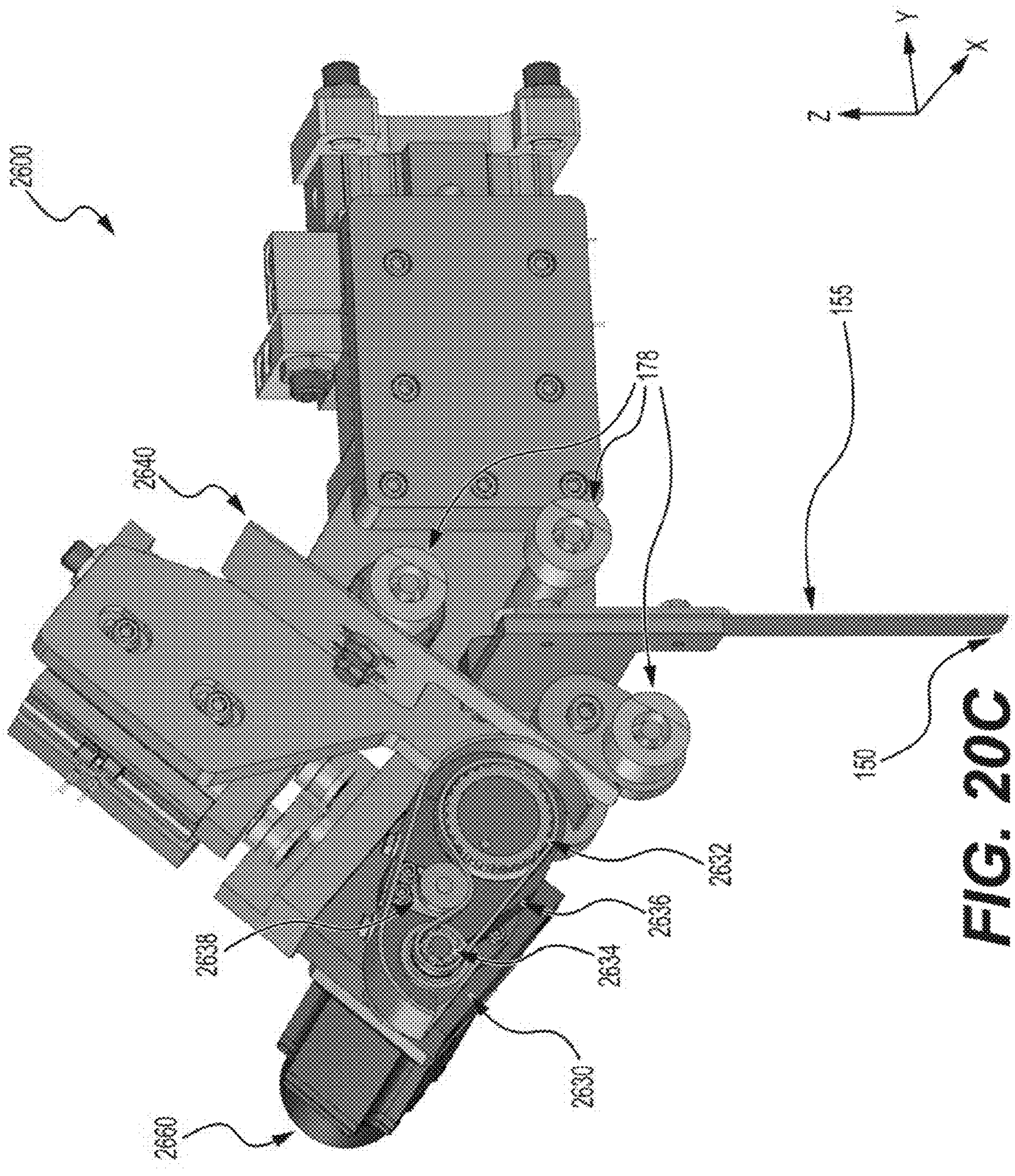
FIG. 20C is a perspective cross-sectional view of the cleaner assembly of FIG. 20A along line 20C-20C' according to some example embodiments.
Figure 20D:
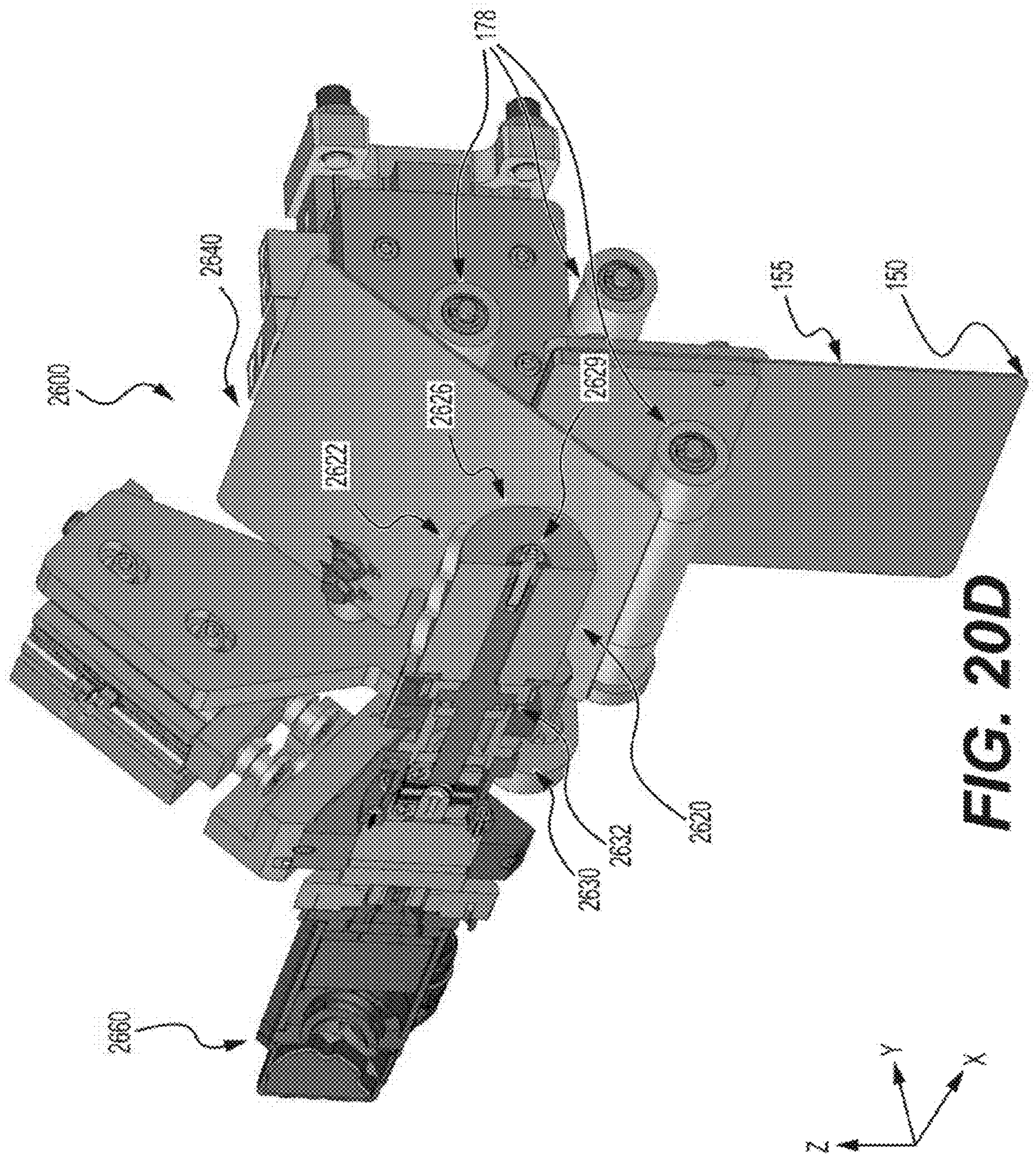
FIG. 20D is a perspective cross-sectional view of the cleaner assembly 2600 of FIG. 20A along line 20D-20D' according to some example embodiments.
Figure 21A:
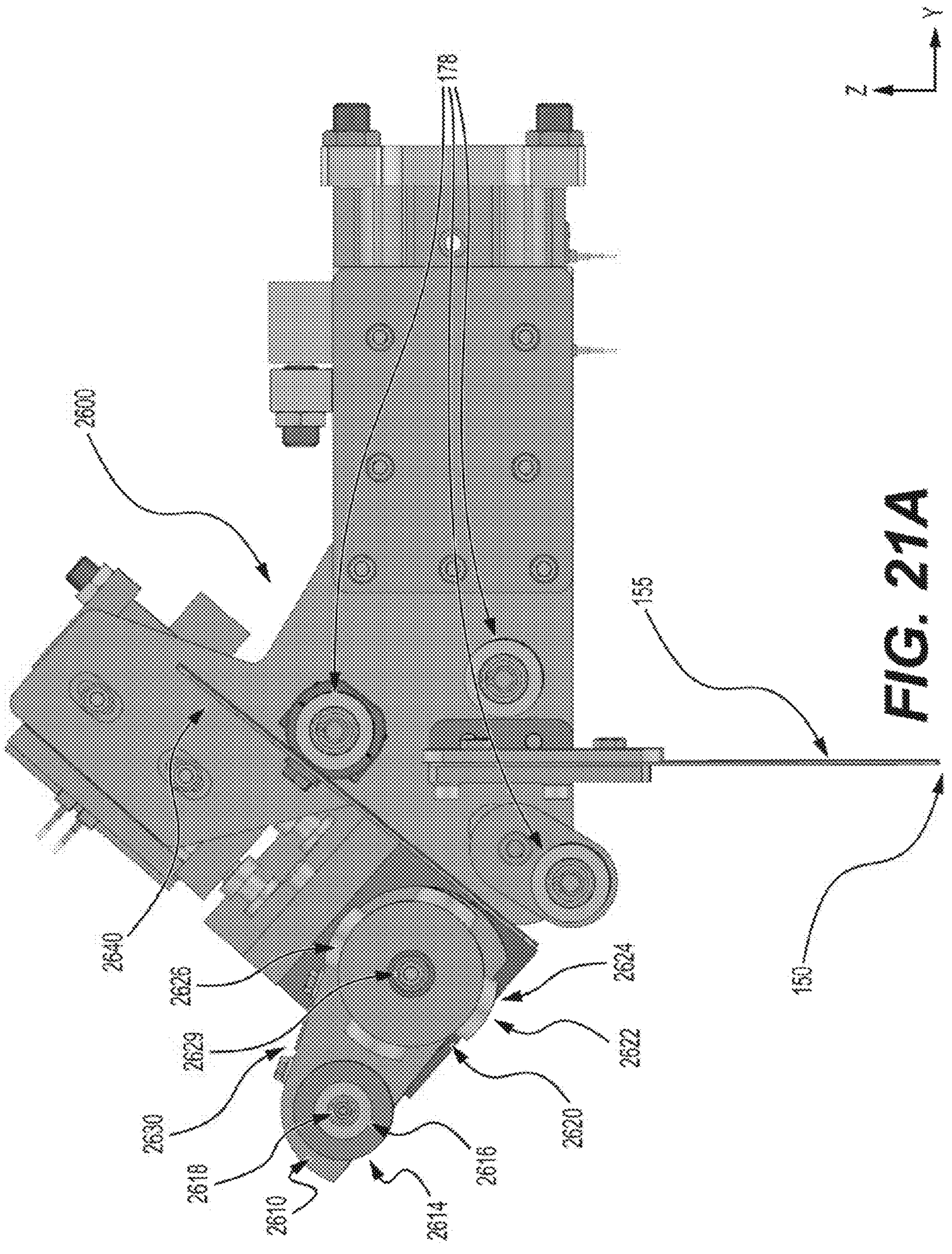
FIGS. 21A and 21B are plan views of the cleaner assembly 2600 of FIGS. 20A and 20B according to some example embodiments.
Figure 21B:
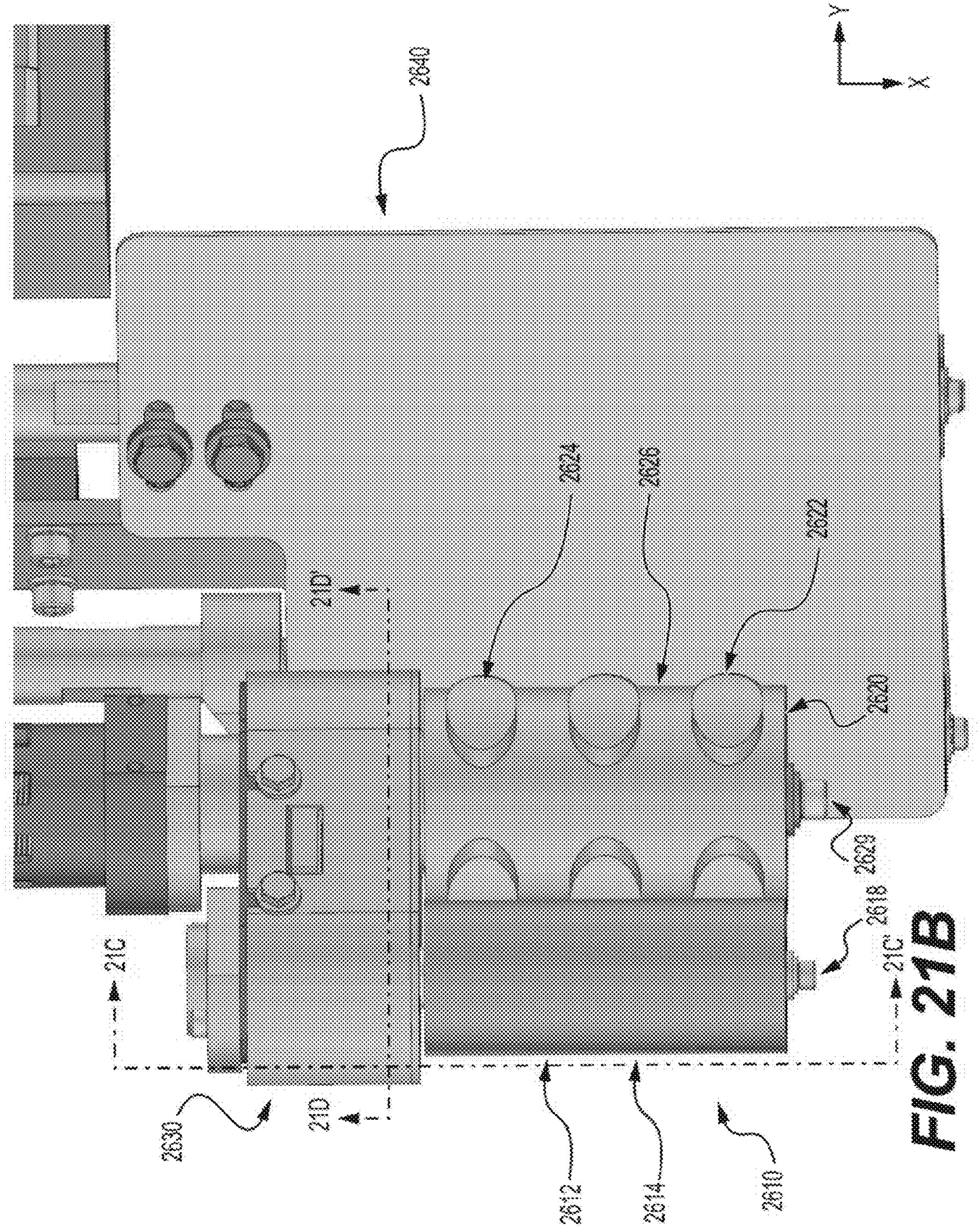
Figure 21C:
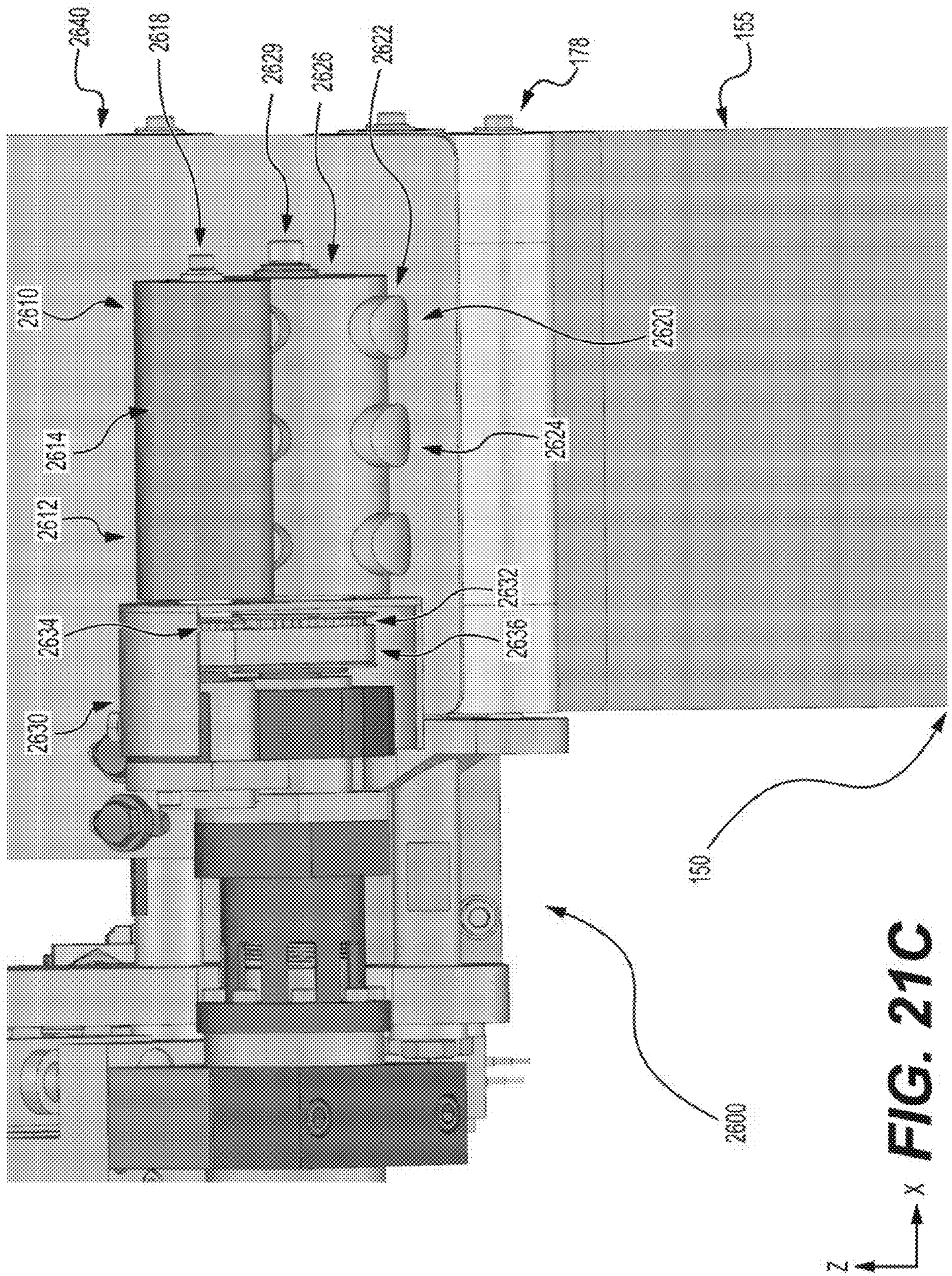
FIG. 21C is a cross-sectional view of the cleaner assembly 2600 of FIG. 21B along line 21C-21C' according to some example embodiments.

FIG. 18A is a perspective view of an apparatus 1000 including the doser assembly of FIGS. 4A-14B and a cleaner assembly 2600 (also referred to as a cleaner/poker assembly) according to some example embodiments. FIG. 18B is a perspective cross-section view of the apparatus 1000 of FIG. 18A. FIG. 18C is a cross-section view of region A of FIG. 18B. FIG. 19 is an image of an apparatus including a doser assembly 100, rotatable drum 1125, and cleaner assembly 2600 with partially removed and lifted cleaner roller 2610 of an apparatus according to some example embodiments. FIGS. 20A and 20B are perspective view of a cleaner assembly 2600 according to some example embodiments. FIG. 20C is a perspective cross-sectional view of the cleaner assembly 2600 of FIG. 20A along line 20C-20C' according to some example embodiments. FIG. 20D is a perspective cross-sectional view of the cleaner assembly 2600 of FIG. 20A along line 20D-20D' according to some example embodiments. FIGS. 21A and 21B are plan views of the cleaner assembly 2600 of FIGS. 20A and 20B according to some example embodiments. FIG. 21C is a cross-sectional view of the cleaner assembly 2600 of FIG. 21B along line 21C-21C' according to some example embodiments. FIG.

Figure 22A:
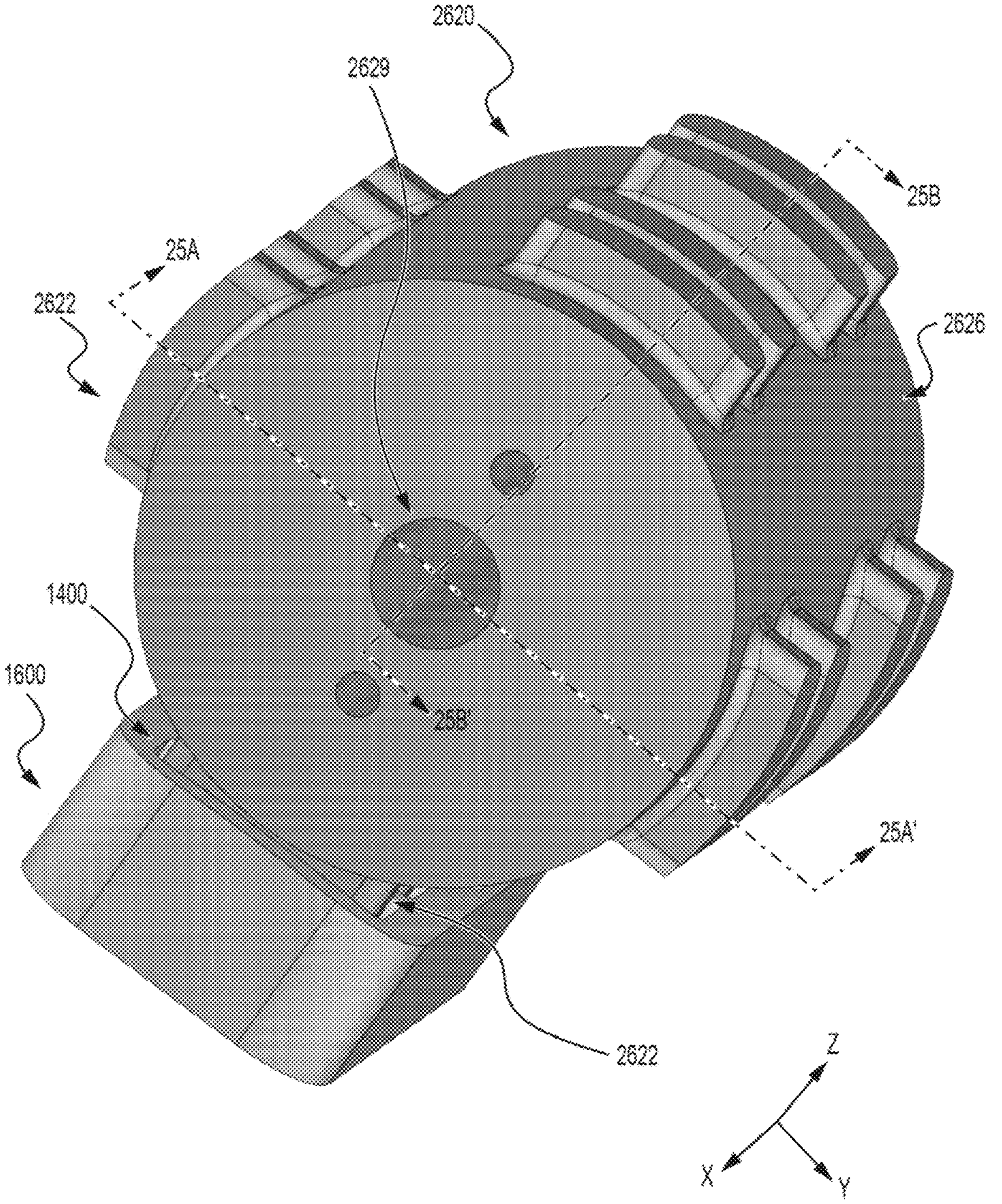
FIGS. 22A, 22B, and 22C are perspective views of a poker roller and corresponding divot plate of a rotatable drum according to some example embodiments.
Figure 22B:
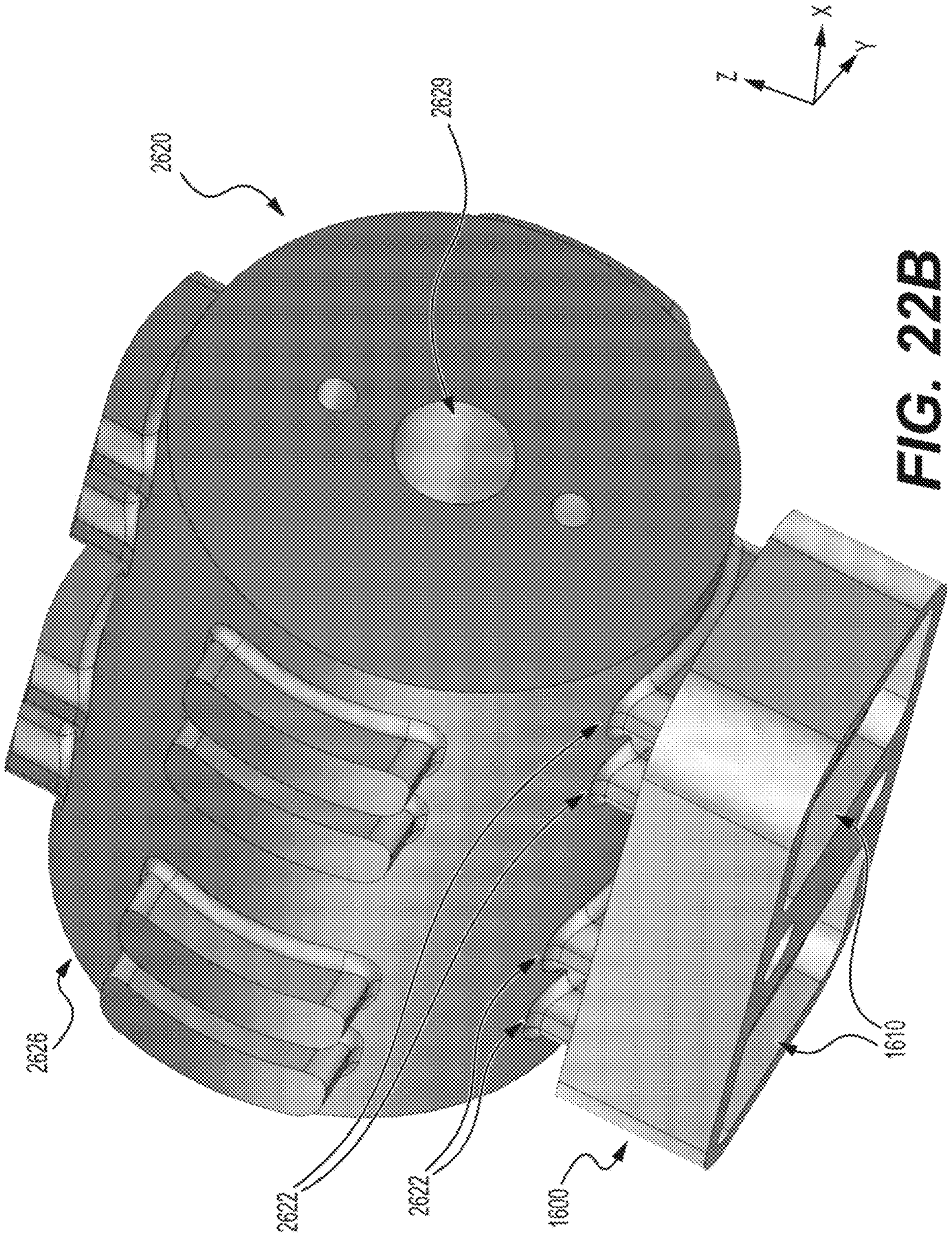
Figure 22C:
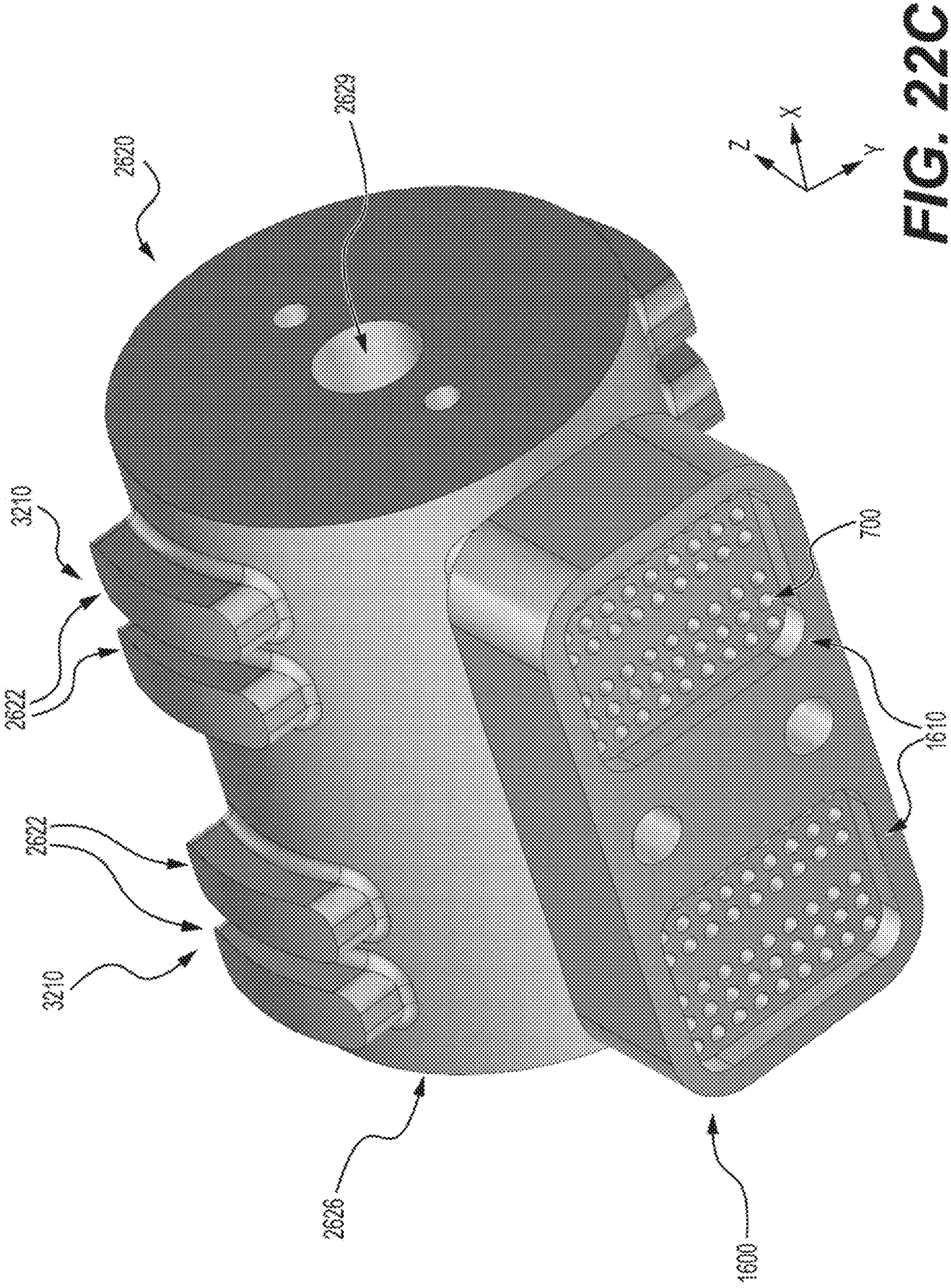
Figure 23A:
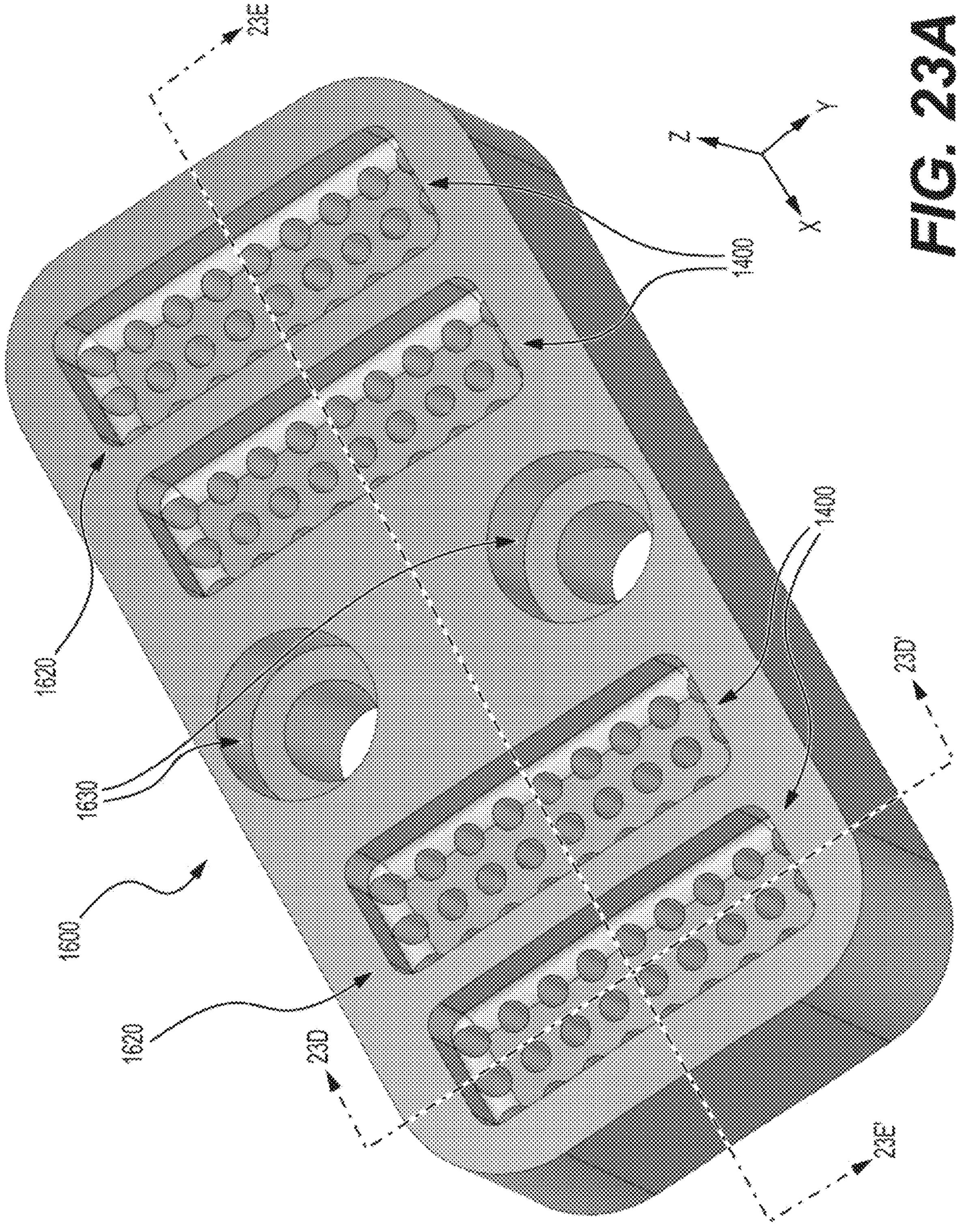
FIGS. 23A, 23B, and 23C are views of the divot plate of FIGS. 22A-22C according to some example embodiments.
Figure 23B:
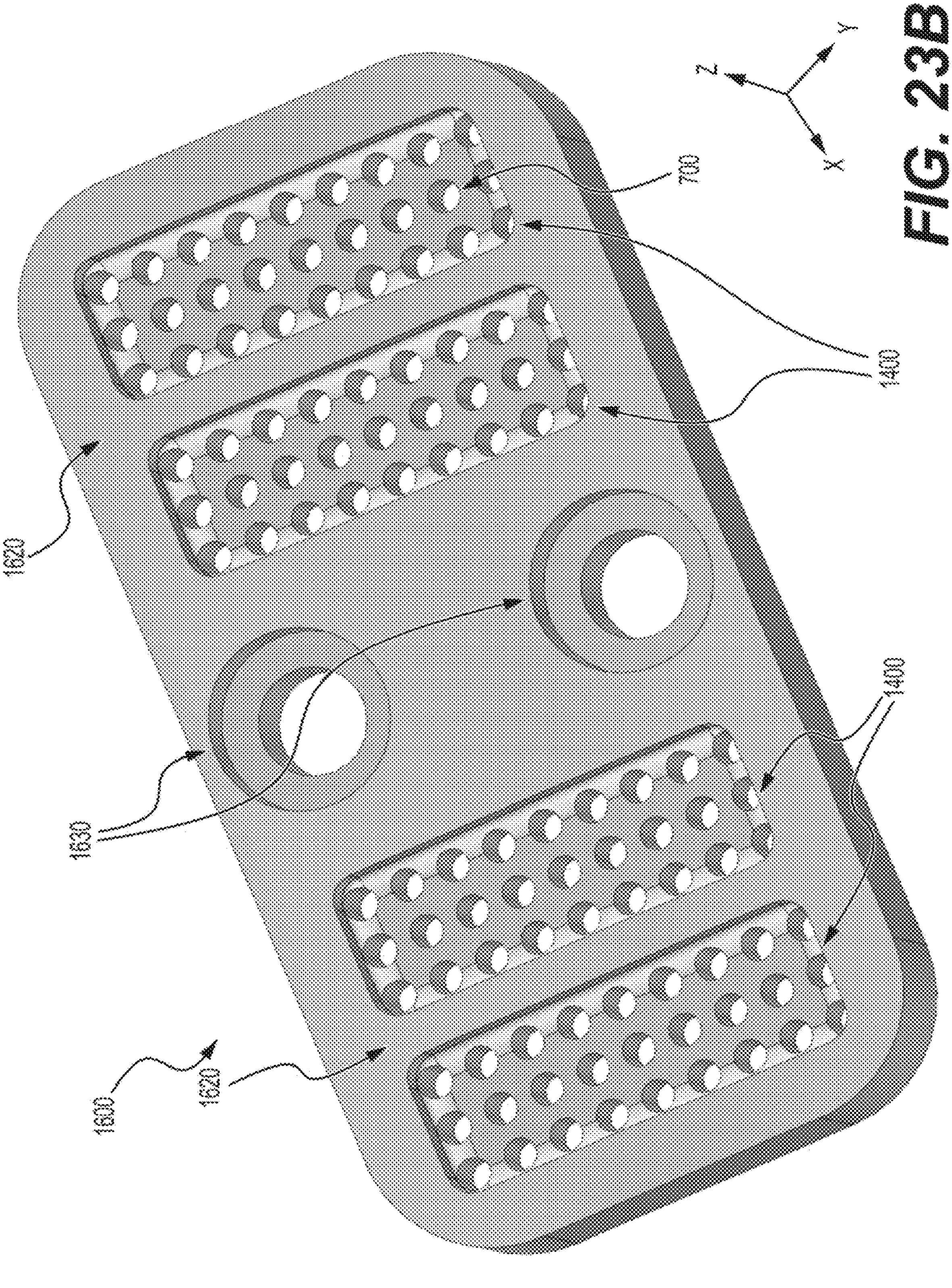
Figure 23C:
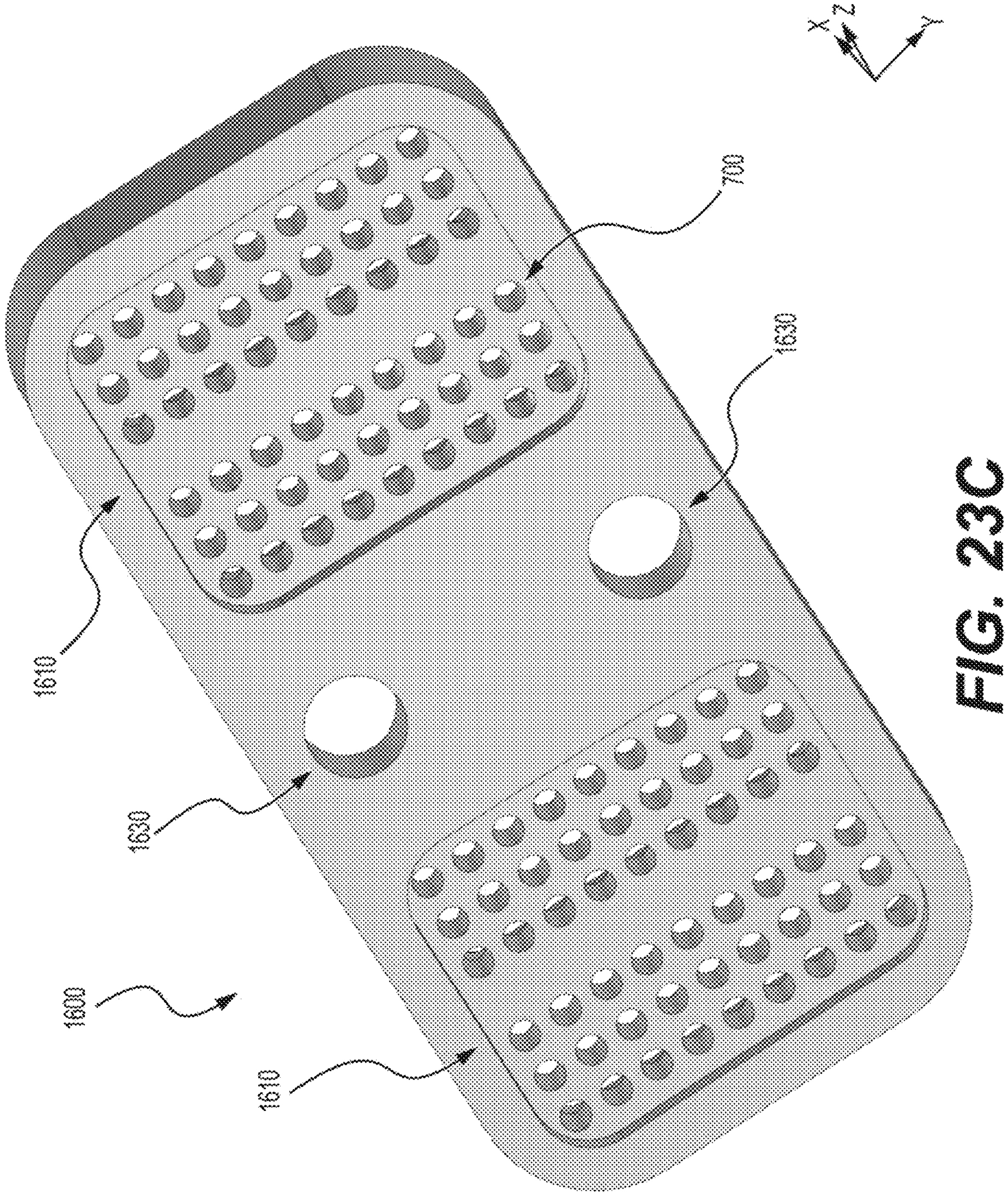
Figure 23D:
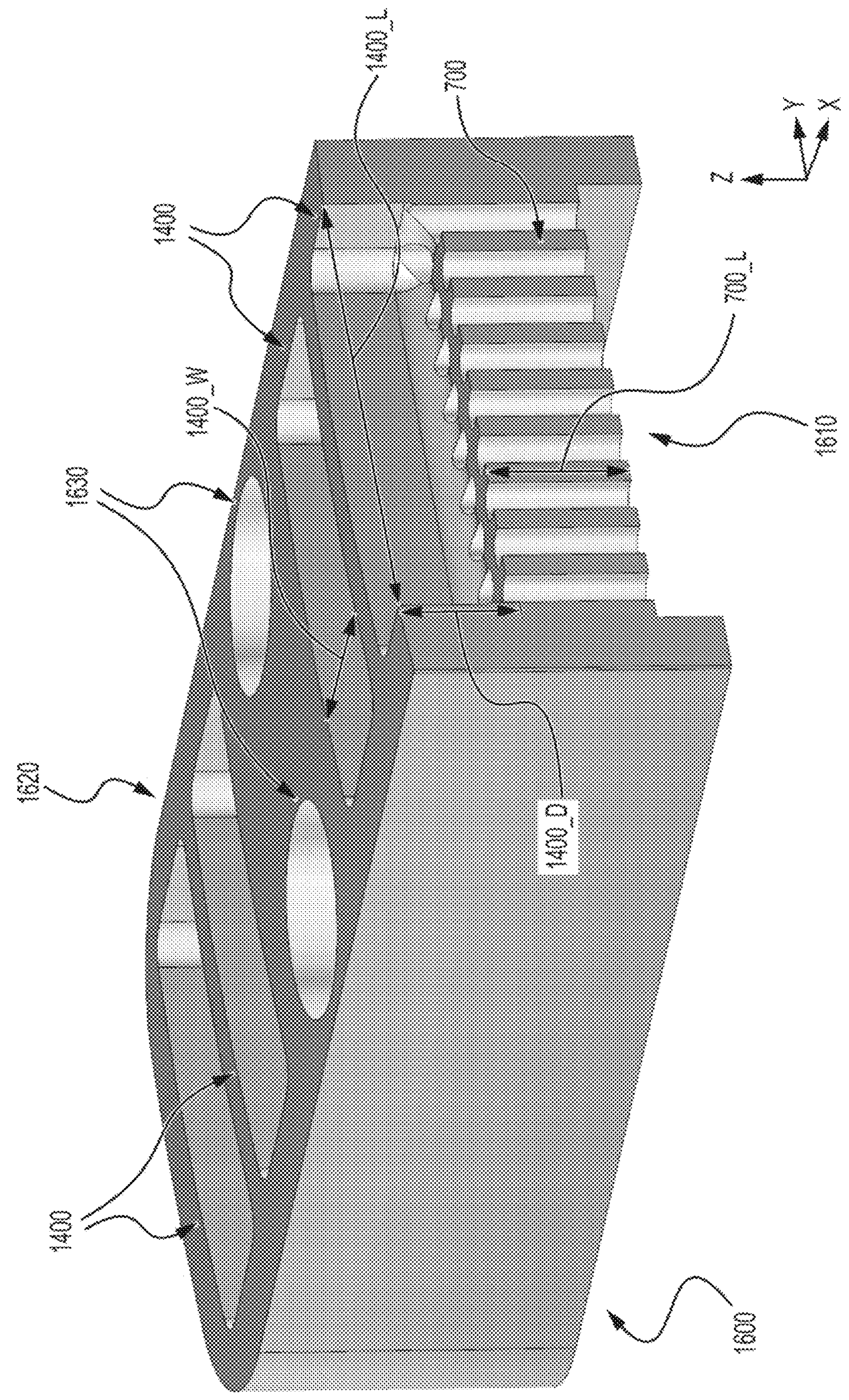
FIGS. 23D and 23E are cross-sectional views of the divot plate of FIG. 23A along lines 23D-23D' and 23E-23E', respectively, according to some example embodiments.
Figure 23E:
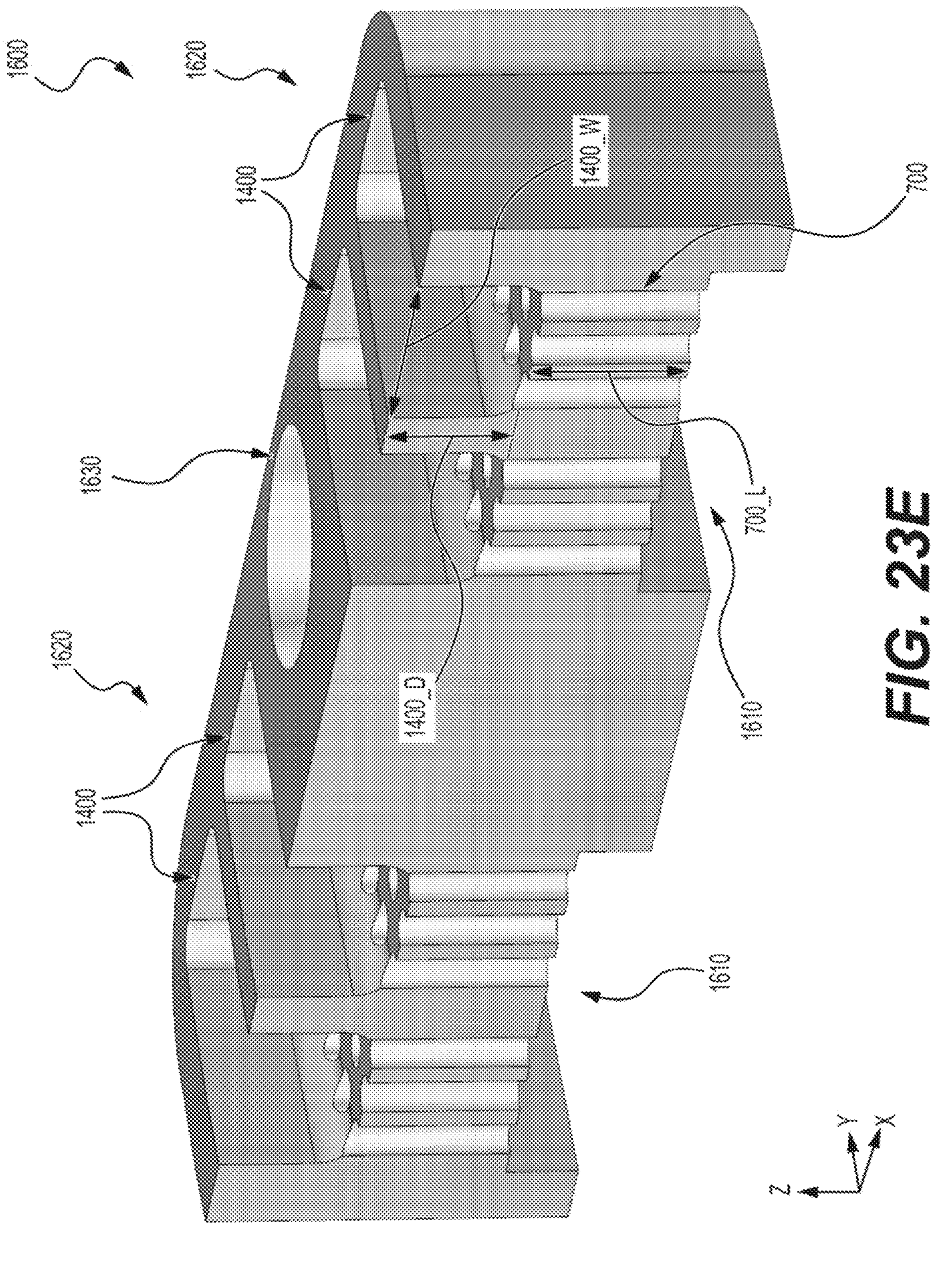
Figure 24A:
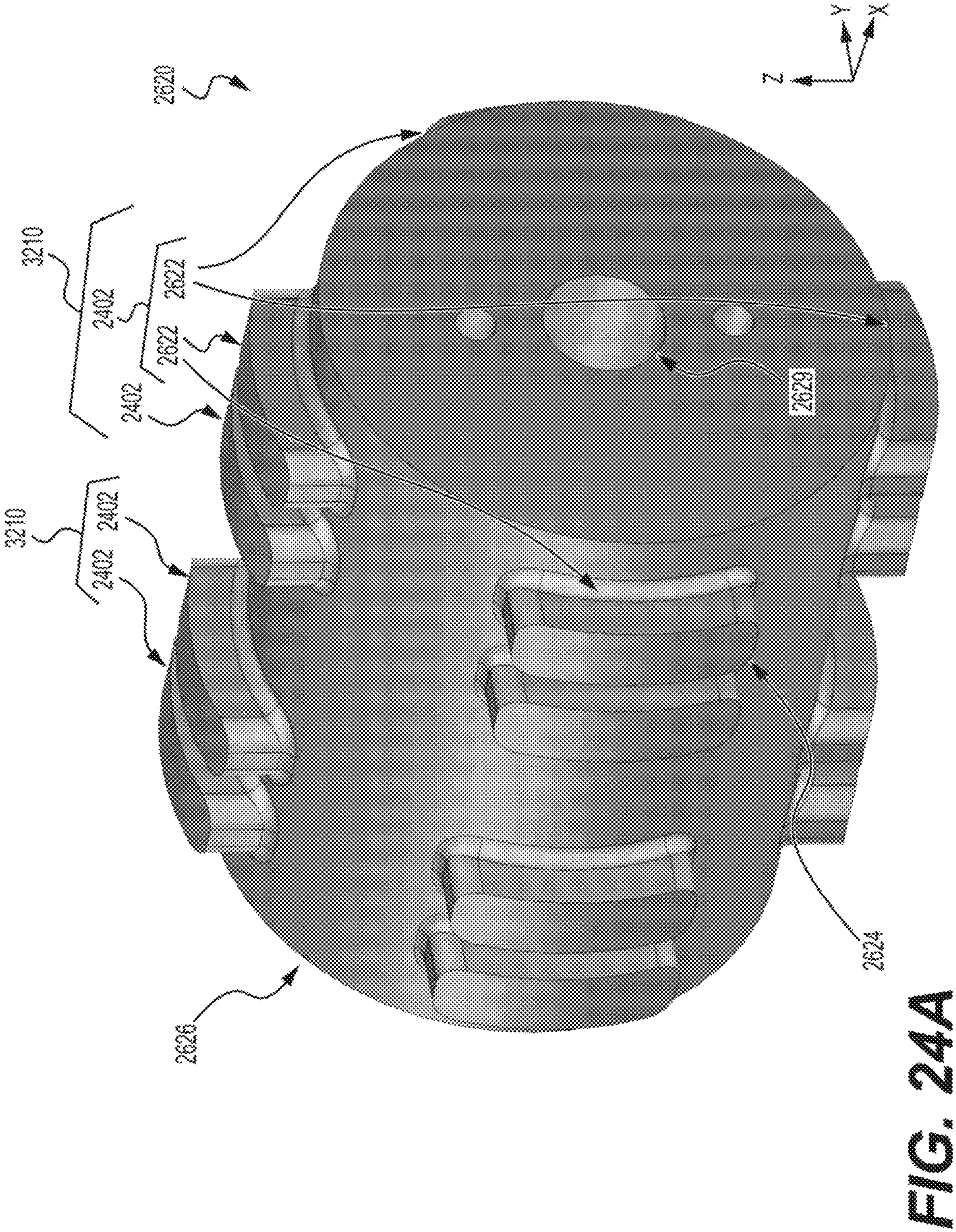
FIGS. 24A and 24B are views of the poker roller of FIGS. 22A-22C according to some example embodiments.
Figure 24B:
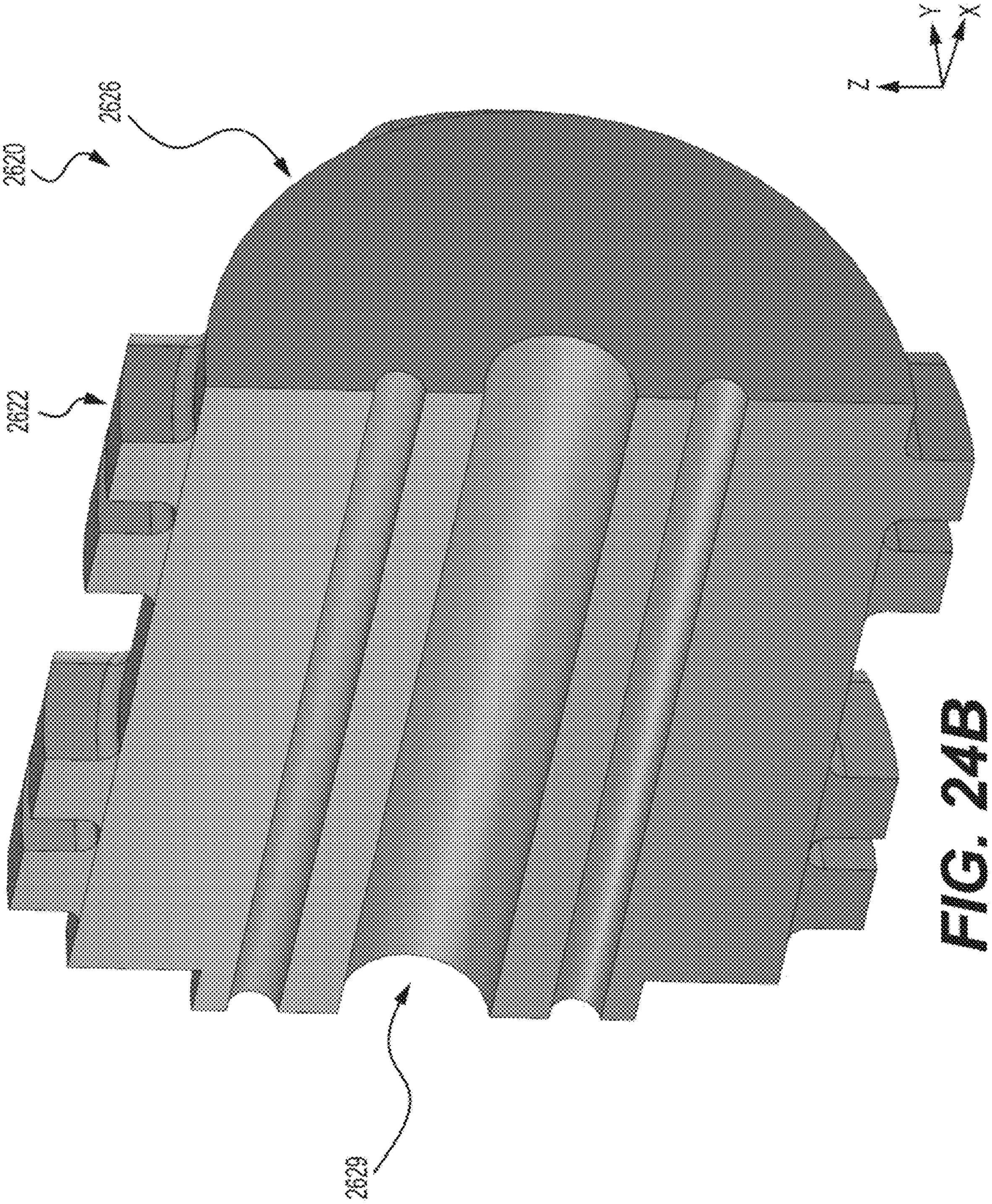
Figure 25A:
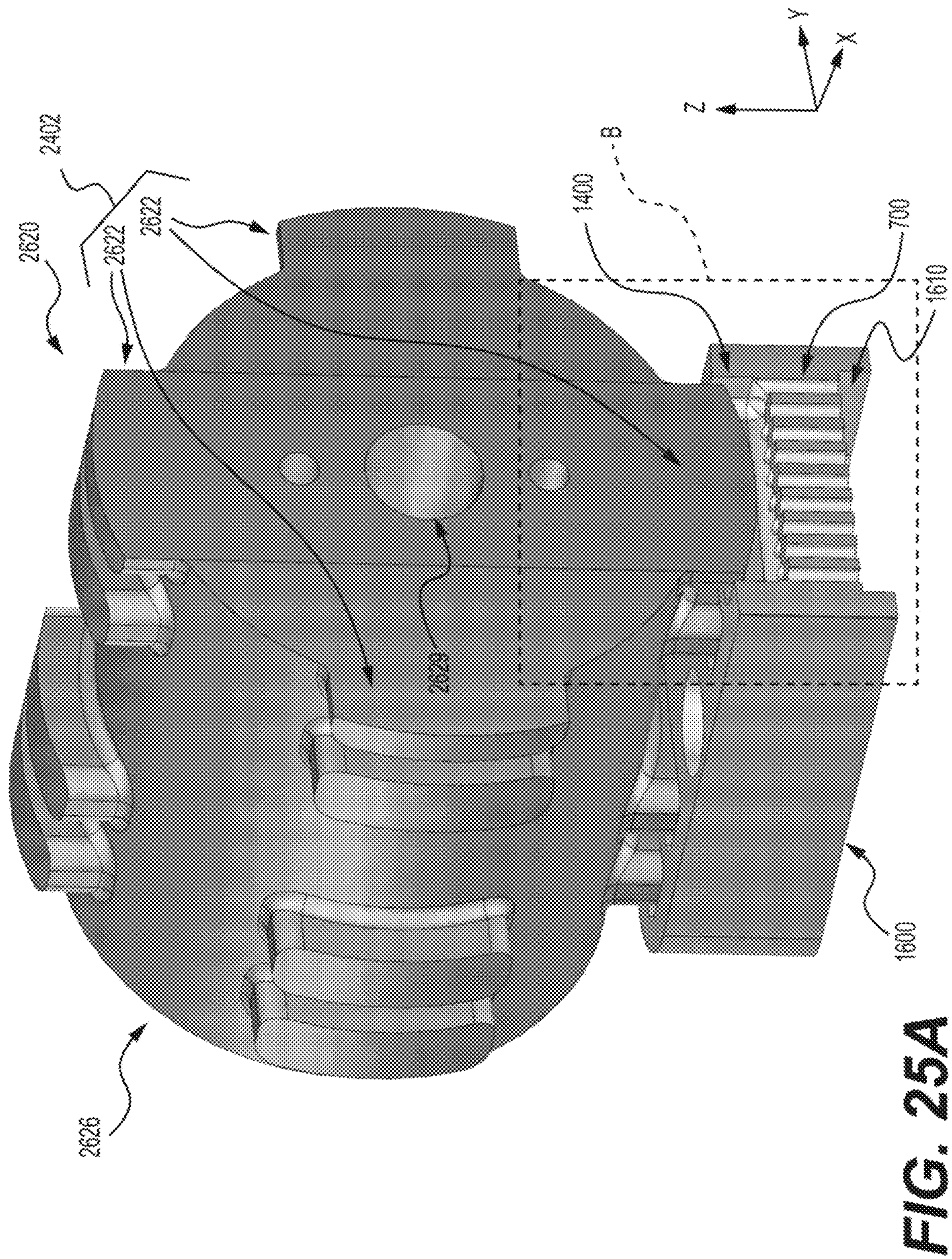
FIGS. 25A and 25B are cross-sectional views of the poker roller and corresponding divot assembly of FIG. 22A along lines 25A-25A' and 25B-25B', respectively, according to some example embodiments.
Figure 25B:
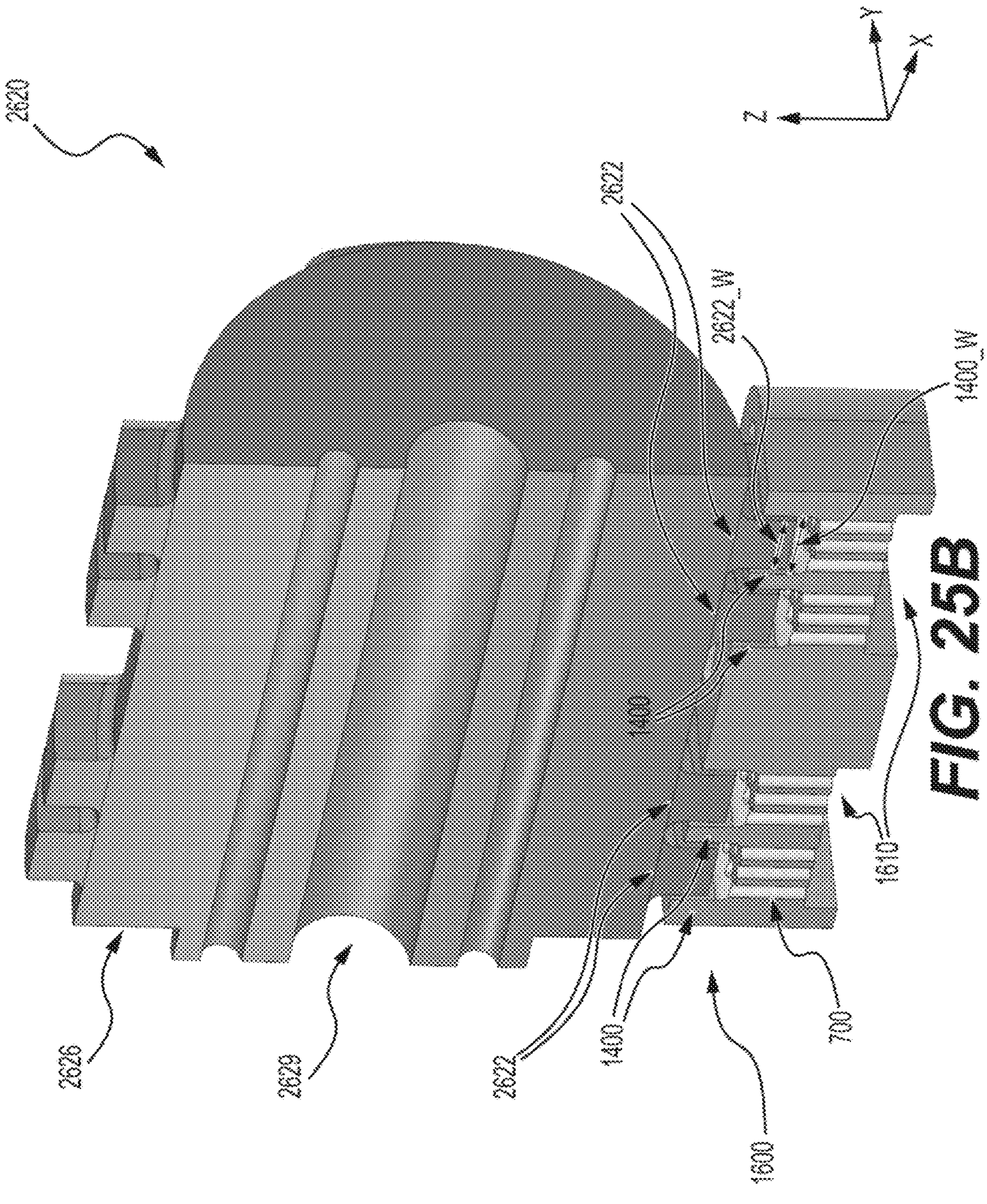
Figure 26:
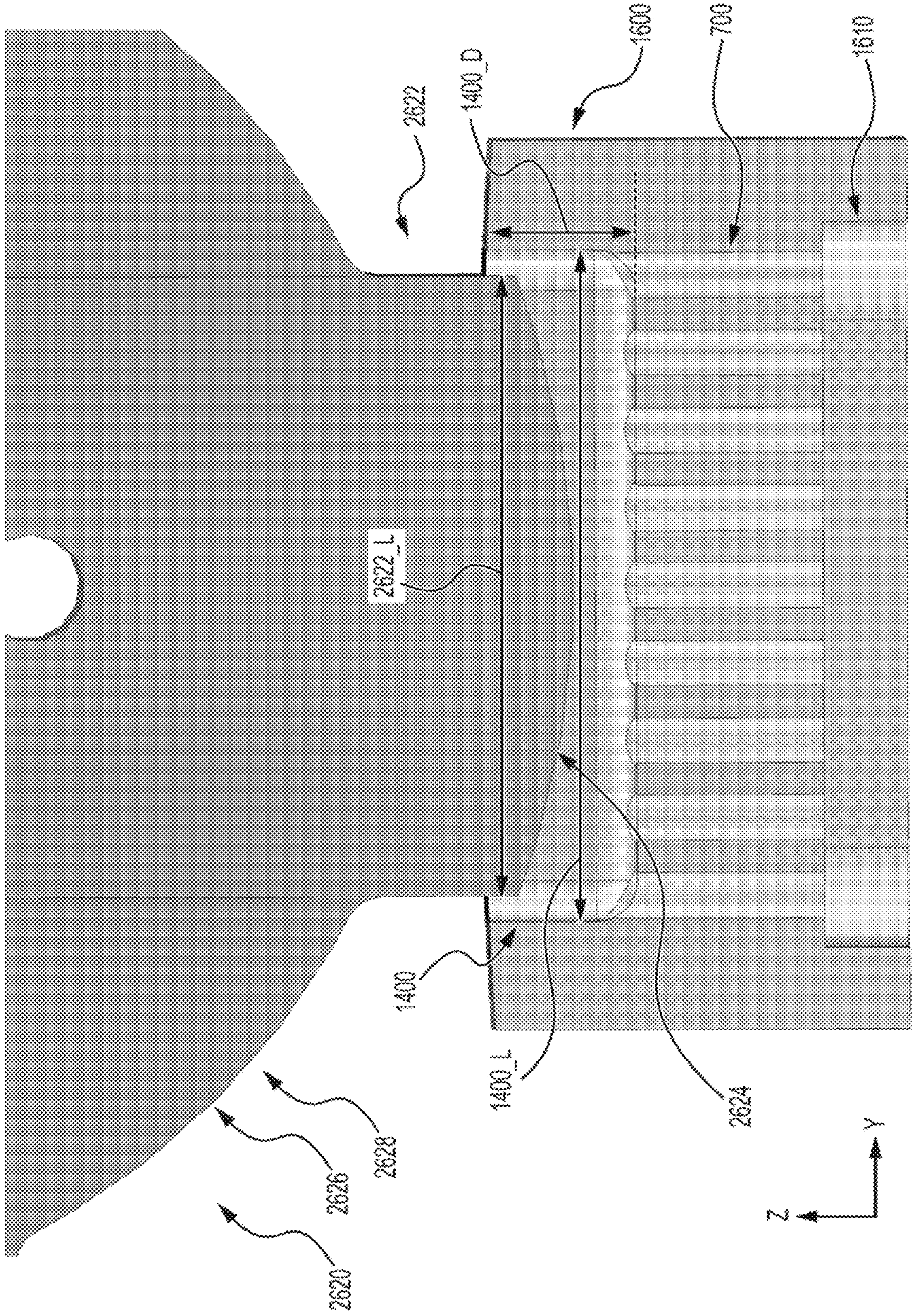
FIG. 26 is an expanded view of region B of FIG. 25A according to some example embodiments.
Figure 27:
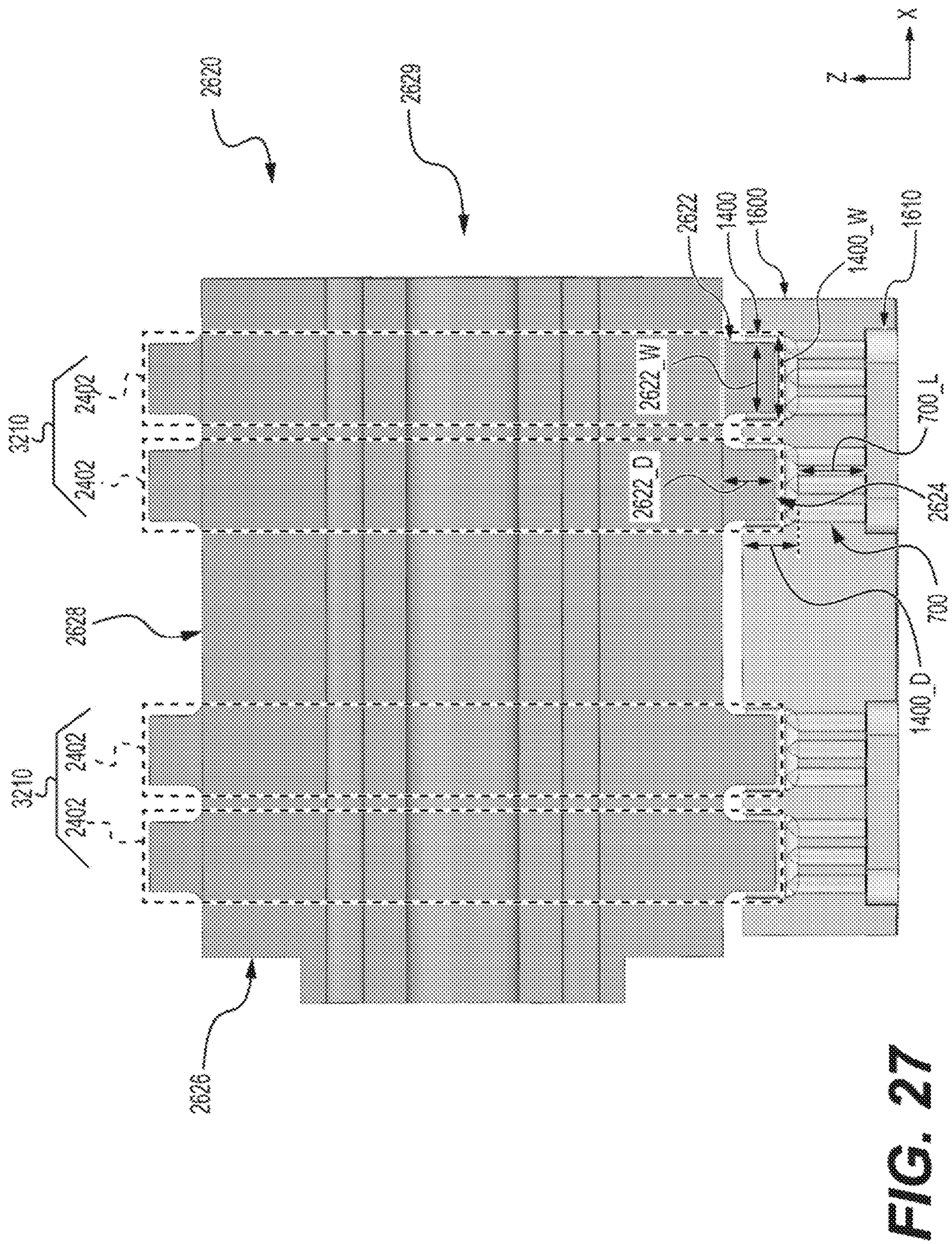
FIG. 27 is a plan cross-sectional view of the poker roller and corresponding divot assembly of FIG. 22A along line 25B-25B', according to some example embodiments.

21D is a cross-sectional view of the cleaner assembly 2600 of FIG. 21B along line 21D-21D' according to some example embodiments. FIGS. 22A, 22B, and 22C are perspective views of a poker roller and corresponding divot plate of a rotatable drum according to some example embodiments. FIGS. 23A, 23B, and 23C are views of the divot plate of FIGS. 22A-22C according to some example embodiments. FIGS. 23D and 23E are cross-sectional views of the divot plate of FIG. 23A along lines 23D-23D' and 23E-23E', respectively, according to some example embodiments. FIGS. 24A and 24B are views of the poker roller of FIGS. 22A-22C according to some example embodiments. FIGS. 25A and 25B are cross-sectional views of the poker roller and corresponding divot assembly of FIG. 22A along lines 25A-25A' and 25B-25B', respectively, according to some example embodiments. FIG. 26 is an expanded view of region B of FIG. 25A according to some example embodiments. FIG. 27 is a plan cross-sectional view of the poker roller and corresponding divot assembly of FIG. 22A along line 25B-25B', according to some example embodiments.

Referring generally to FIGS. 1A to 27, in some example embodiments, an apparatus for forming a pouch product according to some example embodiments, such as apparatus 1000, may include a cleaner assembly 2600, which may be located at a cleaning location 164 between dosing location 130 of the doser assembly 100 and the second receiving location 150 of the second material dispensing station 170. The cleaner assembly 2600 may be configured to clean the upper surface of the first material 1500 (e.g., the upper surface 1516 of the first elastic layer 1512*a* alone or in combination with the upper surfaces of the portions 1522 of the support layer 1514 of the first material 1500) on the rotatable drum 1125 of excess filler material 2270 that is outside the filled divots 1400_2 (and which may be on an upper surface of the first material 1500, including the upper surface 1516 of the first elastic layer 1512*a* of the first material 1500 alone or in combination with the upper surfaces of the portions 1522 of the first material 1500) as the rotatable drum 1125 rotates the first material 1500 (e.g., first web) away from the doser assembly 100 and further move said excess filler material 2270 that is on an upper surface of the first material 1500, including the upper surface 1516 of the first elastic layer 1512*a* of the first material 1500 alone or in combination with the upper surfaces of the portions 1522 of the first material 1500, into the divots 1400 of the rotatable drum 1125 to add to the portions 2280 of filler material located within the filled divots 1400_2. The cleaner assembly 2600 may be further configured to compress the portions 2280 filler material that is in the filled divots 1400_2 further towards the respective bottoms 1480 of the filled divots 1400_2, thereby further restricting the possibility of loss of filler material from the filled divots 1400_2 prior to portions of the second material 1500' (e.g., portions of the second elastic layer 1512*b*) being sealed with corresponding portions of the first material 1500 (e.g., corresponding portions of the first elastic layer 1512*a* that form the filled first web portions), for example via heat knife assembly 5000, to seal the portions 2280 of filler material in separate, respective pouch products. Additionally, the compression of the portions 2280 of filler material in the filled divots 1400_2 by the cleaner assembly 2600 may further improve consistency and uniformity of density of the portions 2280 of filler material, thereby improving the uniformity and consistency of the pouches that are formed by the apparatus 1000.

As shown, the cleaner assembly 2600 may include a cleaner roller 2610 (also referred to herein as a cleaner wheel) and a poker roller 2620 (also referred to herein as a poker wheel). The cleaner roller 2610 and the poker roller 2620 may be mechanically coupled to a motor 2660 (which may be a servoactuator, any known type of drive motor, or the like) via a transmission 2630 (which may be a gearbox) such that the cleaner roller 2610 and the poker roller 2620 are configured to counter rotate with the rotatable drum 1125. It will be understood herein that counter rotation of the cleaner roller 2610 and the poker roller 2620 with the rotatable drum 1125 may mean that the cleaner roller 2610, the poker roller 2620, and the rotatable drum 1125 rotate in a same machine direction so that 1) proximate surface of the cleaner roller 2610 and the rotatable drum 1125 are rotating in a same direction and 2) proximate surfaces of the poker roller 2620 and the rotatable drum 1125 are rotating in a same direction. It will be understood that in some example embodiments the transmission 2630 may be omitted and/or the cleaner and poker rollers 2610 and 2620 may be separately driven by separate drivers.

In some example embodiments, for example as shown in FIG. 18C, the cleaner roller 2610 is positioned so that the outer surface 2612 of the cleaner roller 2610 is in contact with the upper surface 1516 of the first elastic layer 1512*a* of the first material 1500 on the rotatable drum 1125. The cleaner roller 2610 may be configured to be driven (e.g., by motor 2660 via transmission 2630) to counter rotate with the rotatable drum 1125 such that the outer surface 2612 of the cleaner roller 2610 moves at a greater tangential speed than the tangential speed of the outer circumferential surface 1125_S of the rotatable drum 1125 (e.g., to rotate "overspeed" relative to the rotatable drum 1125). For example, the cleaner roller 2610 may be configured to rotate such that the outer surface 2612 of the cleaner roller 2610 moves at a tangential speed that is at least three times greater than a tangential speed of the outer circumferential surface 1125_S of the rotatable drum and/or the upper surface of the first material 1500 (e.g., the upper surface 1516 of the first elastic layer 1512*a* of the first material 1500 alone or in combination with the upper surfaces of the portions 1522 of the first material 1500). Based on the cleaner roller 2610 rotating "overspeed" relative to the rotatable drum 1125 and in contact with at least the upper surface 1516 of the first elastic layer 1512*a* of the first material 1500 on the outer circumferential surface 1125_S of the rotatable drum 1125, the portion of the outer surface 2612 of the cleaner roller 2610 that is contacting the upper surface 1516 of the first elastic layer 1512*a* of the first material 1500 is moving in relation to the upper surface 1516 and is in moving contact with the upper surface 1516. Such moving contact may enable the cleaner roller 2610 to move excess filler material 2270 that is on the upper surface of the first material 1500, including the upper surface 1516 of the first elastic layer 1512*a* of the first material 1500 alone or in combination with the upper surfaces of the portions 1522 of the first material 1500, into one or more proximate divots 1400 to be added to the respective portions 2280 of filler material that are in the one or more divots 1400.

Based on moving the excess filler material 2270 into the divots 1400 to become part of the portions 2280 of filler material within the divots 1400, and thus removing the excess filler material 2270 from the upper surface of the first material 1500, including the upper surface 1516 of the first elastic layer 1512*a* of the first material 1500 alone or in combination with the upper surfaces of the portions 1522 of the first material 1500, the cleaner roller 2610 may be configured to reduce the possibility of excess filler material 2270 becoming trapped within the seal between corresponding portions of the first and second elastic layers 1512*a* and 1512*b* of the first and second materials 1500 and 1500', respectively, when the corresponding portions are sealed together and cut by the heat knife assembly 5000 to form a pouch product. As a result, the cleaner roller 2610 may enable an improvement in the structure of the resulting pouch products that are formed by the apparatus 1000.

In some example embodiments, and as shown, the poker roller 2620 may include multiple projections 2622 (also referred to herein as "pokers") extending from the central core 2626 of the poker roller 2620 having a central shaft 2629 in one or more ring patterns or "lanes" 2402 around the circumference of the central core 2626. The projections 2622 may be configured to each extend into one or more divots 1400 of the rotatable drum 1125 as the poker roller 2620 counter rotates with the rotatable drum 1125.

The poker roller 2620 may be configured to be driven (e.g., by motor 2660 via transmission 2630) to counter rotate with the rotatable drum 1125 such that the projections 2622 move at a same tangential speed as the tangential speed of the outer circumferential surface 1125_S of the rotatable drum 1125 (e.g., to rotate in synchronization with the rotatable drum 1125), so that the projections 2622 extend into and out of separate, respective divots 1400 of the rotatable drum 1125 based on the counter rotation of the poker roller 2620 and the rotatable drum 1125.

Still referring to at least FIGS. 18A-18C, the cleaner assembly 2600 may be positioned at a cleaning location 164 in the apparatus 1000 such that the cleaner roller 2610 is between the dosing location 130 and the poker roller 2620, and thus the cleaner roller 2610 may be between the doser assembly 100 and the poker roller 2620. As a result, the cleaner roller 2610 may be configured to move the excess filler material 2270 that is on the upper surface of the first material 1500, including the upper surface 1516 of the first elastic layer 1512*a* of the first material 1500 alone or in combination with the upper surfaces of the portions 1522 of the first material 1500, into one or more divots 1400 of the rotatable drum 1125 after the doser assembly 100 has supplied portions 2280 of filler material into the divots 1400 and prior to the poker roller 2620 compressing the portions 2280 of filler material in the divots 1400.

Based on the cleaner roller 2610 being between the doser assembly 100 and the poker roller 2620, the uniformity and consistency of the density of the portions 2280 of filler material in the divots 1400 may be improved by reducing the risk of low-density excess filler material 2270 entering the divots 1400 after the portions 2280 of filler material in the divots 1400 has been compressed by the poker roller 2620 to a higher density.

Referring to FIGS. 4A-27, the plates 1600 of the rotatable drum 1125 may have various numbers (quantities) of divots 1400, such that the plates 1600 of the rotatable drum 1125 define various quantities of patterns (e.g., "lanes") of divots 1400 extending in parallel around an outer circumferential surface 1125_S of the rotatable drum 1125. Additionally, the projections 2622 of the poker roller 2620 may similarly define various quantities of patterns (e.g., "lanes") of projections 2622 extending in parallel around the outer circumferential surface 2628 of the poker roller 2620.

For example, as shown in FIGS. 18A-18C, the plates 1600 may each include two divots 1400 and thus may define two lanes of divots 1400 on the rotatable drum 1125. Similarly, the poker roller 2620 may include two lanes of projections 2622 (in FIGS. 18A-18C, four projections 2622 per lane) extending around the outer circumferential surface 2628 of the poker roller 2620, where each separate "lane" of projections 2622 is configured to be aligned with a separate one of the "lanes" of divots 1400. Thus, each separate lane of projections 2622 is configured to extend into and out of divots 1400 of a separate lane of divots 1400 on the rotatable drum 1125 based on the counter rotation of the poker roller 2620 and the rotatable drum 1125.

In another example, as shown in FIGS. 20A-21D, the poker roller 2620 may include three "lanes" of projections 2622, and it will be understood that an apparatus 1000 that includes the poker roller 2620 shown in FIGS. 20A-21D may include a rotatable drum 1125 having plates 1600 with three divots 1400 per plate 1600 such that the rotatable drum 1125 of such an apparatus 1000 may have three lanes of divots 1400, and each separate "lane" of projections 2622 of the poker roller 2620 shown in FIGS. 20A-21D may be configured to be aligned with a separate one of the "lanes" of divots 1400 and may be configured to extend into and out of divots 1400 of a separate lane of divots 1400 on the rotatable drum 1125 based on the counter rotation of the poker roller 2620 and the rotatable drum 1125.

In another example, as shown in FIGS. 19 and 22A-27, the plates 1600 may each include four divots 1400 and thus may define four lanes of divots 1400 on the rotatable drum 1125. As further shown, the plates 1600 may each divide the divots 1400 into separate closely-spaced sets 1620 of divots and may include fastener holes 1630 configured to engage with fasteners to fasten the plate 1600 to the rotatable drum 1125. Similarly, the poker roller 2620 may include four lanes 2402 of projections 2622 (in FIGS. 19 and 22A-27, four projections 2622 per lane) extending around the outer circumferential surface 2628 of the poker roller 2620, where each separate "lane" 2402 of projections 2622 is configured to be aligned (e.g., aligned in the Z direction as shown in at least FIGS. 18A-19) with a separate one of the "lanes" of divots 1400 and thus may be configured to be aligned with a separate divot 1400 of a given plate 1600. As further shown, some lanes 2402 of projections may be closely spaced as separate sets 3210 of projection ring patterns to align with separate sets 1620 of divots in a given plate 1600. Thus, each separate lane 2402 of projections 2622 may be configured to extend into and out of divots 1400 of a separate lane of divots 1400 on the rotatable drum 1125 based on the counter rotation of the poker roller 2620 and the rotatable drum 1125.

As further shown, each plate 1600 may define air inlets 700 that each extend, in a length 700_L that extends through a portion of a thickness of the plate 1600, between a bottom 1480 of a given divot 1400 at the top of the plate 1600 to a vacuum conduit opening 1610 at a bottom of the plate 1600. Each vacuum conduit opening 1610 may be configured to connect with one or more vacuum conduits 1430 of the rotatable drum 1125 and thus may be configured to establish fluid communication of at least some of the air inlets 700 of a plate with the vacuum source 1410, thereby enabling vacuum to be applied to one or more divots 1400 based on a position of the plate 1600 on the rotatable drum 1125 as the rotatable drum rotates during operation of the apparatus 1000. In some example embodiments, a single vacuum conduit opening 1610 may be configured to connect air inlets 700 of multiple divots 1400 to a vacuum conduit. As shown in at least FIGS. 22C, 23C, and 23E, for example, a plate 1600 may include separate vacuum conduit openings 1610 into which air inlets 700 extend from divots 1400 of separate, respective sets 1620 of divots, such that each vacuum conduit opening 1610 is configured to connect to a vacuum conduit 1430 of rotatable drum 1125 and thus couple two divots 1400 of a given set 1620 to vacuum via air inlets 700 extending from the two divots 1400 to the vacuum conduit opening 1610.

As shown in at least FIGS. 18C, 19, and 25A-27, based on the counter rotation of the poker roller 2620 in synchronization with the rotatable drum 1125, the projections 2622 may move into separate, respective divots 1400 of a plate 1600 and may compress the separate, respective portions 2280 of filler material that are within the divots 1400 to increase the density and further increase the uniformity of the density of the filler material in each divot 1400. Such compression may reduce the possibility of filler material leaving the divot 1400 prior to portions of the second elastic layer 1512*b* being sealed to the "filled first web portions" of the first elastic layer 1512*a* to seal the portions 2280 of filler material on the "filled first web portions" within respective pouch products, thereby improving the uniformity and consistency of the amount of filler material included in each pouch product formed by the apparatus 1000.

Referring to FIGS. 20A-21C, the cleaner roller 2610 may, in some example embodiments, include a central shaft 2618 with a central core 2616 comprising a relatively rigid material (e.g., stainless steel, DELRIN®, PEEK, etc.) and an outer layer of a compressible roller material 2614 that defines the outer surface 2612 of the cleaner roller 2610. Such a compressible roller material may include a relatively flexible material, including but not limited to rubber, silicone, or the like. The cleaner roller 2610 may be positioned in relation to the rotatable drum 1125 such that the cleaner roller 2610 is configured to compress the compressible roller material 2614 against the upper surface of the first material 1500, which may include the upper surface 1516 of the first elastic layer 1512*a* of the first material 1500 alone or in combination with the upper surfaces of the respective portions 1522 of the support layer 1514 of the first material, on the rotatable drum 1125.

For example, the cleaner assembly 2600 may position the cleaner roller 2610 in relation to the rotatable drum 1125 such that a smallest spacing distance between the outer circumferential surface 1125_S of the rotatable drum 1125 and the outer surface 2612 of the cleaner roller 2610 is equal to or less than a thickness of the first material 1500 (e.g., a thickness of the first elastic layer 1512*a*). In another example, the cleaner assembly 2600 may position the cleaner roller 2610 in relation to the rotatable drum 1125 such that a smallest spacing distance between the outer circumferential surface 1125_S of the rotatable drum 1125 and the central axis of rotation of the cleaner roller 2610 at central shaft 2618 is equal to or less than the smallest radius of the cleaner roller 2610 from the central shaft 2618 to the outer surface 2612 when the compressible roller material 2614 is in an uncompressed state.

Based on the compressible roller material 2614 being in compression with the rotatable drum 1125, the contact area between the outer surface 2612 of the cleaner roller 2610 and the upper surface 1516 of the first elastic layer 1512*a* of the first material 1500 may be increased, thereby improving the cleaning action (e.g., moving excess filler material 2270 into the divots 1400) that is performed by the cleaner roller 2610.

As shown in FIGS. 20A-21C, the cleaner roller 2610 may have a circular cylindrical shape (e.g., may have a circle cross-section shape) and thus may be a circular cylindrical roller. However, example embodiments are not limited thereto. For example, as shown in FIGS. 18A-18C, in some example embodiments the cleaner roller 2610 may have a polygonal cylindrical shape (e.g., may have a decagon cross-section shape) and thus may be a polygonal cylindrical roller.

Figure 21D:
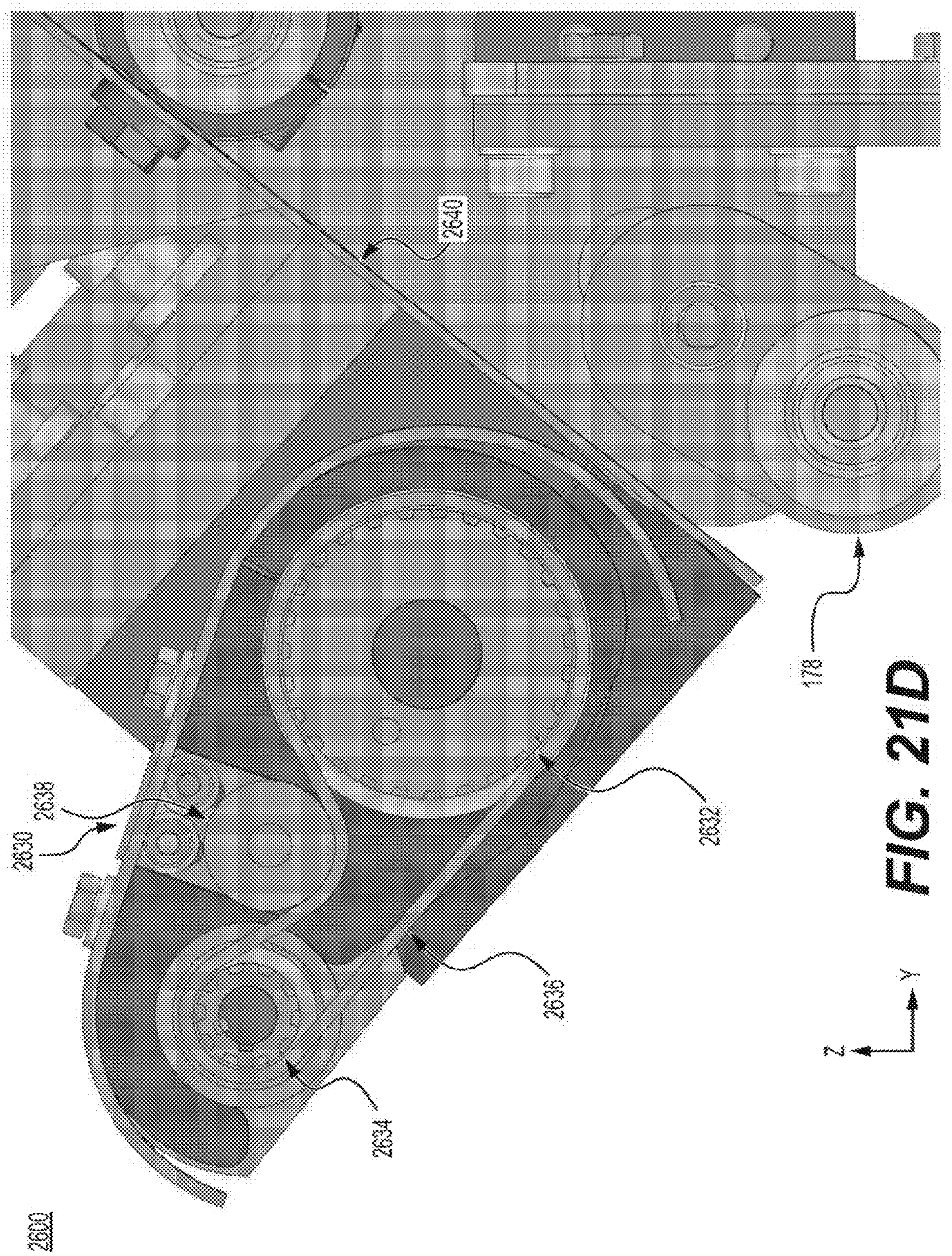
FIG. 21D is a cross-sectional view of the cleaner assembly 2600 of FIG. 21B along line 21D-21D' according to some example embodiments.

As shown in at least FIGS. 20C and 21C-21D, the transmission 2630 may include a gearbox with first and second gears 2632 (e.g., toothed gears) and a belt 2636 (e.g., a toothed belt) extending therebetween with a tensioner roller 2638 providing tension to the belt 2636. The first gear 2632 may be connected to central shaft 2629 and may be configured to directly drive the poker roller 2620. The first gear 2632 may be directly driven by the motor 2660, such that the poker roller 2620 may be directly driven by the motor 2660. As a result of the poker roller 2620 being configured to be directly driven by the motor 2660, the rate of rotation of the poker roller 2620 may be more precisely correspond to the rate of rotation of the rotatable drum 1125 to the that the tangential speed of the outer surface of the poker roller 2620 (e.g., the tangential speed of the projections 2622 and/or the outer surfaces 2624 thereof) matches the tangential speed of the outer circumferential surface 1125_S of the rotatable drum 1125 (e.g., the tangential speed of the divots 1400) and/or the tangential speed of the upper surface of the first material 1500 (e.g., the upper surface 1516 of the first elastic layer 1512*a* alone or in combination with the upper surfaces of the respective portions 1522 of the first material 1500), thereby ensuring synchronized movement of the projections into and out of divots 1400 as the rotatable drum 1125 and the poker roller 2620 counter rotate (e.g., both rotate in the machine direction).

As shown, the second gear 2634 may be connected to the central shaft 2618 and may be configured to directly drive the cleaner roller 2610. The second gear 2634 may be coupled to the first gear 2632 via belt 2636 so that the first and second gears 2632 and 2634 may both be driven by the motor 2660. The first and second gears 2632 and 2634 and the belt 2636 may be sized and positioned to cause the cleaner roller 2610 to counter rotate in "overspeed" in relation to the rotatable drum 1125, as described herein, while the poker roller 2620 counter rotates in synchronization with the rotatable drum 1125 as described herein. Because the cleaner roller 2610 is configured to rotate in overspeed in relation to the rotatable drum 1125 to move excess filler material 2270 while poker roller 2620 is configured to move in synchronization with the rotatable drum 1125 to move projections 2622 into and out of the divots 1400, the cleaner roller 2610 may be configured to tolerate at least minor slippage in the belt 2636 of the transmission 2630 while the synchronized rotation of the poker roller 2620 is ensured via being directly driven by the motor 2660. In some example embodiments, transmission 2630 may be omitted and the second gear 2634 may be separately directly driven by a separate motor.

As shown, and as particularly shown in FIGS. 25A-27, each divot 1400 defined by a given plate 1600 may have a first length 1400_L in a first direction that may be parallel with a tangent of a curvature of the rotatable drum 1125 (e.g., the Y direction in FIGS. 25A-27), a first width 1400_W in a second direction that crosses the first direction and may be parallel to a central axis of the rotatable drum (e.g., the X direction in FIGS. 25A-27), and a first depth 1400_D in a third direction that crosses the first and second directions (e.g., the Z direction in FIGS. 25A-27).

As further shown, and as particularly shown in FIGS. 25A-27, each projection 2622 of the poker roller 2620 may have a second length 2622_L in a fourth direction that may be parallel with a tangent of a curvature of the outer surface 2624 of the projection 2622 (e.g., the Y direction in FIGS.

25A-27), a second width 2622_W in a fifth direction that crosses the fourth direction and may be parallel to a central axis of the poker roller 2620 (e.g., the X direction in FIGS. 25A-27), and a second depth 2622_D in a sixth direction that crosses the fourth and fifth directions and may extend radially from the central axis of the poker roller 2620 (e.g., the Z direction in FIGS. 25A-27). As shown, the first and fourth directions may be the same direction (e.g., Y direction), the second and fifth directions may be the same direction (e.g., X direction), and the third and sixth directions may be the same direction (e.g., Z direction). As shown, in some example embodiments the second length 2622_L may be smaller than the first length 1400_L, and the second width 2622_W may be smaller than the first width 1400_W, thereby providing clearance between the inner surfaces of the divots 1400 and the corresponding outer surfaces of the projections 2622 to reduce the risk of contact between said inner and outer surfaces during operation of the apparatus 1000.

As shown, each projection 2622 of the poker roller 2620 may have an outer surface 2624 that is distal from a central axis of the poker roller 2620 and has a convex curvature, but example embodiments are not limited thereto. For example, in some example embodiments, the outer surface 2624 of each projection 2622 may be a planar surface.

In some example embodiments, a material of any portion of the cleaner assembly 2600, including any portion of cleaner roller 2610, any portion of poker roller 2620, any part of the transmission 2630, or the like may include one of a metal (e.g., aluminum), a metal alloy (e.g., steel), a plastic (e.g., polyether ketone (PEEK), polyoxymethylene (an acetal homopolymer resin corresponding to the trademark DELRIN®, held by DuPont™), a sub-combination thereof, or a combination thereof. A material of the cleaner roller 2610 and/or the poker roller 2620 may include a plastic, such as one of PEEK, polyoxymethylene, or both PEEK and polyoxymethylene. However, example embodiments are not limited thereto and the cleaner roller 2610 and/or the poker roller 2620 may alternatively be formed of other materials such as a metal, a metal alloy, and/or a different plastic.

As shown in FIGS. 20A-21D, the cleaner assembly 2600 may include a filler material shield 2640 that is configured to partition the cleaner roller 2610 and poker roller 2620 from other portions of the apparatus 1000 in which the cleaner assembly 2600 is included, to reduce or minimize the possibility of filler material being ejected from the cleaner assembly 2600 into other parts of the apparatus 1000.

It will be understood that, in some example embodiments, the cleaner assembly 2600 may omit one of the cleaner roller 2610 or the poker roller 2620. For example, the cleaner assembly 2600 may include the cleaner roller 2610 but not the poker roller 2620. In another example, the cleaner assembly 2600 may include the poker roller 2620 but not the cleaner roller.

It will be understood that, in some example embodiments, the cleaner assembly 2600 may be included in an apparatus 1000 with a doser assembly 100, where the doser assembly 100 does not include at least the paddle 400 as described herein. It will be understood that, in some example embodiments, the cleaner assembly 2600 may be included in an apparatus 1000 with a doser assembly 100, where the doser assembly 100 and/or apparatus 1000 does not include at least both the first and second level sensors devices 710 and 720 as described herein and the apparatus 1000 may not be configured to implement the cascade control program as described herein.

Figure 28:
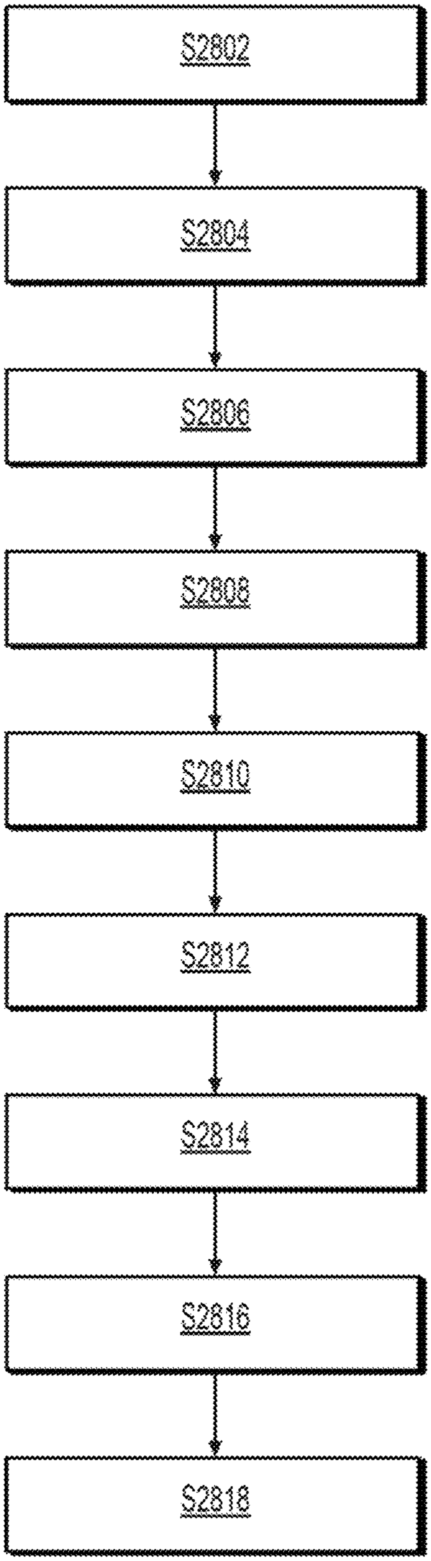
FIG. 28 shows a flowchart illustrating a method of making a pouch product according to some example embodiments.

FIG. 28 shows a flowchart illustrating a method of making a pouch product according to some example embodiments. The method may be performed by the apparatus 1000 according to any of the example embodiments, under the control of the control system 106 of the apparatus 1000. For example, the control system 106 may be configured to cause the apparatus 1000 to implement the method of making the pouch product as shown in FIG. 28 based on a processor 2320 of the control system 106 executing a program of instructions which may be stored at a memory 2330 of the control system 106. It will be understood that at least some operations of the method shown in FIG. 28 may be performed concurrently (e.g., simultaneously) with each other and/or may be performed in a different order than shown in FIG. 28. In some example embodiments, one or more operations shown in FIG. 28 may be absent from the method performed by the apparatus 1000. In some example embodiments, the method performed by the apparatus 1000 may include one or more additional operations in addition to the operations shown in FIG. 28.

At S2802, the apparatus 1000 transfers a first material 1500 to a first receiving location 120 of the apparatus 1000 (e.g., from a first roll holder 112). The first material 1500 may include a first elastic layer 1512*a* and a first support layer 1514. A portion 1520 of the first support layer 1514 may be removed from the first elastic layer 1512*a* (and drawn, for example to first scrap roll holder 119) such that the first elastic layer 1512*a* and the remaining portions 1522 of the support layer 1514 form a first web.

At S2804, the apparatus 1000 conveys the first web to a dosing location 130. The first web may be conveyed to overlay an outer circumferential surface 1125_S of the rotatable drum 1125 of the apparatus 1000, such that the first elastic layer 1512*a* of the first web overlaps one or more divots 1400 of the rotatable drum 1125.

At S2806, the apparatus 1000 applies a vacuum to the first web at the dosing location 130, via vacuum source 1410, vacuum conduits 1430, and air inlets 700 into the divots 1400, to draw at least a portion of the first web into one or more of the divots 1400 to form first web portions that are in the divots 1400.

At S2808, the apparatus 1000 may control a filler material distribution system 1200 to supply filler material 1300 into the hopper opening 200_O of the doser assembly 100. Such control may be implemented based on controlling a motor 1120 of the filler material distribution system 1200 to control a filler material conveyor system 1110 to transfer filler material 1300 from a hopper 1210 to the doser assembly 100. The filler material conveyor system 1110 may supply the filler material 1300 into the hopper opening 200_O of the doser assembly 100 as a flow 1302 of filler material 1300, for example via at least a first volume space 612 of a chute 600 of the doser assembly 100. The filler material 1300 supplied into the hopper opening 200_O of the doser assembly 100 is referred to as filler material 2200.

At S2810, the apparatus 1000 causes the doser assembly 100 to fill each of the first web portions in divots 1400 that are exposed to the hopper opening 200_O of the doser assembly 100 with a portion 2280 of filler material to form filled first web portions. The apparatus 1000 may cause the rotatable drum 1125 to rotate, with the first web portions being in the divots 1400, such that the divots 1400 move under the hopper opening 200_O of the doser assembly 100 to be exposed to the hopper opening 200_O and thus exposed to the filler material 2200 located therein. The filler material 2200 located in the bottom of the hopper opening 200_O may be provided into the exposed divots 1400 that are exposed to the hopper opening 200_O at the bottom of the hopper opening 200_O under gravity (e.g., the own weight of the filler material 2200 entering the divots 1400) and/or the weight of additional, overlaying filler material 2200 pushing the filler material at the bottom of the hopper opening 200_O into the divots 1400. The apparatus 1000 may cause the paddle 400 of the doser assembly 100 to vibrate 490 at S2810 to retain filler material 2200 in the hopper opening 200_O and remove excess filler material from the tops of the filled divots 1400_2 as the rotatable drum 1125 rotates the filled divots 1400_2 with the filled first web portions away from the doser assembly 100.

At S2812, the apparatus rotates the rotatable drum 1125 to the cleaning location 164 to convey the filled first web portions to the cleaner assembly 2600. At the cleaner assembly at S2812, the apparatus 1000 operates the cleaner roller 2610 to move excess filler material 2270 that is on an upper surface of the first material 1500, including the upper surface 1516 of the first elastic layer 1512*a* of the first material 1500 alone or in combination with the upper surfaces of the portions 1522 of the first material 1500, into one or more of the divots 1400, such that the excess filler material 2270 is added to the portions 2280 of filler material contained in the filled first web portions of said divots 1400. At the cleaner assembly at S2812, the apparatus 1000 further operates the poker roller 2620 to compress the portions 2280 of filler material in the one or more divots 1400 to thus compress the filled first web portions in the divots 1400.

At S2814, the apparatus 1000 conveys the filled first web portions, which have been compressed by the cleaner assembly 2600, from the cleaner assembly 2600 at the cleaning location 164 to a second receiving location 150. The apparatus may transfer a second material 1500' to the second receiving location 150 of the apparatus 1000 (e.g., from a second roll holder 172). The second material 1500' may include a second elastic layer 1512*b* and a second support layer 1514. A portion 1520 of the second support layer 1514 may be removed from the second elastic layer 1512*b* (and drawn, for example to second scrap roll holder 179) such that the second elastic layer 1512*b* and the remaining portions 1522 of the support layer 1514 form a second web.

At S2816, the apparatus 1000 may align the second web with the first web and seal the second web to the first web (e.g., via the heat knife assembly 5000 to form a pouch product.

At S2818, the apparatus may operate the heat knife assembly 5000 to cut the pouch product from the first web and the second web, thereby providing the formed pouch product that contains the portion 2280 of filler material.

Figure 29:
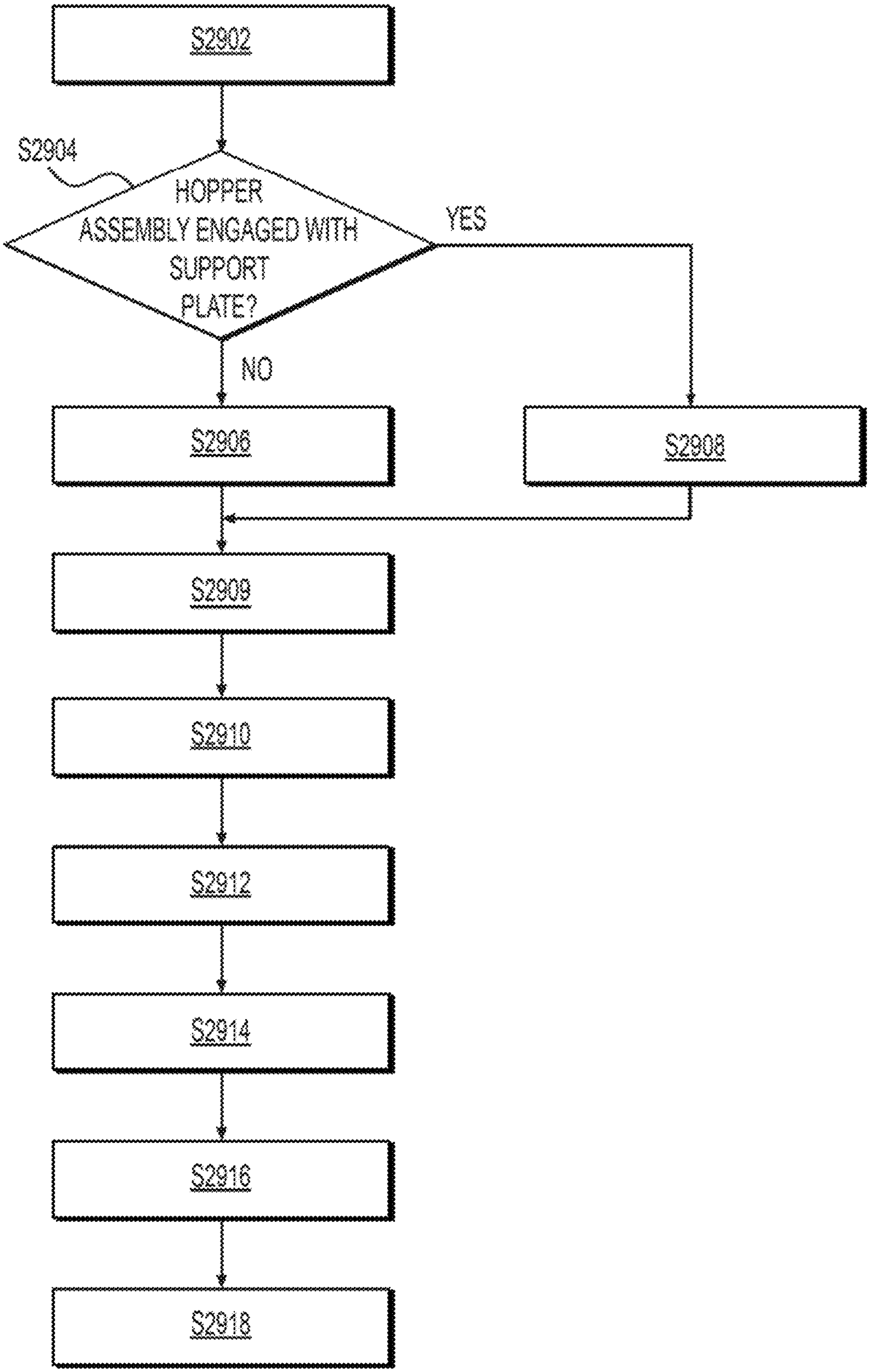
FIG. 29 shows a flowchart illustrating a method of configuring the doser assembly to provide filler material into divots of a rotatable drum of an apparatus according to some example embodiments.

FIG. 29 shows a flowchart illustrating a method of configuring the doser assembly 100 to provide filler material into divots 1400 of a rotatable drum 1125 of apparatus 1000 according to some example embodiments. The method may be performed with regard to the apparatus 1000, doser assembly 100, and/or rotatable drum 1125 according to any of the example embodiments. It will be understood that at least some operations of the method shown in FIG. 29 may be performed concurrently (e.g., simultaneously) with each other and/or may be performed in a different order than shown in FIG. 29. In some example embodiments, one or more operations shown in FIG. 29 may be absent from the method. In some example embodiments, the method may include one or more additional operations in addition to the operations shown in FIG. 29.

At S2902, the doser assembly 100 is coupled to a stationary structure to at least partially position the doser assembly 100 at a fixed location in relation to the rotatable drum 1125 of the apparatus 1000. For example, the fixed support structure 299 of the doser assembly 100 is connected to a stationary support structure to position the fixed support structure 299 at a fixed position in relation to at least the rotatable drum 1125, to thereby at least partially position the doser assembly 100 at a fixed location in relation to the rotatable drum 1125. Such a stationary support structure may be a stationary or fixed part of the apparatus 1000. For example, the fixed support structure 299 may be connected to a part of a frame of the rotatable drum 1125 of the apparatus 1000.

At S2904, a determination is made regarding whether the hopper assembly 200 is at least loosely engaged with the support plate 540 via connection parts 560 and 562 which are at least engaged with each other. If not, at S2906, the hopper assembly 200 is at least partially engaged with the support plate 540 such that the hopper assembly 200 may be configured to rotate in relation to the support plate 540. For example, connection part 560 that is fixed to the support plate 540 may be engaged with the connection part 562 that is fixed to the hopper assembly 200. If so, at S2908 the engagement between connection parts 560 and 562 is loosened or ensured to be loose, for example based on adjustably loosening adjustable clamp 264, to enable the connection parts 560 to 562 to rotate around the common longitudinal axis and thus to enable the hopper assembly 200 to rotate in relation to the support plate 540 while remaining engaged thereto. At S2909, the hopper assembly 200 is rotated to a particular orientation where the lower surface 200_LS of the hopper assembly 200 is located above and is oriented to be complementary, or "concentric," with the outer circumferential surface of the rotatable drum 1125. Such rotation may include rotating connection parts 560 and 562 are in relation to each other around the common central longitudinal axis 568 to a particular relative orientation where the lower surface 200_LS of the hopper assembly 200 is located above and is oriented to be complementary, or "concentric," with the outer circumferential surface of the rotatable drum 1125.

At S2910, the support plate 540 adjustably positioned to be on (e.g., in direct contact with) the outer circumferential surface 1125_S of the rotatable drum 1125 or on first material 1500 that is directly on the outer circumferential surface 1125_S. Such adjustable positioning may include causing the support plate to be pivoted 544 around pivot bar 290 to lower the distal end 540_D so that the lower surface 200_LS of the hopper assembly 200 contacts the outer circumferential surface 1125_S of the rotatable drum 1125 or contacts first material 1500 that is directly on the outer circumferential surface 1125_S and/or such that the support plate 540 (e.g., an inner surface 543 of a lower recess 542 of the support plate 540) rests on the eccentric 574 that is connected to the support bar 294. Such adjustable positioning at S2910 may include orienting the hopper assembly 200 to cause the lower surface 200_LS to be concentric, or "complementary", with the outer circumferential surface.

Such adjustable positioning at S2910 may include adjustably pivoting 579 the lever 576 of the doser assembly 100 to adjustably rotate 548 the eccentric 574 in relation to the support bar 294 to fine-tune the vertical positioning of the support plate 540, and thus the vertical positioning of the hopper assembly 200, in relation to the fixed support structure 299 and thus in relation to the rotatable drum 1125.

At S2912, the adjustable clamp 264 is adjusted to tighten the engagement between the connection parts 560 and 562 and thus hold the hopper assembly 200 in place at its present position and orientation. At S2914, the threaded bolts 582 of the adjustable swivel joint 580 are adjusted to engage opposite surfaces of the nose 584 to thus establish and define the gap 582_G that may be used to quickly re-establish the same relative orientation of connection parts 560 and 562 (and thus re-establish the orientation which renders the lower surfaces 200_LS of the hopper assembly 200 concentric with the outer circumferential surface 1125_S of the rotatable drum 1125) after future disconnection and re-connection of the connection parts 560 and 562.

At S2916, the paddle 400 is adjustably positioned in relation to the hopper assembly 200, so as to adjustably position the paddle 400 in relation to the rotatable drum 1125, the divots 1400 thereof, and first material 1500 that is presently or will be drawn onto the outer circumferential surface 1125_S so as to be between the rotatable drum 1125 and the doser assembly 100. The adjustment at S2916 may include adjusting the adjustable bearing 550 to adjustably pivot 514 the adjustable plate 510 around the pivot bar 290 in relation to the support plate 540, thereby adjustably positioning the paddle 400 which may be pivotably connected to bracket 480 (which may be connected to adjustable plate 510 via drive plate 500) at the paddle pivot joint 410.

At S2918, the doser assembly 100 is operated concurrently with rotation of the rotatable drum to rotate divots 1400, into which the first web portions of the first material 1500 are drawn (e.g., separate, respective portions of the first elastic layer 1512*a* are drawn into separate, respective divots 1400), under the doser assembly 100, and further concurrently with operation of the filler material distribution system 1200 to supply filler material 1300 into the hopper opening 200_O of the doser assembly 100 to accumulate in the hopper opening 200_O as filler material 2200, so that the filler material 2200 may fall into the divots 1400 under gravity and/or under pressure of overlying filler material 2200 in the hopper opening 200_O. S2918 may include operating the motor 360 to drive the vibration transmission assembly 300 to cause the paddle 400 to pivotably reciprocate, or "vibrate" 480 around paddle pivot joint 410 to clear excess filler material 2200 from the tops of filled divots 1400_2 being rotated out of exposure to the hopper opening 200_O and away from the doser assembly 100 and/or to retain filler material 2200 in the hopper opening 200_O while reducing ejection of filler material 2200 from the hopper opening 200_O independently of the portions 2280 of filler material in the filled divots 1400_2.

In some example embodiments, the connection parts 560 and 562 are connected to each other at S2902. Therefore, as shown, the method may bypass S2904 and instead, at S2906, adjustably loosen the adjustable clamp 264 to loosen the engagement between connection parts 560 and 562 to enable the connection parts 560 to 562 to rotate around the common longitudinal axis at S2908 to establish the desire relative orientation between the connection parts 560 and 562

While some example embodiments have been disclosed herein, it should be understood that other variations may be possible. Such variations are not to be regarded as a departure from the spirit and scope of the present inventive concepts, and all such modifications as would be obvious to one skilled in the art are intended to be included within the scope of the following claims.

We claim:

1. An apparatus for making pouch products, the apparatus comprising:

a doser assembly at a dosing location, the doser assembly configured to deliver a filler material at the dosing location;

a conveyor system, the conveyor system including a rotatable drum, the rotatable drum including a plurality of divots along an outer circumferential surface of the rotatable drum, the plurality of divots configured to travel along a path of the rotatable drum, the conveyor system configured to allow a vacuum to be communicated to at least some divots of the plurality of divots, such that separate portions of a receiving material are drawn into separate divots of the plurality of divots, the rotatable drum configured to rotate the separate divots and the receiving material under the doser assembly such that separate portions of the filler material delivered by the doser assembly are received on the separate portions of the receiving material in the separate divots at the dosing location; and a poker roller, the poker roller including a plurality of projections, the poker roller configured to counter rotate with the rotatable drum such that the plurality of projections extend into the separate divots to compress the separate portions of the filler material in the separate divots.

2. The apparatus of claim 1, wherein the plurality of divots of the rotatable drum includes a plurality of separate lanes of divots extending in parallel around the outer circumferential surface of the rotatable drum, the plurality of projections of the poker roller includes a plurality of lanes of projections extending in parallel around an outer circumferential surface of the poker roller, and the plurality of lanes of projections are aligned with separate, respective lanes of divots of the rotatable drum such that respective projections of each separate lane of projections is configured to extend into and out of one or more divots of a separate, respective lane of divots of the rotatable drum based on counter rotation of the poker roller and the rotatable drum.

3. The apparatus of claim 2, wherein the plurality of lanes of projections are grouped into sets of lanes such that adjacent lanes of the plurality of lanes of projections that correspond to a set of lanes are closer together in a first direction compared to adjacent lanes of the plurality of lanes of projections that are each from a different set of lanes.

4. The apparatus of claim 1, further comprising:

a cleaner roller configured to counter rotate with the rotatable drum at a tangential speed greater than a tangential speed of at least one of the outer circumferential surface of the rotatable drum or the receiving material such that an outer surface of the cleaner roller is in contact with the receiving material on the outer circumferential surface of the rotatable drum, wherein the cleaner roller includes at least a compressible roller material that defines the outer surface of the cleaner roller, and the cleaner roller is configured to compress the compressible roller material against the receiving material on the outer circumferential surface of the rotatable drum.

5. The apparatus of claim 4, wherein the compressible roller material includes silicone.

6. The apparatus of claim 4, wherein the cleaner roller is a circular cylindrical roller or a polygonal cylindrical roller.

7. The apparatus of claim 4, wherein a smallest spacing distance between the rotatable drum and the cleaner roller is equal to or less than a thickness of the receiving material.

8. The apparatus of claim 4, wherein the cleaner roller is configured to rotate such that the outer surface of the cleaner roller moves at a tangential speed that is at least three times greater than the tangential speed of the at least one of the outer circumferential surface of the rotatable drum or the receiving material.

9. The apparatus of claim 4, further comprising:

a filler material shield that at least partially covers the cleaner roller and the poker roller.

10. The apparatus of claim 1, wherein:

each divot of the plurality of divots has a first length in a first direction, a first width in a second direction that crosses the first direction, and a first depth in a third direction that crosses the first direction and the second direction, each projection of the plurality of projections has a second length in a fourth direction that is parallel to a tangent of a curvature of the poker roller, a second width in a fifth direction that crosses the fourth direction, and a second depth in a sixth direction that crosses the fourth direction and the fifth direction, the second length is smaller than the first length, and the second width is smaller than the first width.

11. The apparatus of claim 1, wherein each projection of the plurality of projections has an outer surface that is distal from a central axis of the poker roller and has a convex curvature.

12. A cleaner assembly for an apparatus for making pouch products, the cleaner assembly comprising:

a poker roller including a plurality of projections that are each configured to extend into a respective divot of a plurality of divots defined by an outer circumferential surface of a rotatable drum of the apparatus, the poker roller configured to counter rotate with the rotatable drum at a same tangential speed as at least one of the outer circumferential surface of the rotatable drum or a first elastic layer on the outer circumferential surface of the rotatable drum, such that each projection of the plurality of projections extends into and out of a separate respective divot of the plurality of divots based on counter rotation of the poker roller and the rotatable drum, wherein the poker roller is configured to compress a filler material into the plurality of divots.

13. The cleaner assembly of claim 12, wherein the plurality of projections of the poker roller includes a plurality of lanes of projections extending in parallel around an outer circumferential surface of the poker roller, and the plurality of lanes of projections are configured to be aligned with separate, respective lanes of divots of the rotatable drum such that respective projections of each separate lane of projections is configured to extend into and out of one or more divots of a separate, respective lane of divots of the rotatable drum based on the counter rotation of the poker roller and the rotatable drum.

14. The cleaner assembly of claim 13, wherein the plurality of lanes of projections are grouped into sets of lanes such that adjacent lanes of the plurality of lanes of projections that correspond to a set of lanes are closer together in a first direction compared to adjacent lanes of the plurality of lanes of projections that are each from a different set of lanes.

15. The cleaner assembly of claim 12, further comprising:

a cleaner roller configured to counter rotate with the rotatable drum of the apparatus at a greater tangential speed than at least one of the outer circumferential surface of the rotatable drum or an upper surface of the first elastic layer on the outer circumferential surface of the rotatable drum, such that an outer surface of the cleaner roller is in contact with the upper surface of the first elastic layer on the outer circumferential surface of the rotatable drum, wherein the cleaner roller includes a compressible roller material that defines the outer surface of the cleaner roller, and the cleaner roller is configured to compress the compressible roller material against the upper surface of the first elastic layer on the outer circumferential surface of the rotatable drum.

16. The cleaner assembly of claim 15, wherein the compressible roller material includes silicone.

17. The cleaner assembly of claim 15, wherein the cleaner roller is a circular cylindrical roller or a polygonal cylindrical roller.

18. The cleaner assembly of claim 15, wherein the cleaner roller is configured to rotate such that the outer surface of the cleaner roller moves at a tangential speed that is at least three times greater than a tangential speed of the at least one of the outer circumferential surface of the rotatable drum or the upper surface of the first elastic layer.

19. The cleaner assembly of claim 15, further comprising:

a filler material shield that is configured to partition the cleaner roller and the poker roller from a material dispensing station.

20. The cleaner assembly of claim 12, wherein each projection of the plurality of projections has an outer surface that is distal from a central axis of the poker roller and has a convex curvature.

* * * * *